(12) United States Patent
Weskamp et al.

(10) Patent No.: US 11,693,553 B2
(45) Date of Patent: Jul. 4, 2023

(54) DEVICES, METHODS, AND GRAPHICAL USER INTERFACES FOR AUTOMATICALLY PROVIDING SHARED CONTENT TO APPLICATIONS

(71) Applicant: Apple Inc., Cupertino, CA (US)

(72) Inventors: Marcos A. Weskamp, Palo Alto, CA (US); Zheng X. Hong, San Jose, CA (US); Marcel van Os, Santa Cruz, CA (US); Corey K. Wang, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/481,206

(22) Filed: Sep. 21, 2021

(65) Prior Publication Data

US 2022/0365831 A1 Nov. 17, 2022

Related U.S. Application Data

(60) Provisional application No. 63/189,654, filed on May 17, 2021.

(51) Int. Cl.
*G06F 9/54* (2006.01)
*G06F 3/0484* (2022.01)
(Continued)

(52) U.S. Cl.
CPC ........ *G06F 3/04847* (2013.01); *G06F 3/0484* (2013.01); *G06F 9/541* (2013.01);
(Continued)

(58) Field of Classification Search
None
See application file for complete search history.

(56) References Cited

U.S. PATENT DOCUMENTS 8,805,406 B1 8/2014 Casaburi et al.
10,129,573 B1 * 11/2018 Sahasrabudhe ....... G06F 16/783
(Continued)

FOREIGN PATENT DOCUMENTS

WO WO 2019/217009 A1 11/2019

OTHER PUBLICATIONS

Bosnjak, "A New "Activity" Tab Appears in the YouTube Android App", https://www.androidheadlines.com/2017/10/a-new-activity-tab-appears-in-the-YouTube-android_app.html, Oct. 5, 2022, 9 pages.
(Continued)

*Primary Examiner* — Charles E Anya
(74) *Attorney, Agent, or Firm* — Morgan, Lewis & Bockius LLP

(57) ABSTRACT

A computer system receives, in a first messaging conversation by a first messaging application of a plurality of applications, information identifying a first shared content item. In response to receiving the information identifying the first shared content item, in accordance with a determination that the first shared content item is of a first type, the computer system automatically makes the first shared content item available within a first application of the plurality of applications, the first application is associated with content of the first type. In accordance with a determination that the first shared content item is of a second type, the computer system automatically makes the first shared content item available within a second application of the plurality of applications, wherein the second application is associated with content of the second type.

60 Claims, 77 Drawing Sheets

(51) Int. Cl.
  *G06F 3/04847* (2022.01)
  *G06F 21/10* (2013.01)
(52) U.S. Cl.
  CPC .............. *G06F 9/546* (2013.01); *G06F 21/10* (2013.01); *G06F 2209/544* (2013.01); *G06F 2221/0791* (2013.01)

(56) References Cited

U.S. PATENT DOCUMENTS

| | | | |
|---|---|---|---|
| 10,476,827 B2 | 11/2019 | Lieb et al. | |
| 2014/0040742 A1* | 2/2014 | Park | G06F 3/04842 715/719 |
| 2014/0282263 A1* | 9/2014 | Pennington | G06F 3/0482 715/838 |
| 2015/0172250 A1* | 6/2015 | Sharma | H04L 51/08 715/753 |
| 2016/0063276 A1 | 3/2016 | Pycock | |
| 2018/0124129 A1* | 5/2018 | Geisler | H04L 67/306 |
| 2018/0270180 A1* | 9/2018 | Chen | H04L 51/24 |
| 2018/0332086 A1* | 11/2018 | De Napoli Ferreira | G06F 16/958 |
| 2019/0073102 A1* | 3/2019 | Shaw | H04L 67/06 |
| 2019/0146995 A1* | 5/2019 | Lewis | G06F 16/48 707/723 |
| 2019/0394276 A1* | 12/2019 | Dachille | G06F 3/04842 |
| 2020/0106610 A1 | 4/2020 | Doddavula et al. | |
| 2020/0133478 A1* | 4/2020 | Chaudhri | H04N 5/23216 |
| 2020/0204647 A1* | 6/2020 | Forster | H04L 67/327 |
| 2020/0217009 A1 | 7/2020 | Luo et al. | |
| 2020/0288194 A1* | 9/2020 | Lewis | H04N 21/4825 |
| 2022/0365666 A1 | 11/2022 | Weskamp et al. | |

OTHER PUBLICATIONS

Bray, "Google Drive: Shared with Me", https://www.youtube.com/watch?v=ENnCIZn9fxw, Apr. 7, 2016, 3 pages.
Northville Tech, "Save WhatsApp Photos to iPhone Camera Roll", https://youtube.GLOiejvnvRI?t=61, Feb. 6, 2020, 3 pages.
Youtube, "NEW Youtube Messenging Feature—Share Videos with Friends", https://www.youtube.com/watch?v=3s90jN6iVJ8, May 26, 2018, 3 pages.
Guinness, "What Do the Little Checkmarks in WhatApp Mean?", http://web.archive.org/web/20201202104027/https://www.howtogeek.com/284629/what-do-the-little-checkmarks-in-whatsapp-mean, Dec. 14, 2016, 5 pages.
Lloyd, "WikiHow.com How to Delete Photoes on Facebook Messenger", https://web.archive.org/web/20200919045804/https.//www.wikihow.tech/Delete-Photos-on-Facebook-Messenger, Jul. 8, 2018, 32 pages.
Tibbetts, "Allow or Deny App Access to Documents, Pictures, and Video Folders in Windows 10", https://web.archive.org/web/20210210105818/https://www.majorgeeks.com/com/content/page/allow_or_deny_app_access_to_documents_pictures_and_video_folder_in_windows_10, Jan. 3, 2020, 3 pages.
Anoymous, "Dispatcher Phoenix Sample Workflows", https://web.archive.org/web/20210117061328/https://sec.kmbs.us/version2/products/dppe/samples.html, Jan. 17, 2021, 18 pages.
Hardwick, "How to Stop WhatsApp Auto-Saving Images and Video to Your iPhone's Camera Roll", https://www.macrumors.com/how-to-stop-Whatsapp-saving-images-in-iphone-camera-roll, Jun. 22, 2018, 18 pages.
Krose, "Chatapp Telegram photos and videos are not showin the Google photo gallerty. (Or other gallery apps)", https://support.google.com/photos/thread/10416012/chatapp-telegram-photos-and-videos-are-not-shownin-the-google-photo-gallery-or-other-gallery-apps?, Jan. 20, 2020, 4 pages.
Invitation to Pay Additional Fees, dated Aug. 8, 2022, received in International Patent Application No. PCT/US2022/028574, which corresponds with U.S. Appl. No. 17/745,788, 22 pages.
Tillman, "What is Apple Shared with You and How Does it Work in Apps?", https://www.pocket-lint.com/apps/news/apple/157265-what-is-apple-shared-with-you-and-how-does-it-work-in-apps, Sep. 21, 2022, 25 pages.
Office Action, dated Oct. 3, 2022, received in U.S. Appl. No. 17/481,212, 33 pages.
ISR and Written Opinion, dated Nov. 9, 2022, received in International Patent Application No. PCT/US2022/029664, 36 pages.

\* cited by examiner

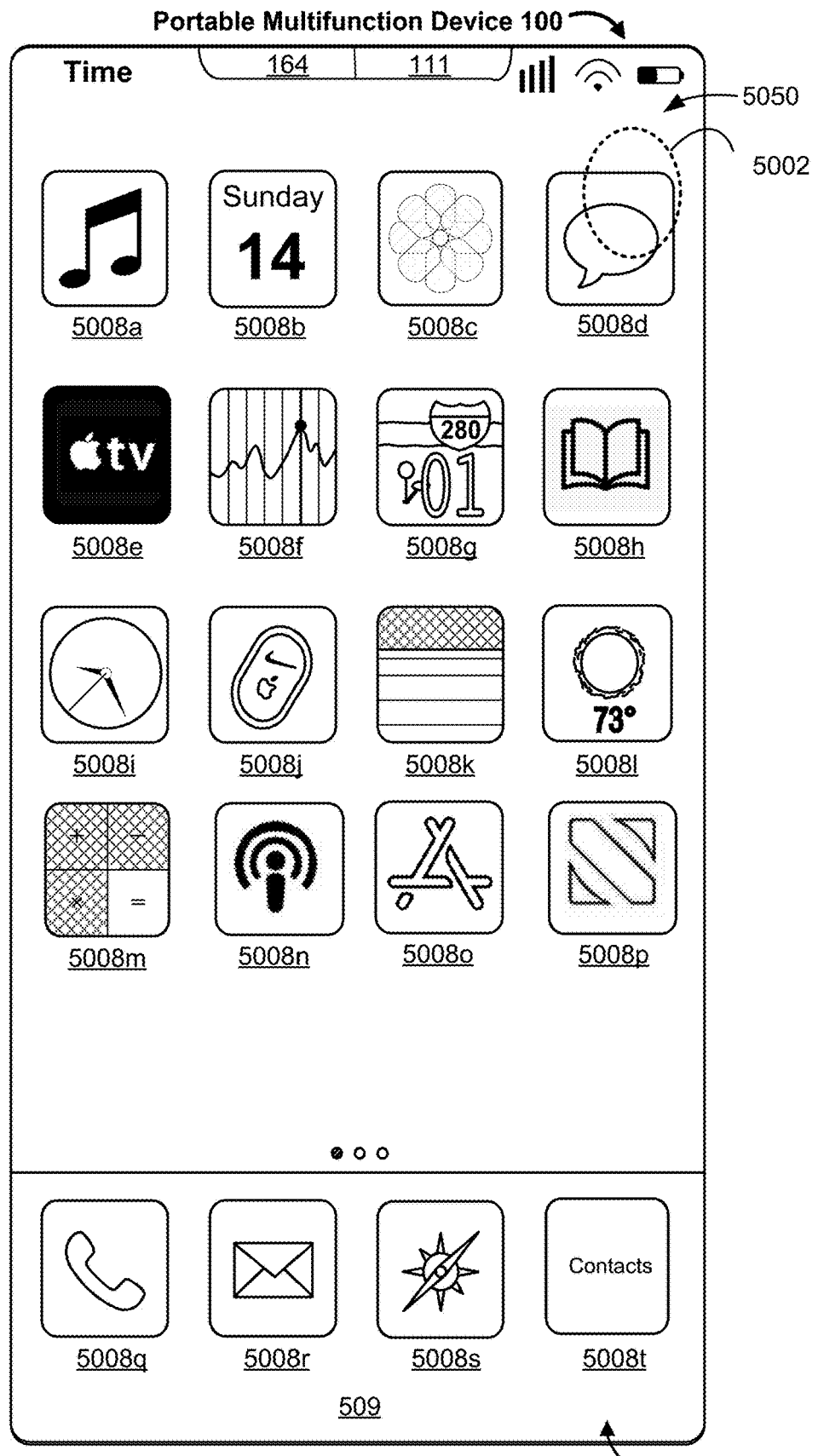
Figure 5A1

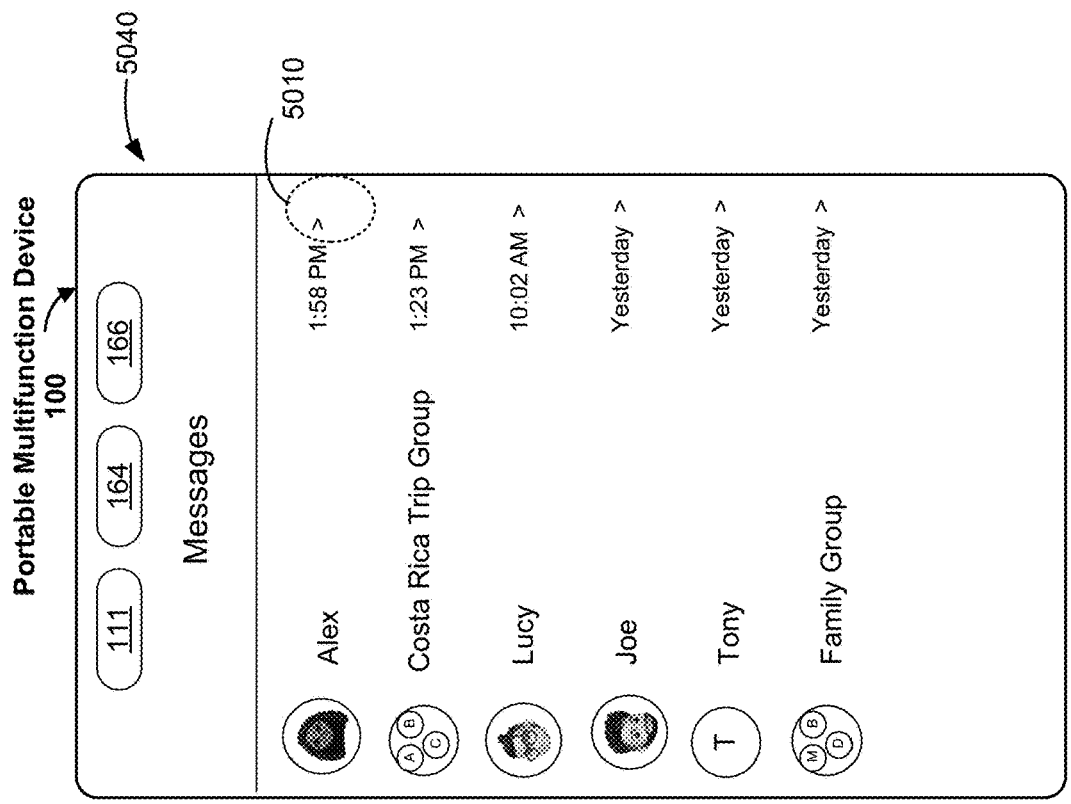
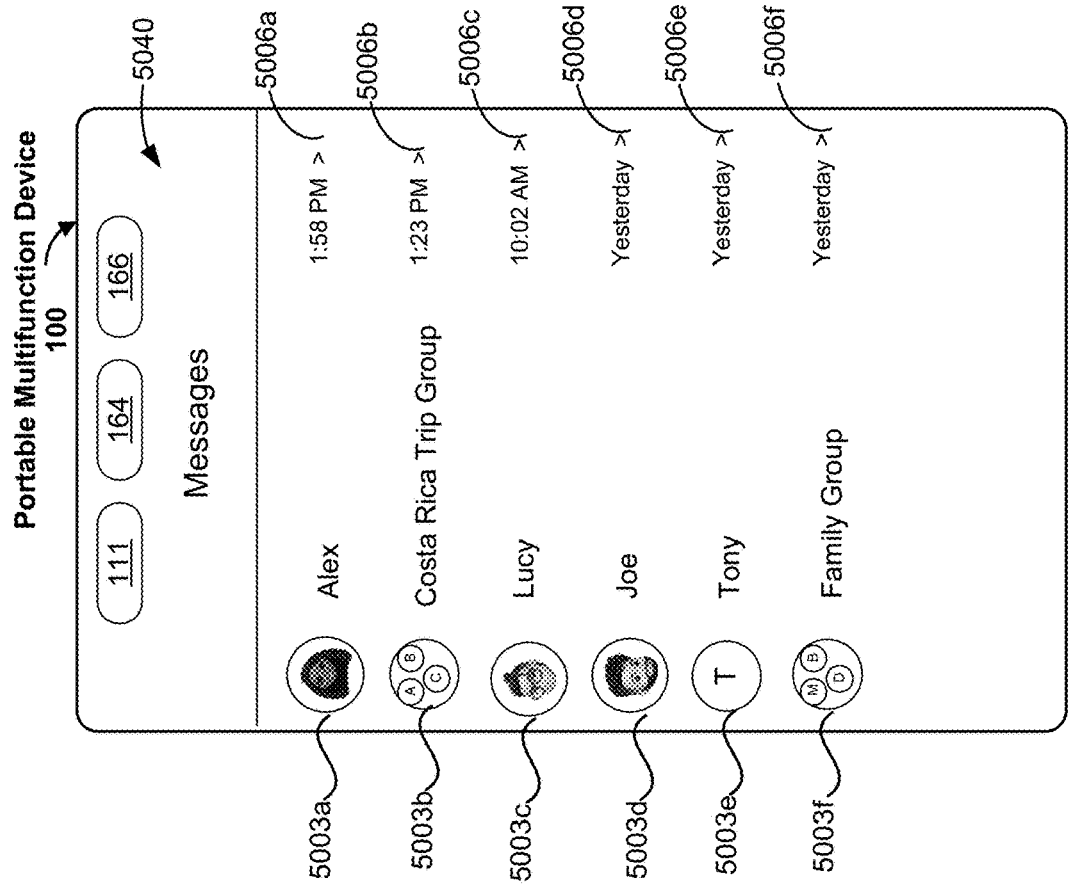
Figure 5A2
Figure 5A3

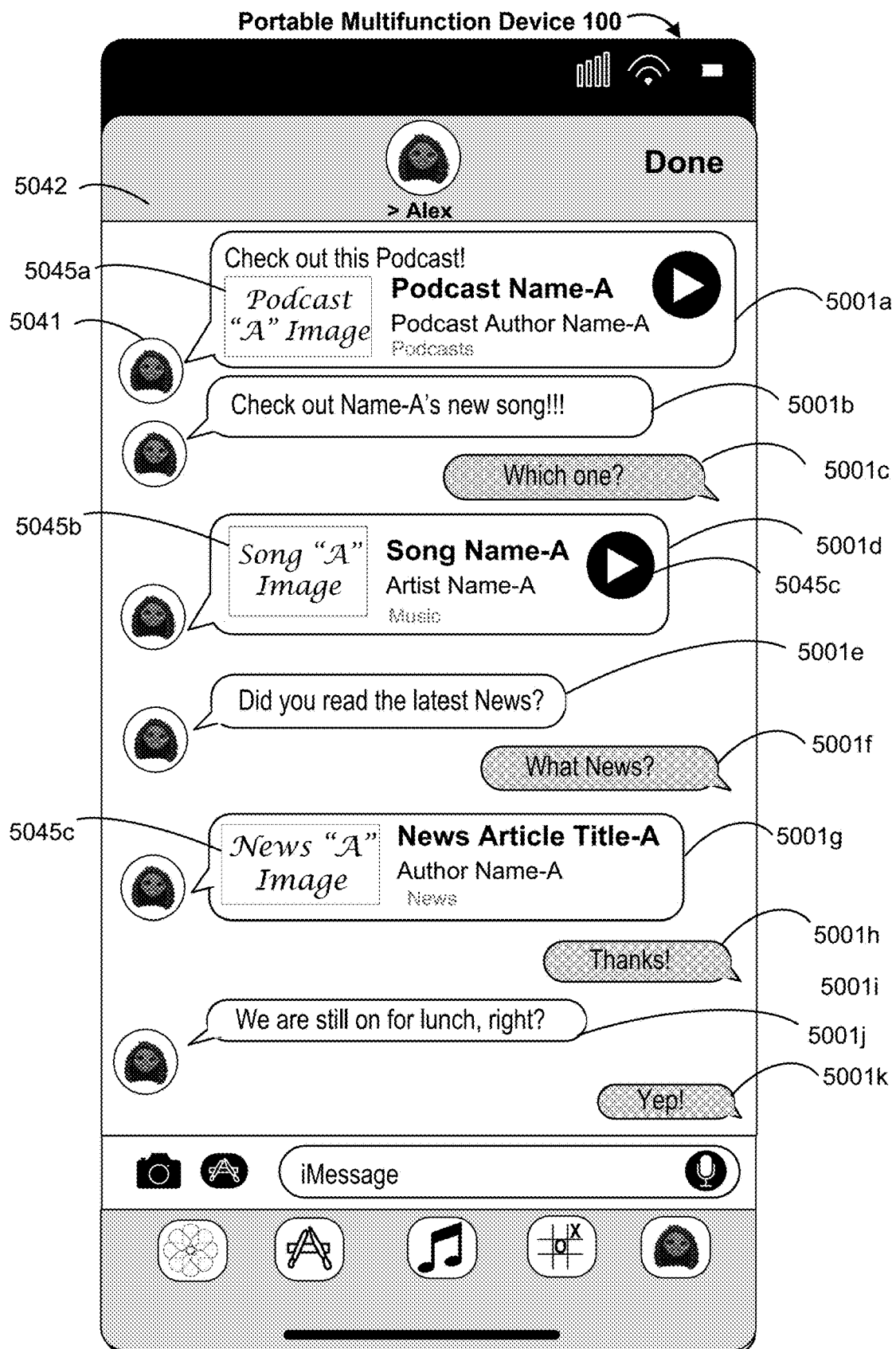
Figure 5A4

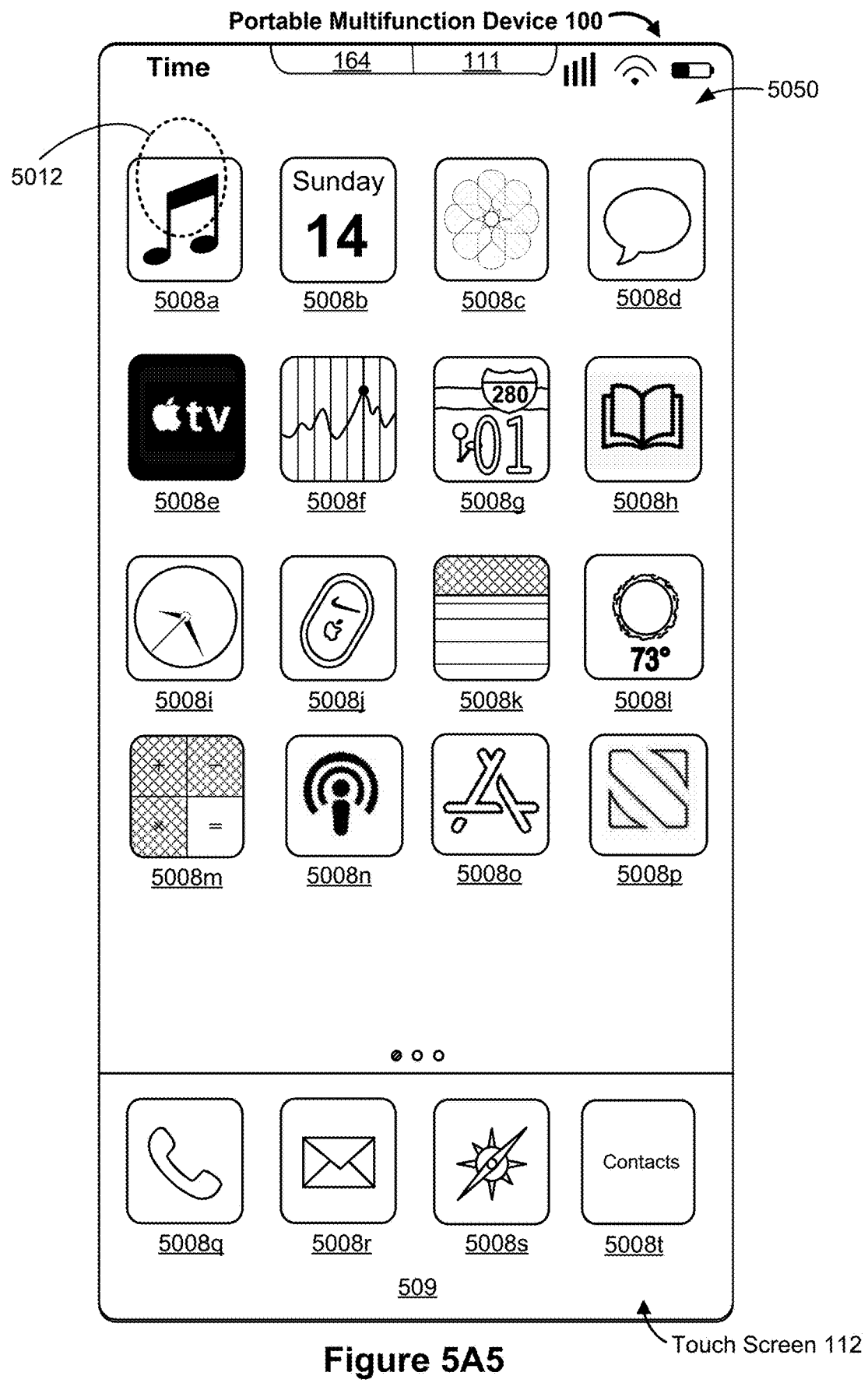
Figure 5A5

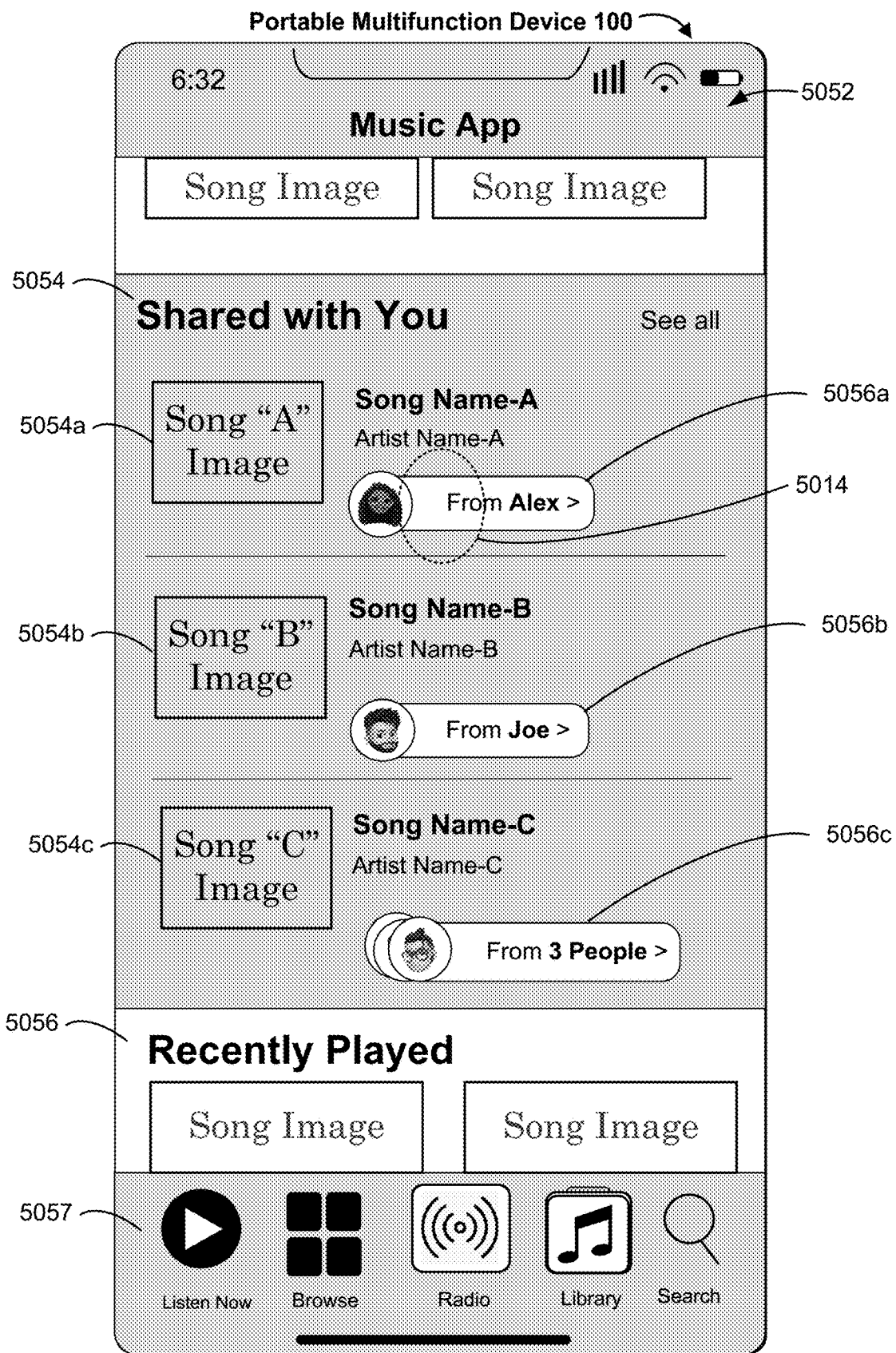
Figure 5A6

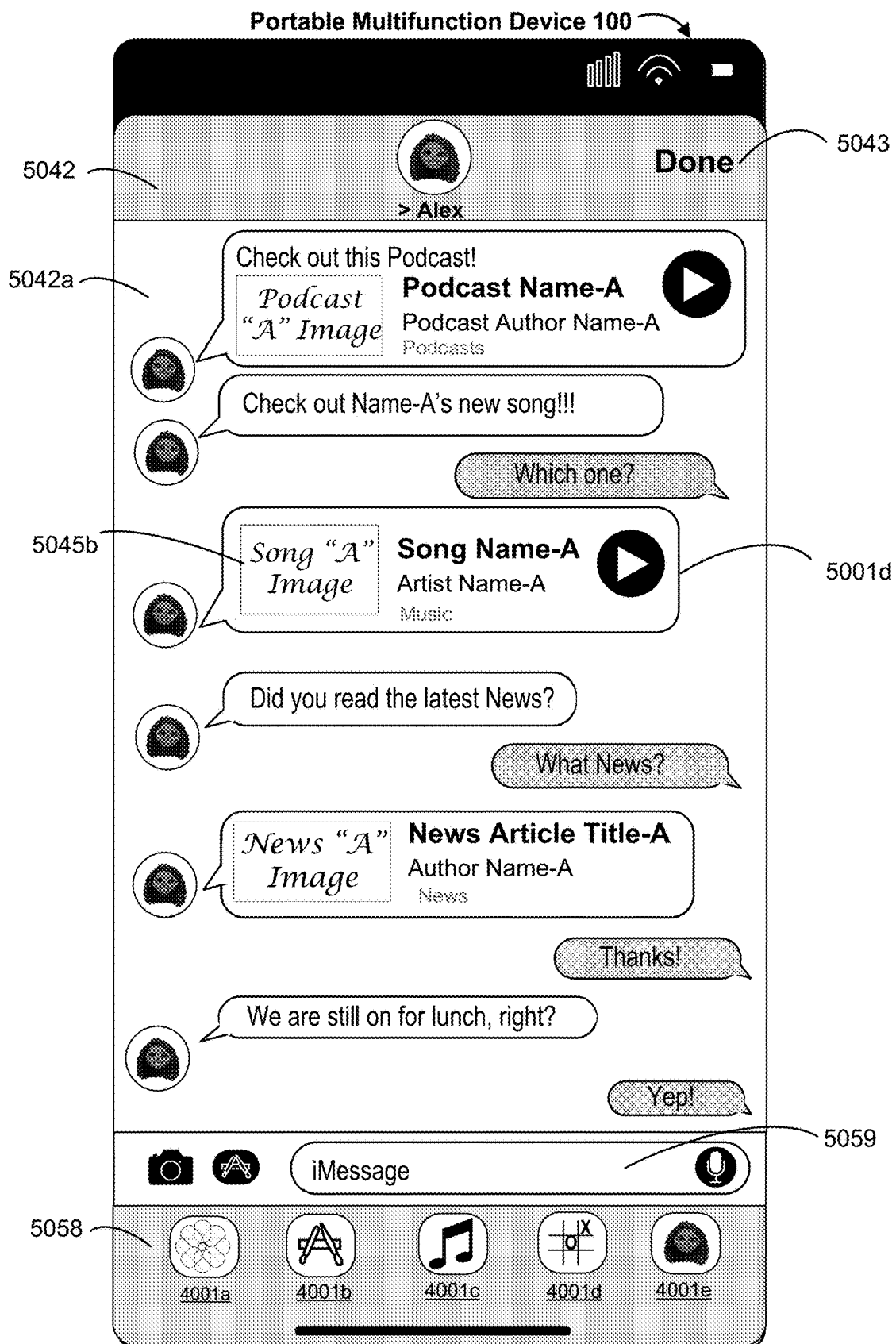
Figure 5A7

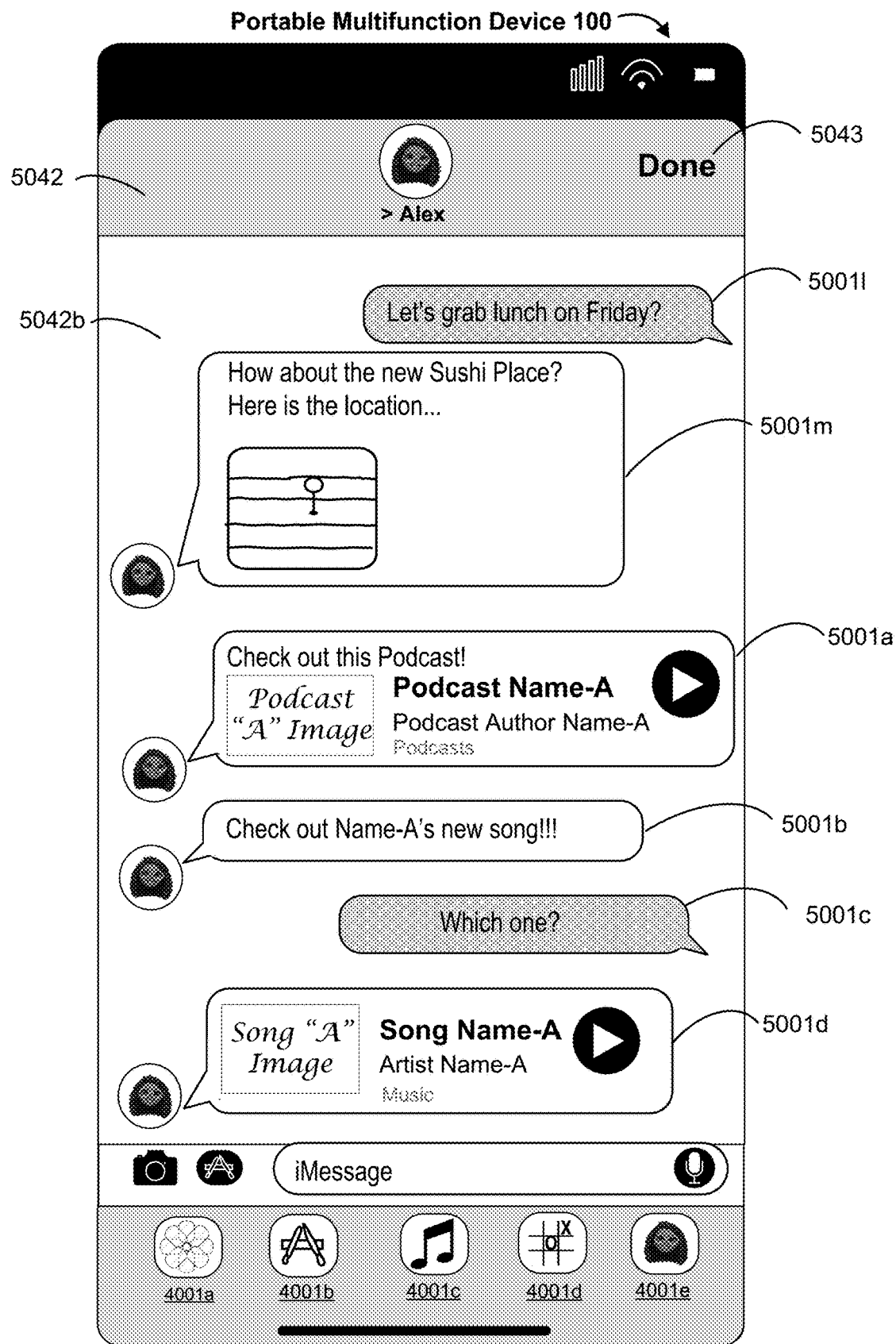
Figure 5A8

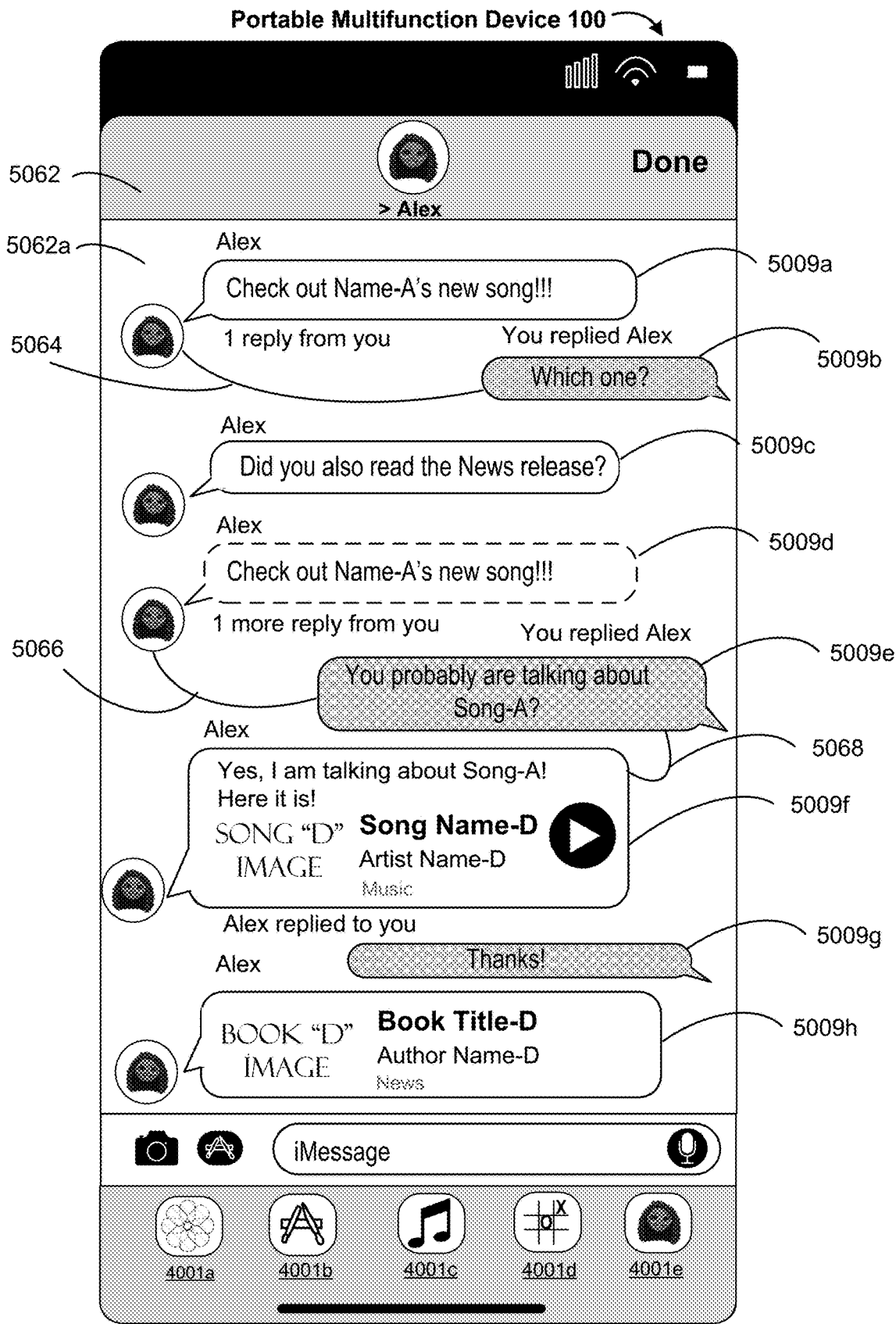
Figure 5B1

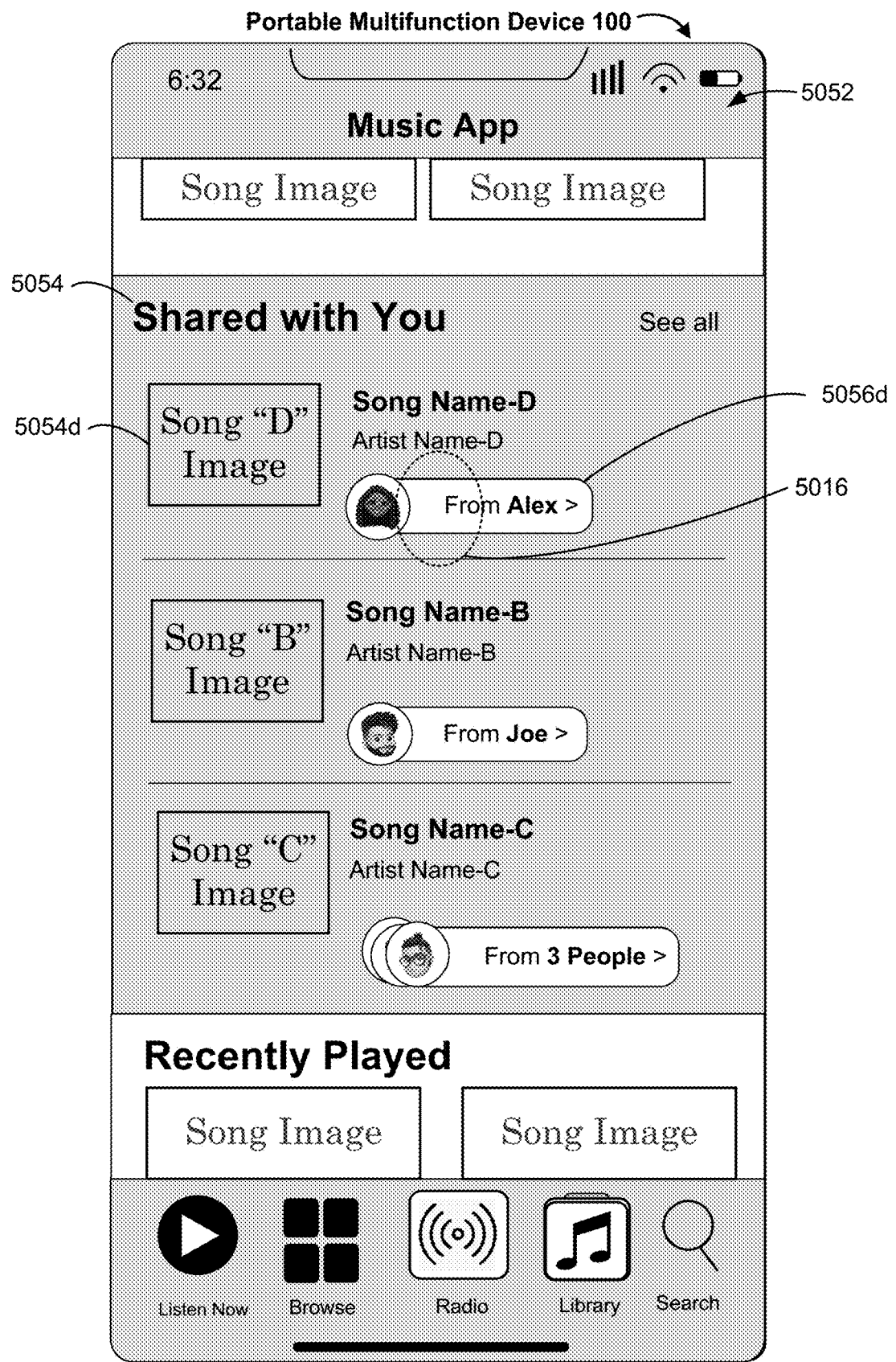
Figure 5B2

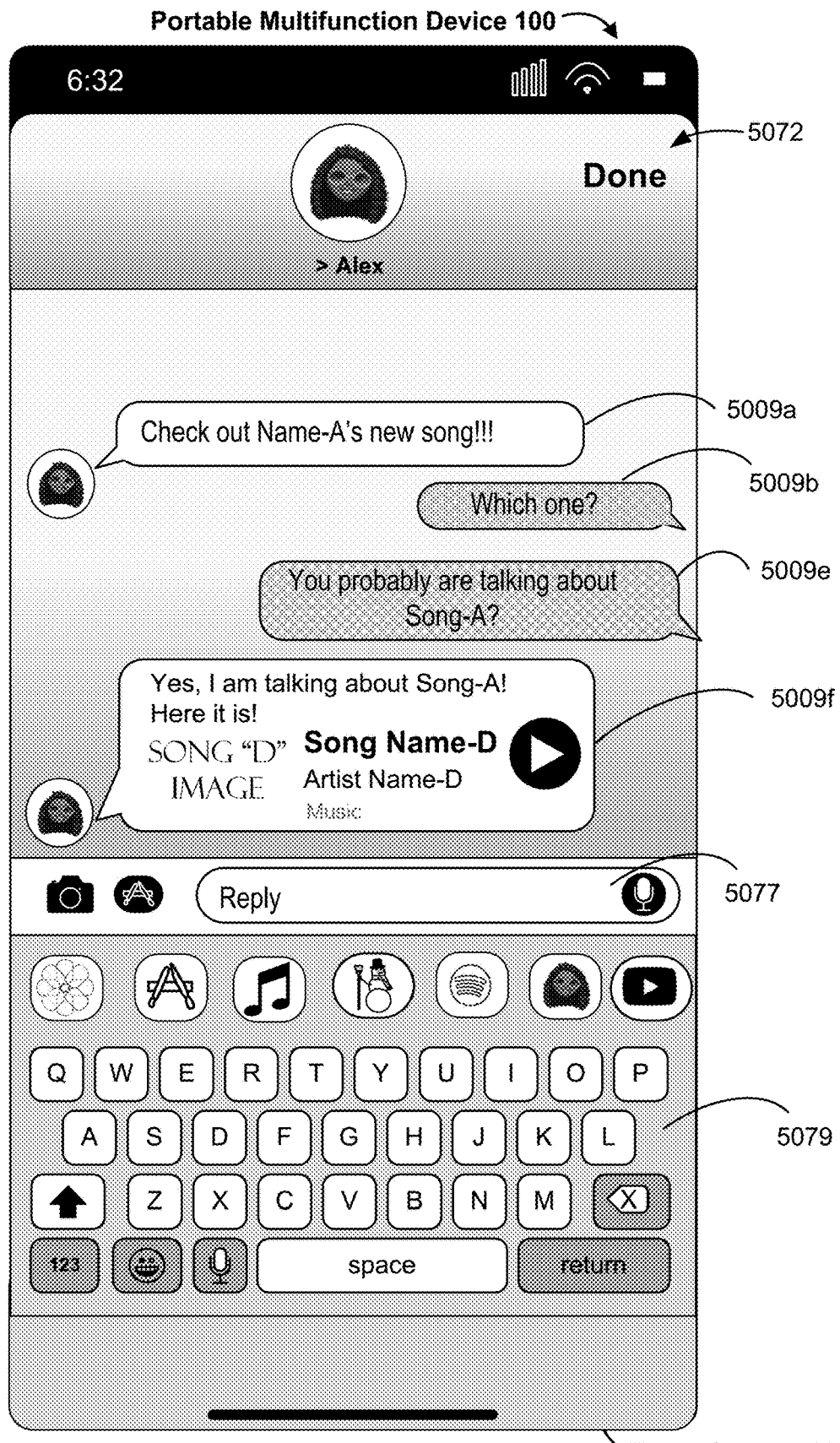
Figure 5B3

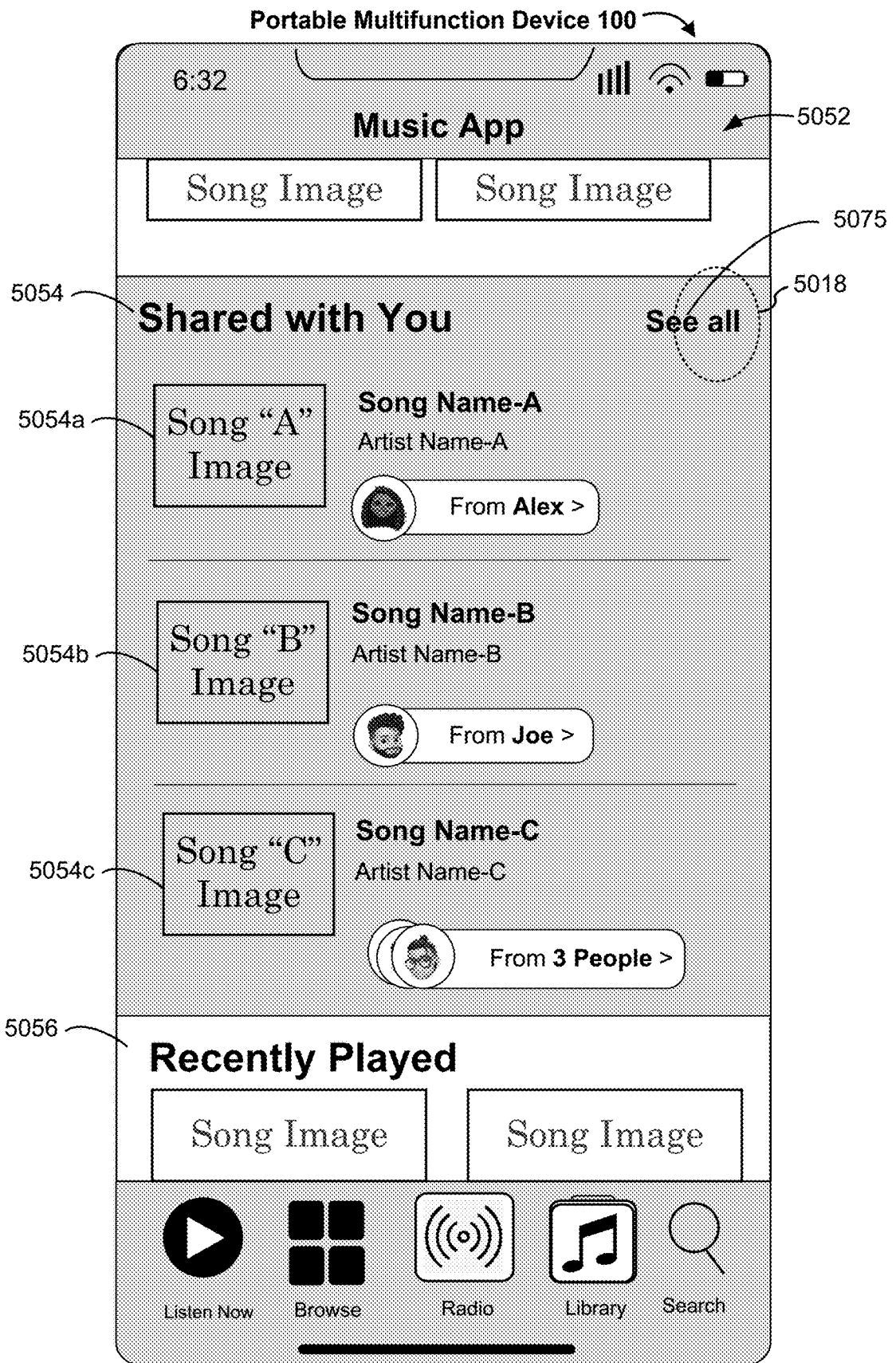
Figure 5C1

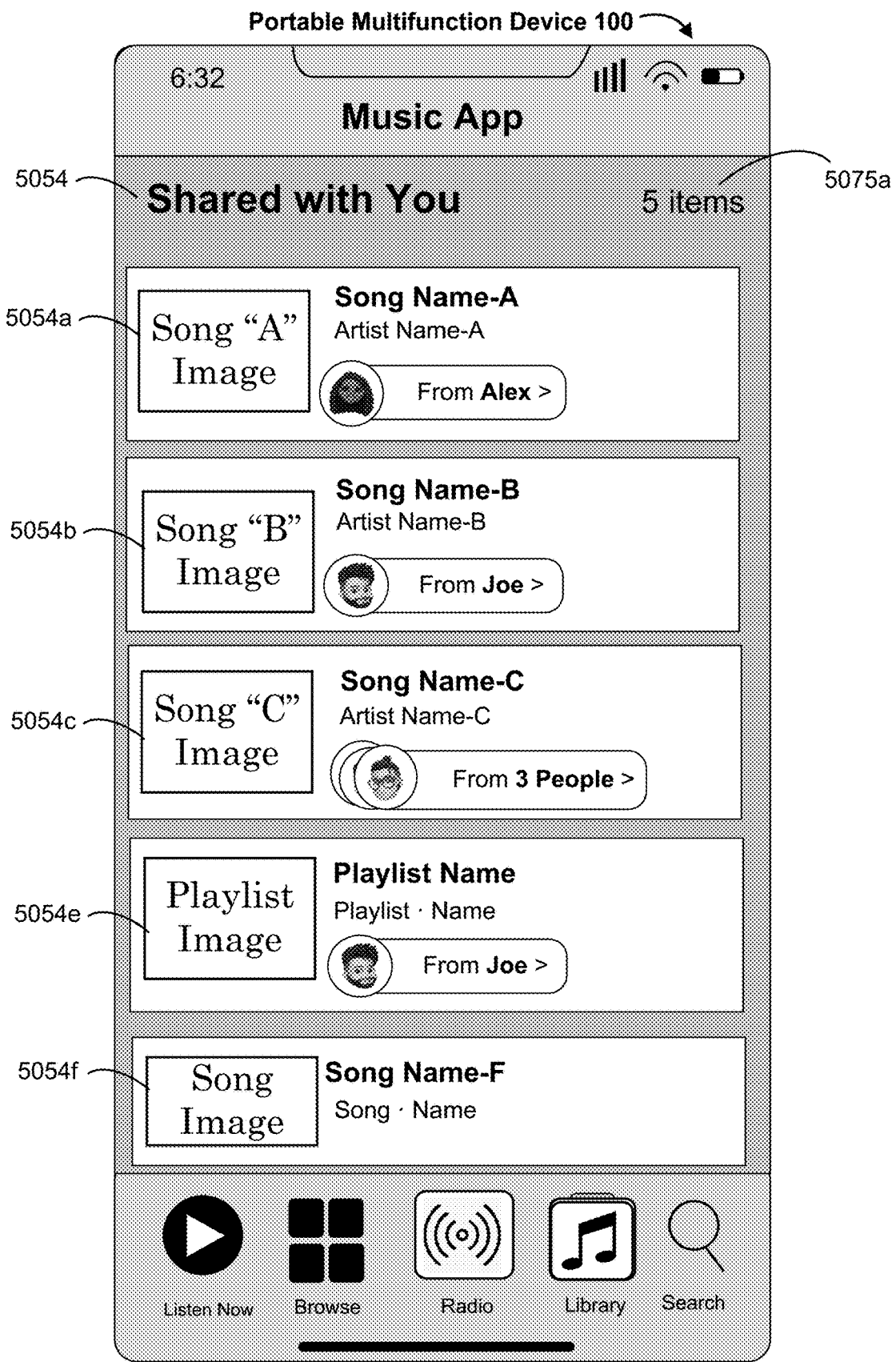
Figure 5C2

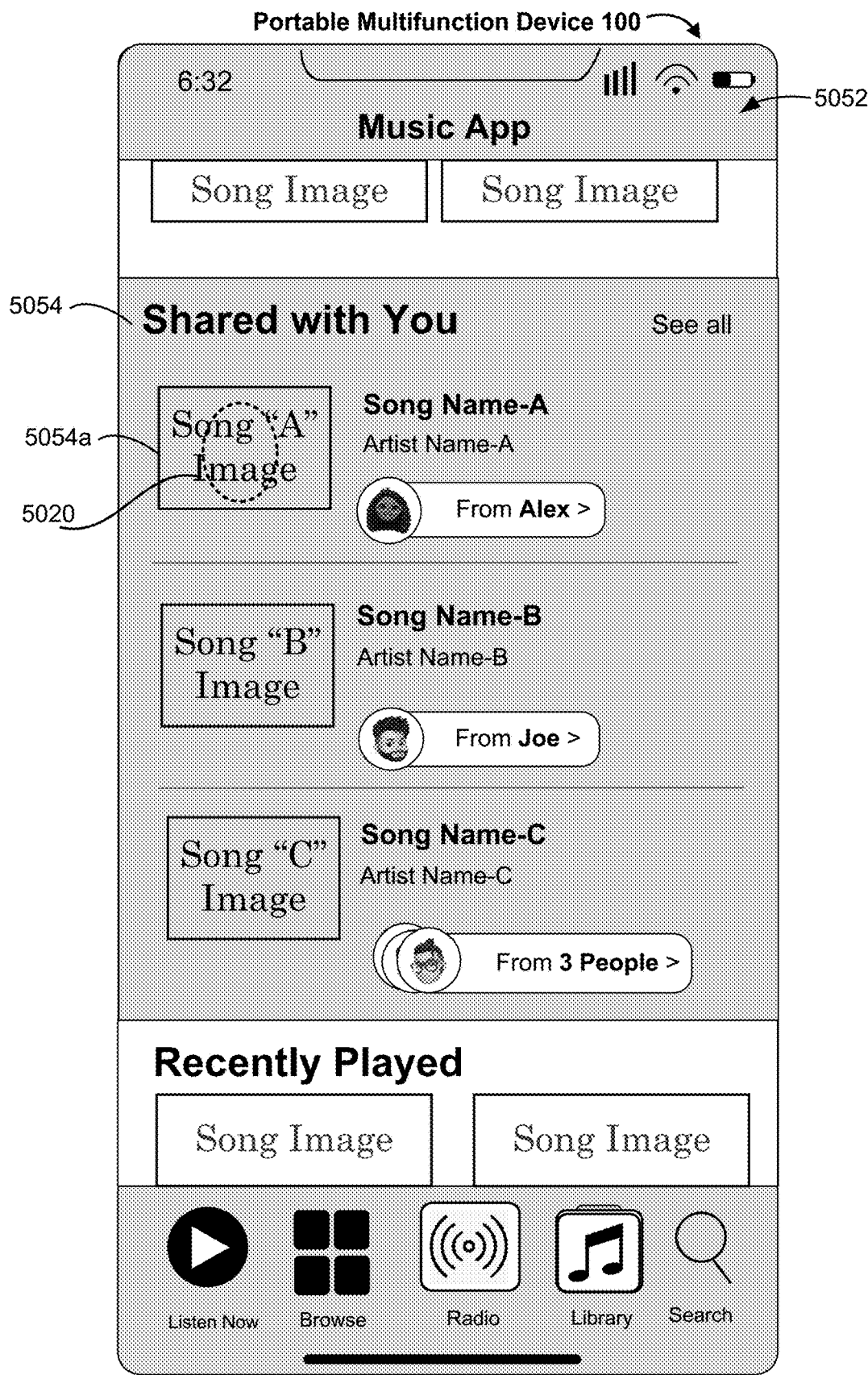
Figure 5C3

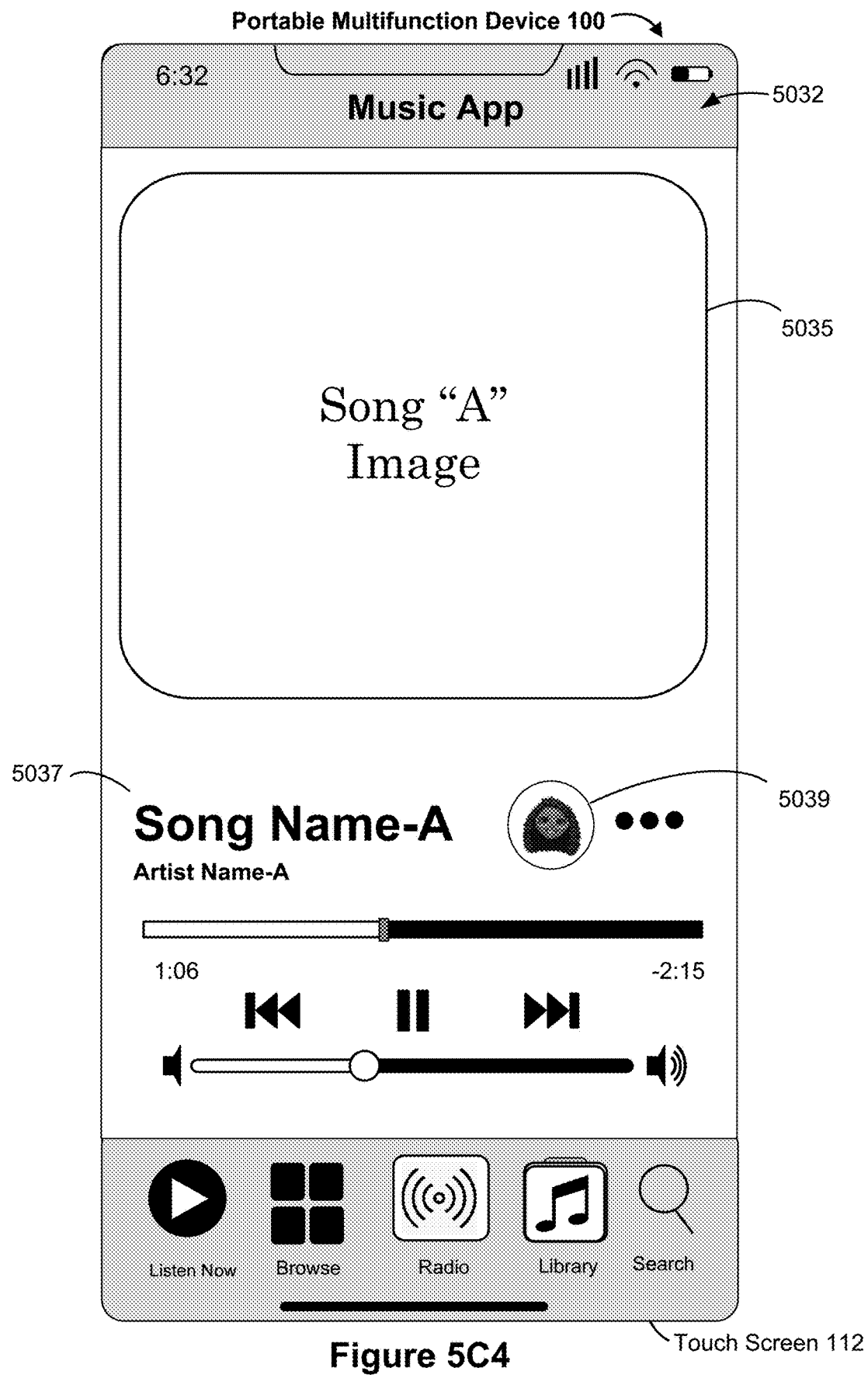
Figure 5C4

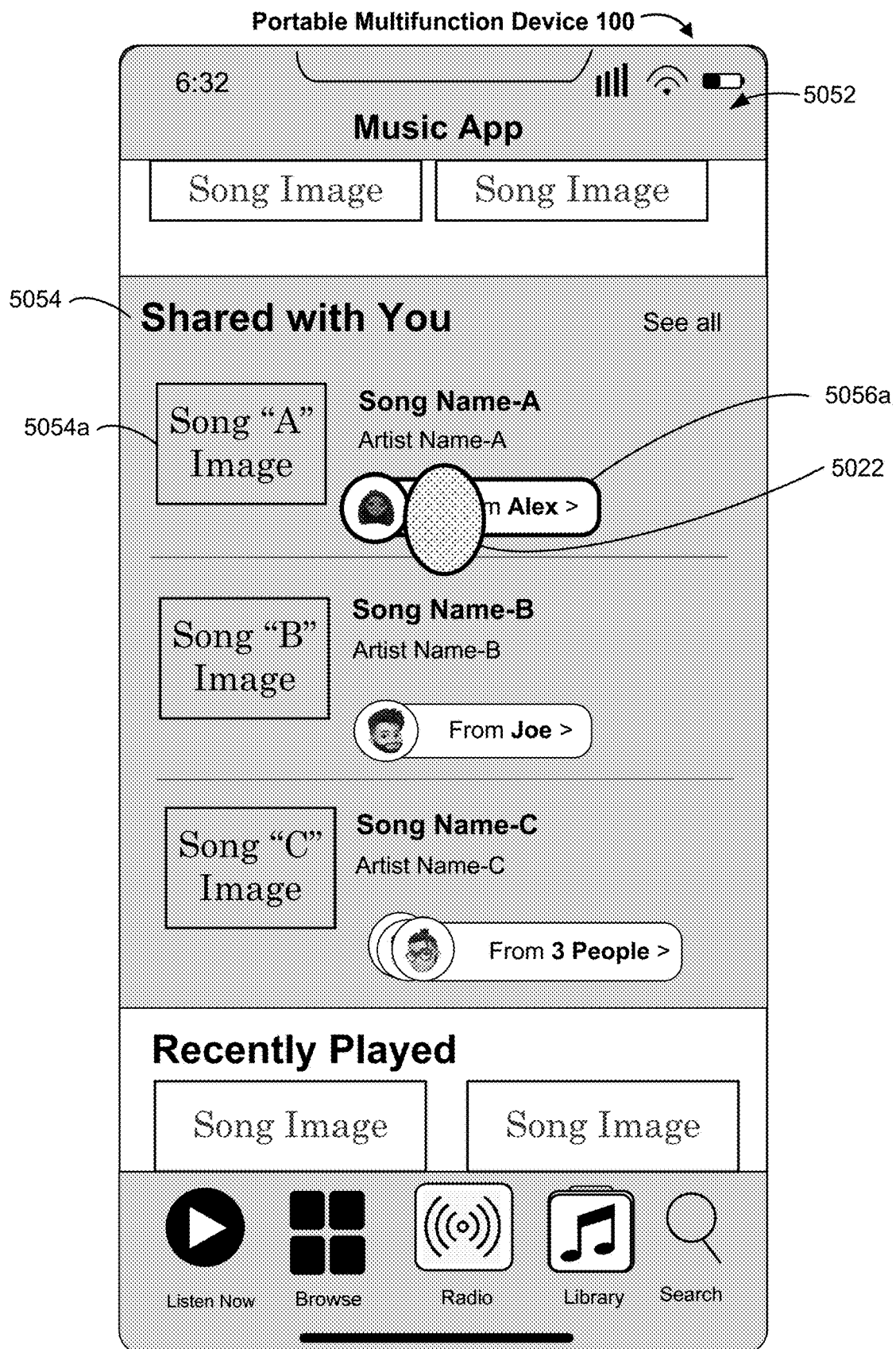
Figure 5D1

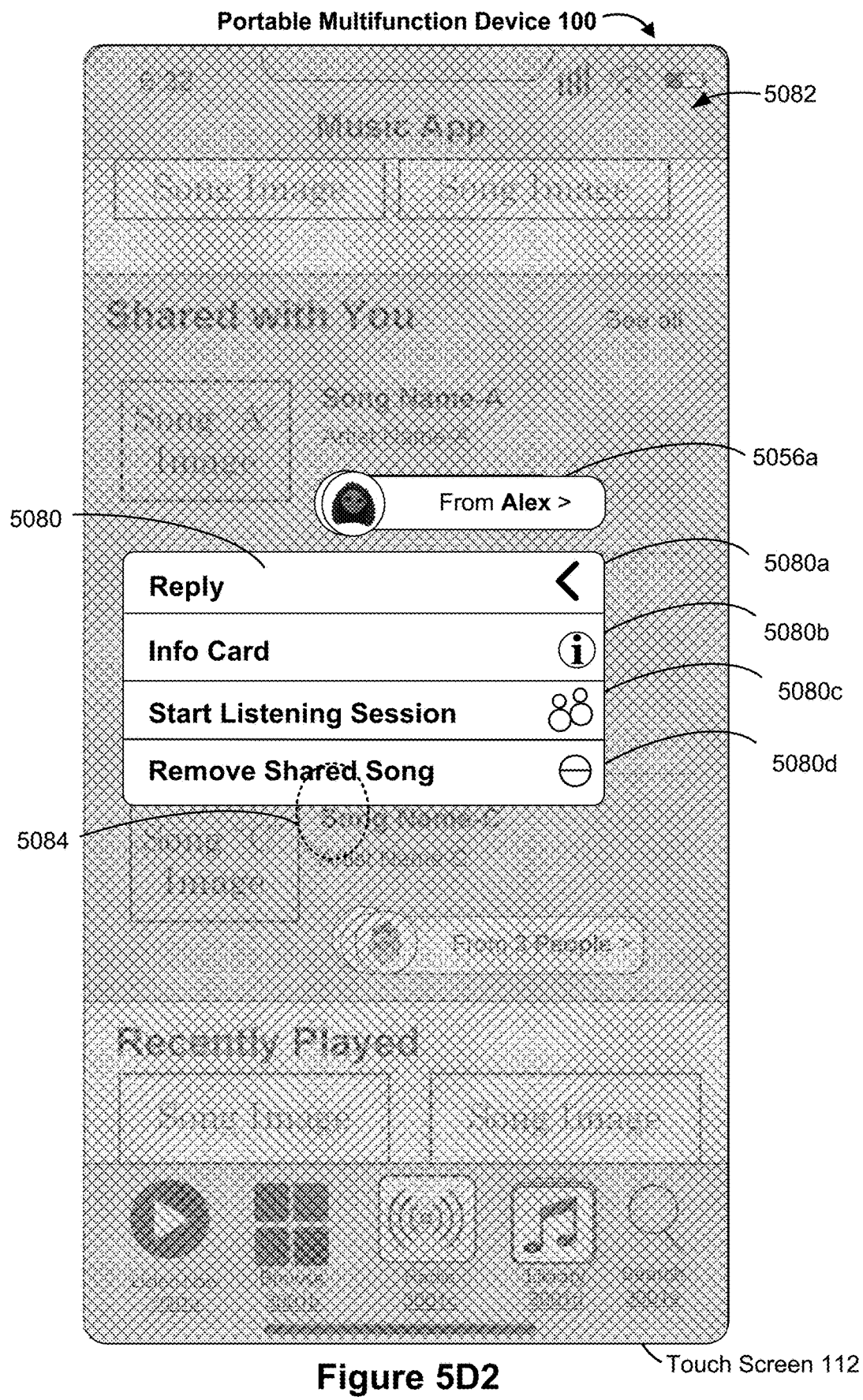
Figure 5D2

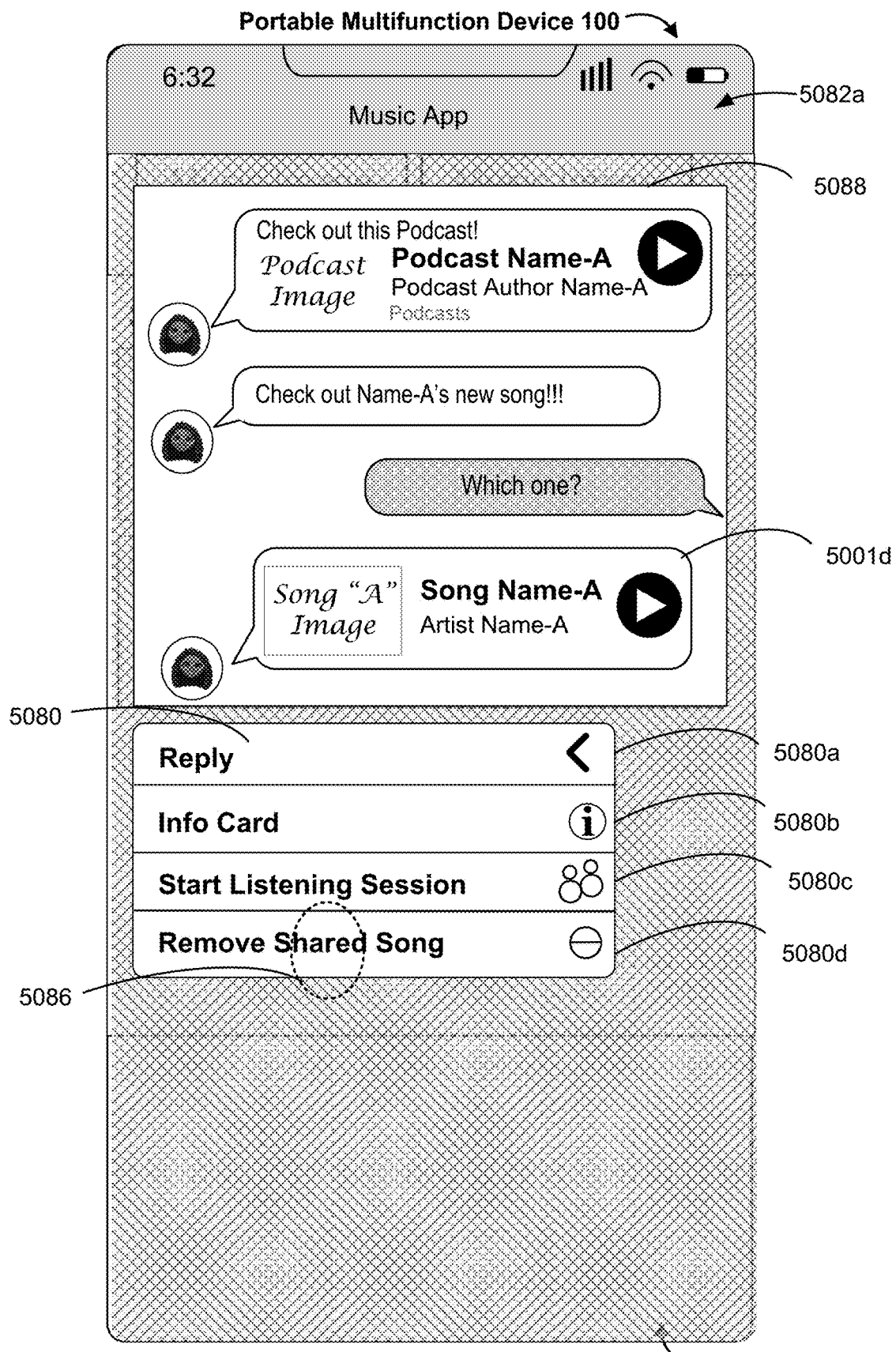
Figure 5D3

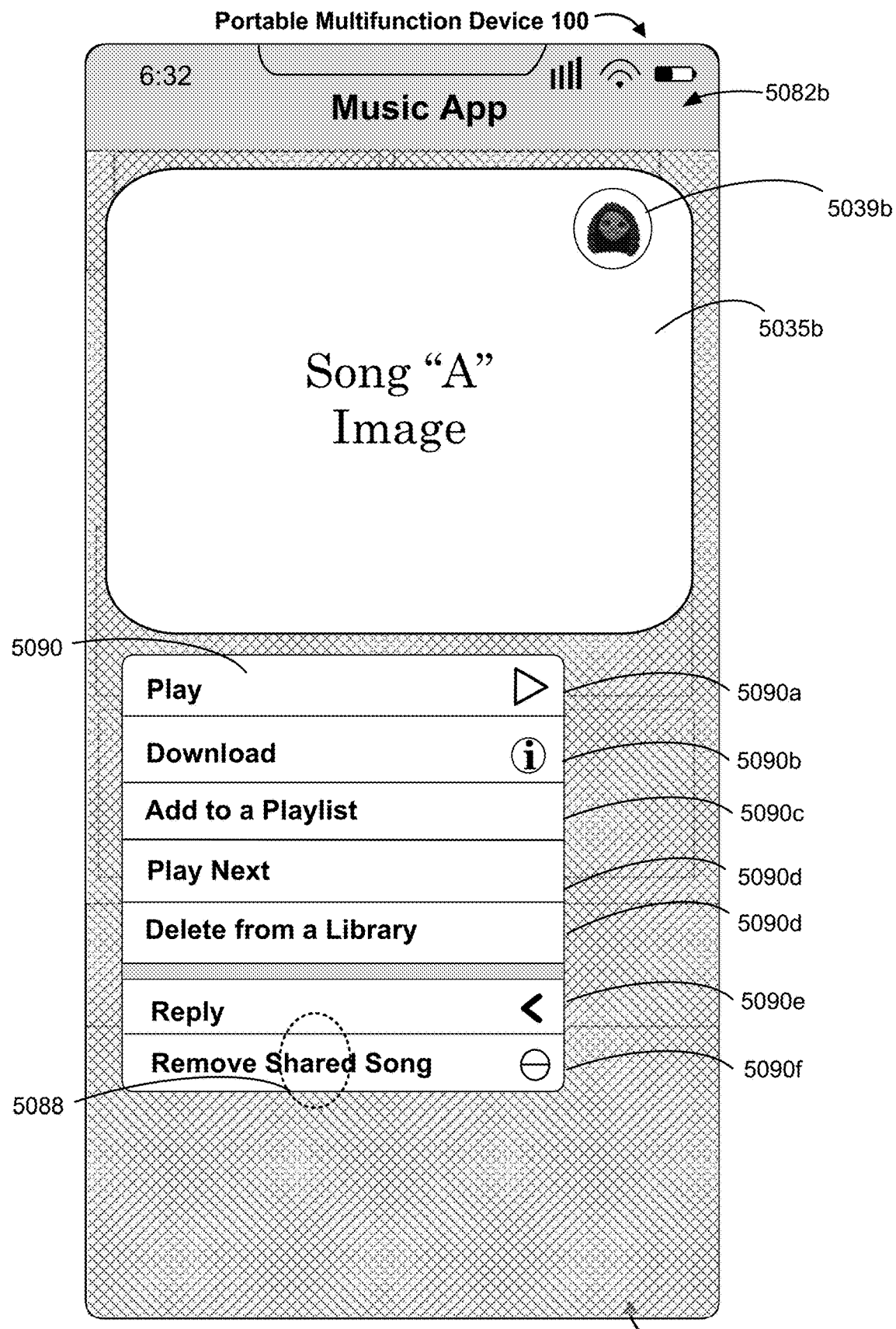
Figure 5D4

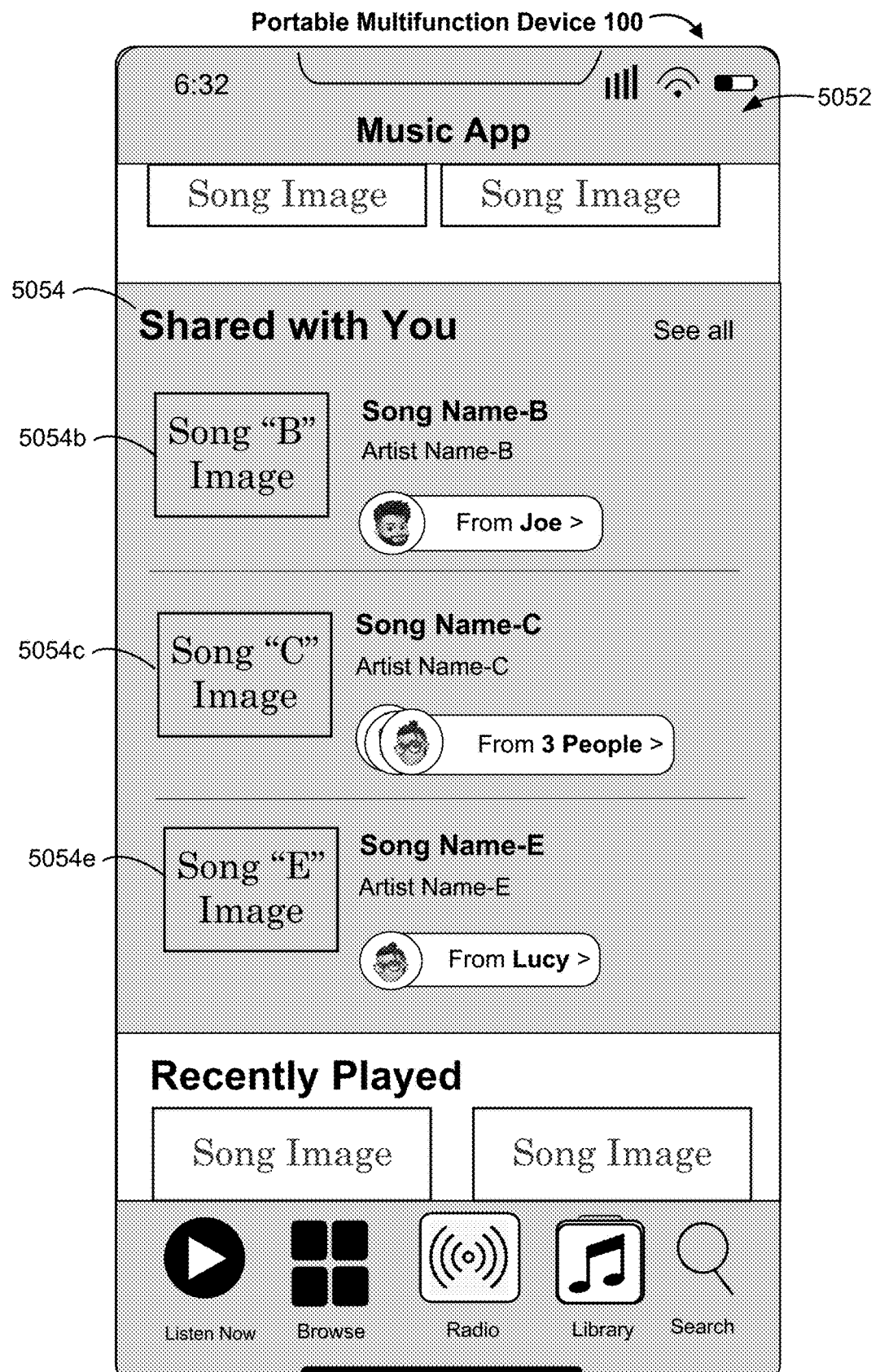
Figure 5D5

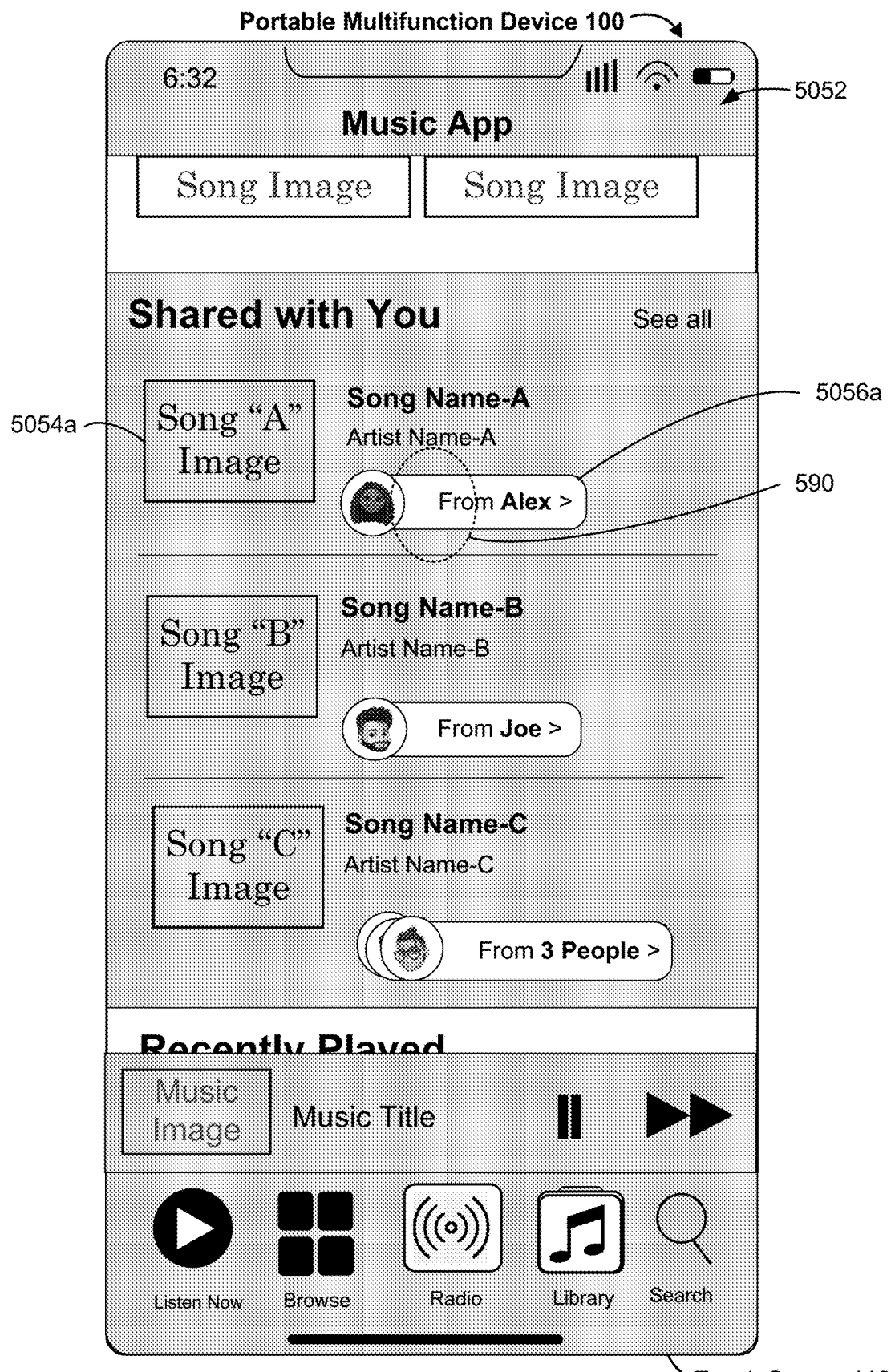
Figure 5E1

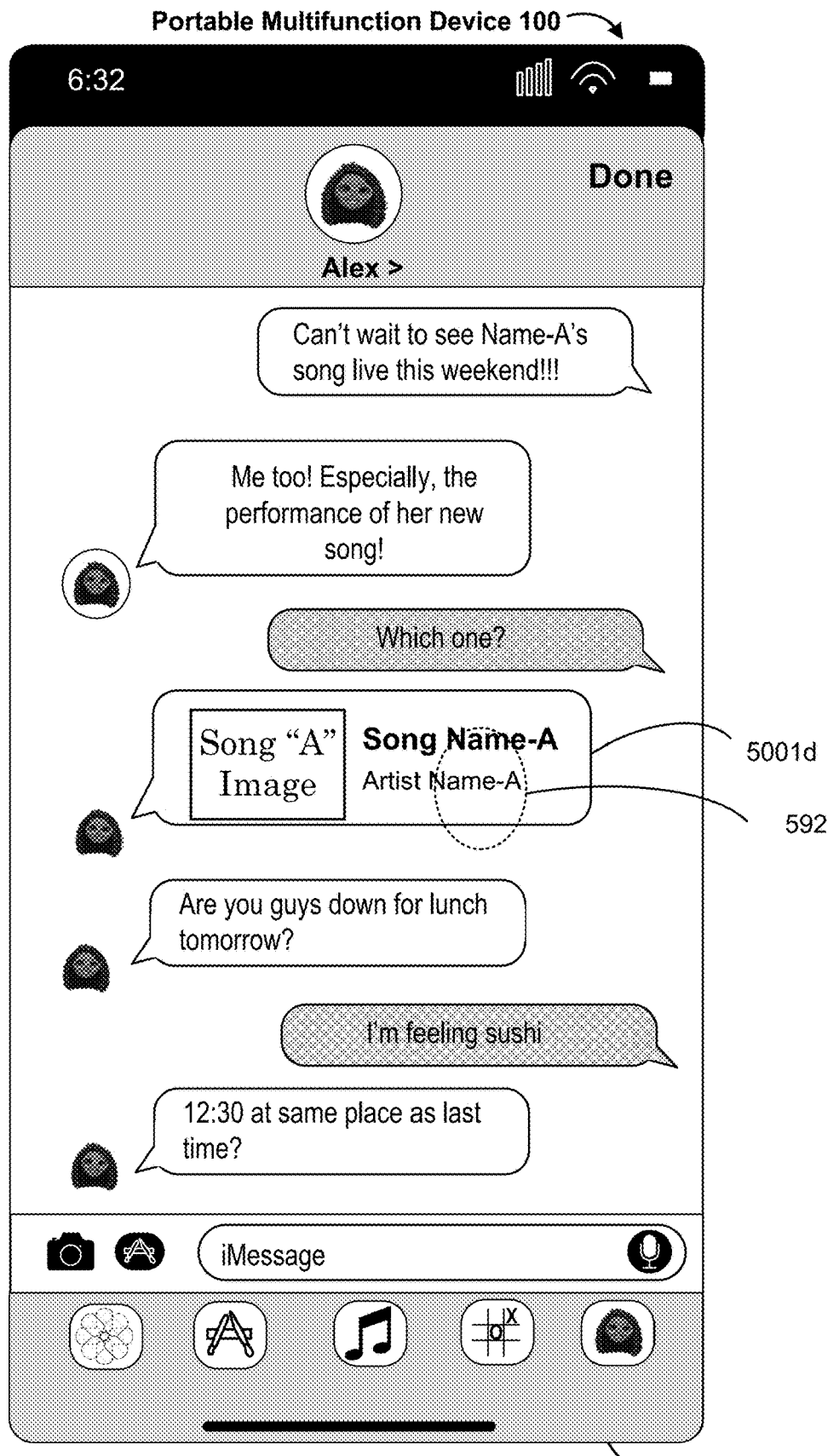
Figure 5E2

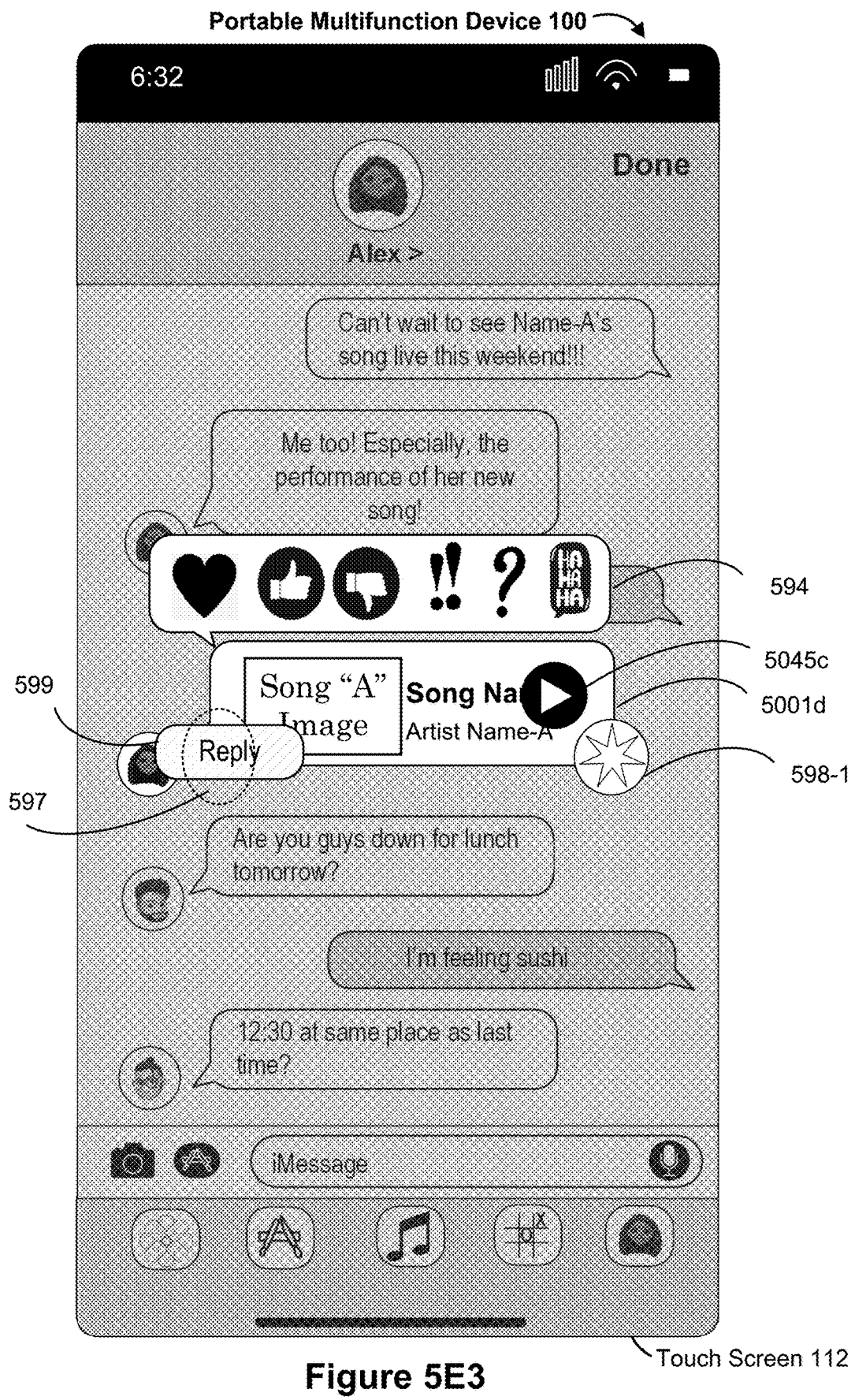
Figure 5E3

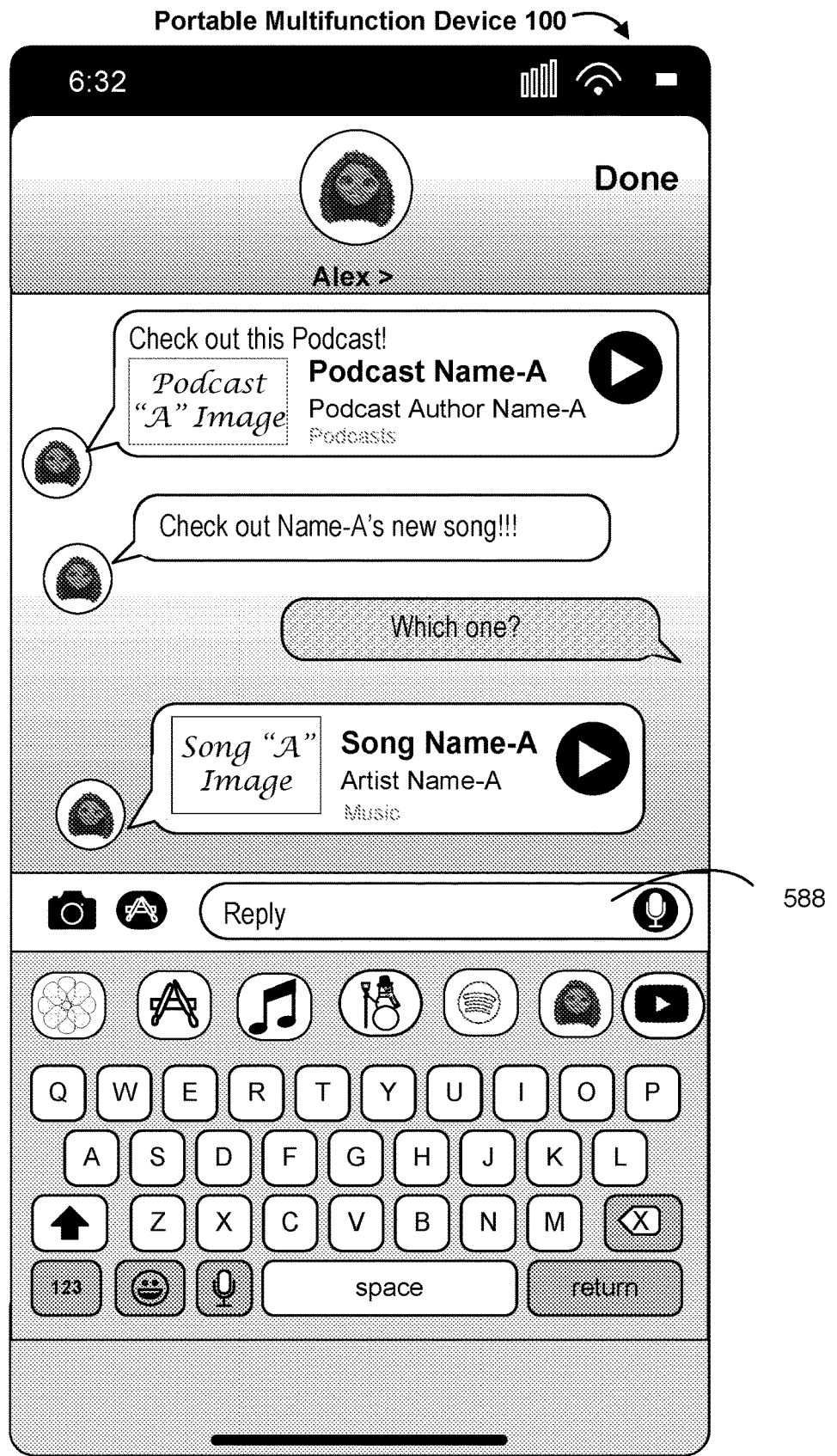
Figure 5E4

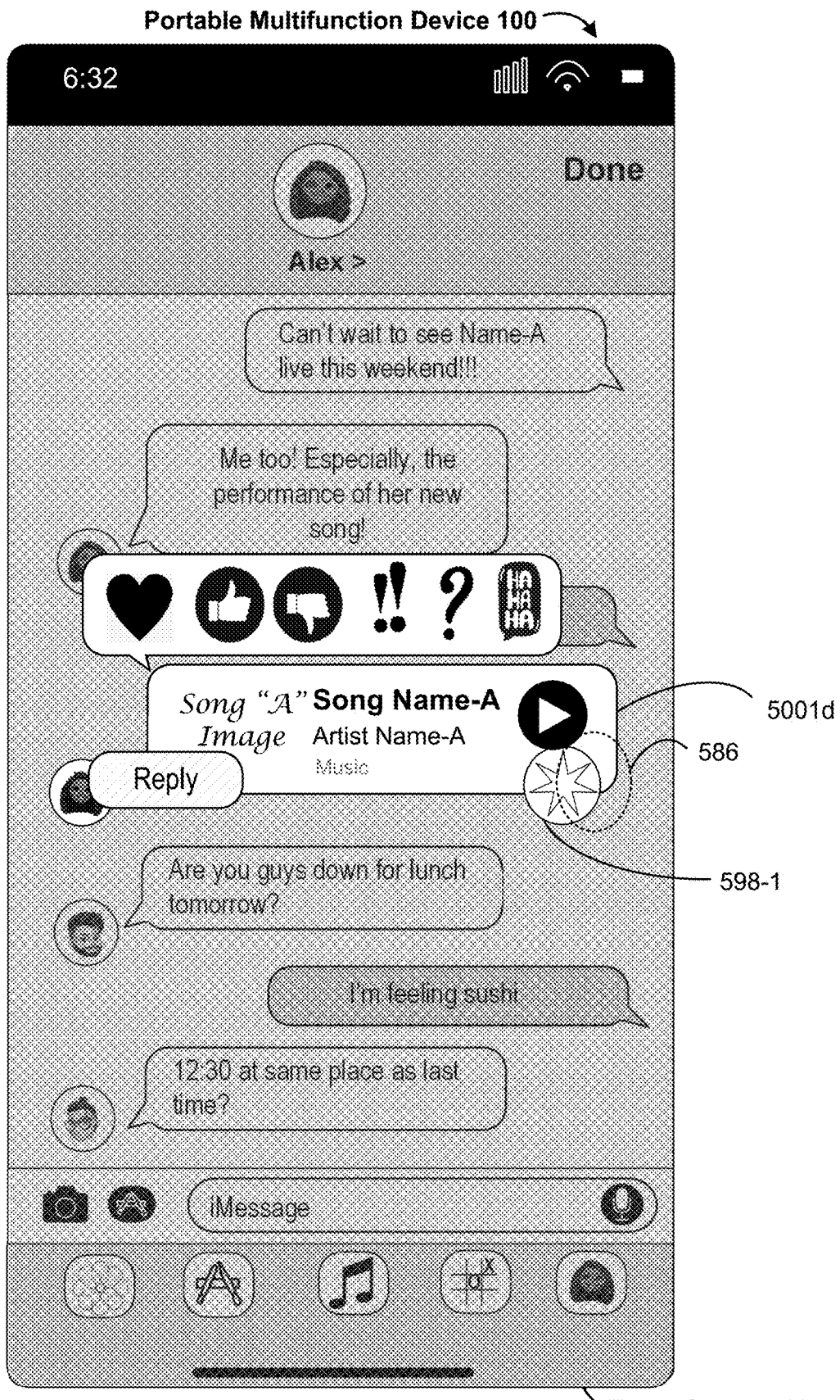
Figure 5E5

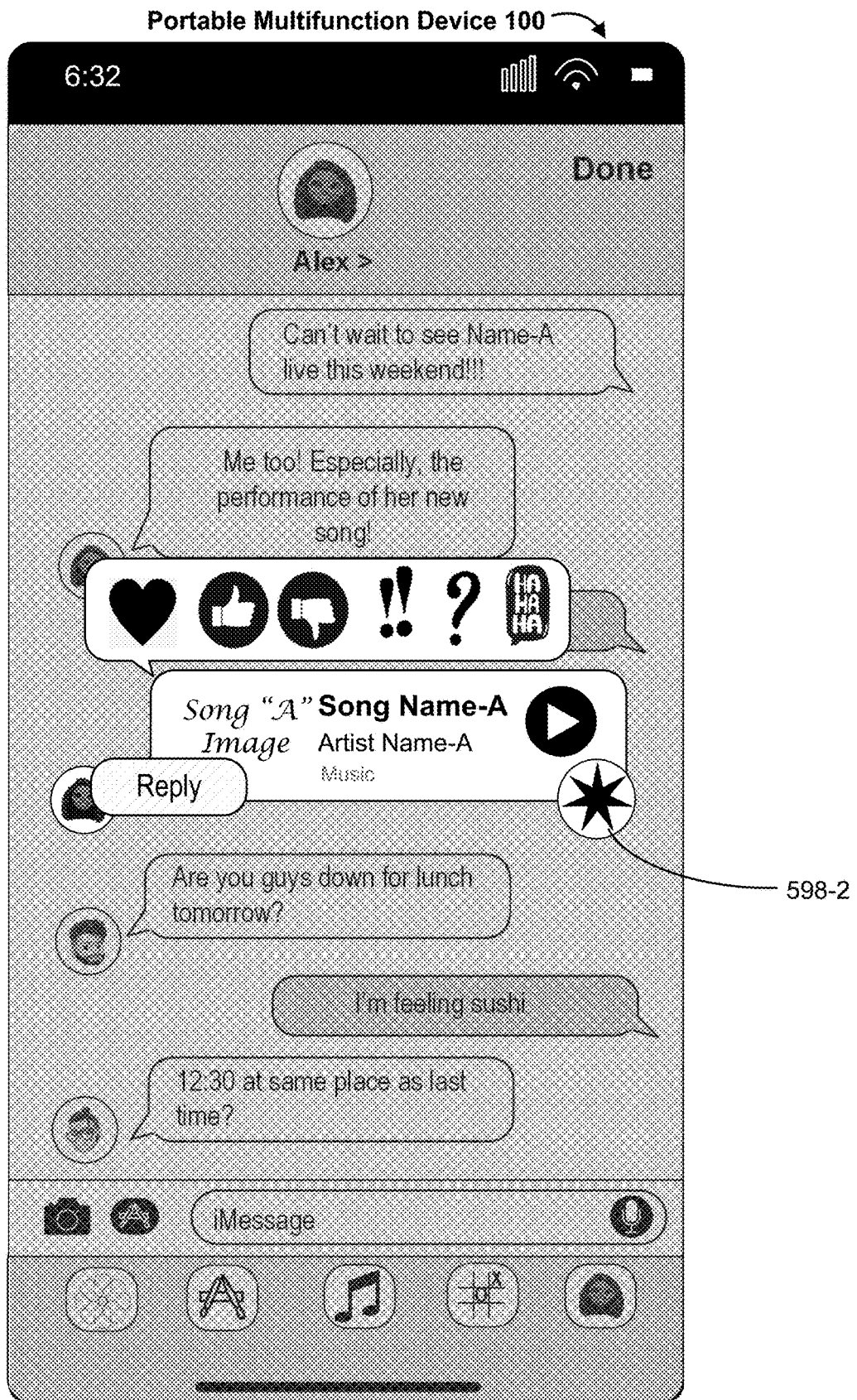
Figure 5E6

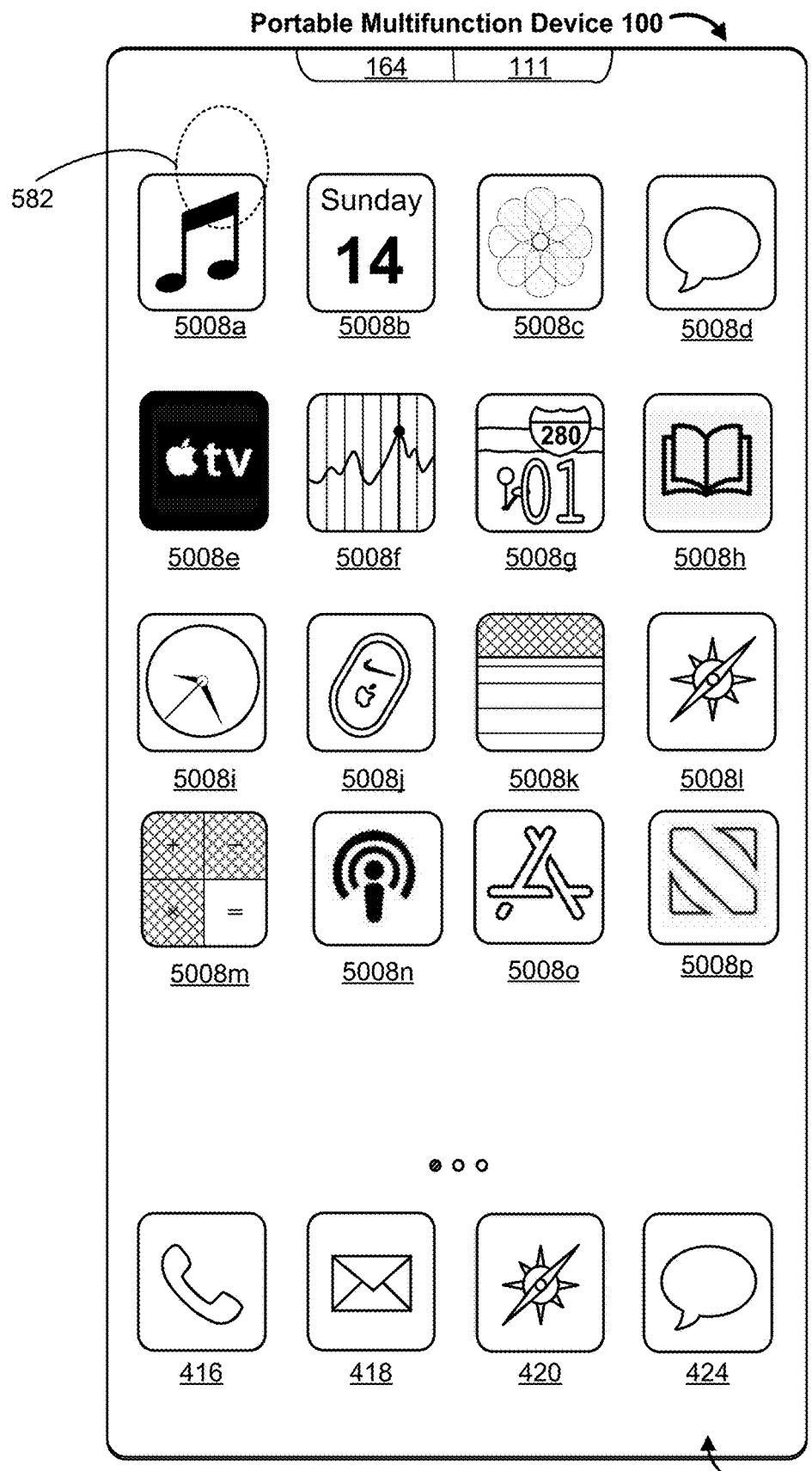
Figure 5E7

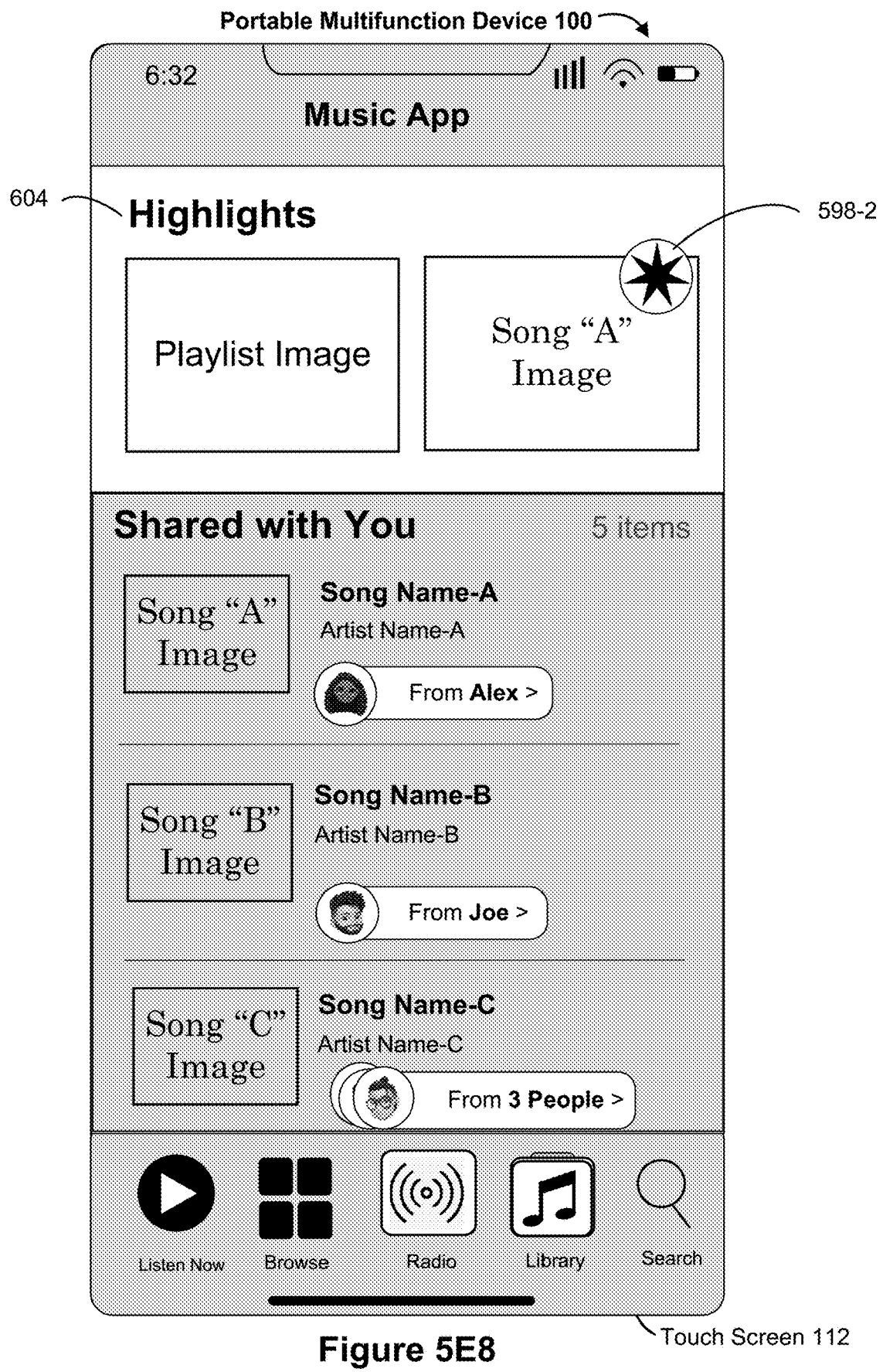
Figure 5E8

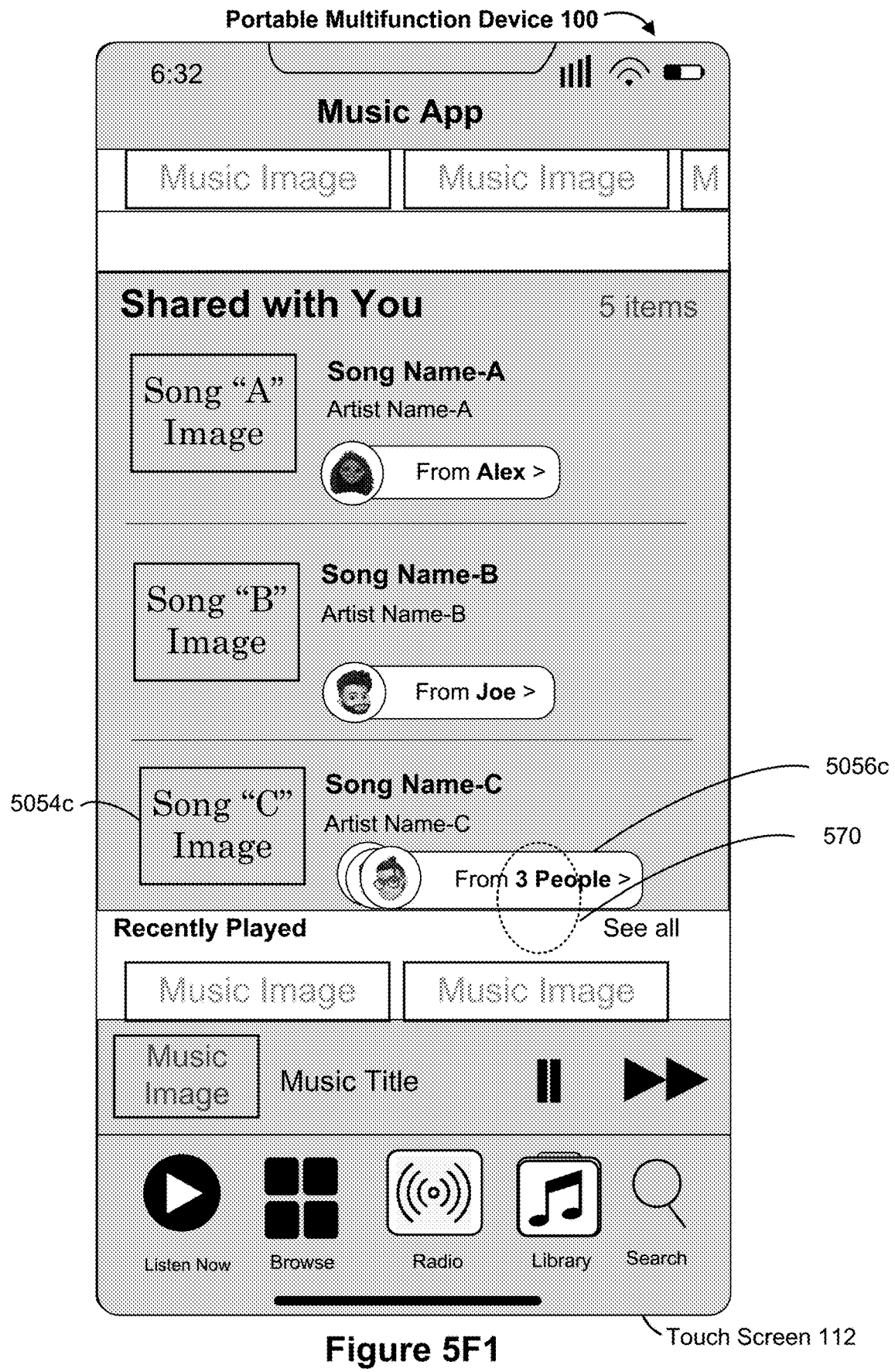
Figure 5F1

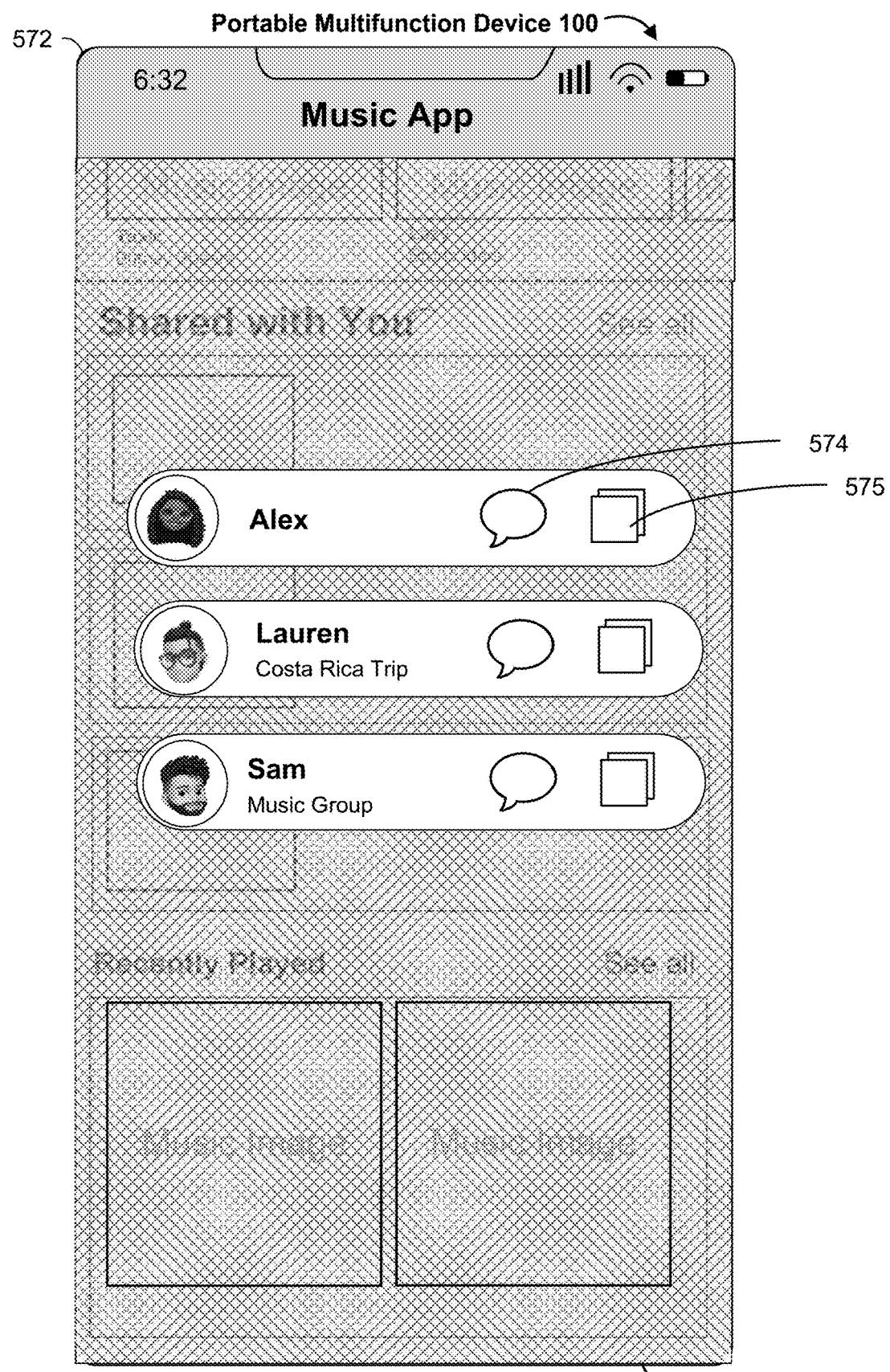
Figure 5F2

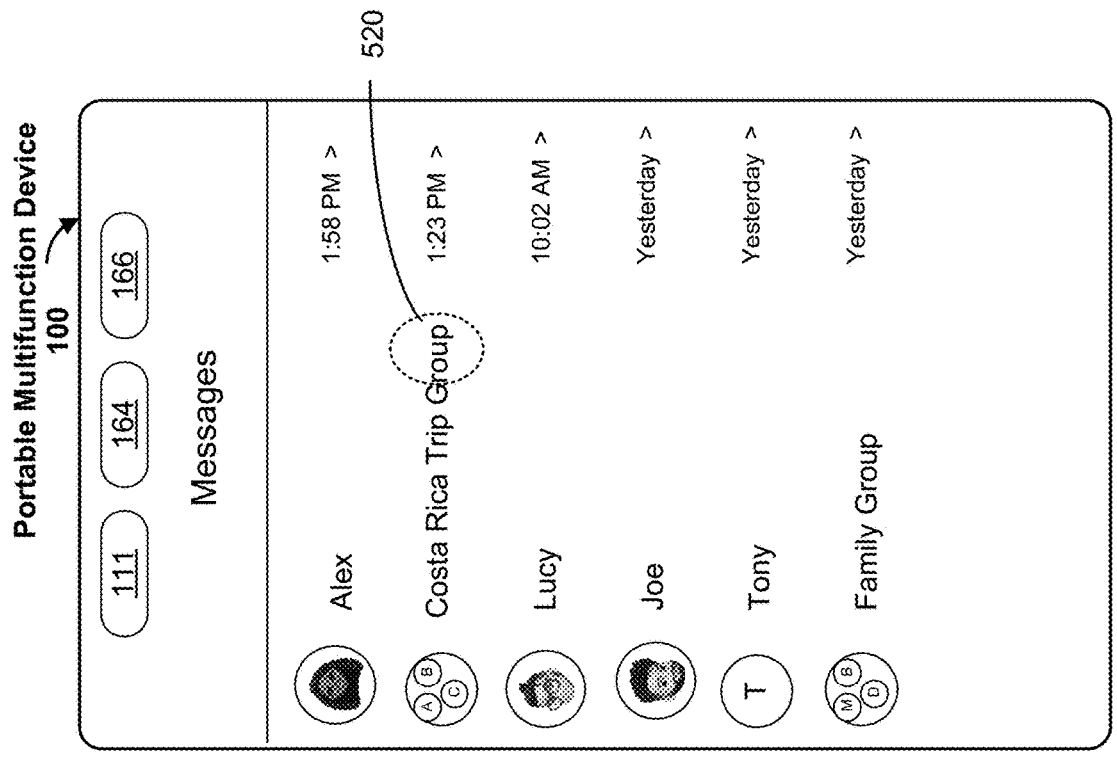
Figure 5G1B
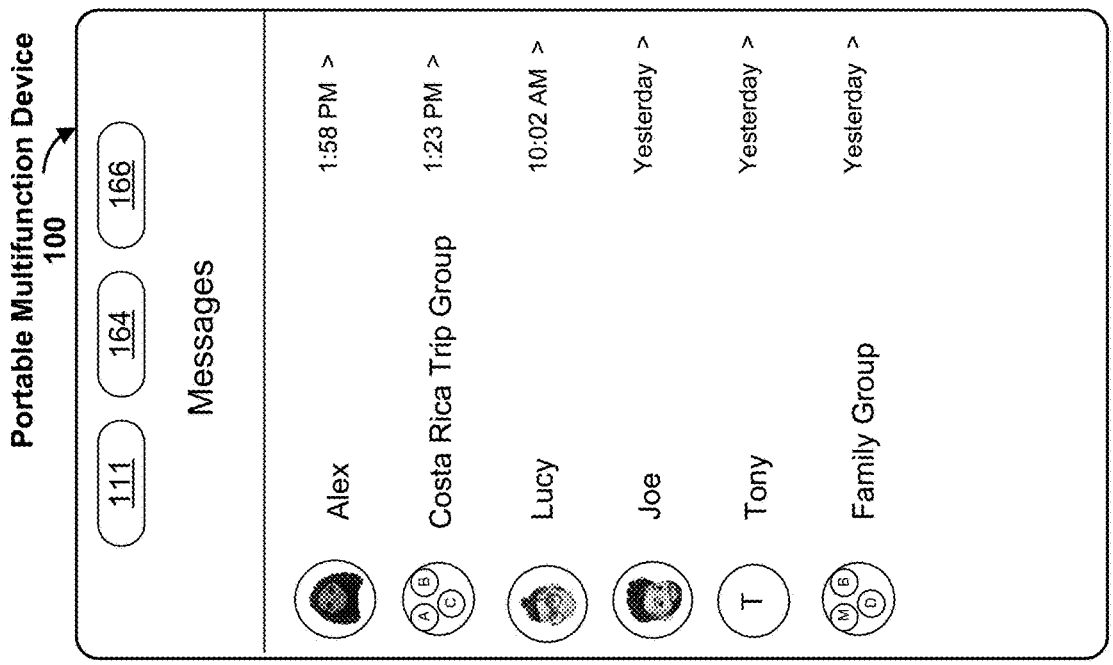
Figure 5G1A

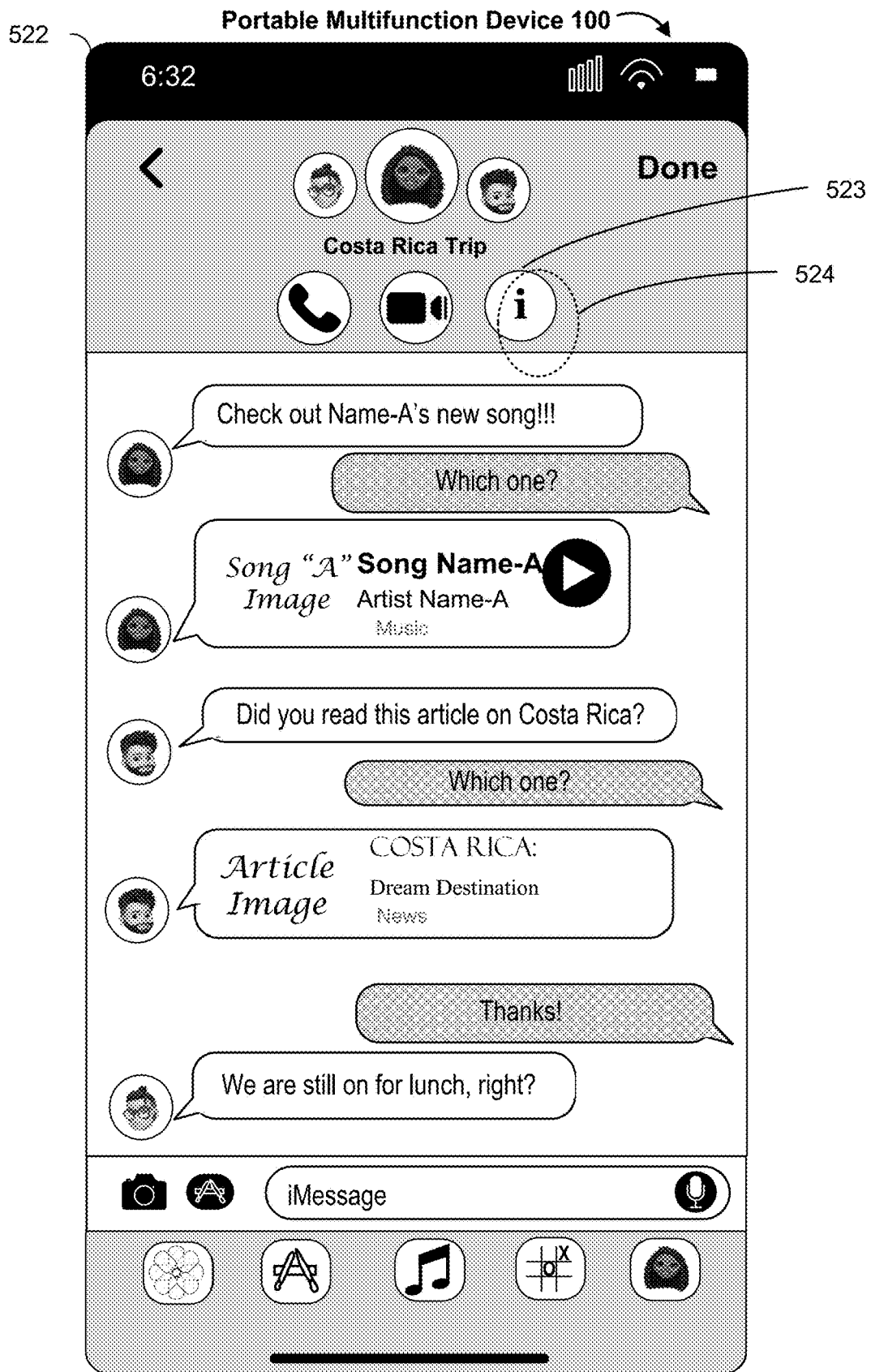
Figure 5G2

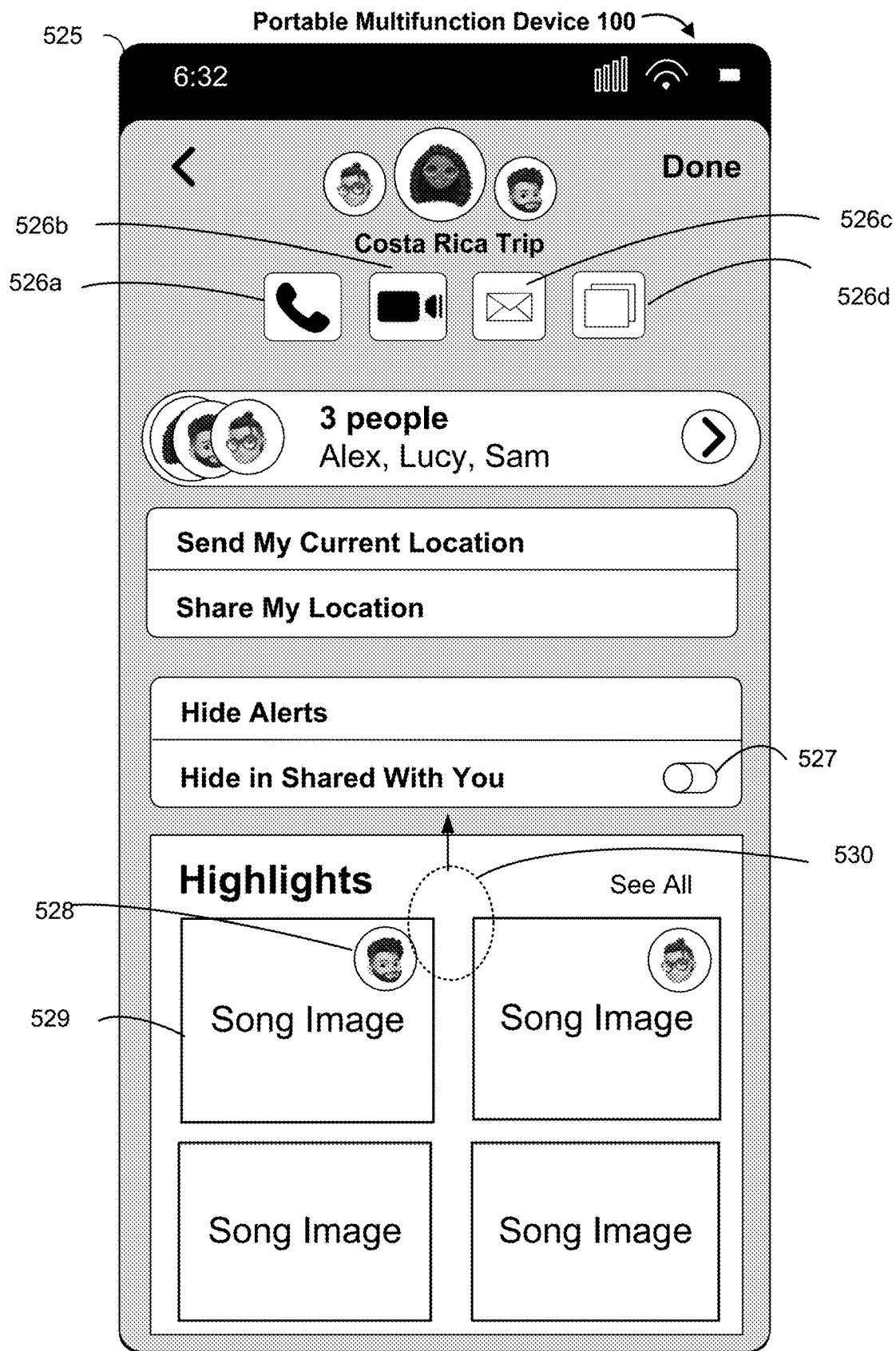
Figure 5G3

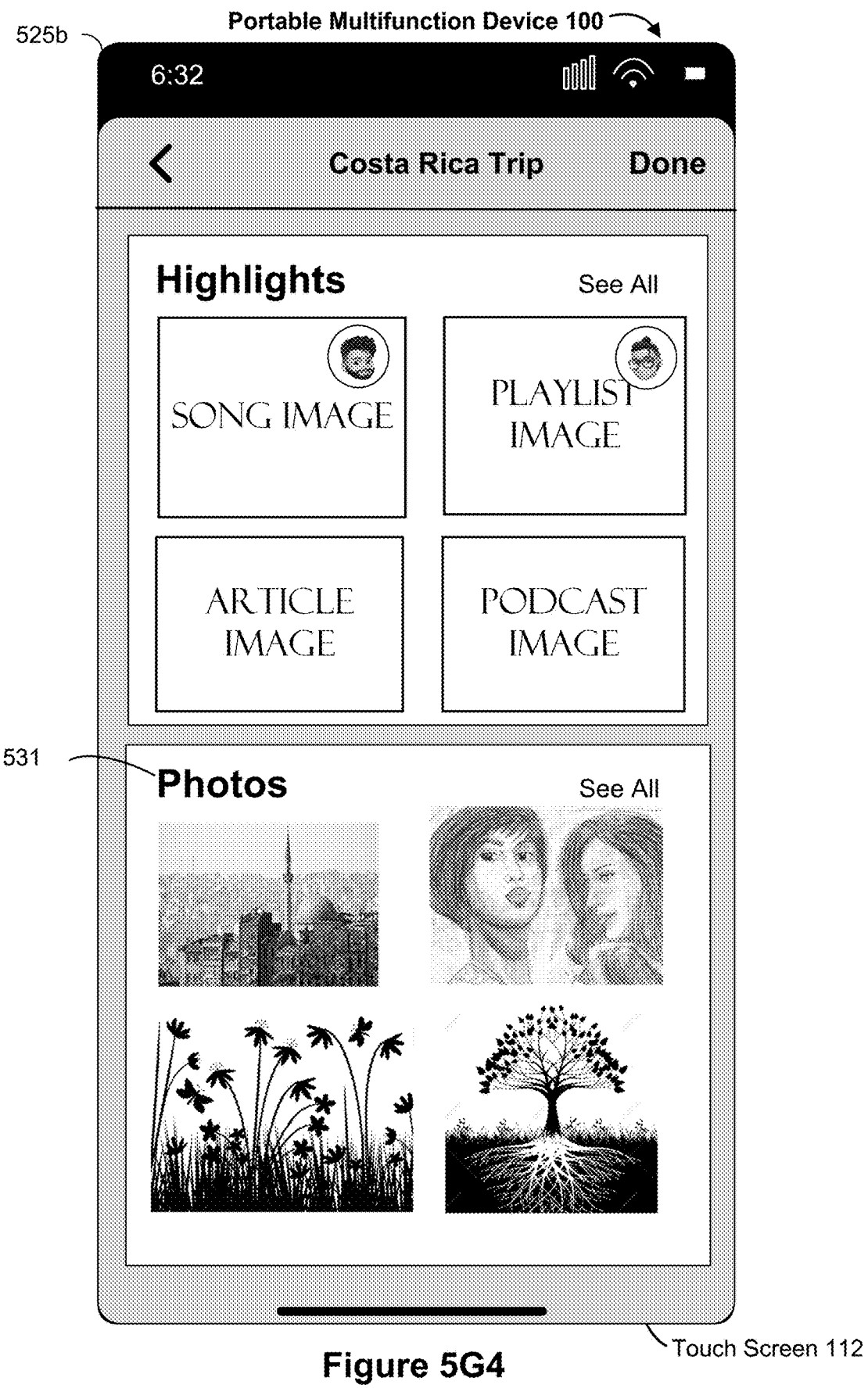
Figure 5G4

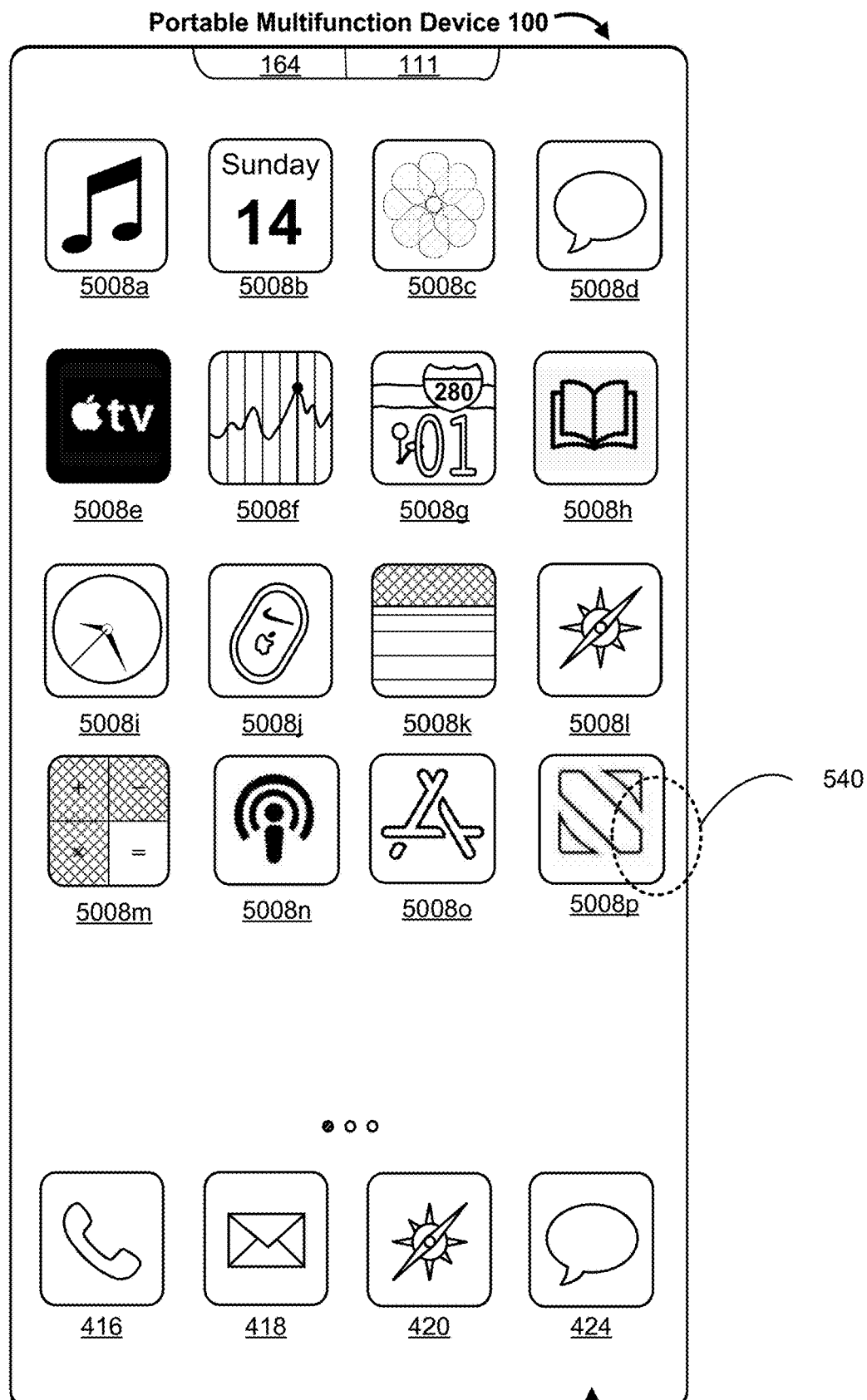
Figure 5I1

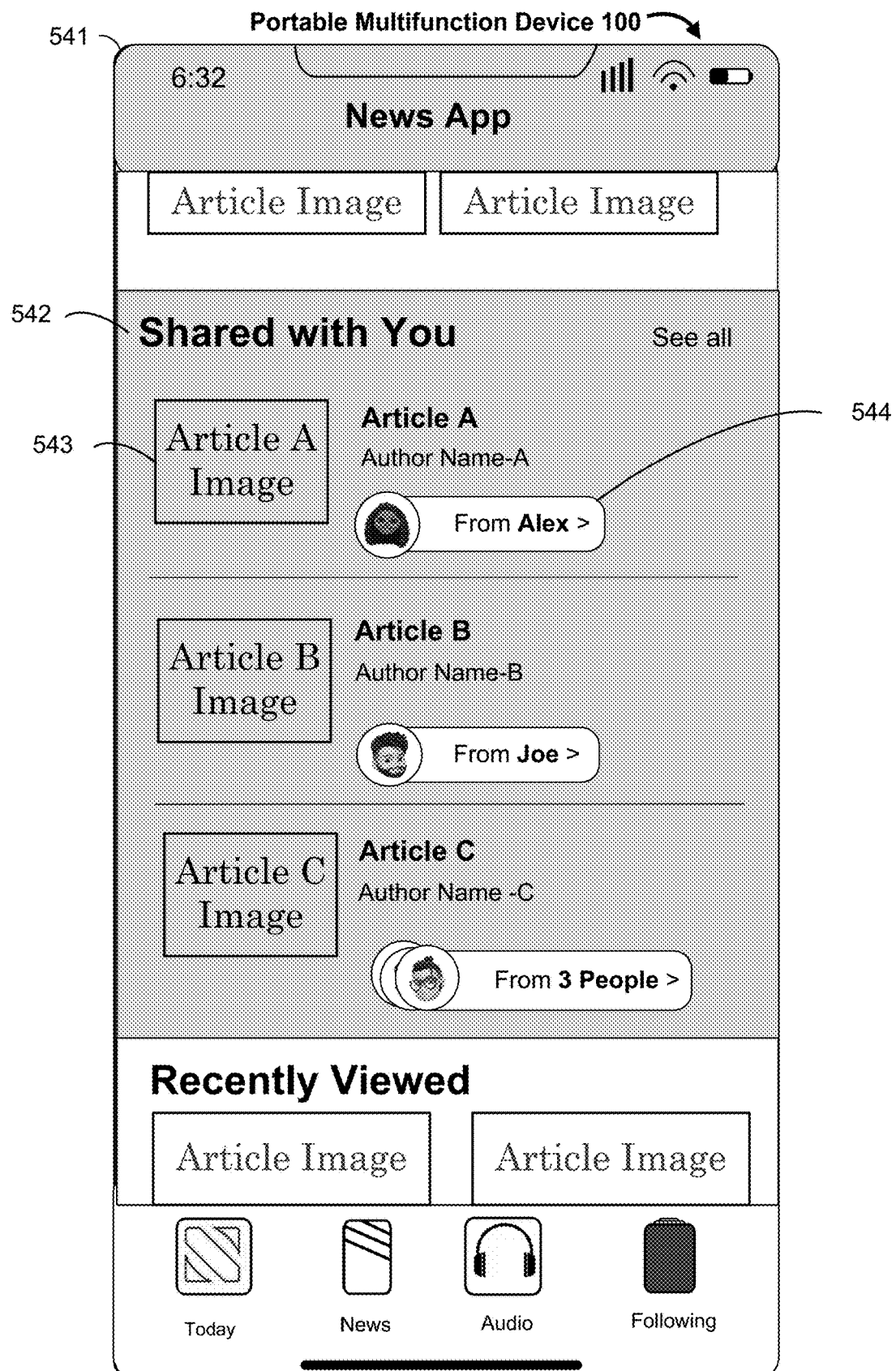
Figure 5I2

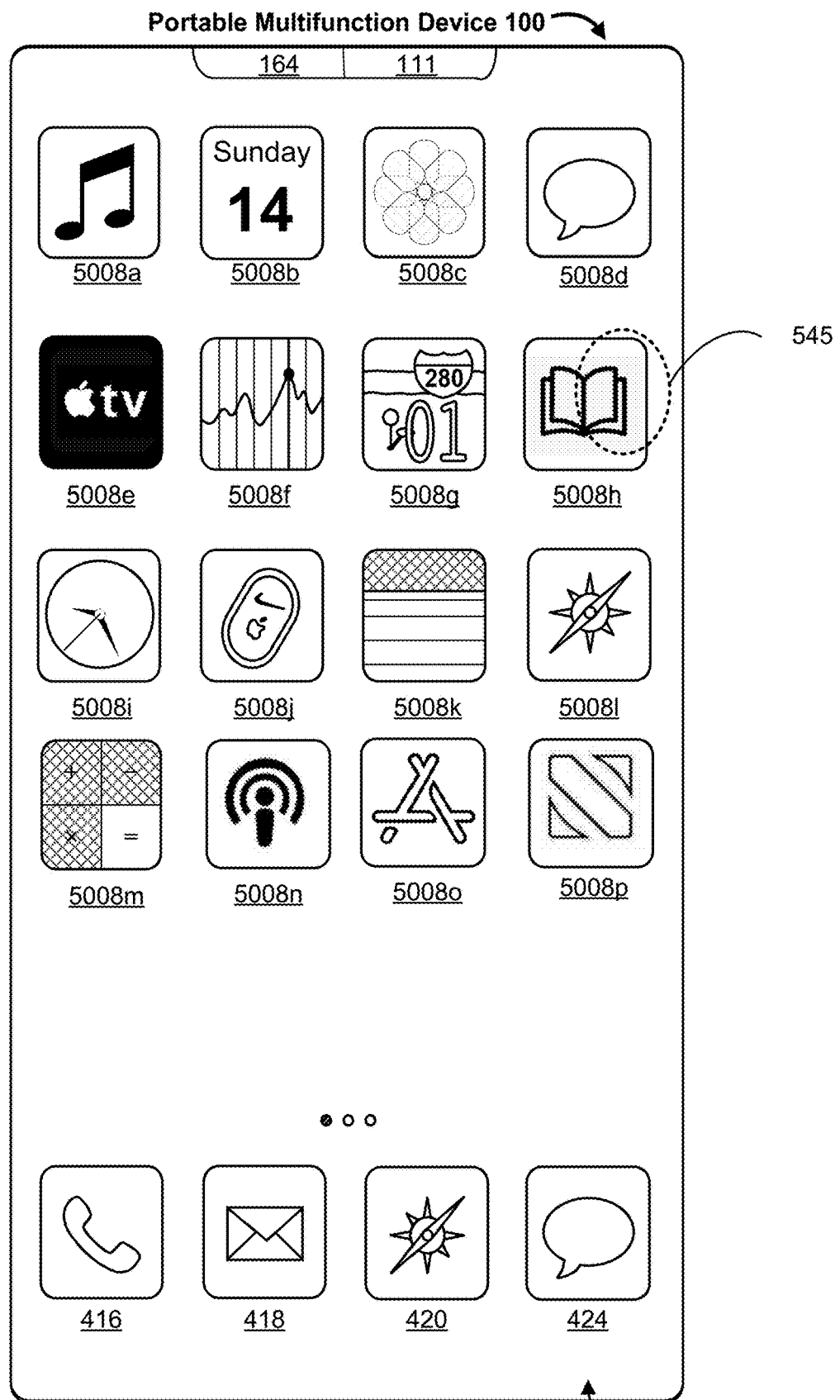
Figure 5I3

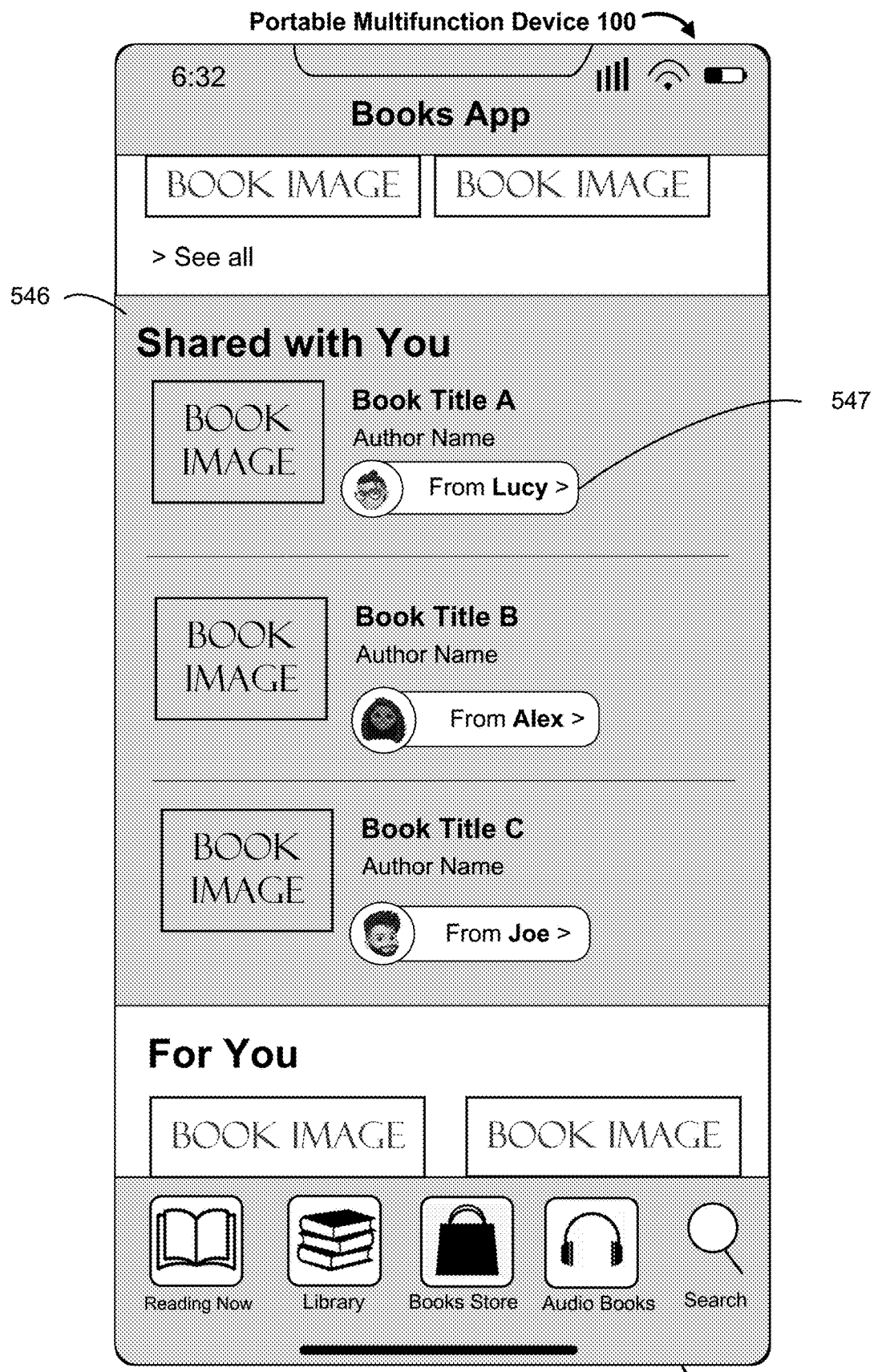
Figure 5I4

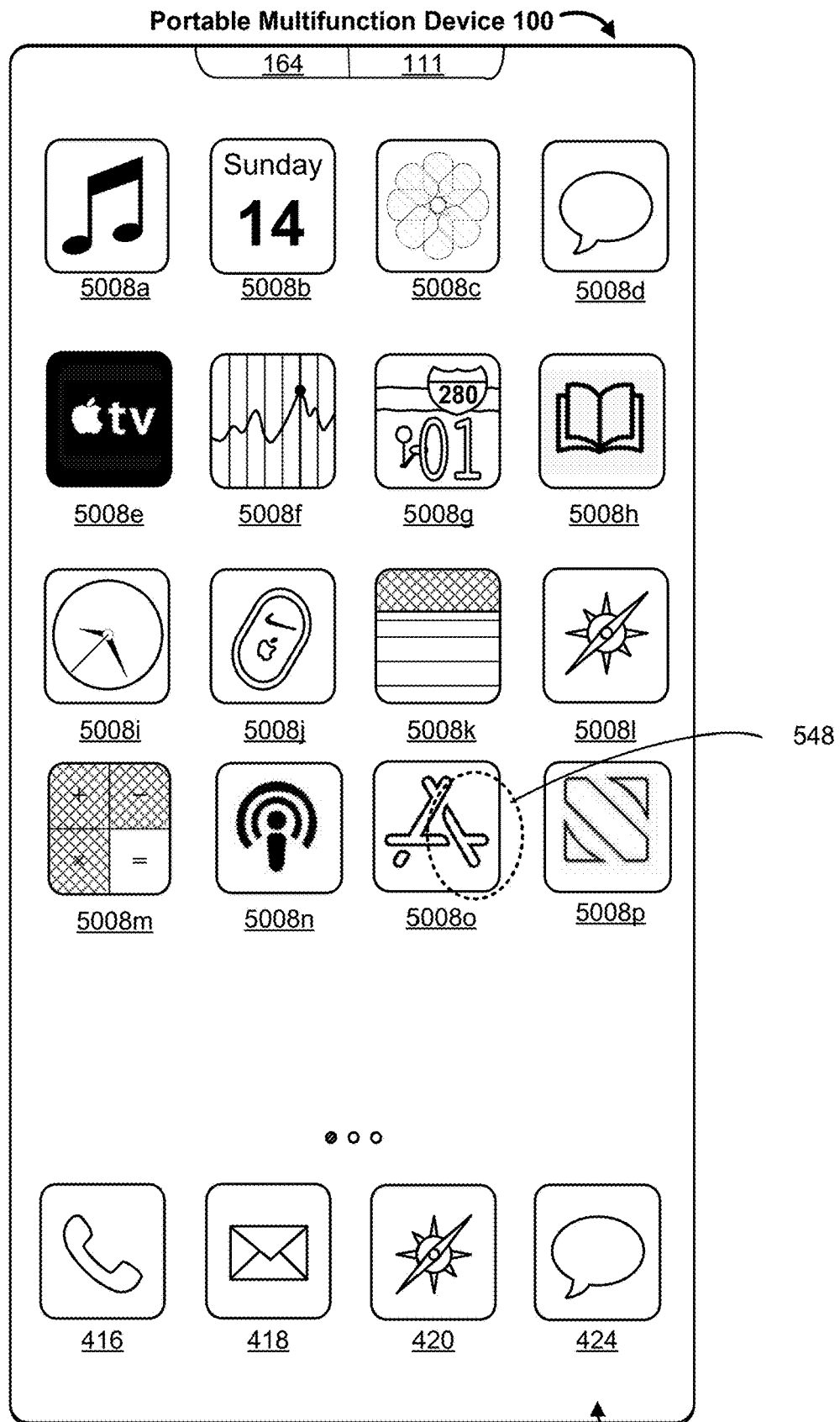
Figure 5I5

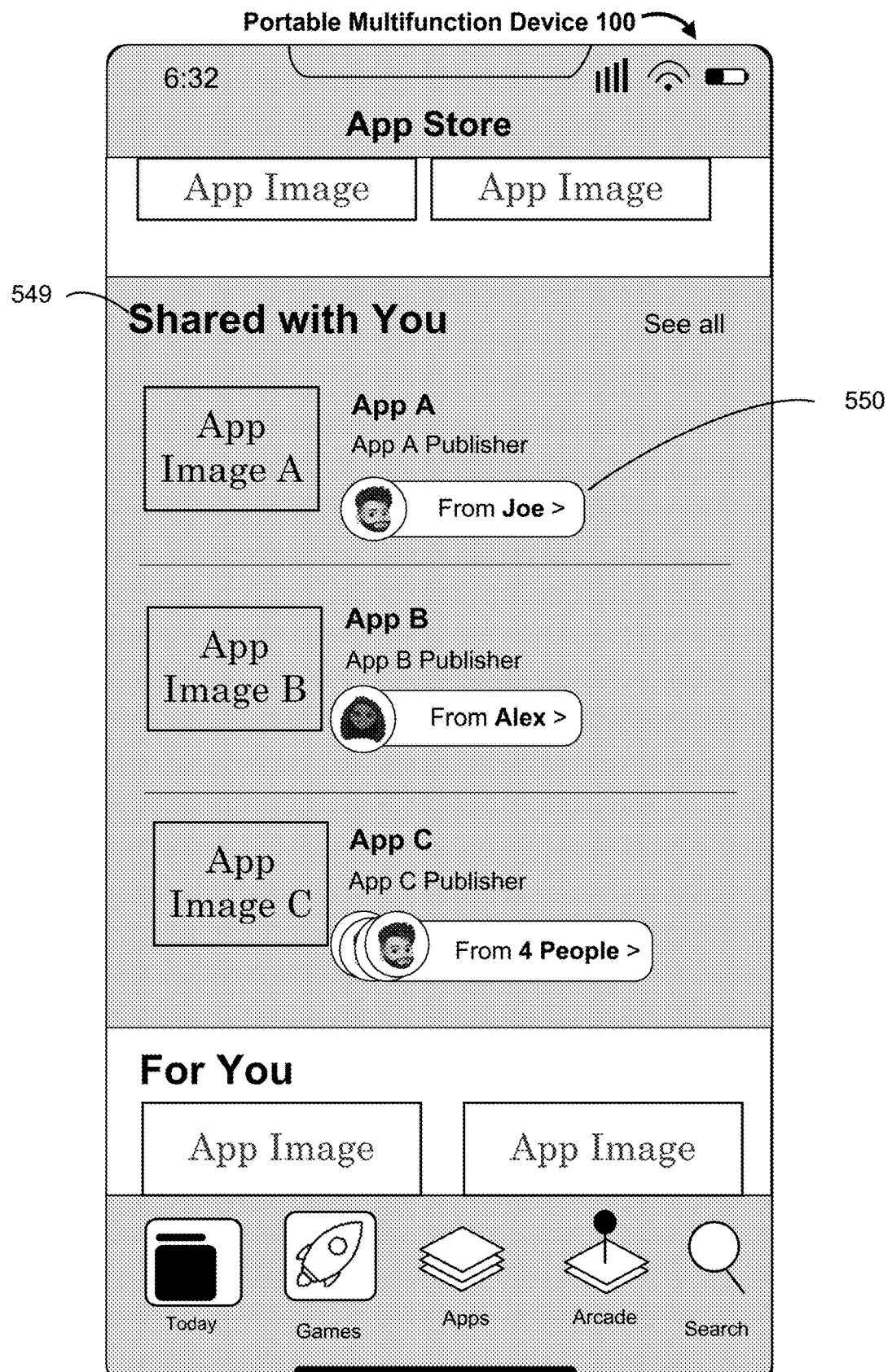
Figure 5I6

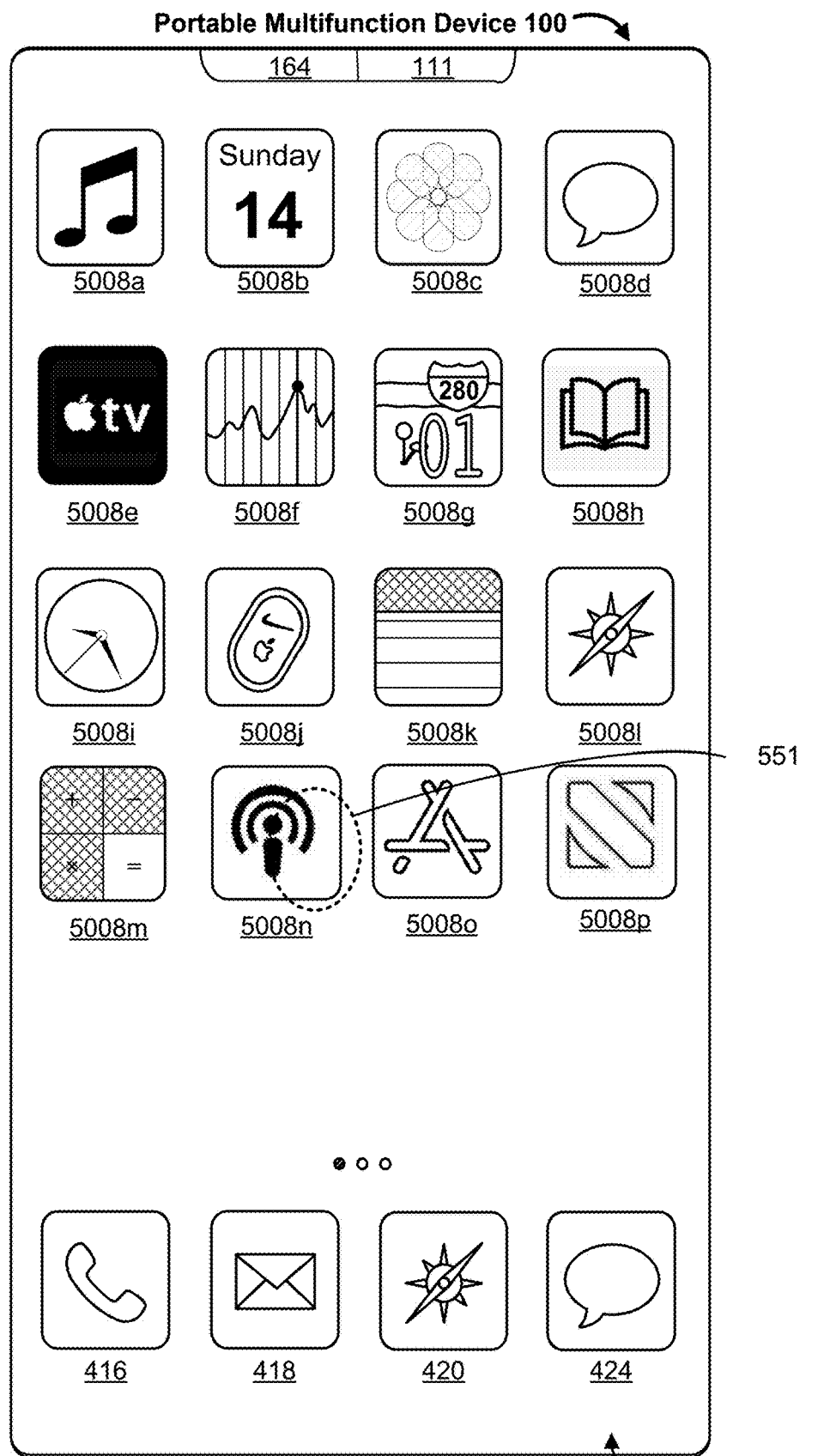
Figure 5I7

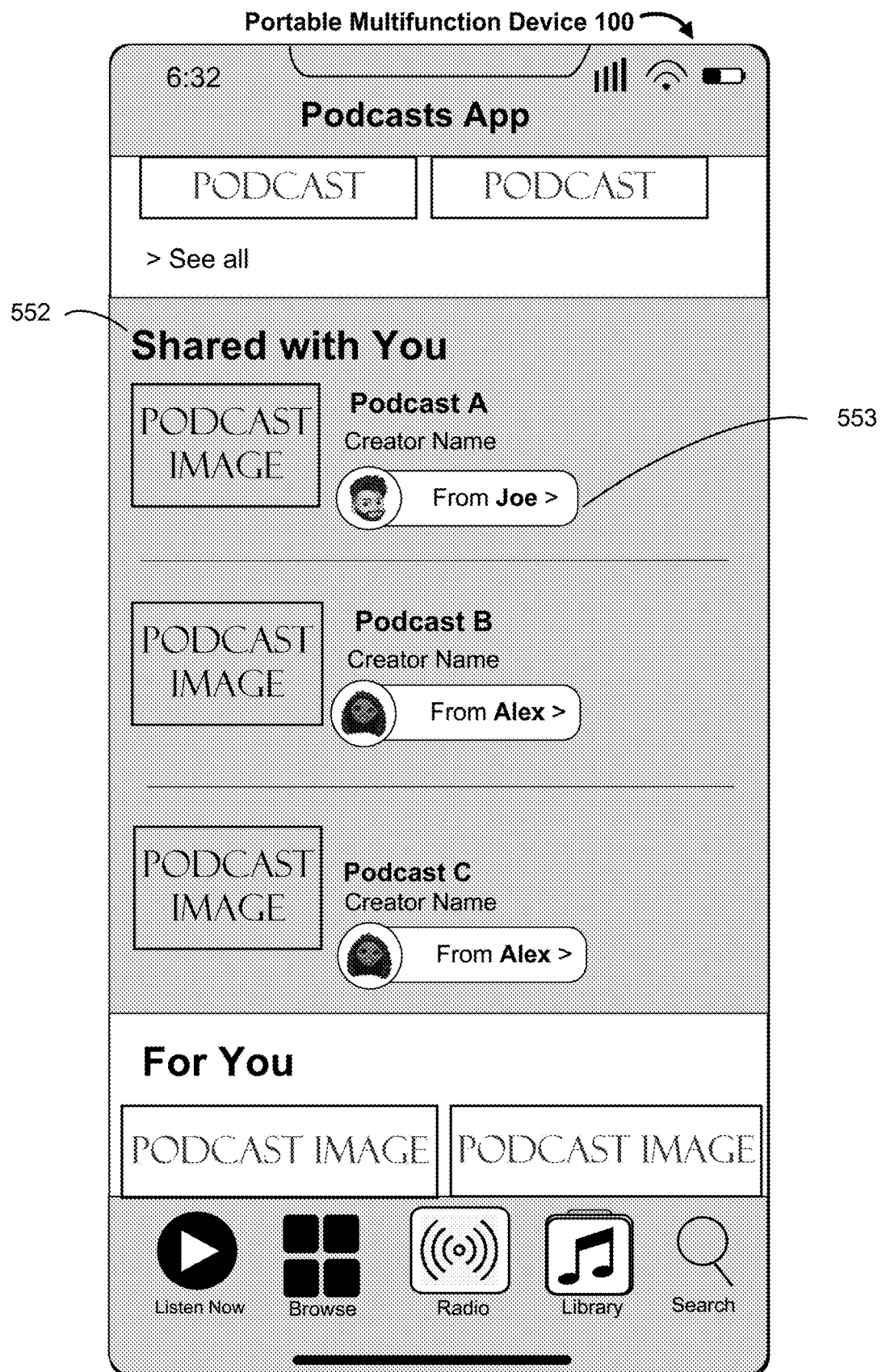
Figure 5I8

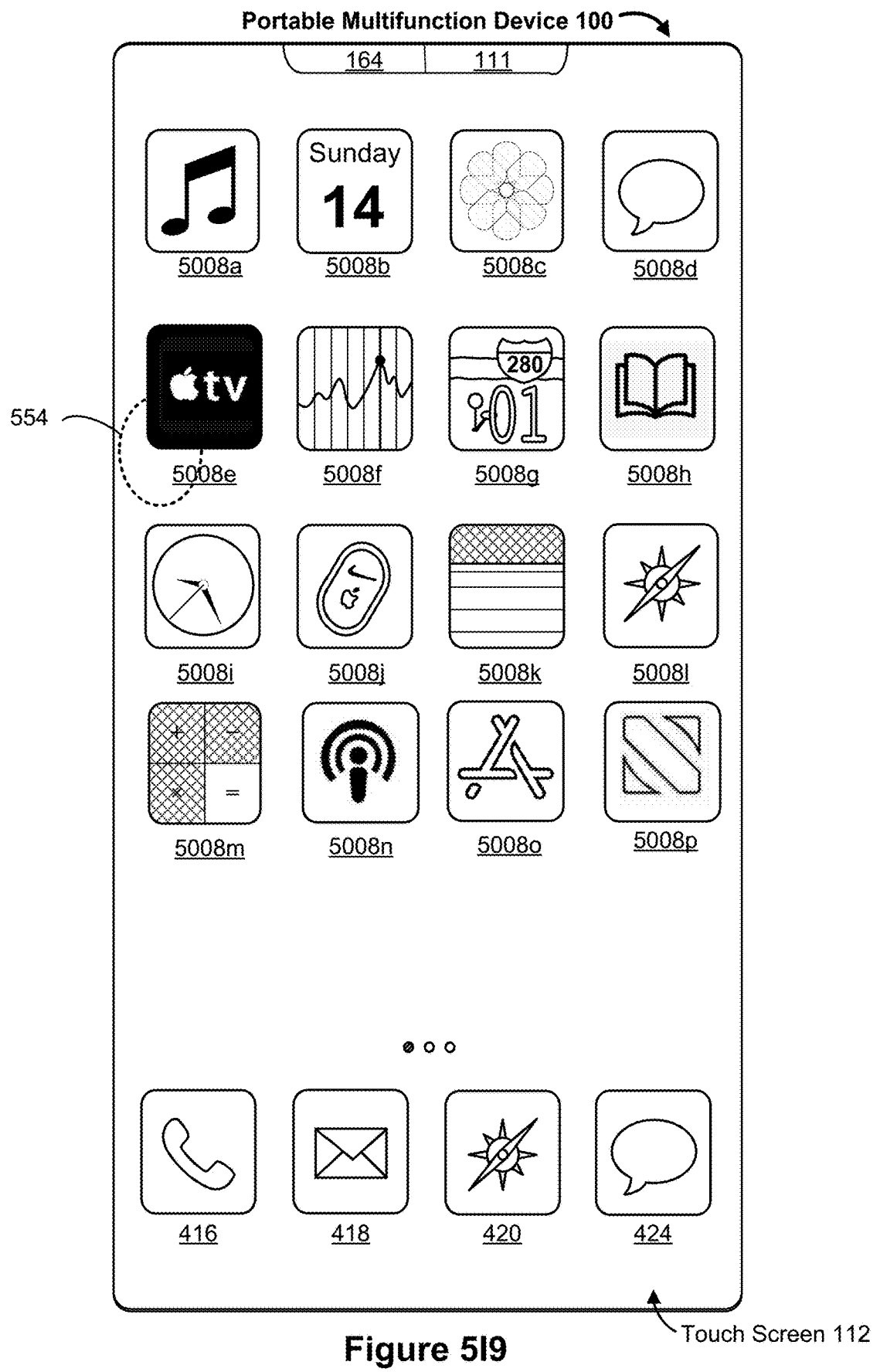
Figure 5I9

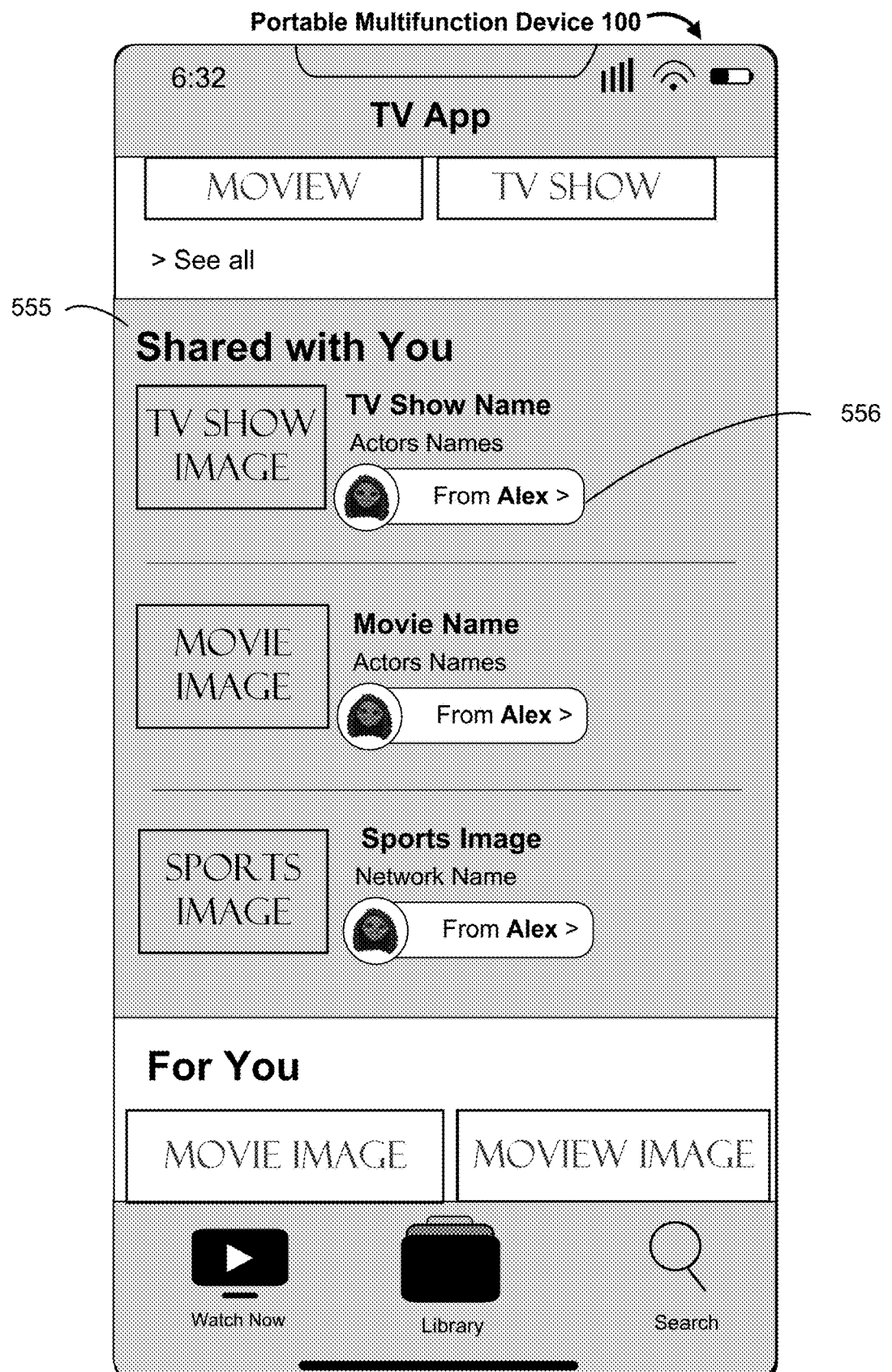
Figure 5I10

812 Receive, by a second receiving application of the plurality of applications, information identifying a second shared content item. The second receiving application is different from the first receiving application.
In response to receiving the information identifying the second shared content item:
  in accordance with a determination that the second shared content item is of the first type, automatically making the second shared content item available within the first application of the plurality of applications; and
  in accordance with a determination that the second shared content item is of the second type, automatically making the second shared content item available within the second application of the plurality of applications.

814 The information identifying a first shared content item is received in a first location of the first receiving application.

Receive, in a second location of the first receiving application, information identifying a third shared content item.
In response to receiving the information identifying the third shared content item:
  in accordance with a determination that the third shared content item is of the first type, automatically making the third shared content item available within the first application of the plurality of applications; and
  in accordance with a determination that the third shared content item is of the second type, automatically making the third shared content item available within the second application of the plurality of applications.

816 The first shared content item is of the first type. Receive a user input to add the first shared content item to a library of the first application. In response to receiving the user input to add the first shared content item to the library of the first application, store the first shared content item in the library of the first application.

818 The first shared content item is not automatically added to a library of the first application in response to receiving the information identifying the first shared content item.

820 In response to receiving the information identifying the first shared content item and in accordance with the determination that the first shared content item is of the second type, automatically add the first shared content item to a library in the second application of the plurality of applications.

Figure 8B (B)

822 A plurality of information identifying respective shared content items of the first type that are aggregated for display in the first application, and a plurality of information identifying respective shared content items of the second type are aggregated for display in the second application.

824 The plurality of information identifying respective shared content items of the first type are displayed in a dedicated section of the first application and the plurality of information identifying respective shared content items of the second type are displayed in a dedicated section of the second application.

826 Receive, at the first receiving application, information identifying a first plurality of content items as shared content. The first plurality of shared content items are of the first type. After receiving the information identifying the first plurality of shared content items, receive, via the one or more input devices, a request to open the first application. In response to receiving the request to open the first application, concurrently display the information identifying the first plurality of shared content items in the dedicated section of the first application and a second plurality of content items of the first type in a portion of the first application other than the dedicated section.

828 The first plurality of shared content items are of the first type. In accordance with a determination that a pre-determined criterion is met for a content item in the first plurality of shared content items, remove the information identifying the content item from display in the dedicated section of the first application.

830 The pre-determined criterion is a time-based criterion. In accordance with a determination that a pre-determined amount of time has passed from the time when the content item was shared, remove the information identifying the content item from display in dedicated section of the first application.

832 The dedicated section in the first application and the dedicated section in the second application are visually similar.

834 The first shared content item is of a first type. Automatically making the first shared content item available within the first application includes providing a mechanism in the first application for navigating to a location in the first receiving application where the information identifying the first shared content item was initially received.

836 Providing the mechanism in the first application for navigating to the location in the first receiving application where the information identifying the first shared content item was initially received further comprises auto-scrolling to a location within the first receiving application where the first shared content item was initially received.

838 A request to share the first shared content item is initiated from a remote messaging application on a remote electronic device.

840 A plurality of contacts is stored in a contacts application of the plurality of applications. Prior to the automatically making the first shared content item available within the first application or the second application, determine that the information identifying the first shared content item as shared content was received from one or more of the plurality of contacts.

842 Prior to the automatically making the first shared content item available within the first application or the second application, determine that the information identifying the first shared content item as shared content was received from a contact of the one or more of the plurality of contacts that meets communication criteria.

844 Prior to the automatically making the first shared content item available within the first application or the second application, determine that the information identifying the first shared content item as shared content was received from a contact of the one or more of the plurality of contacts that meets a threshold level of communication.

846 A plurality of contacts is stored in a contacts application of the plurality of applications. Prior to the automatically making the first shared content item available within the first application or the second application, determine that the information identifying the first shared content item as shared content was received by a group conversation that meets a threshold level of communication, wherein two or more of the plurality of contacts are participants in the group conversation.

Figure 8D (A)
↓

912 A default setting of the computer system is to allow automatic content sharing from the receiving application to the plurality of applications. Receive a user input requesting inclusion of a new application to the plurality of applications. In response to the user input requesting inclusion of the new application to the plurality of applications, including the new application to the plurality of applications, receive a user input requesting to turn off the default setting for the new application. In response to the user input requesting to turn off the default setting for the new application, include the new application in a set of applications for which automatic content sharing from the receiving application to the set of applications is not authorized.

914 Receive, by the receiving application, information identifying a second shared content item as shared content. The second shared content item is of a second type.
In response to receiving the information identifying the second shared content item as shared content and in accordance with a determination that (i) a second application can open content of the second type and (ii) the second application is included in the set of applications for which automatic content sharing from the receiving application to the set of applications is not authorized, do not make the second shared content item automatically available within the second application.

916 A default setting of the computer system is to not allow automatic content sharing from the receiving application to the plurality of applications. Receive a user input requesting inclusion of a new application to the plurality of applications.
In response to the user input requesting inclusion of the new application to the plurality of applications, including the new application to the plurality of applications, receive a user input requesting to turn off the default setting for the new application. In response to the user input requesting to turn off the default setting for the new application, include the new application to a set of applications for which automatic content sharing from the receiving application to the set of applications is authorized.

918 Receive, by the receiving application, information identifying a second shared content item as shared content. The second shared content item is of a second type. In response to receiving the information identifying the second shared content item as shared content and in accordance with a determination that (i) a second application can open content of the second type, and (ii) the second application is included in the set of applications for which automatic content sharing from the receiving application to the set of applications is authorized, automatically make the second shared content item available within the second application.

920 The receiving application is a messaging application. The information identifying the first shared content item as shared content is received in a first conversation of a plurality of conversations in the receiving application and a default setting of the computer system is to allow automatic content sharing from the plurality of conversations in the receiving application to the plurality of applications.
Receive a new conversation in the receiving application. In response to receiving the new conversation in the receiving application, include the new application to the plurality of conversations.
Receive a user input requesting to turn off the default setting for the new conversation. In response to the user input requesting to turn off the default setting for the new conversation, include the new conversation to a set of conversations for which automatic content sharing from the set of conversations to the plurality of applications is not authorized.

922 Receive, in a second conversation, information identifying a second shared content item as shared content, wherein the second shared content item is of the first type. In response to receiving the information identifying the second shared content item as shared content and in accordance with a determination that (i) the first application can open content of the first type and (ii) the second conversation is included in the set of conversations for which automatic content sharing from the set of conversations to the plurality of applications is not authorized, do not make the second shared content item automatically available within the first application.

924 The receiving application is a messaging application. The information identifying the first shared content item as shared content is received in a first conversation of a plurality of conversations in the receiving application and a default setting of the computer system is not to allow automatic content sharing from the plurality of conversations in the receiving application to the plurality of applications.
Receive a new conversation in the receiving application. In response to receiving the new conversation in the receiving application, include the new application to the plurality of conversations.
Receive a user input requesting to turn off the default setting for the new conversation. In response to the user input requesting to turn off the default setting for the new conversation, include the new conversation to a set of conversations for which automatic content sharing from the set of conversations to the plurality of applications is authorized.

926 Receive, in the second conversation, information identifying a second shared content item as shared content, wherein the second shared content item is of the first type. In response to receiving the information identifying the second shared item as shared content in the second conversation and in accordance with a determination that (i) the first application can open content of the first type and (ii) the second conversation is included in the set of conversations for which automatic content sharing from the set of conversations to the plurality of applications is authorized, automatically make the second shared content item available from within the first application.

928 The plurality of applications includes a settings application. Receive an input requesting to modify content sharing settings. In response to receiving the input requesting to modify content sharing settings, display a user interface for content sharing setting, wherein the user interface for content sharing settings includes a plurality of controls for authorizing the provision of information identifying content as shared to the plurality of applications.

930 The plurality of controls includes a control for activating and deactivating the provision of information identifying content as shared content for all applications from the plurality of applications.

932 The plurality of controls includes a control for activating and deactivating the provision of information identifying content as shared content for each application of the plurality of applications that is capable of opening content for which information identifying the content as shared is received.

934 Providing information identifying content as shared content to the first application is not authorized and the content item has not been automatically made available within the first application in response to receiving the information identifying the content item as shared content.
Receive a request to authorize the provision of information identifying the content item as shared content to one or more relevant applications of the plurality of applications, including the first application. In response to the request to authorize the provision of information identifying the content item as shared content to one or more relevant applications, automatically make the content item available from within the first application.

936 Receive, at the receiving application, a request to open a conversation of a plurality of conversations, where the conversation includes a message including the information identifying the content item. In response to the request to open the conversation, display a user interface that at least partially includes the first messaging conversation, and includes a user-selectable affordance that when selected displays a first set of controls related to the first messaging conversation. In response to a selection of the user-selectable affordance, concurrently display the first set of controls, including a control for activating and deactivating the provision of the information identifying the content as shared content for the conversation.

938 Concurrently display the first set of controls and information specific to the conversation.

940 The information specific to the first conversation includes names of contacts associated with the conversation, avatars of contacts associated with the conversation, and/or a count of contacts associated with the conversation.

942 The first set of controls includes one or more options for communicating with one or more users participating in the conversation.

944 Concurrently displaying the first set of controls and the information specific to the conversation further comprises displaying a plurality of shared content items and a plurality of indicators for each displayed content item of the plurality of content, wherein each of the plurality of indicators indicates that information identifying a corresponding content item of the plurality of content item has been received in the conversation.

946 A request to share the content item is initiated from a remote messaging application on a remote electronic device.

948 The request to share the content item is initiated by a remote user of the remote messaging application and providing the information identifying the content item as shared content to the first application has been authorized.
In response to receiving the information identifying the content item as shared content:
    in accordance with a determination that the remote user is not a contact from a plurality of contacts stored in the memory, do not make the content item available within the first application; and
    in accordance with a determination that the remote user is a contact from the plurality of contacts stored in the memory, do not make the content item available within the first application.

950 Automatically making the first shared content item available within the first application is not in response to receiving, in the receiving application, a user request to open the first shared content item.

952 In accordance with the determination that providing the information identifying the first shared content item as shared content to the first application has been authorized, the first shared content item is automatically made available for later viewing within the first application.

954 The receiving application is a messaging application.

1012 Receive an input in the first application selecting the selectable attribution affordance. In response to the input, at the location in the second application where the information identifying the first shared content item was initially shared, display the information identifying the first shared content item.

1014 The second application is a messaging application that includes a plurality of messaging conversations and the information identifying the content item was received in a first messaging conversation of the plurality of messaging conversations.
In response to receiving the input selecting the selectable attribution affordance, display a portion of a message thread of the first messaging conversation that includes a previously-received message within the first messaging conversation where the information identifying the first shared content item was initially shared.

1016 The second application is a messaging application that includes a plurality of messaging conversations and the information identifying the first shared content item was received in a message of a plurality of messages in a first messaging conversation of the plurality of messaging conversations. In response to receiving the input selecting the selectable attribution affordance, display the message and a field for replying to the message.

1018 The input is a tap input.

1020 The second application is a messaging application that includes a plurality of messaging conversations and the information identifying the first shared content item was received in a message of a plurality of messages in a first messaging conversation of the plurality of messaging conversations.
In response to receiving the input selecting the selectable attribution affordance, display a set of controls for performing an action related to the first shared content item.

1022 The set of controls includes a control for replying to the message.

1024 The set of controls includes a control for removing the representation of a first shared content item and the selectable attribution affordance from being displayed by the first application.

1026 The set of controls includes a control for listening or viewing the first shared content item together with one or more other users.

1028 The information identifying the first shared content item was received in a first message of the plurality of messages in the first messaging conversation of the plurality of messaging conversations, and wherein displaying the view of the second application further includes displaying a user interface of the first messaging conversation, including a message thread of one or more of the plurality of messages and a message entry field.

1030 The view of the first application is a default view that includes a section for shared content. While displaying the information identifying the first shared content item in the second application, receive a single input to return to the default view of the first application thar includes a section for shared content.

1032 While displaying the view of the first application, display:
a plurality of representations of a plurality of shared content items, including the first shared content item, and
a plurality of selectable attribution affordances that provide links to respective locations in the second application where respective information identifying the plurality of shared content items were initially shared.

1034 While displaying the view of the first application, display:
a representation of a second shared content item, and
a second selectable attribution affordance that provides a link to a location in the second application where information identifying the second shared content item was initially shared.

1036 Receive an input selecting the second selectable attribution affordance, and in response to the input, display, at the location in the second application, the information identifying the second shared content item.

1038 The second application is a messaging application that includes a plurality of messaging conversations and the information identifying the second content item was received in a messaging conversation of the plurality of messaging conversations. In response to receiving the input selecting the second selectable attribution affordance, display a message within the messaging conversation that includes the information identifying the second shared content item.

1040 The view of the first application is a first view. While displaying a second view of the first application:
in accordance with a determination that the first shared content item is a single media file, display a first attribution affordance near a representation of the single media file, wherein the first attribution affordance indicates that information identifying the single media file as shared content was received by the second application, and
in accordance with a determination that the first shared content item is a collection of media, display a second attribution affordance near a representation of the collection of media, wherein the second attribution affordance indicates that information identifying the collection of media as shared content was received by the second application.

1042 The first attribution affordance is an avatar overlapping the representation of the single media file, and the second attribution affordance is an avatar overlapping the representation of the collection of media.

1044 The first attribution affordance is selectable and provides a link to a location in the second application where information identifying the single media file as shared content was received, and wherein the second attribution affordance is selectable and provides a link to a location in the second application where information identifying the collection of media as shared content was received.

1046 The selectable attribution affordance is a pill user interface object and the selectable attribution affordance is displayed near the representation of the content item.

1048 The memory stores a plurality of contacts of a user of the electronic device, and wherein the electronic device receives from the plurality of contacts information identifying one or more shared content items.

1050 The selectable attribution affordance further indicates a number of contacts of the plurality of contacts that included the information identifying the one or more shared content items in one or more messages received by the second application.

1052 Receive a first input selecting the selectable attribution affordance. In response to receiving the input selecting the selectable attribution affordance, in accordance with a determination that a number of contacts of the plurality of contacts shared the information identifying the first shared content item, display a disambiguation user interface that includes a plurality of selectable contact affordances, each selectable contact affordance associated with a separate one of the number of contacts of the plurality of contacts.

1054 Receive a second input selecting a contact affordance of the plurality of selectable contact affordances, where the selected contact affordance is associated with a particular contact. In response to the second input, display a view of the second application including a message sent by the particular contact and that includes the information identifying the first share content.

1056 Each contact affordance of the plurality of selectable contact affordances is displayed as a pill user interface object, including an option to send a message and an option for virtual co-presence communication.

1058 While displaying the view of the first application, display an indicator of the number of content items for which information identifying the shared content items were received by the second application.

Figure 10E (A)

1114 The first application is a messaging application. Before displaying a representation of a content item, receive, by the messaging application, information identifying a plurality of content items as shared content. Each of the plurality of content items is of the first type. In response to receiving the information identifying the plurality of content items as shared content, display, within the second application, representations of the plurality of content items.

1116 The representations of the plurality of content items is not marked as highlighted in the second application, wherein displaying, in the second application, the representation of the content item and the representations of the plurality of content items further comprises displaying, in the second application, the representation of the content item and the representations of the plurality of content items in a dedicated section in the second application, where the representation of the content item that was highlighted is displayed first 1118 Receiving the input highlighting the representation of the content item further comprises:
receiving a selection of the representation of the content item;
displaying a control menu that includes an affordance for highlighting the representation of the content item;
receiving a selection of the affordance for highlighting the representation of the content item; and
in response to receiving the selection of the affordance for highlighting the representation of the content item, displaying an indication that the representation of the content item has been highlighted.

1120 While displaying a user interface of the second application, automatically display the highlighted content item and a highlight indicator associated with the content item, the highlighter indicator indicating that the content item has been highlighted.

1122 The highlighted content item and the highlight indicator are displayed in a dedicated section in the user interface of the second application, the dedicated section displaying other content items of the first type that are highlighted.

1124 The first application is a messaging application. Prior to displaying a representation of a content item, receive, by the messaging application, information identifying the content items as shared content, and in response to receiving the information, do not make the content item automatically available for display within the second application.

1126 The representation of the content item is displayed in a shared content section of a plurality of sections of the second application and the representation of the content item is displayed in a highlighted section of a plurality of sections of the second application indicating that the content item was highlighted.

1128 The first application is a messaging application. Receive a search request having search criteria. In response to receiving the search request, concurrently display representations of one or more content items that are not marked as highlighted, and the representation of the content item that is marked as highlighted, wherein the representation of the content item that is marked as highlighted appears more prominently as compared to the representations of one or more content items that are not marked as highlighted.

1130 The search request is for content in one of the first application, the second application, or both the first and second applications.

1132 The first application is a messaging application. Receive, in a messaging conversation in the messaging application, information identifying the content item as shared content, wherein a request to share the content item is initiated from a remote messaging application on a remote electronic device. Receive, in the messaging conversation, information identifying a plurality of content items as shared content, wherein each of the plurality of content items is of the first type. In response to receiving the information identifying the plurality of content items as shared content, do not make the plurality of content items automatically available for display within the second application. Receive an additional input to highlight the representation of the content item. In response to the additional input, mark the content item as highlighted and make the content item available for display in the second application.

1134 The first application is a messaging application, and wherein the information identifying the content item as shared content is received in a first messaging conversation of a plurality of messaging conversations in the messaging application. Receive an additional input to display information about the first messaging conversation. Display information about the first messaging conversation including an indication that the representation of the content item was highlighted.

1136 The first application is a messaging application available on the electronic device and the input selecting the representation of the content item is a first input. Receive, by the messaging application, information identifying the content item as shared content, wherein a request to share the content item is initiated from a remote messaging application on a remote electronic device. Receive a second input directed at the control for highlighting the content item in the second application. In response to the second input, mark the content item as highlighted and make the content item available in the second application.

1138 In response to receiving the input, display a set of controls, including the control for highlighting the content item.

1140 The second application is a music application, a photos application, or a video application.

1142 Highlighting the representation of the content item in the first application comprises marking the representation in the first application to indicate that the content item is highlighted.

Figure 11D

DEVICES, METHODS, AND GRAPHICAL USER INTERFACES FOR AUTOMATICALLY PROVIDING SHARED CONTENT TO APPLICATIONS

RELATED APPLICATIONS

This application claims priority to U.S. Provisional Patent Application No. 63/189,654, filed May 17, 2021, which is hereby incorporated by reference in its entirety.

TECHNICAL FIELD

This disclosure relates generally to electronic devices that share content among applications.

BACKGROUND

The personal use of electronic devices has increased significantly in recent years. Examples of such electronic devices include smartphones, laptops, desktop computers, wearable technology, etc. Such devices are increasingly used for communication (e.g., instant messages, email, or social media) and entertainment (e.g., music, TV, podcasts, etc.). For example, a user of a smartphone may frequently receive communications from various contacts that include content, recommend content, or otherwise identify content that a user may want to view or interact with at a later time (e.g., a user may receive a song recommendation from a friend and want to listen to the song after work). Current methods do not provide an efficient way for surfacing this received content so that a user can easily find it later For example, a user typically needs to open and read a message to discover that the message includes shared content such as a book, a video, a photo, an article, a podcast, music, a link to a webpage, and so on. These methods typically require numerous user inputs, create a significant cognitive burden on a user, and take longer than necessary, thereby wasting the energy. This latter consideration is particularly important in battery-operated devices.

SUMMARY

Accordingly, there is a need for electronic devices with faster, more efficient methods and interfaces for improving discoverability of shared content without the need of additional user inputs. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices are addressed, reduced, or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device that is in communication with a display generation component and one or more input devices. The method includes receiving, by a messaging application of a plurality of applications, information identifying a content item as shared content; and, in response to receiving the information identifying the content item as shared content and in accordance with a determination that the content item is of a first type, automatically making the content item available within a first application of the plurality of applications, wherein the first application is associated with content of the first type. The method further includes: in response to receiving the information identifying the content item as shared content and in accordance with a determination that the content item is of a second type, automatically making the content item available within a second application of the plurality of applications, wherein the second application is associated with content of the second type.

In accordance with some embodiments, a method is performed at an electronic device that is in communication with a display generation component and one or more input devices. The method includes receiving, by a messaging application of a plurality of applications, information identifying a content item as shared content, wherein the content item is of a first type. The method further includes: in response to receiving the information identifying the content item as shared content and in accordance with a determination that a first application of the plurality of applications can open content of the first type, and in accordance with a determination that providing the information identifying the content item as shared content to the first application has been authorized, automatically making the content item available within the first application. The method further includes: in response to receiving the information identifying the content item as shared content and in accordance with a determination that a first application of the plurality of applications can open content of the first type, and in accordance with a determination that providing information identifying the content item as shared content to the first application has not been authorized, not making the content item automatically available within the first application.

In accordance with some embodiments, a method is performed at an electronic device that is in communication with a display generation component and one or more input devices. The method includes while displaying a view of a first application of a plurality of applications, displaying: a representation of a content item, and a selectable attribution affordance that provides a link to a location in a second application where information identifying the content item as shared content was received.

In accordance with some embodiments, a method is performed at an electronic device that is in communication with a display generation component and one or more input devices. The method includes displaying a representation of a content item in a first application of a plurality of applications. The method further includes: while displaying the representation of the content item in the first application, receiving an input selecting the representation of the content item, and in response to receiving the input selecting the representation of the content item, activating a control for highlighting the content item in a second application of the plurality of applications, wherein the content item is of a first type and the second application is associated with content of the first type.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for providing shared content automatically to applicable applications, thereby increasing the effectiveness, efficiency, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A1-5D5 illustrate example user interfaces for sharing music media content received in a messaging application to a music media application, in accordance with some embodiments.

FIGS. 5E1-5E8 illustrate example user interfaces for highlighting representation of content in a messaging application, in accordance with some embodiments.

FIGS. 5F1-5F2 illustrate example user interfaces for disambiguation, in accordance with some embodiments.

FIGS. 5G1-5G4 illustrate example user interfaces for sharing media content received in a group message thread, in accordance with some embodiments.

FIGS. 5I1-5I10 illustrates example of various media application displaying content shared in a messaging application, according to some embodiments.

FIGS. 8A-8D are flow diagrams of a process for automatically making content shared in one or more messaging application available within corresponding media applications based on the type of the content in accordance with some embodiments.

FIGS. 9A-9F are flow diagrams of a process for automatically displaying shared content within media applications based on whether the sharing functionality has been enabled in accordance with some embodiments.

FIGS. 10A-10E are flow diagrams of a process for displaying information related to how a content item was shared in accordance with some embodiments.

FIGS. 11A-11D are flow diagrams of a process for highlighting representations of content items such that the highlighted representations of the content items are available in another application in accordance with some embodiments.

DESCRIPTION OF EMBODIMENTS

Figure 1A:
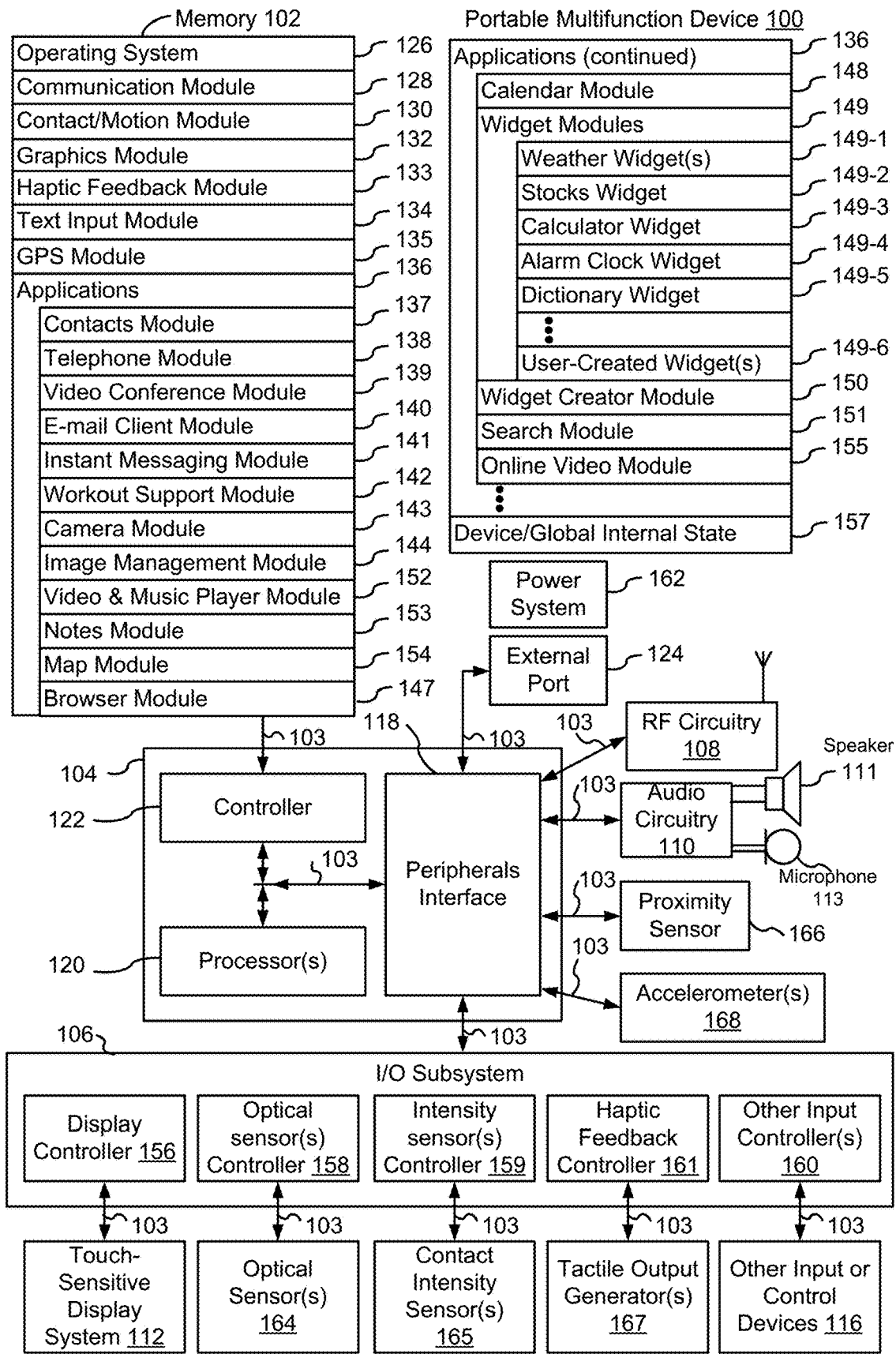
FIG. 1A is a block diagram illustrating a portable multifunction device with a touch-sensitive display in accordance with some embodiments.

Many electronic devices have one or more communication applications and several other applications that provide different functionality, including but not limited to entertainment, shopping, business, productivity, navigation, web browsing, and other types of functionality. A user may frequently receive communication in the one or more communication applications that include a number of different recommendations for various types of content. For example, different contacts of the user may send/share copies or links to music, books, photos, locations, podcasts, websites, news or articles, applications, etc. Current methods for viewing, listening to, playing or otherwise consuming the shared content, require a sequence of user inputs that navigate through various user interfaces (e.g., a user may need to scroll several screens of received messages). For example, a user may be required to open the communication application, search through and open each conversation thread individually, review and search through each message or communication included therein, and individually select each link or copy of content in order to interact with content shared by the user's contacts. In addition, with these methods, after the user selects the content and the electronic device displays the content, the user may be required to go through another sequence of inputs to reply to the contact and/or message that includes the selected content. For example, the user may be required to open the communication application again, and search through the conversations and/or messages to find the location in which the content was shared and then reply at that location. This cumbersome process is repeated for each content item that is shared. Furthermore, if the same content is shared by more than one contact, the user may be required to follow the same inefficient method of searching through communication applications, conversation threads, and messages to discover that a particular item of content was shared by multiple people. In addition, the user may have no way of knowing whether more than one contact has shared the same content until the search is initiated and/or completed. Thus, discovering and consuming shared content with current methods can be cumbersome and inefficient.

In the embodiments described below, an improved method for discovering shared content (or integrating the shared content into the device ecosystem) is achieved by automatically (e.g., without the need of additional user input) making different types of content, that is shared in a messaging application, available within other applications where that type of content is typically provided, rendered, viewed, played or listened to. In addition, in the embodiments described below, an improved method for discovering and connecting with the source of the sharing (e.g., the content sender) is achieved by displaying a selectable attribution affordance in a first application (e.g., a music, photos, or video application) that provides a link to a location in a communication application (e.g., messaging application) where the content was shared. The selectable attribution affordance provides a mechanism in the first application for navigating to a location in the first application where information identifying the shared content item was initially received. Furthermore, the selectable attribution affordance indicates who is the contact that shared the content or the number of contacts that shared the same content if more than one. Additionally, an improved method for highlighting or pinning shared content of interest is achieved by providing a user interface control in a communication application for highlighting shared content in another application. These improved methods provide an efficient way for displaying shared content within corresponding applications where the shared content is typically consumed, thus reducing the number of necessary user inputs and the corresponding cognitive burden that may result from having to navigate through different applications and menu hierarchies.

Below, FIGS. 1A-1B, 2, and 3 provide a description of example devices. FIGS. 4A-4B, 5A1-5D5, 5E1-5E8, 5F1-5F2, 5G1-5G4, 5H, 5I1-5I10, 6A-6D, and 7A-7D illustrate example user interfaces for providing shared content automatically to suitable or applicable applications. FIGS. 8A-8D illustrate a flow diagram of a method of automatically making content shared in one or more messaging application available within corresponding media applications based on the type of the content in accordance with some embodiments. FIGS. 9A-9F illustrate a flow diagram of a method of automatically displaying shared content within media applications based on whether the sharing functionality has been enabled. FIGS. 10A-10E illustrate a flow diagram of a method of displaying information related to how a content item was shared. FIGS. 11A-11D illustrate a flow diagram of a method of highlighting representations of content items such that the highlighted representations of the content items are available in another application. The user interfaces in FIGS. 5A1-5D5, 5E1-5E8, 5F1-5F2, 5G1-5G4, 5H, 5I1-5I10, 6A-6D, and 7A-7D are used to illustrate the processes in FIGS. 8A-8D, 9A-9F, 10A-10E and 11A-11D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
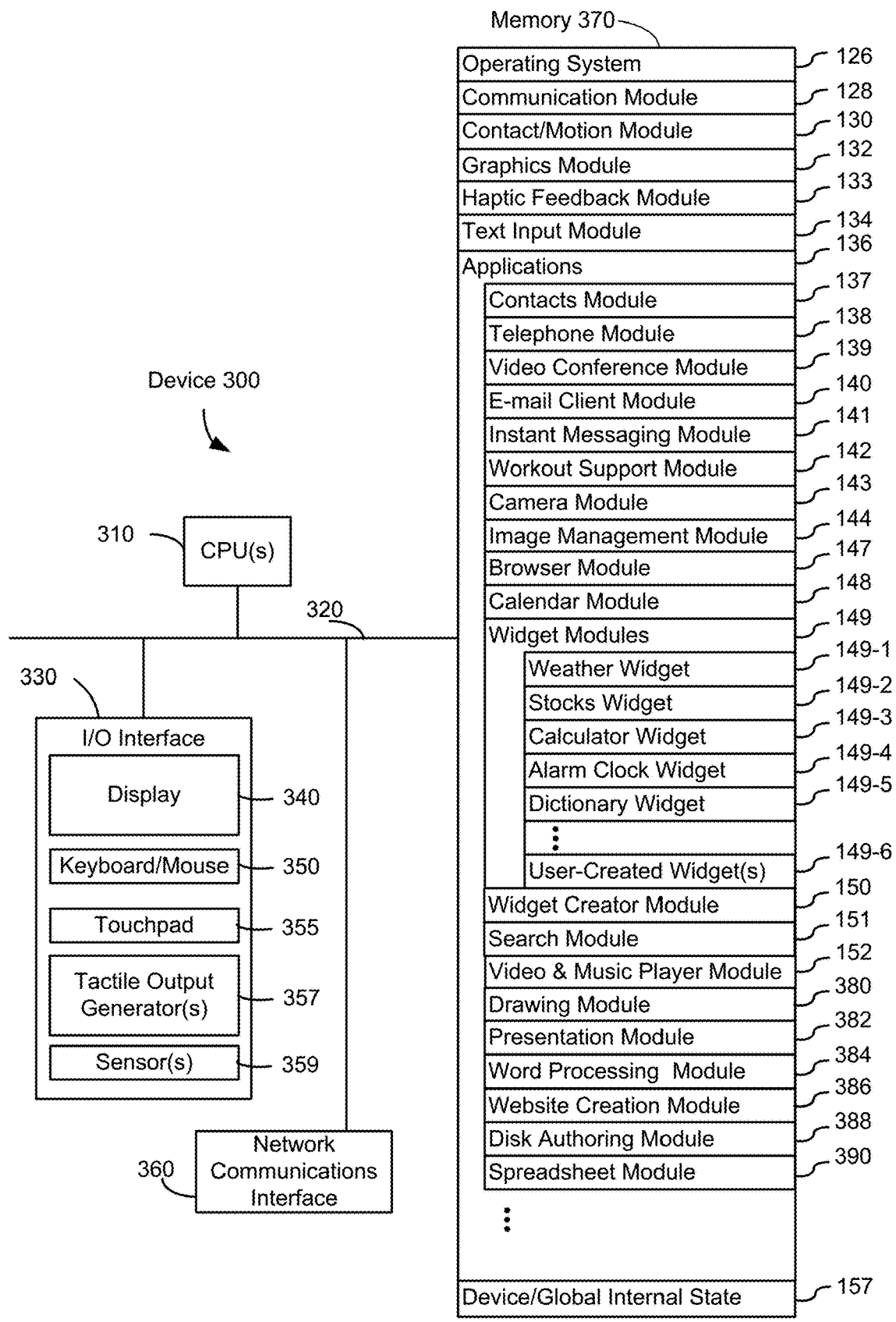
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
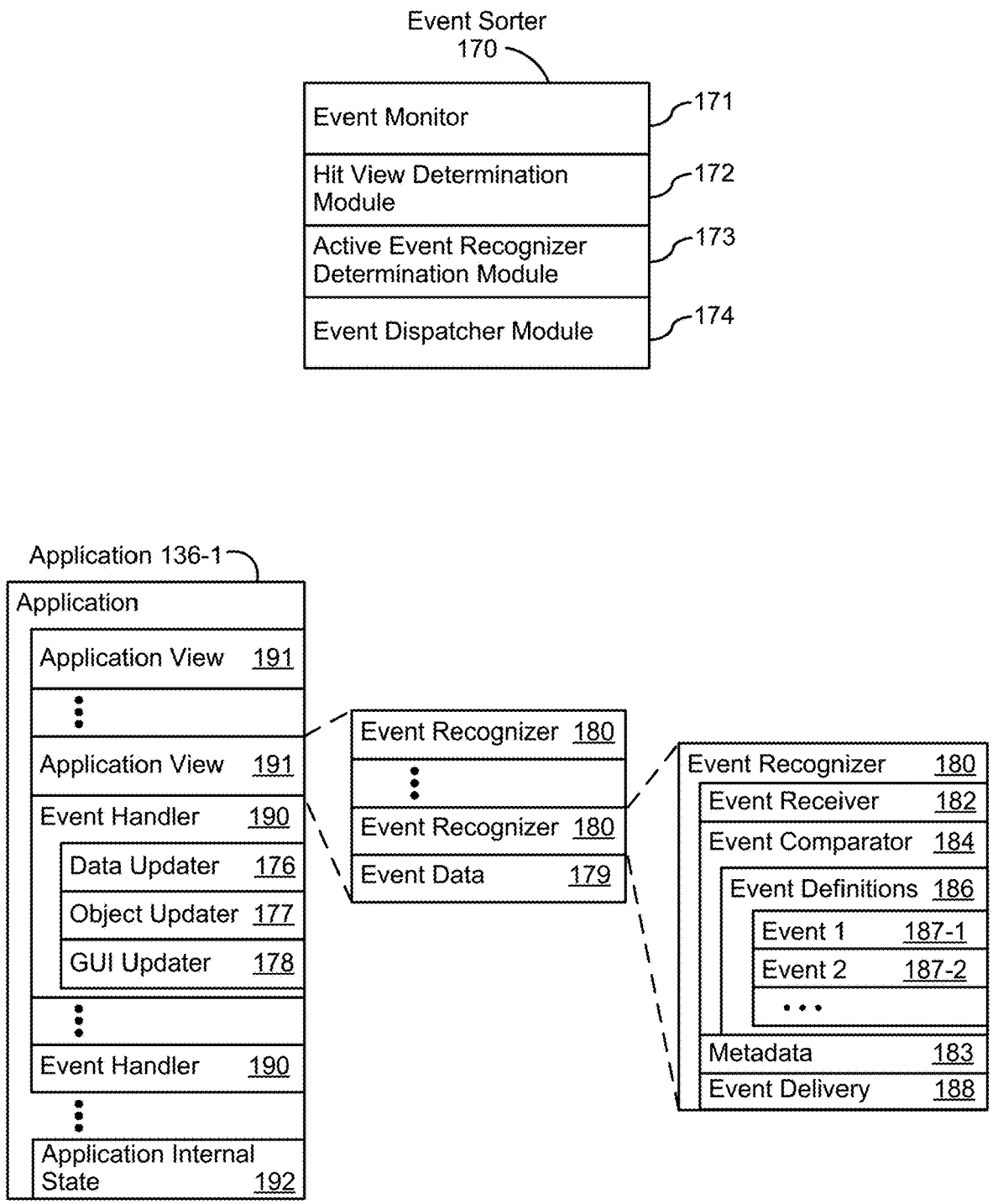
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
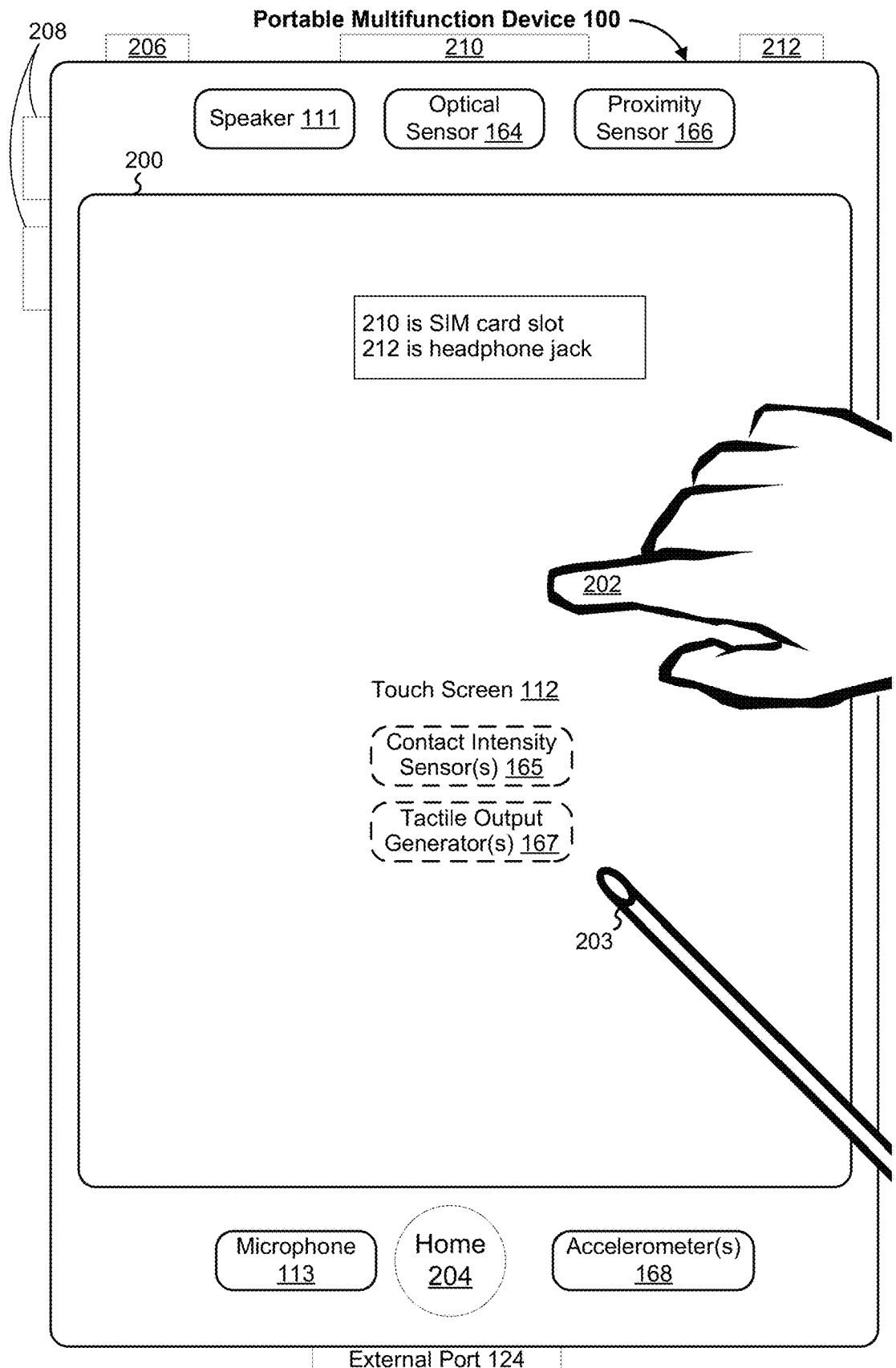
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
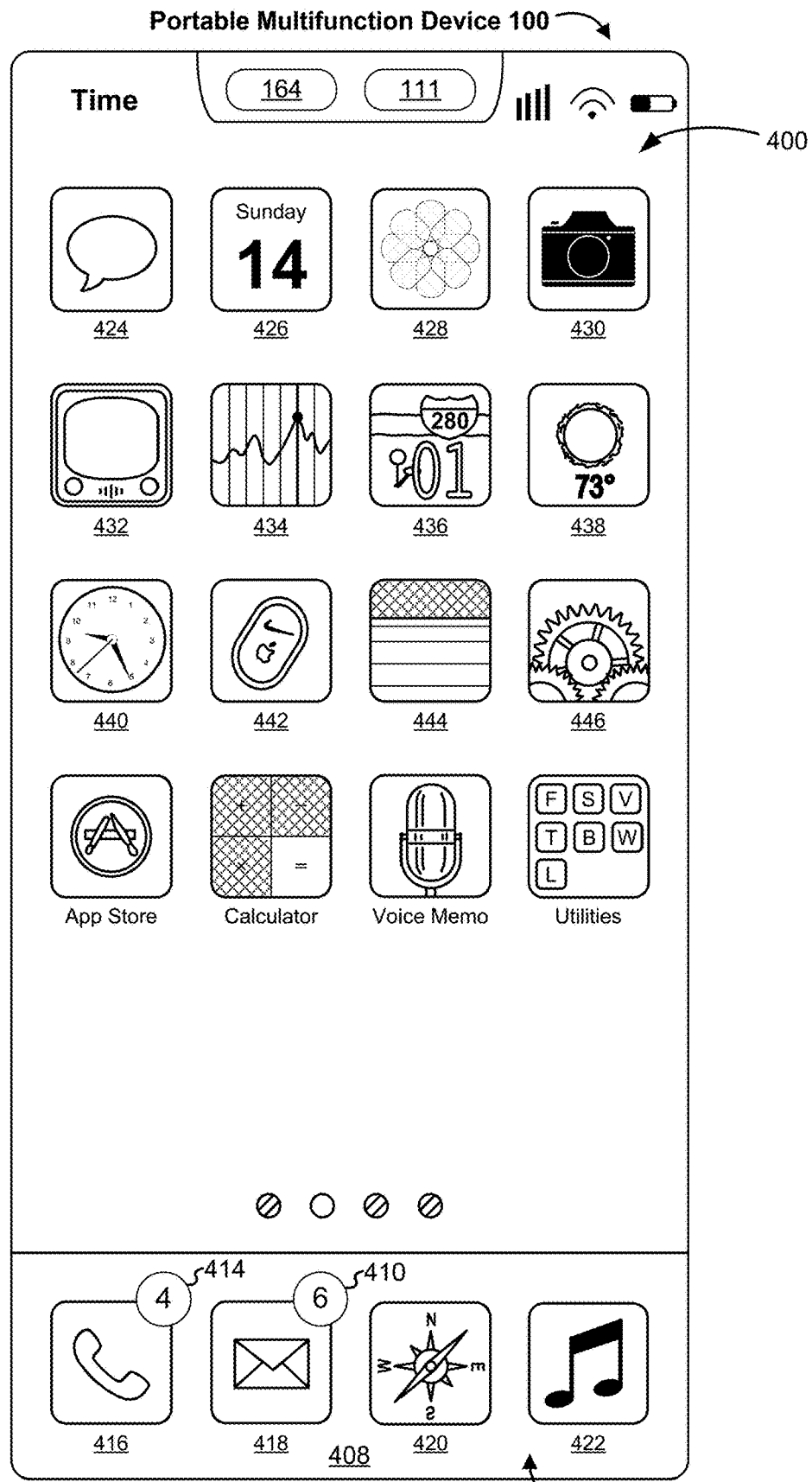
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser;" and
 Icon 422 for video and music player module 152, labeled "Music;" and
Icons for other applications, such as:
 Icon 424 for IM module 141, labeled "Messages;"

Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
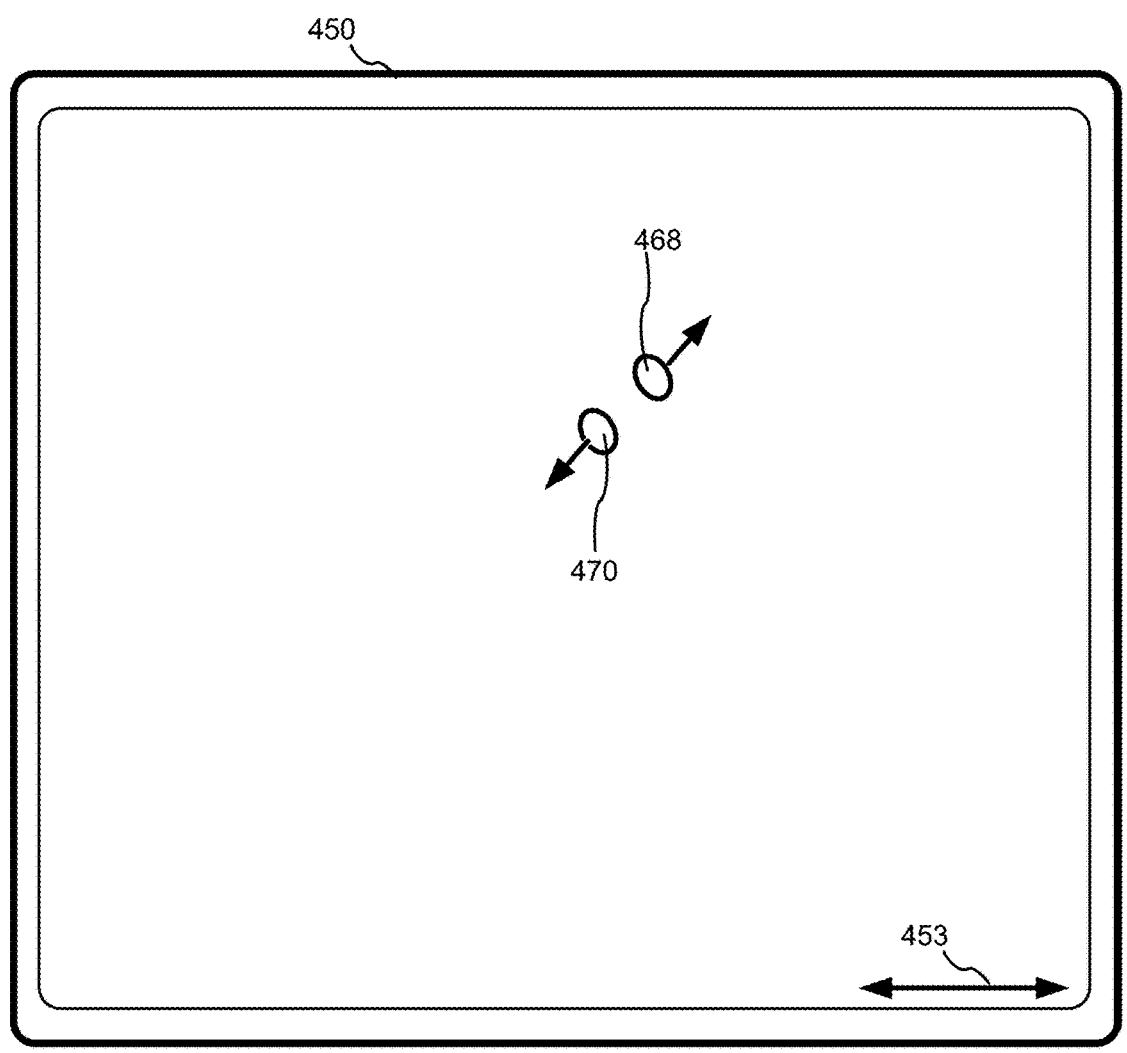
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A1-5D5, 5E1-5E8, 5F1-5F2, 5G1-5G4, 5H, 5I1-5I10, 6A-6D, and 7A-7D illustrate example user interfaces for providing shared content automatically to applicable applications in accordance with some embodiments. The user interfaces in these figures are used to illustrate the processes described below, including the processes in FIGS. 8A-8D, 9A-9F, 10A-10E and 11A-11D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A1-5D5 illustrate example user interfaces for sharing music media content received in a messaging application to a music media application, in accordance with some embodiments.

FIG. 5A1 illustrates an example user interface for a menu of applications on portable multifunction device 100 in accordance with some embodiments. Similar user interfaces are, optionally, implemented on device 300. In particular, FIG. 5A1 shows a user interface page 5050 of a multipage home screen user interface. The user interface page 5050 includes a number of application icons (application icons 5008a-5008p and applications icons 5008q-5008t) arranged, optionally in a preset layout (e.g., application icons 5008a-5008p are arranged on a 5×4 grid and applications icons 5008q-5008t in 1×4 grid in tray 509). In some embodiments, the application icons 5008a-5008p are user-selected and are placed at respective positions on the user interface page 5050 in accordance with user inputs. In some embodiments, the application icons 5008q-5008t are system selected and are automatically placed at respective positions in a navigation bar, dock or tray 409, e.g., a menu of applications that appear on the bottom of the user interface page 5050. In some embodiments, application icons 5008q-5008t may also be user selected. In some embodiments, if an icon is displayed in tray 509, the same icon is not displayed in the rest of the user interface page 5050. In some embodiments, an icon is displayed in both tray 509, and the same icon is displayed in another portion of the user interface page 5050 (e.g., an icon may be displayed in two distinct locations in the user interface). In some embodiments, the dock or tray 509 that is shown in the bottom portion of the user interface page 5050 is shown on other pages of the multipage home screen user interface at the same location on the display 112.

In some embodiments, the tray 509 includes application icons for frequently used applications, such as:

Icon 5008q for telephone module 138, labeled "Phone;"
Icon 5008r for e-mail client module 140, labeled "Mail;"
Icon 5008s for browser module 147, labeled "Browser;" and
Icon 5008t for contacts module 137.

In some embodiments, user interface page 5050 further includes the following application icons, or a subset or superset thereof:

Icon 5008a for video and music player module 152, labeled "Music;"
Icon 5008b for calendar module 148, labeled "Calendar;"
Icon 5008c for image management module 144, labeled "Photos;"
Icon 5008d for IM module 141, labeled "Messages;"
Icon 5008e for online video module 155, labeled "Online Video;"
Icon 5008f for stocks widget 149-2, labeled "Stocks;"
Icon 5008g for map module 154, labeled "Maps;"
Icon 5008h for books module, labeled "Books;"
Icon 5008i for alarm clock widget 149-4, labeled "Clock;"
Icon 5008j for workout support module 142, labeled "Workout Support;"
Icon 5008k for notes module 153, labeled "Notes;"
Icon 5008l for weather widget 149-1, labeled "Weather;"
Icon 5008m for calculator widget 149-3, labeled "Calculator;"
Icon 5008n for podcast application or module, labeled "Podcast;"
Icon 5008o for application store module, labeled "App Store;"
Icon 5008p for news application or module, labeled "News."

In some embodiments, more applications than the ones illustrated on user interface page 5050 are available on electronic device 100 or 300. Additional applications may be represented by other application icons available on other user interface pages of the multipage home screen. Some application icons may appear on more than one user interface page of the multipage home screen.

It should be noted that the icon labels associated with icons 5008a-5008t in FIG. 5A1 are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon. Application icon labels are selected to indicate the associated functionality of the corresponding application.

It will also be understood that the term "application icon" is used to describe a user interface element that represents a corresponding application, and the term application is used to describe the functionality or module that is available, stored, and/or installed on electronic device 100 or 300 (e.g., any of the aforementioned applications 136, 137-155, 380-390). It will also be understood that activation of a respective application icon of the number of application icons (e.g., 5008a-5008t) causes display of an application corresponding to the respective application icon to replace display of a respective page of the multipage home screen user interface on which the respective application icon is displayed. In some embodiments, displaying an application includes displaying a view of an application or a user interface of the application.

FIG. 5A1-5A3 illustrate an example of navigating from a user interface page on the multipage home screen (e.g., user interface page 5050) to a particular conversation in an instant messaging application, in accordance with some embodiments.

FIG. 5A1 shows a tap input by contact 5002. The tap input by contact 5002 is detected at a location on the touch-screen that corresponds to an instant messaging application represented by application icon 5008d. In response to the tap input by contact 5002, the instant messaging application is opened, launched, or activated and the electronic device ceases to display the user interface page on the multipage home screen and displays a user interface of the instant messaging application is displayed, namely messages user interface 5040 shown on FIG. 5A2.

In some embodiments, communication is received in an instant messaging application represented by application icon 5008d. The incoming communication may be sent by contacts of the user associated with the electronic device or by other users that are not contacts, e.g., not saved as known contacts in the user's electronic device. In some embodiments, contacts and information about the contacts is saved in a contacts application (e.g., contacts module 137). Information about a contact may include one or more phone numbers, one or more email addresses, a name, an address, and other identifying information for the contact. Contacts are usually saved in the contacts application in response to user input associated with electronic device (e.g., the user saving contact information in electronic device 100 or 300). Contacts are users of remote electronic devices similar to devices 100 or 300. Contacts optionally connect with the user associated with the electronic device via communication applications such as an instant messaging application (e.g., represented by icon 5008d), a social media application, and/or email application (e.g., represented by an application icon 5008r) that are installed on the device.

The incoming communication may include content shared by contacts of the user associated with the electronic device. Incoming communication may also include shared content from others who are not contacts of the user. It should be noted that sharing content (e.g., providing content recommendations) does not necessarily imply positive reviews of the content being shared. More broadly, shared content can be content items that are shared from one device to another and can be interacted with in other applications. In some embodiments, content can be shared from one device to another by a communication application (e.g., instant messaging application represented by 5008d or 5008r, an email application). The sharing device may send a copy of the content item, a representation of the content item, a link to the content item, or other identifier of the content item to the receiving device and the receiving device may determine that the content is readable by a corresponding application designed to open such content. When content is shared from a device that is not a contact of the receiving device, the receiving device may determine that the content should not be sent to corresponding applications to open the content depending on user settings.

In some implementations, content may be airdropped (e.g., via WiFi or Bluetooth), or sent by NFC or UWB from one device to another. In other implementations, content may be shared using other applications, alternatively or in addition to a communication application.

FIG. 5A2-5A3 show messages user interface 5040, including a number of conversations 5006a-5006f. Conversations 5006a-5006f are between the user associated with the electronic device and one or more contacts saved in the contacts module 137. In some embodiments, the conversation may be between the user and one contact, e.g., conversation 5006a is between the user and contact "Alex" represented by avatar 5003a; conversation 5006c is between the user and contact "Lucy" represented by avatar 5003c; conversation 5006d is between the user and contact "Joe" represented by avatar 5003c; and conversation 5006e is between the user and contact "Tony" represented by avatar 5003e. In some embodiments, the conversation may be between the user and two or more contacts. For example, conversations 'Costa Rica Trip Group' 5006b and "Family Group" 5006f are group chats with more than one contact participating in the conversation. Group chats are represented by multiple avatars to indicate than more than two users are participating in the conversation, e.g., 'Costa Rica Trip Group' 5006b is represented by a group of avatars 5003b and Family Group" 5006f is represented by a group of avatars 5003f.

FIG. 5A3 shows a tap input by contact 5010 that is detected at a location on the touch-screen that corresponds to conversation 5006a between the user of the electronic device and the contact "Alex". In response to the tap input by contact 5010, the electronic device opens conversation 5006a in another user interface of the messaging application. For example, tap input by contact 5010 causes the electronic device to cease to display messages user interface 5040 and to display a conversation user interface 5042.

Figure 4B:
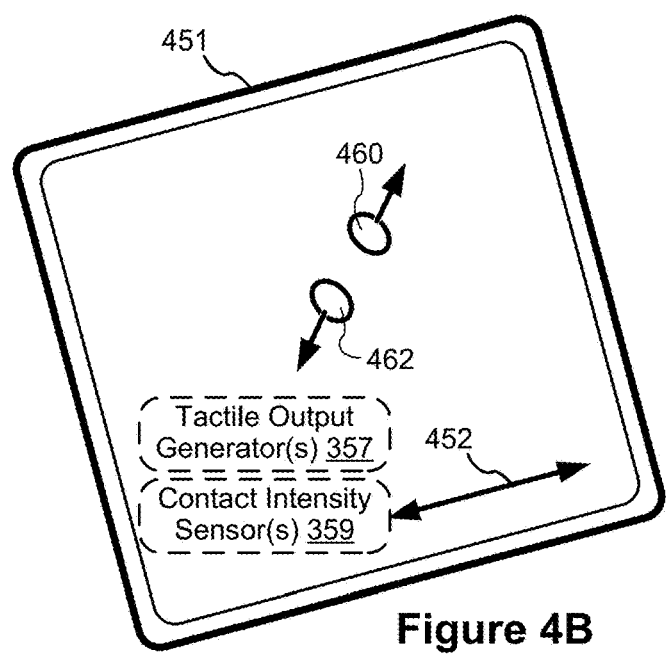

FIG. 5A4 shows at least a portion of conversation 5006a that includes a number of shared content items of different types that are shared by contact "Alex", according to some embodiments. Conversation 5006a is displayed in conversation user interface 5042, according to some embodiments. For example, conversation user interface 5042 shows a number of messages 5001a-5001k that have been exchanged between the contact "Alex" and the user of the electronic device. Conversation 5006a is saved in the messaging application, and the user of the electronic device may come back to continue the conversation, to respond to one of the messages, to review the content of the conversation, to copy contents of the conversation, or to delete one or more messages in the conversation. In some embodiments, conversation 5006a includes a number of shared content items that are shared with the user of the electronic device by contact "Alex" represented by avatar 5041. For example, message 5001a from contact "Alex" shares a podcast with the user of the electronic device, where the podcast is represented by podcast image 5045a and tiled "Podcast Name-A"; message 5001d from contact "Alex" shares a song with the user of the electronic device, where the song is represented by a song image (e.g., representation 5045b) and is titled "Song Name-A"; and message 5001g from contact "Alex" shares an article with the user of the electronic device, where the article is represented by article image 5045c and is titled "News Article Title-A." In some embodiments, sharing a content item via an instant message may include sharing a copy of the content item, a representation of the content item, a link to the content item, or other identifier of the content item that is readable by a corresponding application that is designed or capable of opening such content. For example, a music application such as video and music player module 152 is designed to or is capable of playing, displaying, or otherwise opening the song represented by a song image (e.g., representation 5045b). The user may tap or otherwise select play button 5045c that is associated with the song represented by an image (e.g., representation 5045b). Messages 5001c, 5001f, 5001h, and 5001k that are from the user of the electronic device are visually distinguished from messages 5001a, 5001b, 5001d, 5001e, 5001g, and 5001j that are from contact "Alex."

In some embodiments, in response to receiving shared music in a message such as message 5001d in conversation 5006a, the electronic device automatically, without the need for any user input, makes that music available in a dedicated section for later listening or playing. Music that has been shared with the user (e.g., in different messages, conversations, applications, or by different contacts/users) may be marked as shared or automatically grouped together (e.g., in a data structure) for later display in the music application. For example, when a shared content item meets criteria (e.g., it is shared by a content and should be sent to an application where the content can be opened) there is no need for the user to open the application where the content was shared; there is no need for the user to open the message or the conversation in which the content was shared; there is no need to open the application where the content can be interacted with and take any proactive action. When the information associated with shared content is received by a receiving electronic device in one application, the receiving application makes decisions regarding where to surface the shared content. For example, if the received content is music content, the receiving device may surface the content in the application in which the content was received as well as one or more applications that are specific to music. For example, device 100 includes applications for Music Service 1, Music Service 2, Music Service 3, but only surfaces the shared content in Music Service 1 and Music Service 2 without surfacing the shared content in Music Service 2.

In some embodiments, the song shared in message 5001d is made automatically available in one or more music applications (e.g., the music application represented by icon 5008a) without any user input. For example, the song shared in message 5001d is made automatically available in a music application not in response to a user selecting or requesting to open or view the shared song. Instead, the receiving device automatically determines the appropriate one or more applications in which to surface the content based on sharing settings on the device. Sharing settings may include determining whether the content was shared from a specific user, user type, or group. Sharing settings may also include determining whether to share specific content in one or more specific applications. For example, a user device may have three music applications downloaded to the user device, but may only enable sharing content on two of the music applications. When the user device receives music content, the user device may automatically share the music content with the two music applications on which sharing was previously enabled and not the third application (e.g., without sharing the content to one or more applications that have not allowed content sharing). For example, as described with reference to FIG. 7A-7D, the user is enabled to select for which applications sharing content is enabled.

Content may be shared automatically by the receiving device once it is received and not in response to user interaction, e.g., a user choosing content represented by an image (e.g., representation 5045b), e.g., in response to a user selecting the image (e.g., representation 5045b) or in response to a user selecting the play button 5045c.

FIG. 5A5 shows a tap input by contact 5012 that is detected at a location on the touch-screen that corresponds to music application represented by icon 5008a on user interface page 5050, according to one embodiment. In response to the tap input by contact 5012, the electronic device ceases to display user interface page 5050, opens the music application and displays a default view of the music application.

FIG. 5A6 shows a default view 5052 of the music application, where the default view includes a section for shared content, according to some embodiments. Default view 5052 displays a number of shared songs or other music (e.g., playlists, albums of songs, etc.) in a dedicated section such as section 5054, according to one embodiment. In some embodiments, the default view 5052 of music application includes a section 5054 dedicated to music that has been shared with the user of the electronic device. In some embodiments, section 5054 is labeled "Shared with You." Section 5054 groups together or aggregates in one section music that has been shared with the user of the electronic device. For example, section 5054 displays a representation 5054a of the song shared in message 5001d (shown in FIG. 5A4). In some embodiments, section 5054 displays representations 5054b and 5054c of other music shared in other or the same conversation, such as music shared in one or more of conversations 5006a-5006f For example, the song "Song Name-B", represented by song image 5054b is shared by "Joe" in conversation 5006d (shown in FIG. 5A2), and the song "Song Name-C", represented by song image 5054c is shared by two or more contacts in one or more of conversations 5006a-5006f (shown in FIG. 5A2).

In some embodiments, the default view 5052 includes additional sections that display music content such as section 5056 that displays representations of recently played music or section 604 "Highlights" that displays representations of highlighted content (shown in FIG. 5E8). In some embodiments, the user interface of music application includes a tray or navigation bar 5057 that includes options 3001a-3001e for selecting different views of the music application, such as view 3001a for displaying currently played content; view 3001b for browsing music in the music application; view 3001c for playing or browsing radio stations; view 3001d for displaying a library of saved music, and search 3001e for searching artists, playlists, albums, and other music available in the music application.

In some embodiments, each music item that is represented in section 5054 (which is the section dedicated for shared music) is associated with a selectable pill that provides information or a link to a location (e.g., in the messaging application) where the shared music item was initially shared. For example, the shared song "Song Name-A", represented by song image 5054a is associated with a selectable pill 5056a, labeled "From Alex"; the shared song "Song Name-B", represented by song image 5054b is associated with a selectable pill 5056b labeled from Joe; and the shared song "Song Name-C" is associated with a selectable pill 5056c, labeled "from 3 People". In some embodiments, selectable pill 5056a is located near representation 5054a;

selectable pill 5056b is located near representation 5054b; and selectable pill 5056c is located near representation 5054c.

FIG. 5A6 shows a tap input by contact 5014 that is detected at a location on the touch-screen that corresponds to selectable pill 5056a, labeled "From Alex." In response to the tap input by contact 5014, the electronic device ceases to display default view 5052 and opens the application in which the content was shared (e.g., message application) at a location where the content was shared. For example, in some embodiments, in response to the tap input by contact 5014, the electronic device displays a conversation user interface 5042 (shown in FIG. 5A7). Similarly, in some embodiments, in response to the tap input at a location on the touch-screen that corresponds to selectable pill 5056b, labeled "From Joe," the electronic device ceases to display default view 5052 and opens the message application at a location where song "Song Name-B" (represented by song image 5054b) was shared. In some embodiments, in response to the tap input at a location on the touch-screen that corresponds to selectable pill 5056c, labeled "From 3 people," the electronic device ceases to display default view 5052 and displays a disambiguation interface such as disambiguation user interface 572, described in further detail in relation to FIGS. 5F1-5F2.

FIG. 5A7 shows a portion 5042a of a message thread of conversation 5006a displayed in conversation user interface 5042 in response to tap input by contact 5014, according to some embodiments. The tap input by contact 5014 selects the selectable pill 5056a, and, in response to selecting the selectable pill 5056a, the electronic device opens conversation 5006a where the content was shared in the messaging application. Portion 5042a of the message thread displays both sides of conversation 5006a on one screen, in chronological order. For example, messages from the contact "Alex" are displayed on one side, and messages from the user of the electronic device/computer system are displayed on the other side. The user of the electronic device may enter a text message in the field 5059. Furthermore, the user of the electronic device may share content by selecting one or more of options 4001a-4001e. For example, the user may share photos by selecting option 4001a; the user may share applications by selecting option 4001b; the user may share music by selecting option 4001c; the user may share games by selecting option 4001d, and the user may share contacts by selecting option 4001e. In some embodiments, the user may tap or select the selectable text "Done" 5043 to return to the default view of the music application that includes section 5054 dedicated for shared music.

Portion 5042a of the message thread of conversation 5006a is displaying the messages sent/received last in the chronological order. For example, FIG. 5A7 displays conversation 5006a without scrolling to a previously-received message (e.g., message 5001d) that includes the shared song "Song Name-A." In some embodiments, in response to the tap input by contact 5014 (shown in FIG. 5A6), the electronic device displays a portion 5042b of the message thread of conversation 5006a at a location of a previously-received message (e.g., message 5001d) that includes the shared song "Song Name-A" (described in FIG. 5A8 below).

FIG. 5A8 shows a portion 5042b of the message thread of conversation 5006a that is auto-scrolled to the previously-received message 5001d, which includes the shared song "Song Name-A," represented by representation 5045b. For example, instead of displaying the messages sent/received last in the chronological order, portion 5042b displays last previously received message 5001d and the messages that were sent/received prior to receiving message 5001d such as previously shown messages 5001c, 5001b, 5001a, and previously not shown messages 5001m and 5001l. Message 5001m shows that the contact "Alex" has shared a location (e.g., address that can be opened in maps application). In some embodiments, the user may tap or select the selectable text "Done" 5043 to return to the default view of the music application that includes section 5054 dedicated for shared music.

FIG. 5B1 shows a portion 5062a of a conversation between the contact "Alex" and the user of the electronic device in conversation user interface 5062 that includes a number of inline replies, according to some embodiments. For example, message 5009b from the user of the electronic device is a reply to message 5009a of contact "Alex". Line 5064 indicates that message 5009b is a reply to message 5009a. Message 5009e is also a reply to message 5009a that was sent after unrelated message 5009c was sent by the contact "Alex". Unrelated message 5009c breaks the inline replies thread. To mitigate the cognitive burden that this break creates, message 5009d is automatically added to the conversation by the electronic device. Message 5009d is the same message as message 5009a (the message being replied to) and is shown with a dashed line to indicate that it was not actually sent by the contact "Alex" but it is merely repeated for visual feedback indicating the message that follows is a reply. Line 5066 indicates that message 5009e is a reply to message 5009d. Message 5009f includes a text message "Yes, I am talking about Song-A! Here it is!" and a shared song "Song Name-D". Message 5009f is a reply to message 5009e and this is indicated with line 5068. Message 5009g and message 5009h are not related to the inline replies thread, and therefore, no lines are used to indicate that there is no relationship between the messages.

In some embodiments, after message 5009f that includes shared song "Song Name-D" has been received in the messaging application, the user of the electronic device opens the music application and the electronic device displays the default view of the music application, as illustrated in FIG. 5B2.

FIG. 5B2 shows shared song "Song Name-D", represented by song image 5045d in section 5054 dedicated for shared music, as described above in relation to FIG. 5A6. The shared song "Song Name-D" is associated with a selectable pill 5056d, labeled "From Alex".

FIG. 5B2 shows a tap input by contact 5016 that is detected at a location on the touch-screen that corresponds to selectable pill 5056d, labeled "From Alex." In response to the tap input by contact 5016, the electronic device ceases to display default view 5052 and opens a reply user interface in the message application at a location where the content was shared. For example, in some embodiments, in response to the tap input by contact 5016, the electronic device displays an inline reply user interface 5072, shown in FIG. 5B3.

In some embodiments, the inline reply user interface 5072 displays only messages that are related, e.g., messages that are part of the same inline reply thread such as messages 5009a, 5009b, 5009e, and 5009f. Furthermore, the inline reply user interface 5072 is auto-scrolled to message 5009f that includes the shared song "Song Name-D". The inline reply user interface 5072 further shows keyboard 5079 that the user of the electronic device may use to enter a reply, and a reply entry field 5077. The user of the electronic device may use the inline reply user interface 5072 to send a reply directly to message 5009f that includes the shared song "Song Name-D", according to one embodiment.

FIG. 5C1 shows a tap input by contact 5018 on a selectable text 5075 labeled "See all". The selectable text 5075 is displayed in default view 5052 of the music application in the dedicated section 5054 for shared music. Default view 5052 is described with reference to FIG. 5A6 above. Upon tapping by contact 5018 on the selectable text 5075 labeled "See all", the electronic device expands the dedicated section 5054 for shared music to include and display all music that has been shared with the user of the electronic device as illustrated in FIG. 5C2 below.

FIG. 5C2 shows default view 5052 with an expanded section 5054 for shared music. The expanded section 5054 is displayed in response to the tap input by contact 5018, shown in FIG. 5C1. In response to the tap input by contact 5018, the electronic device ceases to display section 5056 for recently played music and other sections that may have been displayed concurrently with unexpanded section 5054.

FIG. 5C2 concurrently displays, in the expanded section 5054 for shared music, shared songs that are displayed in the unexpanded section 5054 and shared songs that are not displayed in the unexpanded section 5054. For example, shared song "Song Name-A" represented by song image 5054a; shared song "Song Name-B" represented by song image 5054b; and shared song "Song Name-C" represented by song image 5054c were displayed in the unexpanded section 5054 in FIG. 5C1, and shared playlist "Playlist Name" represented by playlist image 5054e and shared song "Song Name-F" represented by song image 5054f were not displayed in the unexpanded section 5054, shown in FIG. 5C1. In some embodiments, FIG. 5C2 shows an indicator 5075a of the number of shared music items. For example, FIG. 5C2 shows that the section 5054 for shared music includes five share music items represented by image representations 5054a, 5054b, 5054c, 5054e, and 5054f.

FIG. 5C3 shows a tap input by contact 5020 that is detected at a location on the touch-screen that corresponds to representation 5054a of shared song "Song Name-A". The tap input by contact 5020 selects the shared song "Song Name-A". In response to the tap input by contact 5020, the electronic device ceases to display the default view 5052 that includes section 5054 for shared music. In response to the tap input by contact 5020, the electronic device plays the shared song "Song Name-A" and displays a user interface with a detailed view of the currently played song, such as user interface 5032 for currently playing song, shown in FIG. 5C4 that is described below.

FIG. 5C4 shows user interface 5032 for currently playing song, which is represented by image 5035. Image 5035 is the same as image 5045a but displayed in an enlarged form. The user interface 5032 shows details 5037 for the currently shared song such as the song's name and avatar 5039 that represents the contact "Alex" that has shared the currently playing song represented by image 5035. In some embodiments, avatar 5039 is selectable and provides a link to a location in the messaging application where the currently playing song has been shared. For example, in some embodiments, upon tapping on avatar 5038, the electronic device ceases to display user interface 5032 for currently playing song and displays messaging user interface as described in FIGS. 5A6, 5A7, and 5B3.

FIG. 5D1 shows a long press input by contact 5022 that is detected at a location on the touch-screen that corresponds to selectable pill 5056a, labeled "From Alex." FIG. 5D1 shows the same default view 5052 of the music application including shared song "Song Name-A" represented by song image 5054a in section 5054 for shared music, as described in relation to FIG. 5A6.

FIG. 5D2 shows an overlay user interface 5082 including a set of controls 5080 for performing a number of actions related to the shared song "Song Name-A." In response to the long press input by contact 5022, the electronic device ceases to display default view 5052 and displays the overlay user interface 5082 including a set of controls 5080 for performing a number of actions related to the shared song "Song Name-A" represented by song image 5054a in section 5054 (shown in FIG. 5D1). In some embodiments, the overlay user interface 5082 maintains display of selectable pill 5056a associated with the shared song "Song Name-A". For example, the user of the electronic device may return to the conversation in which the song was shared by selecting selectable pill 5056a displayed in overlay user interface 5082.

In some embodiments, the set of controls 5080 includes control 5080a for replying to the message in which the song "Song Name-A" was shared such as message 5001d shown in FIG. 5A4 above. In response to tapping or otherwise selecting control 5080a, the electronic device displays the conversation in which the song "Song Name-A" represented by song image 5054a was shared such as conversation user interface 5042 described in FIGS. 5A7 and 5A8, y an inline reply user interface such as inline reply user interface 5072 shown in FIG. 5B3.

In some embodiments, the set of controls 5080 includes a control 5080b for viewing further details associated with the shared song. Control 5080b is labeled "Info Card", according to some embodiments. In some embodiments, the set of controls 5080 includes a control 5080c for starting a shared listening session with the contact "Alex" who shared the song. In a shared listening session, the user of the electronic device and contact "Alex" may listen to the song at the same time in a virtual co-presence session.

In some embodiments, the set of controls 5080 includes a control 5080d for removing the representation 5054a of the shared song "Song Name-A" and the associated selectable pill 5056a, labeled "From Alex" from the collection of shared music. For example, in response to a tap input by contact 5084 the electronic device ceases to display the shared song in section 5054 for shared music as shown in FIG. 5D5. In some embodiments, control 5080d allows the user of the electronic device to disassociate the shared song from the message that shared the song and/or from the contact that shared the song.

FIG. 5D3 shows an overlay user interface 5082a including a set of controls 5080 as described in FIG. 5D2 above. In some embodiments, the overlay user interface 5082 is displayed in response to the long press input by contact 5022, shown in FIG. 5D1. In some embodiments, the overlay user interface 5082a displays a snippet 5088 of the conversation in which the song was shared such as an extract or portion of the conversation 5006a illustrated in conversation user interface 5042. In some embodiments, the snippet 5088 includes the message that shared the song such as message 5001d (also shown in FIG. 5A4 above). In some embodiments, in response to a tap input by contact 5086 the electronic device ceases to display the shared song in section 5054 dedicated for shared music as shown in FIG. 5D5.

FIG. 5D4 shows an overlay user interface 5082b that includes a set of controls 5090 for performing a number of actions related to the shared song "Song Name-A." The electronic device displays the overlay user interface 5082b in response to the long press input by contact 5022 (shown in FIG. 5D1). In some embodiments, the overlay user interface 5082b further displays an enlarged representation 5035b of the shared song "Song Name-A" and an avatar 5039*b* that represents the contact "Alex" that has shared the song represented by an image (e.g., representation 5035*b*). In some embodiments, avatar 5039*b* is selectable and provides a link to a location in the messaging application where the song has been shared. For example, in some embodiments, upon tapping on avatar 5039*b*, the electronic device ceases to display overlay user interface 5082*b* and displays messaging user interface as described in FIGS. 5A6, 5A7, and 5B3, according to some embodiments.

In some embodiments, the set of controls 5090 includes 5090*a* for playing the shared song "Song Name-A"; control 5090*b* for downloading the song for offline playing and storing the song in the memory of the electronic device; control 5090*c* for adding the shared song to a playlist; control 5090*d* for playing a next song in a list of songs (options is displayed when the shared song "Song Name-A" is part of a playlist); control 5090*d* for deleting the shared song from a library of the music application (control 5090*d* when the shared song was saved in the library).

In some embodiments, the electronic device includes control 5090*e* for replying to the message in which the song "Song Name-A" was shared such as message 5001*d* shown in FIG. 5A4 above. In response to tapping or otherwise selecting control 5090*e*, the electronic device displays the conversation in which the song "Song Name-A" was shared such as conversation user interface 5042 described in FIGS. 5A7 and 5A8, and an inline reply user interface such as inline reply user interface 5072 shown in FIG. 5B3.

In some embodiments, the set of controls 5090 includes a control 5080*f* for removing the representation 5054*a* of the shared song "Song Name-A" and the associated selectable pill 5056*a*, labeled "From Alex" from the collection of shared music. For example, in response to a tap input by contact 5098 the electronic device ceases to display the shared song in section 5054 for shared music as shown in FIG. 5D5. In some embodiments, control 5090*f* allows the user of the electronic device to disassociate the shared song from the message that shared the song and/or from the contact that shared the song.

FIG. 5D5 shows default view 5052 of the music application where the shared song "Song Name-A" and the associated selectable pill 5056*a* (labeled "From Alex") have been removed from section 5054 dedicated for sharing. In some embodiments, previously displayed representations 5054*b* and 5054*c*, have been shifted to the top of the list of shared songs, and shared song "Song Name-E" have emerged in the list of shared songs that have not been previously displayed in the section 5054 dedicated for shared music.

FIGS. 5E1-5E8 illustrate example user interfaces for highlighting representation of content in a messaging application, in accordance with some embodiments.

FIG. 5E1 illustrates detecting a user input 590 (e.g., a tap input) selecting user-selectable pill 5056*a*. As explained above with reference to FIG. 5A6, selectable pill 5056*a*, when selected, causes device 100 to display at least a portion of the message thread (e.g., conversation history) in which the respective media item (e.g., Song A) was shared. For example, in response to user input 590, device 100 displays the user interface illustrated in FIG. 5E2, including the message (e.g., message 5001*d*) in which Song A (e.g., also referred to as "Song Name-A") was shared. In some embodiments, in response to user input 590, device 100 switches from the media application (e.g., the Music application) to the communication application in which the media item was shared (e.g., the messaging application). In some embodiments, in response to user input 590, device 100 replaces display of a portion of the user interface to display a portion of the communication thread in which the media item was shared (e.g., wherein the portion of the communication thread is displayed overlaying a portion of the currently displayed media application).

FIG. 5E2 illustrates receiving a user input 592 (e.g., a long press user input) selecting message 5001*d*.

In response to detecting user input 592, device 100 displays a tapback menu, e.g., plurality of user-selectable options, for message 5001*d*, including a plurality of reaction controls 594, optionally a play control 596, a highlight control 598, and/or a reply control 599. In some embodiments, the plurality of reaction controls 594, when activated, cause the device to add a "reaction" to the selected message (e.g., message 5001*d*). In some embodiments, the added "reaction" is added to the message thread (e.g., conversation history) such that each participant in the message thread is enabled to view the "reaction." In some embodiments, the plurality of reaction controls 594 include one or more controls to heart (e.g., love) a message, thumbs-up (e.g., like) a message, thumbs-down (e.g., dislike) a message, exclamation points (e.g., emphasize) a message, question mark (e.g., question) and message and HAHA (e.g., laugh at) a message.

In some embodiments, in accordance with a determination that the selected message 5001*d* includes a representation of a media item (e.g., Song A), device 100 optionally provides a play control 5045*c* (e.g., to initiate playback of the media item). In some embodiments, device 100 displays a highlight control 598-1 that enables a user to mark (e.g., highlight) the representation of the selected media item (e.g., and/or message). For example, after a representation of the media item has been highlighted, device 100 displays a highlight indication 598-2 (as described with reference to FIG. 13*A*) to indicate that the user has highlighted the media item. In some embodiments, the highlight indication 598-2 comprises the highlight control 598-1 with a changed visual feature (e.g., filling in the star, changing the color, showing the content with a pin, etc.).

FIG. 5E3 further illustrates detecting a user input 597 on reply control 599. In response to detecting user input 597 on reply control 599, device 100 displays a user interface (e.g., in the messaging application) for replying to the selected message, as illustrated in FIG. 5E4. For example, a reply box 588 is displayed (e.g., concurrently with a virtual keyboard) to allow the user to compose and send a reply message to the selected message 5001*d*.

FIG. 5E5 illustrates user input 586 (e.g., a tap input) selecting highlight option 598-1 displayed for the representation of shared song A. In some embodiments, in response to user input 586 selecting highlight control 598-1, device 100 marks (e.g., stores) shared song A as highlighted and updates highlight control 598-1 to be displayed (e.g., concurrently displayed with the representation of the shared media item) with a visually distinguished appearance. For example, before selection of highlight control 598-1, highlight control 598-1 comprises a star that is not filled in. After the user selects highlight control 598-1, device 100 updates highlight control 598-1 to be displayed as a filled star (e.g., highlight indication 598-2), as illustrated in FIG. 5E6. It will be understood that alternative methods for visually distinguishing highlight control 598-1 that are not shown may also be used (e.g., updating a color of the highlight option, changing a size of the highlight option, animating the highlight option, adding an overlay to the highlight option, etc.). One of skill in the art will appreciate that the highlighting affordance could take any other suitable form or design to show two or more toggled states.

Once in the highlighted state, the representation of the content item (and the shared content item itself) has now been highlighted. In some embodiments, once highlighted, the content item is added to a database on the device listing all content items that have been highlighted. In some embodiments, after shared song A has been marked as highlighted, device 100 displays highlight indication 598-2 that, optionally, at least partially overlays the message 5001*d* that includes the representation of shared song A. For example, at any time thereafter, the user can open an application (e.g., a second application) that is capable of playing or viewing the content item (i.e., that is capable of playing or viewing content items having a first content type, e.g., music, video, images), and a representation of the content item will be displayed in the application. In some implementations, once a user has highlighted specific content, the electronic device automatically marks the content to be highlighted in one or more corresponding applications. For example, if a song is highlighted, the electronic device marks the song as highlighted to be highlighted with any music applications in which highlighted content has been enabled.

FIG. 5E7 illustrates user input 582 selecting icon 5008*a*, corresponding to a music application. In response to user input 582, device opens (e.g., launches, initiates display of) the music application, as illustrated in FIG. 5E8.

FIG. 5E8 illustrates an example user interface of the music application. In some embodiments, the user interface includes a first portion for displaying media items that are "Highlights" and a second portion for displaying media items that are "Shared With You." For example, as explained with reference to FIG. 5E5, in response to the user selecting highlight control 598-1, shared song A is marked (e.g., stored) as a highlighted media item. Accordingly, a representation of shared song A is displayed in the "Highlights" portion of the music application. In some embodiments, the representation of shared song A is optionally displayed with the highlight indication 598-2 (e.g., the filled in star).

In some embodiments, one or more media items are displayed in a plurality of sections of the music application. For example, Song A is categorized as both highlighted and shared with the user of device 100. Accordingly, in some embodiments, a representation of Song A is displayed in both the "Highlights" section of the user interface of the music application and in the "Shared with You" section of the user interface of the music application. In some embodiments, in accordance with a determination that a media item is categorized by two or more sections, device 100 selects one section in which to display the representation of the media item (e.g., to avoid duplicating display of a same media item in multiple sections of the user interface). In some embodiments, the representation of shared song A is optionally displayed with a highlight indication 598-2 in the "Shared With You" section (e.g., highlighted shared items that appear in the "Shared With You" section optionally display highlight indications over the representations of the highlighted shared items).

In some embodiments, any content item (or representation of a content item) that was highlighted by the user includes a toggled-on highlight indication 598-2 (e.g., the highlight indication in a highlighted state). In some embodiments, the user is enabled to select the highlight indication to toggle it off to an unhighlighted (or non-highlighted state). Here, if the representation of the content item is toggled-off, it is removed from the "Highlights" section of the user interface of the music application. Similarly, the highlight indication is either removed or shown in a toggled-off state (unhighlighted) in the "Shared With You" section of the user interface.

The highlighting affordance allows a user to easily highlight content items that the user wants to easily access in other applications. For example, if a user receives a song from a friend via a messaging application, which they like, they can easily highlight the song in their messaging application and that song will be listed at the top if their music application the next time that it is opened.

FIGS. 5F1-5F2 illustrate example user interfaces for disambiguation, in accordance with some embodiments.

FIG. 5F1 illustrates receiving a user input 570 (e.g., a tap input) on selectable pill 5056*c*. As explained above, selectable pill 5056*c* comprises a sharing indication, concurrently displayed over a media item representation 5054*c*, that includes information about who shared the respective media item. In some embodiments, in accordance with a determination that a plurality of distinct users (e.g., and/or distinct groups) shared a same media item, selectable pill 5056*c*, when selected, allows the user of device 100 to select from a list of communication threads (e.g., within a same communication application (e.g., messaging application) or from different communication applications (e.g., a thread from the messaging application and a thread from a mail application)).

For example, in response to detecting user input 570, device 100 displays a disambiguation user interface 572, illustrated in FIG. 5F2. In some embodiments, user interface 572 displays a list of users (e.g., contacts), each user in the list of users corresponding to a user that shared the selected media item (e.g., Song C ("Song Name-C")). In some embodiments, each user in the list of users is displayed with a representation of the user (e.g., an avatar, a contact photo, etc.) and an identifier (e.g., a textual identifier) of the user (e.g., "Alex"). In some embodiments, for each user in the list of users, an option 574 to open a communication application (e.g., messaging application) is provided. In some embodiments, the option 574 to open the communication application is for a communication application in which the media item was shared. For example, in accordance with a determination that the media item was shared using a mail application, a mail application icon is displayed as the option to open the communication application. In some embodiments, in response to detecting a user input selecting option 574, device 100 opens (e.g., within the messaging application) the message thread in which the selected media item (e.g., Song C) was shared. In some embodiments, in response to detecting an input selecting option 574, device 100 opens an overlaid user interface (e.g., a "quick reply" user interface) for sending a message to the respective user who shared the selected media item, the overlaid user interface displayed while maintaining display of the media application (e.g., music application) without switching to the messaging application.

In some embodiments, user interface 572 further includes, for each user in the list of users, an option 575 to initiate a shared session. For example, in response to detecting a user input (e.g., a tap input) selecting option 575, device 100 opens a shared session with the respective user indicated in the list of users (e.g., a shared session with Alex). In some embodiments, a shared session allows the user of device C and the respective user in the list of users (e.g., Alex) to both play the selected media item (e.g., Song C) at substantially the same time in the shared session.

FIGS. 5G1-5G4 illustrate example user interfaces for sharing media content received in a group message thread, in accordance with some embodiments.

FIG. 5G1A illustrates an example user interface for a messaging application, including displaying a plurality of representations for message threads (e.g., each message thread corresponding to a different user (e.g., contact) or group of users (e.g., for a group message thread)). In some embodiments, as illustrated in FIG. 5G1B, a user input 520 (e.g., a tap input) is detected on a portion of the user interface corresponding to a group message (e.g., Costa Rica Trip Group).

In response to detecting user input 520, device 100 displays a user interface 522 that includes a message thread (e.g., conversation history) for the selected group message, as illustrated in FIG. 5G2. In some embodiments, the selected group message includes representations of one or more shared media items (e.g., one or more media items shared in the group message), including representations of media items shared by the user of device 100 and media items shared by other members of the group that are not the user of device 100. In some embodiments, user interface 522 includes a user-selectable option 523 to view additional information related to the message thread. For example, device 100 detects a user input 524 (e.g., a tap input) selecting user-selectable option 523.

In response to detecting user input 524, device 100 updates the display to information user interface 525. In some embodiments, information user interface 525 includes one or more communication options 526, including an option 526a to initiate an audio call with the members of the group, an option 526b to initiate a video call with the members of the group, an option 526c to send a message (e.g., email) to the members of the group, and an option 526d to initiate a shared session with the members of the group. In some embodiments, user interface 525 further includes toggle switch 527, which allows the user of device 100 to enable and/or disable whether media items shared within the selected group message (e.g., Costa Rica Trip) will use the "Shared With You" functionality described herein. For example, toggle switch 527, when turned off, "Hide in Shared With You" is off (e.g., and thus media items shared in the group message will appear in the respective media application corresponding to the type of shared media item). In response to turning toggle switch 527 on, "Hide in Shared With You" is on (e.g., and thus media items shared in the group message will not appear in the respective media application corresponding to the type of shared media item). Accordingly, a user of device 100 is enabled to select, for each conversation in the messaging application, whether or not to enable the "Shared With You" functionality.

In some embodiments, information user interface 525 further includes a "Highlights" portion of the display. In some embodiments, the "Highlights" portion includes representations of one or more media items (e.g., representation of media item 529) that have been shared in the group message. In some embodiments, representations of media items that were shared by another user (e.g., not the user of device 100) in the group message, are displayed with a sharing indicator 528. In some embodiments, sharing indicator 528 comprises a representation of the user that shared the media item (e.g., an avatar or contact photo corresponding to the user that shared the media item). In some embodiments, representations of media items that were shared by the user of device 100 are not displayed with a representation of the user that shared the media item (e.g., because it was shared by the user of device 100). In some embodiments, the representations of the one or more media items in the "Highlights" portion only includes representations of media items (e.g., within the group message) that have been highlighted by the user (e.g., as described above with reference to FIGS. 5E5-5E6), without including representations of media items that have not been highlighted by the user. In some embodiments, the "Highlights" portion includes representations of one or more media items that were highlighted by the user in addition to representations of one or more media items that have not been highlighted by the user. For example, device 100 determines one or more media items that are likely to be relevant to the user to include in "Highlights" portion (e.g., regardless of whether the user has selected to highlight the media item).

FIG. 5G3 illustrates detecting user input 530 (e.g., a swipe input) that corresponds to a request to scroll (e.g., a swipe input up to scroll the user interface down). In response to user input 530, device 100 scrolls the user interface 525 to display user interface 525b, as illustrated in FIG. 5G4. In some embodiments, as illustrated in FIG. 5G4, user interface 525b includes a "Photos" section 531. In some embodiments, the "Photos" section 531 includes one or more photos that are shared in the group message. In some embodiments, photos that are shared in the group message are optionally displayed with a sharing indicator (not shown) (e.g., such as the sharing indicator 528 described with reference to FIG. 5G3).

Figure 5H:
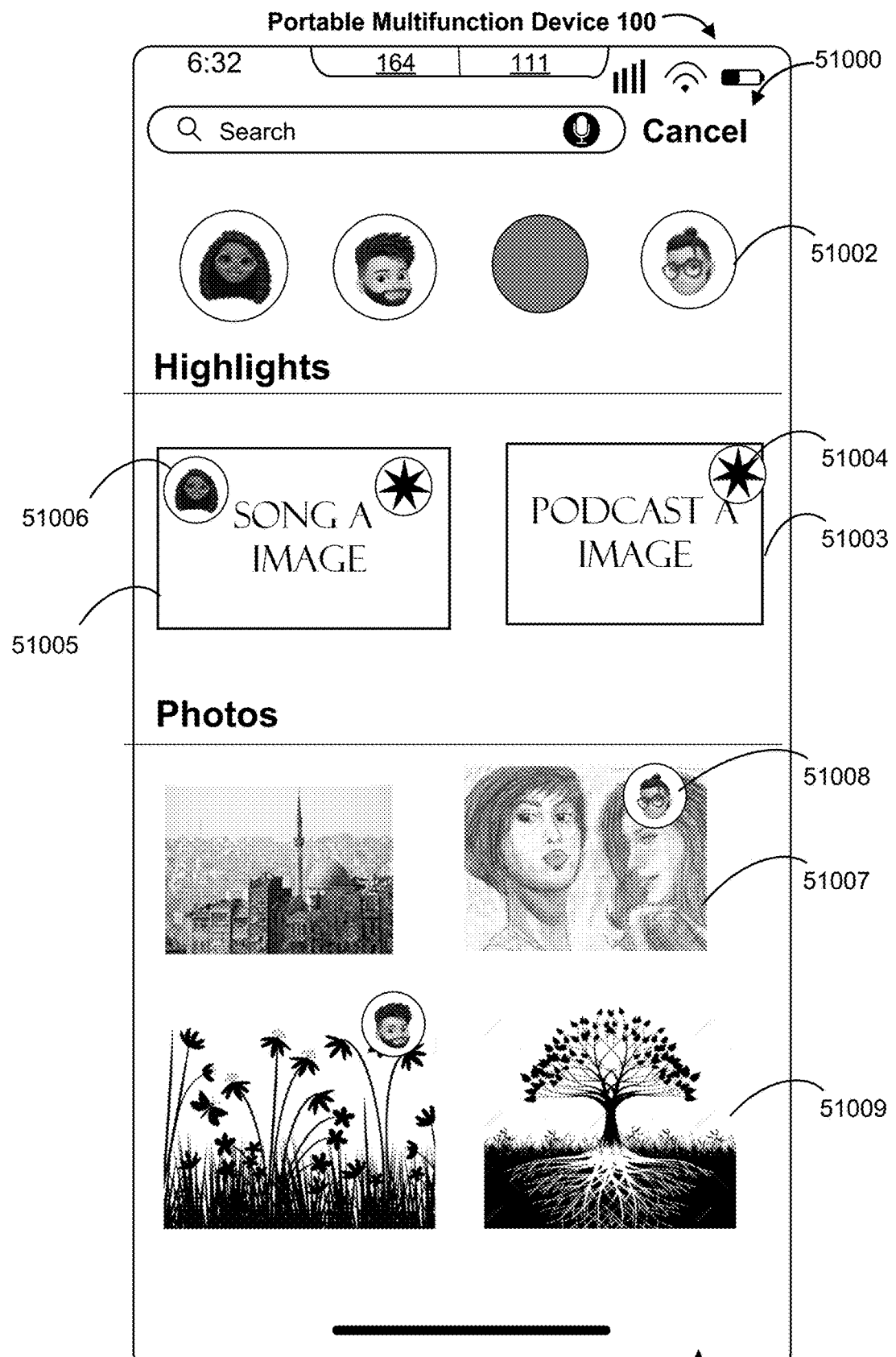
FIG. 5H illustrates an example search user interface displaying shared and highlighted content, according to some embodiments.

FIG. 5H illustrates an example user interface 51000 that is displayed in response to a user request to search for media items. For example, in some embodiments, device 100 detects a user input (e.g., a swipe input) that causes device 100 to display a search user interface 51000. In some embodiments, search user interface 51000 includes a search box (e.g., in which a user is enabled to enter a search query using keywords). In some embodiments, before receiving a user input requesting to search (e.g., before receiving a search query), device 100 automatically displays representations of one or more recommended media items. For example, device 100 determines one or more media items that are likely to be relevant to the user (e.g., based on media items the user has highlighted (e.g., added as a favorite), based on the user's historical use of search, based on media items in a media library of the user, etc.).

In some embodiments, the search user interface 51000 includes representations for a plurality of contacts (e.g., representation 51002). For example, device 100 displays representations for a plurality of contacts that have been marked as favorite contacts by the user. In some embodiments, the representation for each contact of the plurality of contacts comprises a contact photo, an animated contact head, or a letter (e.g., a first initial of a name of the contact). For example, representation 51002 comprises an animated contact head corresponding to a contact that has been marked as a favorite by the user of device 100.

In some embodiments, the search user interface 51000 includes a plurality of portions, such as a "Highlights" portion for displaying representations of one or more media items that have been "highlighted" (e.g., marked) by the user, and a "Photos" portion for displaying one or more images (e.g., that are also displayed in the photos application).

In some embodiments, the search user interface 51000 includes displaying representations of one or more shared media items that are not stored in a media library of the user (e.g., instead of, or in addition to, displaying representations of media items that are stored in the media library of the user). For example, device 100 includes a media library for audio items (e.g., songs, podcasts, etc.). In some embodiments, Song A Image 51005 represents a song (e.g., "Song A") that is a shared media item (e.g., as indicated by sharing indication 51006) that was shared with device 100 via a communication application. In some embodiments, "Song A" (e.g., corresponding to "Song A Image" 51005) is not saved to the media library for audio items on device 100. In some embodiments "Podcast A Image" 51003 represents a podcast (e.g., "Podcast A") that is stored in the media library for audio items. In some embodiments, Song A Image and Podcast A Image have been highlighted (e.g., flagged, pinned, starred, marked or otherwise tagged as a favorite), as indicated by the highlight indicator 51004 that is overlaid with "Song A Image" 51005 and "Podcast A Image" 51003, and appear in a "Highlights" portion of the search user interface 51000.

FIGS. 5I1-5I10 illustrate example user interfaces for displaying representations of shared media items in different media applications, based on a respective type of the respective shared media item.

For example, FIG. 5I1 illustrates device 100 detecting a user input 540 (e.g., a tap input) selecting a News application icon 5008p. In response to detecting user input selecting News application icon 5008p, device 100 opens (e.g., launches, initiates execution of, or otherwise displays a user interface for) the News application, as illustrated in FIG. 5I2. FIG. 5I2 illustrates an example user interface of the News application, including a "Shared With You" section 542. In some embodiments, "Shared With You" section 542 includes a list of one or more News articles that are shared with the user of device 100 (e.g., via a communication application, such as the messaging application). For example, "Shared With You" section 542 includes a representation of Article A, including an image 543 representing Article A, and other information (e.g., textual information) pertaining to the article (e.g., a title, author, summary, etc.). In some embodiments, the representation of Article A further includes a sharing indication 544, which provides information about who shared the respective article. For example, Alex shared Article A with the user of device 100. In some embodiments, sharing indication 544 is selectable, and in response to selecting sharing indication 544, the user is provided with options to message the user that shared the Article and/or is provided with additional sharing information.

In some embodiments, in response to detecting a user input on the representation of an article, device 100 displays (e.g., opens) the selected article (e.g., for the user to view).

FIG. 5I3 illustrates device 100 detecting a user input 545 (e.g., a tap input) selecting a Books application icon 5008h. In response to detecting user input selecting Books application icon 5008h, device 100 opens (e.g., launches, initiates execution of, or otherwise displays a user interface for) the Books application, as illustrated in FIG. 5I4. FIG. 5I4 illustrates an example user interface of the Books application, including a "Shared With You" section 546. In some embodiments, "Shared With You" section 546 includes a list of one or more books that are shared with the user of device 100 (e.g., via a communication application, such as the messaging application). For example, "Shared With You" section 546 includes a representation of Book Title A, including an image representing Book Title A, and other information (e.g., textual information) pertaining to the book (e.g., a title, author, summary, etc.). In some embodiments, the representation of Book Title A further includes a sharing indication 547, which provides information about who shared the respective book. For example, Lucy shared Book Title A with the user of device 100. In some embodiments, sharing indication 547 is selectable, and in response to selecting sharing indication 547, the user is provided with options to message the user that shared the book (e.g., Lucy) and/or is provided with additional sharing information.

In some embodiments, in response to detecting a user input on the representation of a book, device 100 displays (e.g., opens) a preview of the selected book (e.g., for the user to view) and/or opens a user interface for purchasing the selected book.

FIG. 5I5 illustrates device 100 detecting a user input 548 (e.g., a tap input) selecting an Application ("App") Store application icon 5008o. In response to detecting user input selecting App Store application icon 5008o, device 100 opens (e.g., launches, initiates execution of, or otherwise displays a user interface for) the App Store application, as illustrated in FIG. 5I6. FIG. 5I6 illustrates an example user interface of the App Store application, including a "Shared With You" section 549. In some embodiments, "Shared With You" section 549 includes a list of one or more applications that are shared with the user of device 100 (e.g., via a communication application, such as the messaging application). For example, "Shared With You" section 549 includes a representation of App A, including an image representing App A, and other information (e.g., textual information) pertaining to the App (e.g., a title, publisher, ratings, etc.). In some embodiments, the representation of App A further includes a sharing indication 550, which provides information about who shared the respective app. For example, Joe shared App A with the user of device 100. In some embodiments, sharing indication 550 is selectable, and in response to selecting sharing indication 550, the user is provided with options to message the user that shared the app (e.g., Joe) and/or is provided with additional sharing information.

In some embodiments, in response to detecting a user input on the representation of an app, device 100 displays (e.g., opens) a user interface for downloading the selected app and/or launches the respective app (e.g., if the app is already installed on device 100).

FIG. 5I7 illustrates device 100 detecting a user input 551 (e.g., a tap input) selecting a Podcasts application icon 5008n. In response to detecting user input selecting Podcasts application icon 5008n, device 100 opens (e.g., launches, initiates execution of, or otherwise displays a user interface for) the Podcasts application, as illustrated in FIG. 5I8. FIG. 5I8 illustrates an example user interface of the Podcasts application, including a "Shared With You" section 552. In some embodiments, "Shared With You" section 552 includes a list of one or more podcasts that are shared with the user of device 100 (e.g., via a communication application, such as the messaging application). For example, "Shared With You" section 552 includes a representation of Podcast A, including an image representing Podcast A, and other information (e.g., textual information) pertaining to the podcast (e.g., a title, creator name, episode number, etc.). In some embodiments, the representation of Podcast A further includes a sharing indication 553, which provides information about who shared the respective podcast. For example, Joe shared Podcast A with the user of device 100. In some embodiments, sharing indication 553 is selectable, and in response to selecting sharing indication 553, the user is provided with options to message the user that shared the podcast (e.g., Joe) and/or is provided with additional sharing information.

In some embodiments, in response to detecting a user input on the representation of a podcast, device 100 displays (e.g., opens) a user interface for the podcast (e.g., with additional information about the podcast) and/or initiates playback of the podcast.

FIG. 5I9 illustrates device 100 detecting a user input 554 (e.g., a tap input) selecting a television ("TV") application icon 5008e. In response to detecting user input selecting television application icon 5008e, device 100 opens (e.g., launches, initiates execution of, or otherwise displays a user interface for) the television application, as illustrated in FIG. 5I10. FIG. 5I10 illustrates an example user interface of the television application, including a "Shared With You" section 555. In some embodiments, "Shared With You" section 555 includes a list of one or more television shows, movies, or other media (e.g., video) items (e.g., such as a Sports Event) that are shared with the user of device 100 (e.g., via a communication application, such as the messaging application). For example, "Shared With You" section 555 includes a representation of a TV Show, including an image representing the TV Show, and other information (e.g., textual information) pertaining to the TV Show (e.g., a title, names of actors, episode number, etc.). In some embodiments, the representation of TV Show further includes a sharing indication 556, which provides information about who shared the respective TV Show. For example, Alex shared the TV Show with the user of device 100 (e.g., Alex also shared the Movie and Sports Event). In some embodiments, sharing indication 556 is selectable, and in response to selecting sharing indication 556, the user is provided with options to message the user that shared the TV Show (e.g., Alex) and/or is provided with additional sharing information.

In some embodiments, in response to detecting a user input on the representation of the TV Show, device 100 displays (e.g., opens) a user interface for the TV Show (e.g., with additional information about the TV Show) and/or initiates playback of the TV show.

FIGS. 6A-6D illustrate example user interfaces for initializing sharing functionality. In some embodiments, the example user interfaces shown in FIGS. 6A-6D are automatically displayed (e.g., without user input) in accordance with a determination that the user has not turned on sharing functionality (e.g., in "Settings"). In some embodiments, the example user interfaces shown in FIGS. 6A-6D are displayed by device 100 in accordance with a determination that device 100 is enabled to use functionality (e.g., a first time the device is able to use the sharing functionality). For example, FIGS. 6A-6D comprise introductory user interfaces to guide a user through various capabilities and functions available for shared media items.

Figure 6A:
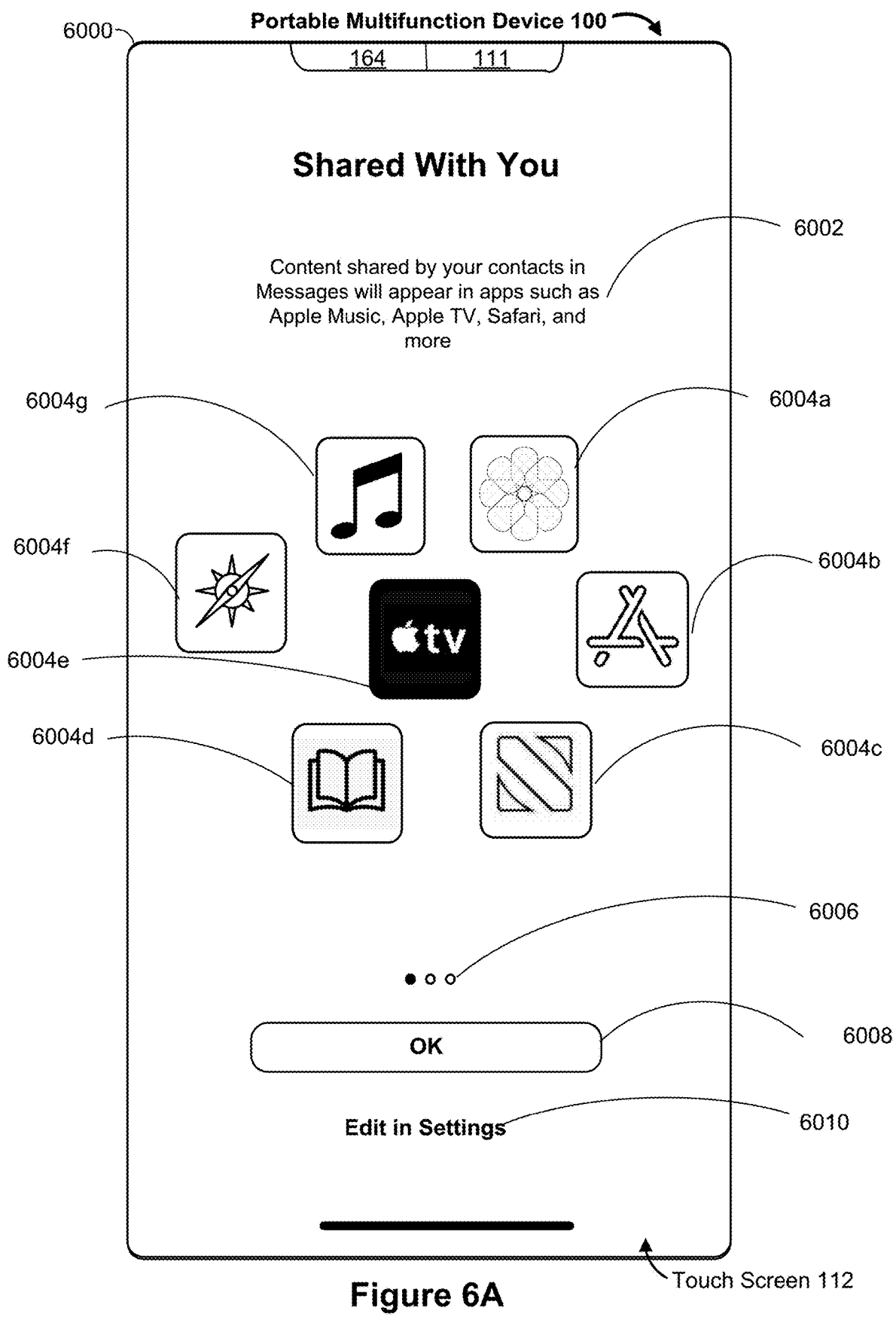
FIGS. 6A-6D illustrate example user interfaces for initializing sharing functionality in accordance with some embodiments.

FIG. 6A illustrates a "Shared With You" user interface 6000. In some embodiments, "Shared With You" user interface 6000 includes textual information 6002 that provides information about how shared media items will be displayed in various applications. For example, in some embodiments, shared media items that are received by device 100 within one or more communication applications (e.g., messaging applications, email applications, etc.) are automatically displayed in one or more media applications (e.g., distinct from the one or more communication applications) without requiring use input. For example, textual information 6002 provides an overview of how device 100 will handle shared media items. In some embodiments, the type of shared media item determines in which media application(s) the respective media item will be displayed. For example, shared photos and/or videos are displayed in a photos application, shared songs are displayed in a music application, shared TV shows and/or movies are displayed in a television application, etc.

In some embodiments, representations of the one or more media applications that enable the integration of shared media are displayed on "Shared With You" user interface 6000. For example, an application icon for each media application is displayed, such as: photos application 6004a, application store 6004b, news application 6004c, books application 6004d, television application 6004e, internet browser application 6004f, and music application 6004g. It will be understood that the examples of media applications illustrated in FIG. 6A may is not an exhaustive list. For example, the media applications that enable integration of shared media items may include additional media application applications, or a subset, less than all, of the media applications illustrated in FIG. 6A.

In some embodiments, the "Shared With You" user interface 6000 includes a navigation bar 6006 which is updated based on a currently displayed user interface. For example, each dot represents another user interface in a sequence of user interfaces (e.g., an onboarding sequence of user interfaces). For example, in FIG. 6A, the leftmost dot (of the three dots) is filled to indicate that the currently displayed user interface is the first user interface in the sequence of user interfaces. In some embodiments, a swipe input (e.g., to the left and/or right) detected on device 100 causes device 100 to navigate between user interfaces of the sequence of user interfaces. For example, a swipe to the left causes device 100 to replace display of user interface 6000 (shown in FIG. 6A) with user interface 6012 (shown in FIG. 6B).

Figure 6B:
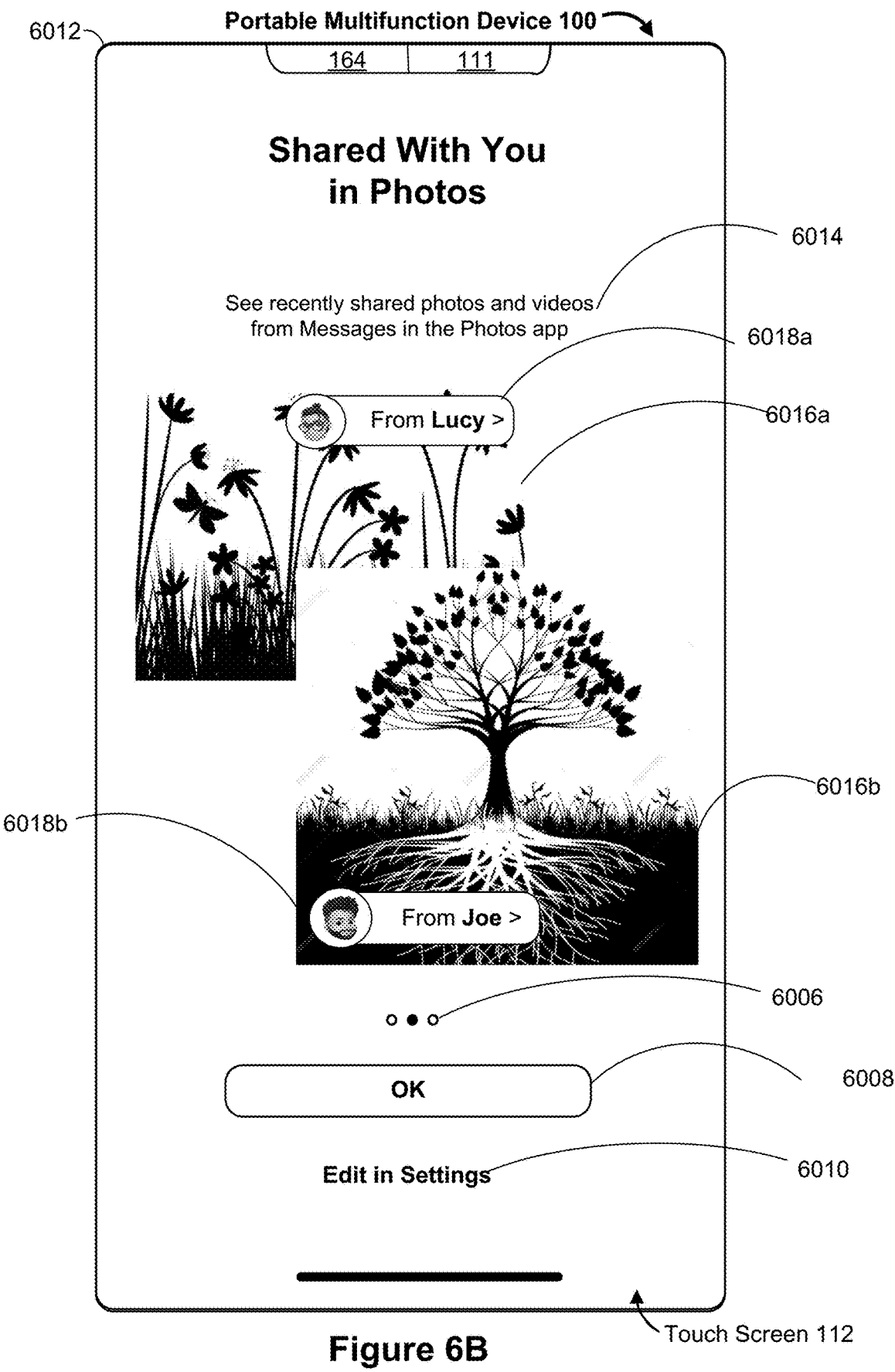
Figure 6C:
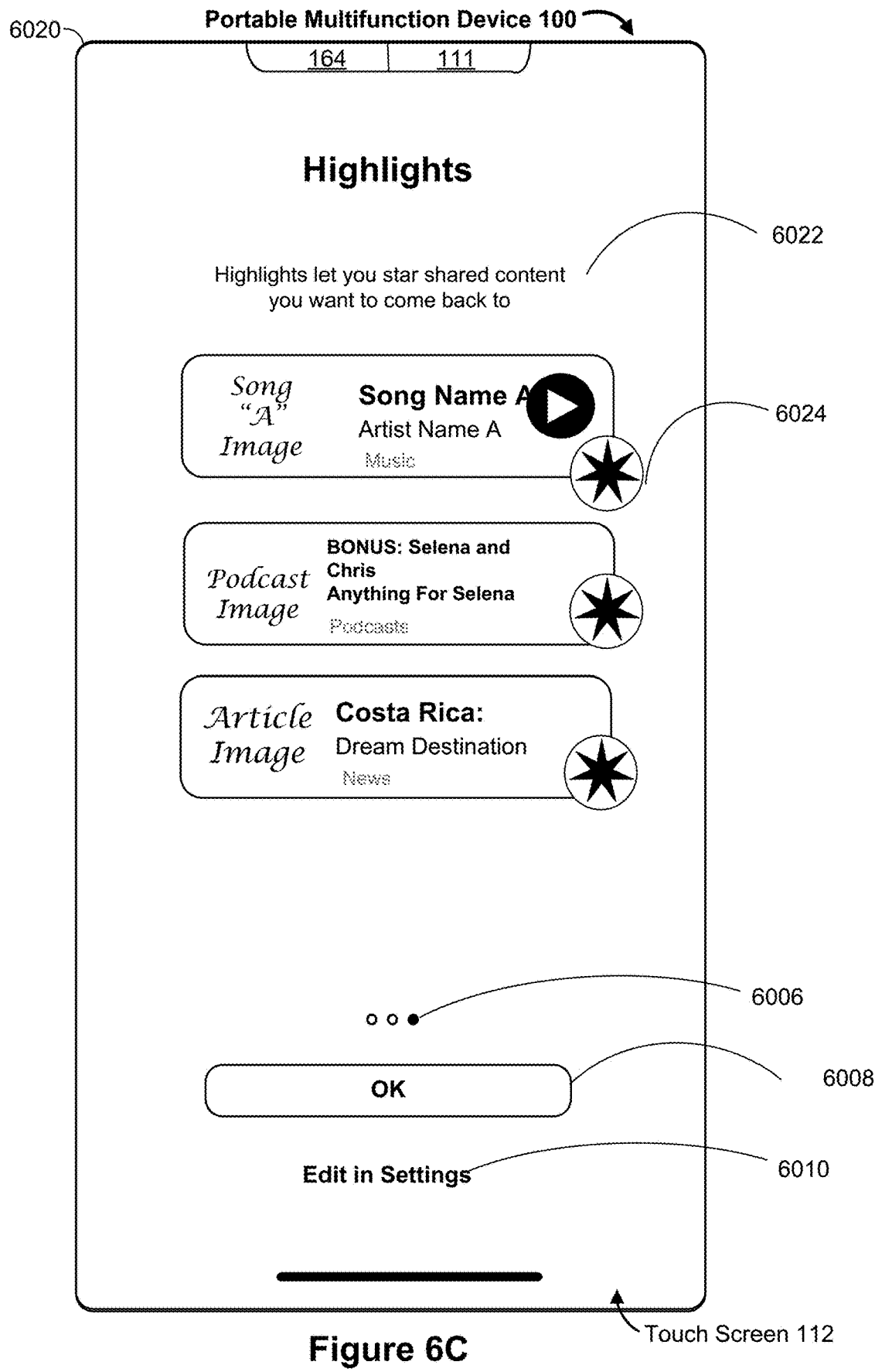

In some embodiments, the "Shared With You" user interface 6000 includes a button 6008 (e.g. "OK") that, when selected, causes the device to display a next user interface in the sequence of user interfaces (e.g., replace display of user interface 6000 in FIG. 6A with display of user interface 6012 in FIG. 6B). In some embodiments, selection of button 6008 causes device 100 to exit the sequence of user interfaces (e.g., and return to a home screen, such as interface 400 shown in FIG. 4A).

In some embodiments, the "Shared With You" user interface 6000 includes a user-selectable option 6010 that enables the user to update the functionalities for shared media items for different applications (e.g., "Edit in Settings"). In some embodiments, in response to device 100 detecting a user selection of (e.g., a user input selecting) "Edit in Settings" option 6010, device 100 opens a settings user interface, as described in more detail with reference to FIGS. 7A-7D.

In some embodiments, in response to detecting a user input to navigate to a next user interface in the sequence of user interfaces (e.g., a swipe input to the left), device 100 displays "Shared With You in Photos" user interface 6012. In some embodiments, "Shared With You in Photos" user interface 6012 provides textual information 6014 about how shared media items (e.g., shared photos and/or shared videos) are integrated with a media application (e.g., a photos application). In some embodiments, "Shared With You in Photos" user interface 6012 includes one or more examples of shared media items (e.g., and sharing indicators displayed with the shared media items). For example, shared media item 6016a includes a sharing indicator 6018a, which indicates information about how the media item was shared (e.g., "From Lucy") and shared media item 6016b includes a sharing indicator 6018b. In some embodiments, sharing indicators 6018a and 6018b include a representation of a user that shared the media item (e.g., a saved contact photo, an emoticon representing the user, etc.).

In some embodiments, "Shared With You in Photos" user interface 6012 includes navigation bar 6006, which is updated based on a currently displayed user interface within the sequence of user interfaces. For example, in FIG. 6B, the middle dot (of the three dots) is filled to indicate that the currently displayed user interface 6012 is the middle user interface in the sequence of user interfaces (e.g., with one user interface (e.g., user interface 6000, FIG. 6A)) in the sequence before the current user interface and one user interface (e.g., user interface 6020, FIG. 6C) after the current user interface). In some embodiments, a swipe input (e.g., to the left and/or right) detected on device 100 causes device 100 to navigate between user interfaces of the sequence of user interfaces. For example, a swipe input detected to the right causes device 100 to replace display of user interface 6012 (shown in FIG. 6B) with user interface 6000 (shown in FIG. 6A) and a swipe input detected to the left causes device 100 to replace display of user interface 6012 (shown in FIG. 6B) with user interface 6020 (shown in FIG. 6C).

In some embodiments, user interface 6012 also includes button 6008 and "Edit in Settings" option 6010, as described above with reference to FIG. 6A.

It will be understood that additional user interfaces for specific applications may be included in the sequence of user interfaces. For example, the "Shared With You in Photos" user interface 6012 shown in FIG. 6B is an example of an informational user interface for a first media application (e.g., a photos application). In some embodiments, an informational user interface is displayed for a different media application (e.g., news, web browser, music, etc.) instead of (e.g., or in addition to) user interface 6012.

In response to detecting a user input to navigate to a next user interface in the sequence of user interfaces (e.g., a swipe input detected to the left), device 100 displays "Highlights" user interface 6020. In some embodiments, "Highlights" user interface 6020 provides textual information 6022 describing functionality that enables a user to mark (e.g., star, pin, highlight, or otherwise flag) particular media items. In some embodiments, marked media items are concurrently displayed with an indicator 6024 to indicate that the media item is a marked media item. In some embodiments, device 100 displays one or more marked media items in a dedicated portion of the user interface (e.g., to make it easy for the user to view the marked media items). For example, a portion of the user interface of a respective media application includes a section for displaying marked media items.

In some embodiments, "Highlights" user interface 6020 also includes navigation bar 6006, button 6008 and "Edit in Settings" option 6010, as described above with reference to FIGS. 6A-6B.

Figure 6D:
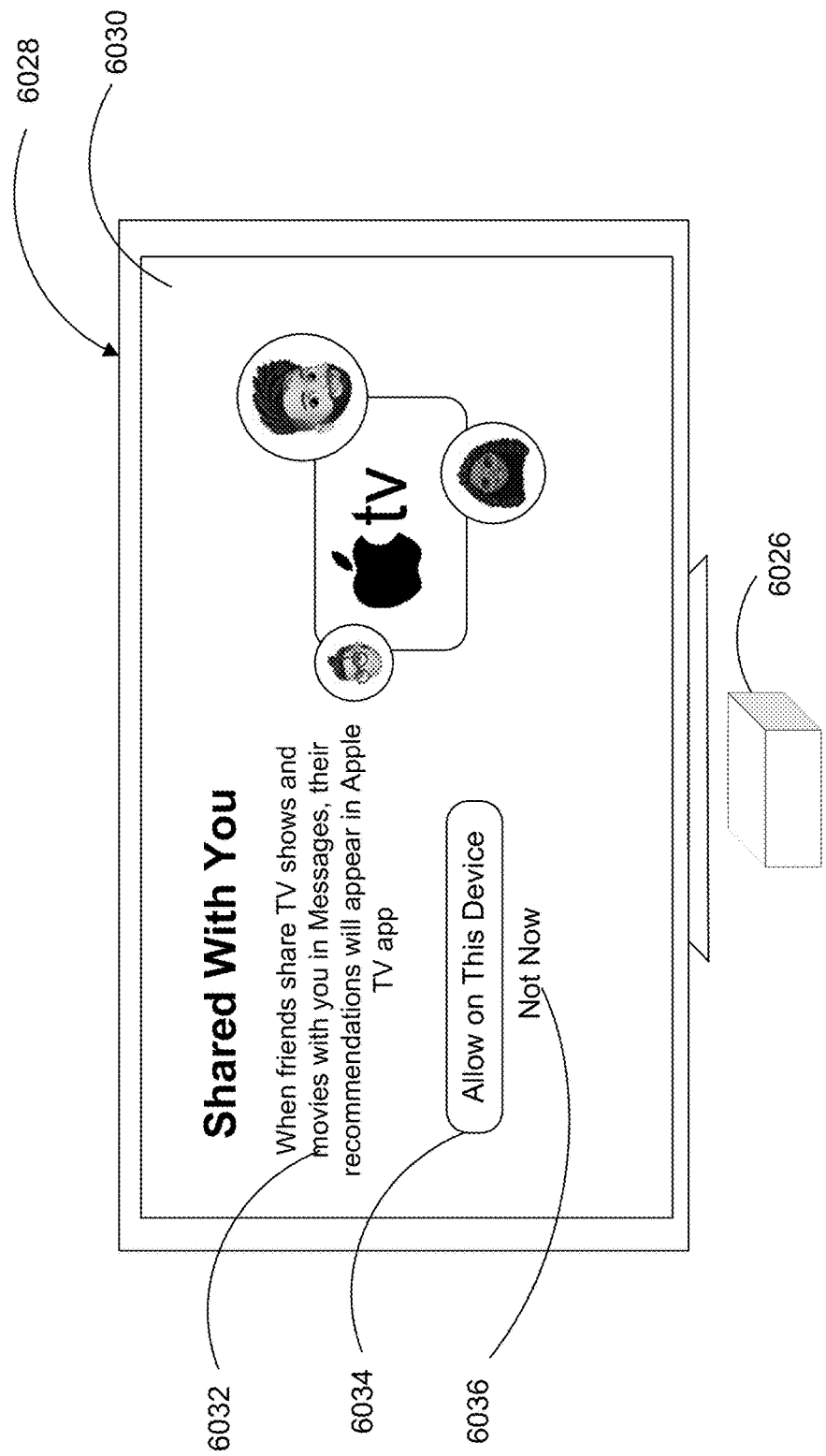

FIG. 6D illustrates an example user interface for providing information about shared media items integration on device 6026. In some embodiments, device 6026 comprises a computer system that is communicatively coupled to display 6028 (e.g., a television display). In some embodiments, device 6026 and display 6028 comprise a same device (e.g., device 6026 includes the display 6028). In some embodiments, device 6026 is an example of portable multifunction device 100. For example, device 6026 includes a plurality of applications, including a television application (e.g., corresponding to application icon 6004e, shown in FIG. 6A). In some embodiments, television application is enabled to display (e.g., stream and present) television shows and/or movies on display 6028.

In some embodiments, device 100 displays "Shared With You" user interface 6030. In some embodiments, "Shared With You" user interface 6030 includes textual information 6032 that provides information about how shared media items will be displayed in applications on device 6026 (e.g., in the television application). For example, shared media items (e.g., TV shows and/or movies) that are received by device 100 within one or more communication applications (e.g., messaging applications, email applications, etc.) are automatically displayed in one or more media applications (e.g., distinct from the one or more communication applications) without requiring use input. For example, textual information 6032 provides an overview of how device 100 will handle shared media items.

In some embodiments, "Shared With You" user interface 6030 includes a button 6034 that enables the user to allow the shared media integration functionality on device 6026 (e.g., and/or display 6028), and an option 6036 that enables the user to opt-out of enabling the shared media integration functionality on device 6026. For example, in response to the user selecting button 6034, device 6030 is enabled to synchronize shared content (e.g., received via a communication application) to be displayed within media applications (e.g., the television application). In some embodiments, the user is enabled to update (e.g., at a later time) the selection to enable to disable the shared media integration functionality in a settings interface, as described with reference to FIGS. 7A-7D.

Figure 7A:
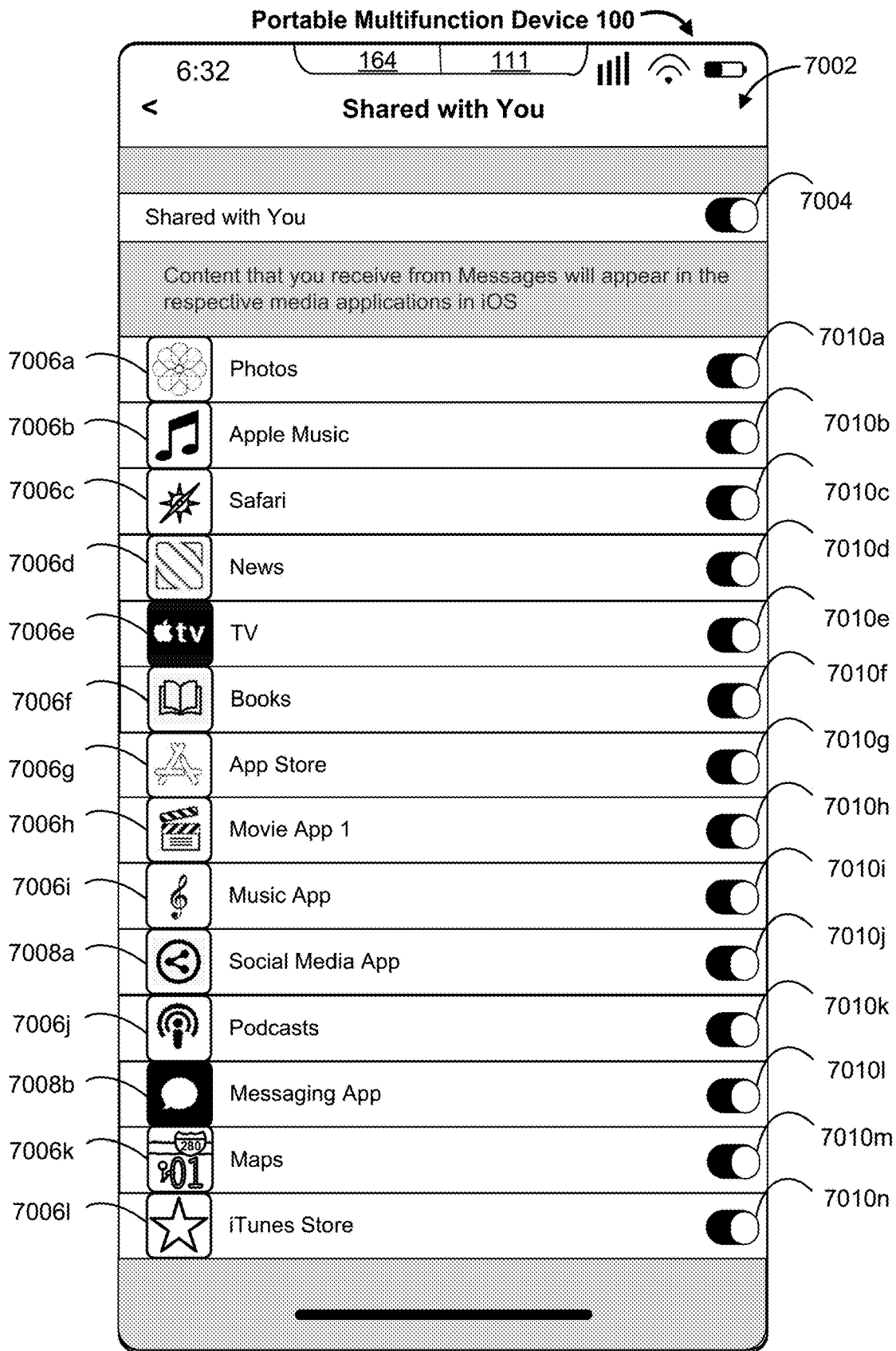
FIGS. 7A-7D illustrate example user interfaces for enabling and/or disabling shared media integration functionality for a plurality of applications in accordance with some embodiments.

FIGS. 7A-7D illustrate example user interfaces for enabling and/or disabling shared media integration functionality for a plurality of applications. FIG. 7A illustrates example user interface 7002. In some embodiments, a user is enabled to navigate to user interface 7002 using (e.g., through a sequence of user inputs) a Settings application (e.g., by selecting icon 446, shown in FIG. 4A).

In some embodiments, a user selects applications for which to enable and/or disable highlighting functionality (e.g., described with reference to FIGS. 5E5-5E8). For example, two or more applications allow the shared media integration functionality (e.g., based on the controls described with reference to FIGS. 7A-7D) and a first application of the two or more applications enables highlighted content to be displayed in the first application, while a second application of the two or more applications does not enable highlighted content to be displayed in the second application (e.g., there is no "Highlights" section in the second application and/or content items are not displayed with a highlight indication (e.g., as described with reference to FIG. 5E8). For example, a user interface (e.g., accessible using a Settings application) is provided that allows a user to enable and/or disable highlighting functionality for respective applications (e.g., using toggle switches provided for each application in a list of applications, such as the toggle switches described with reference to FIGS. 7A-7D). FIG. 7A illustrates a plurality of applications, including one or more media applications (e.g., applications 7006a-7006l) and one or more communication applications (e.g., social media application 7008a and messaging application 7008b). In some embodiments, the one or more media applications are displayed in a distinct portion of the user interface from the one or more communication applications (e.g., the communication applications are grouped in a section and the media applications are grouped in a distinct section). In some embodiments, the one or more media application and one or more communication applications are not displayed in distinct portions of the user interface 7002 (e.g., as illustrated in FIG. 7A, both types of applications are displayed in a same section). It will be understood that the one or more media applications 7006a-7006l shown in FIG. 7A are examples of media applications, and that additional or alternative media applications may be displayed in user interface 7002.

In some embodiments, user interface 7002 includes a toggle switch 7004 for controlling whether shared media integration functionality is enabled or disabled for all of the applications displayed on user interface 7002 (e.g., applications 7006a-7006l and 7008a-7008b). For example, when toggle switch 7004 is enabled, one or more applications can use the shared media integration functionality (e.g., based on a current setting of the toggle switches 7010a-7010n). In some embodiments, toggle switches 7010a through 7010n are provided for each application. For example, each toggle switch 7010 can be turned on or off to enable or disable the shared media integration functionality for the respective application. In some embodiments, as described in more detail below with respect FIG. 7C, in response to toggle switch 7004 being disabled (e.g., set to off), none of the applications use the shared media integration functionality (e.g., also referred to herein as "Shared With You" functionality). For example, in response to setting toggle switch 7004 to "off", all of the toggle switches 7010a-7010n are also set to "off" (e.g., and the "Shared With You" functionality is disabled for all of the applications).

In some embodiments, as illustrated in FIG. 7A, device 100 automatically (e.g., by default) enables the "Shared With You" functionality (e.g., toggle switch 7004 is set to on). In some embodiments, device 100 automatically enables the "Shared With You" functionality to all of the applications in the list shown in FIG. 7A.

Figure 7B:
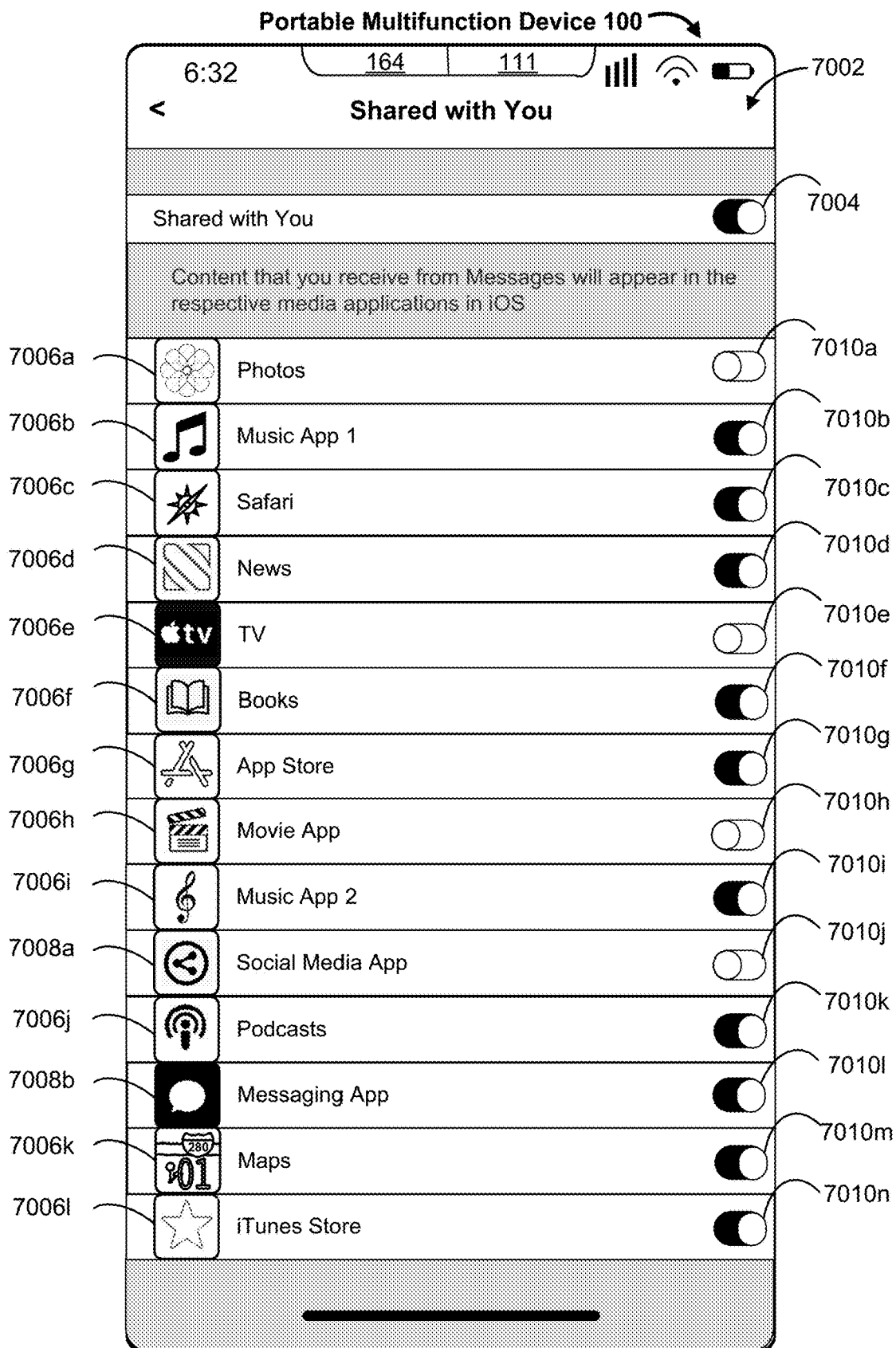

FIG. 7B illustrates an example user interface for a user of device 100 requesting to disable the "Shared With You" functionality for a first set of applications (e.g., without disabling the "Shared With You" functionality for all of the applications shown in the list of FIG. 7A). For example, FIG. 7B illustrates that toggle switch 7010a (corresponding to photos application 7006a), toggle switch 7010e (e.g., corresponding to television application 7006e), toggle switch 7010h (e.g., corresponding to movie application 7006h), and toggle switch 7010j (e.g., corresponding to social media application 7008a) are disabled (e.g., as illustrated by the respective toggle switches that are not filled in), while toggle switch 7010b (e.g., corresponding to music application 1 7006b), toggle switch 7010c (e.g., corresponding to safari (e.g., web browser) application 7006c), toggle switch 7010d (e.g., news application 7006d), toggle switch 7010f (e.g., corresponding to books application 7006f), toggle switch 7010g (e.g., corresponding to app store application 7006g), toggle switch 7010i (e.g., corresponding to music application 2 7006i), toggle switch 7010k (e.g., corresponding to podcasts application 7006j), toggle switch 7010l (e.g., corresponding to messaging application 7008b), toggle switch 7010m (e.g., corresponding to maps application 7006k), and toggle switch 7010n (e.g., corresponding to iTunes Store application 7006l) are enabled (e.g., as illustrated by the filled in toggle switches). Accordingly, a user is enabled to select which applications will allow the "Shared With You" functionality and which applications will not allow the "Shared With You" functionality.

For example, by disabling the "Shared With You" functionality for social media application 7008a, while continuing to enable the "Shared With You" functionality for messaging application 7008b, device 100 will synchronize media items that are shared via messaging application 7008b with the respective media application for the respective media item and will not synchronize media items that are shared via social media application 7008a. Similarly, shared media items will not be synchronized in media applications in which the "Shared With You" functionality is disabled (e.g., the toggle switch is set to off). For example, share photos and/or videos (e.g., shared via messaging application 7008b) will not be displayed in photos application 7006a because toggle switch 7010a is set to off. Accordingly, in some embodiments, only shared media items that are shared via a communication application that has been enabled to use the "Shared With You" functionality and that are shared media items for display in a media application that has been enabled to use the "Shared With You" functionality will be displayed for the user in the respective media application (e.g., the shared media item must satisfy both criteria). For example, if a shared media item is shared via a communication that is not enabled to use the "Shared With You" functionality or the shared media item a type of media item to be displayed in a media application that has not been enabled to use the "Shared With You" functionality, the shared media item will not be displayed for the user in the respective media application.

Figure 7C:
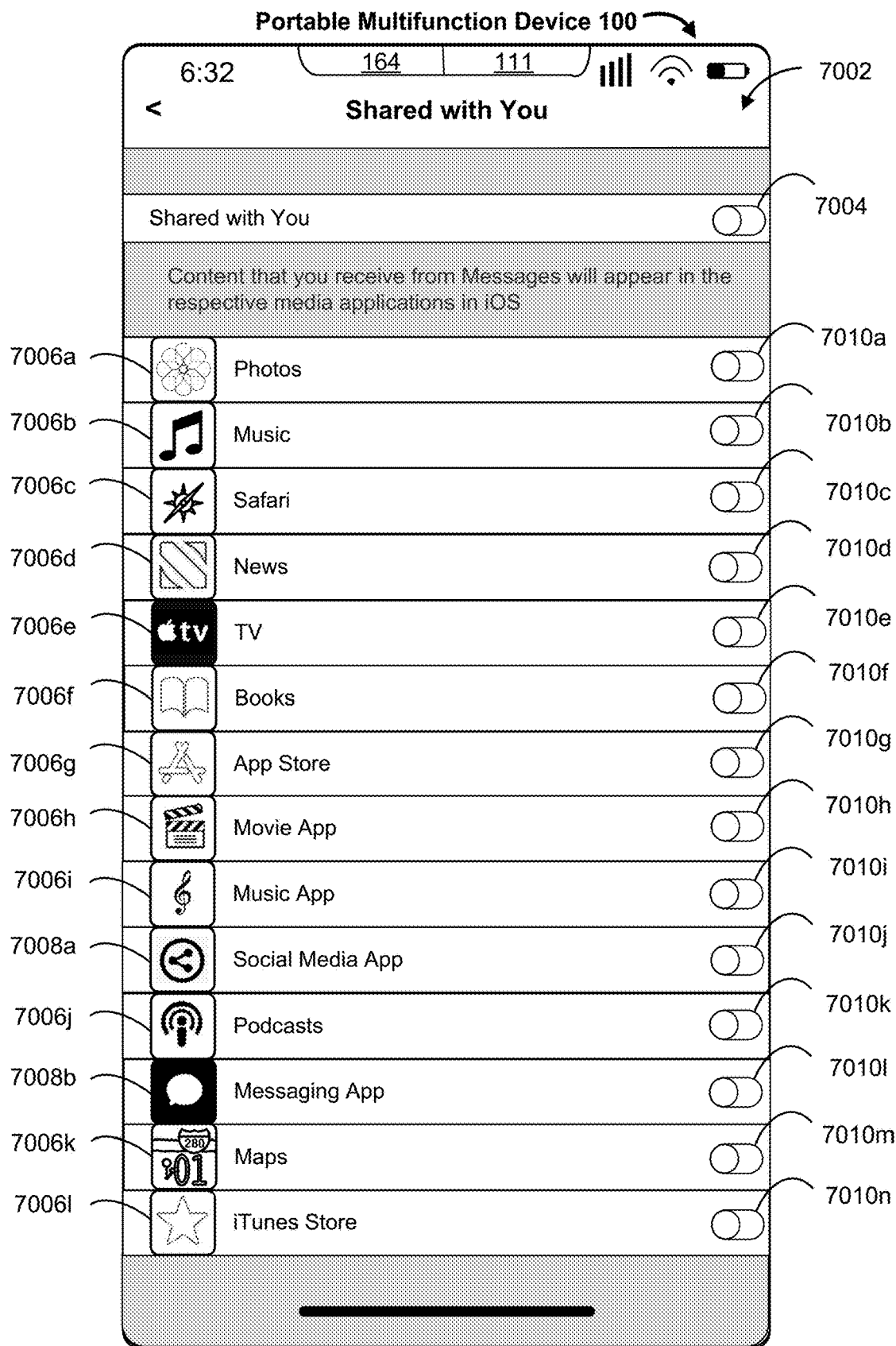

FIG. 7C illustrates an example user interface in which toggle switch 7004 is set to off, and the "Shared With You" functionality is disabled for all of the applications in the list of applications displayed in FIG. 7C. In some embodiments, device 100 automatically (e.g., without user input) sets toggle switch 7004 to off (e.g., and the user of device 100 can select which, if any, applications will be enabled to use the "Shared With You" functionality). For example, when toggle switch 7004 is set to off, all of the toggle switches 7010a-7010n are also set to off (e.g., because the "Shared With You" functionality is disabled across all applications).

Figure 7D:
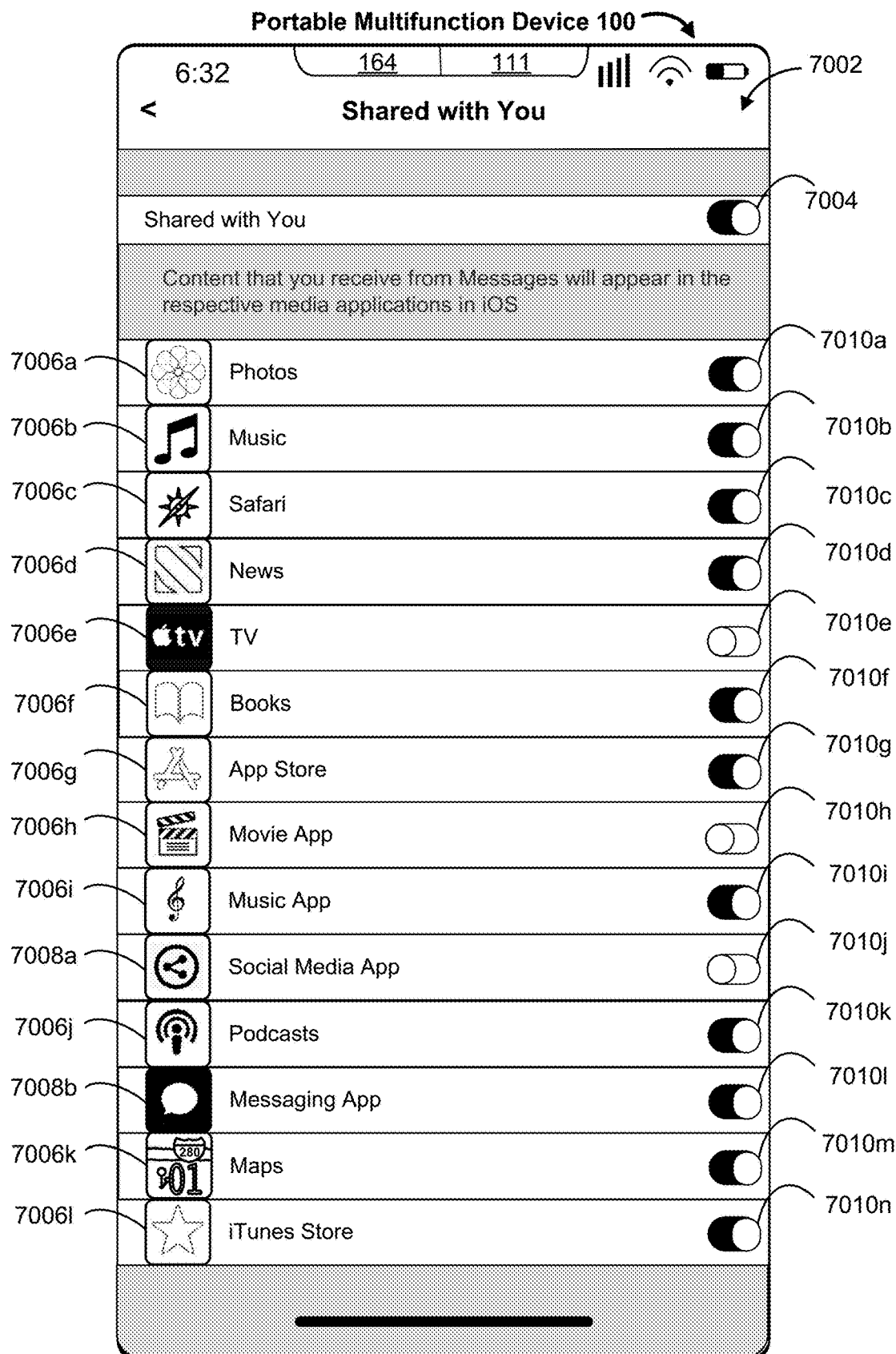
Figure 8A:
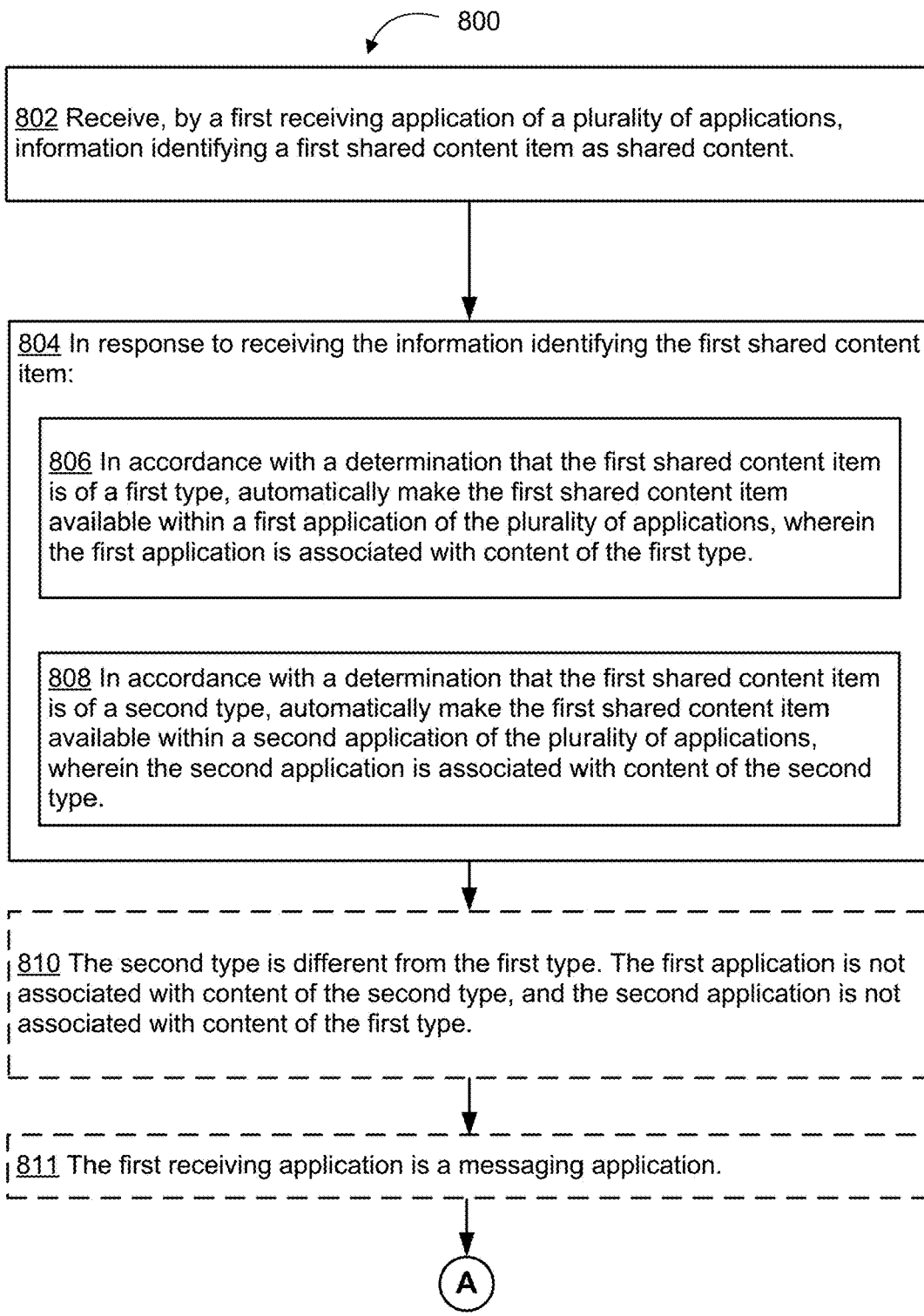
Figure 9A:
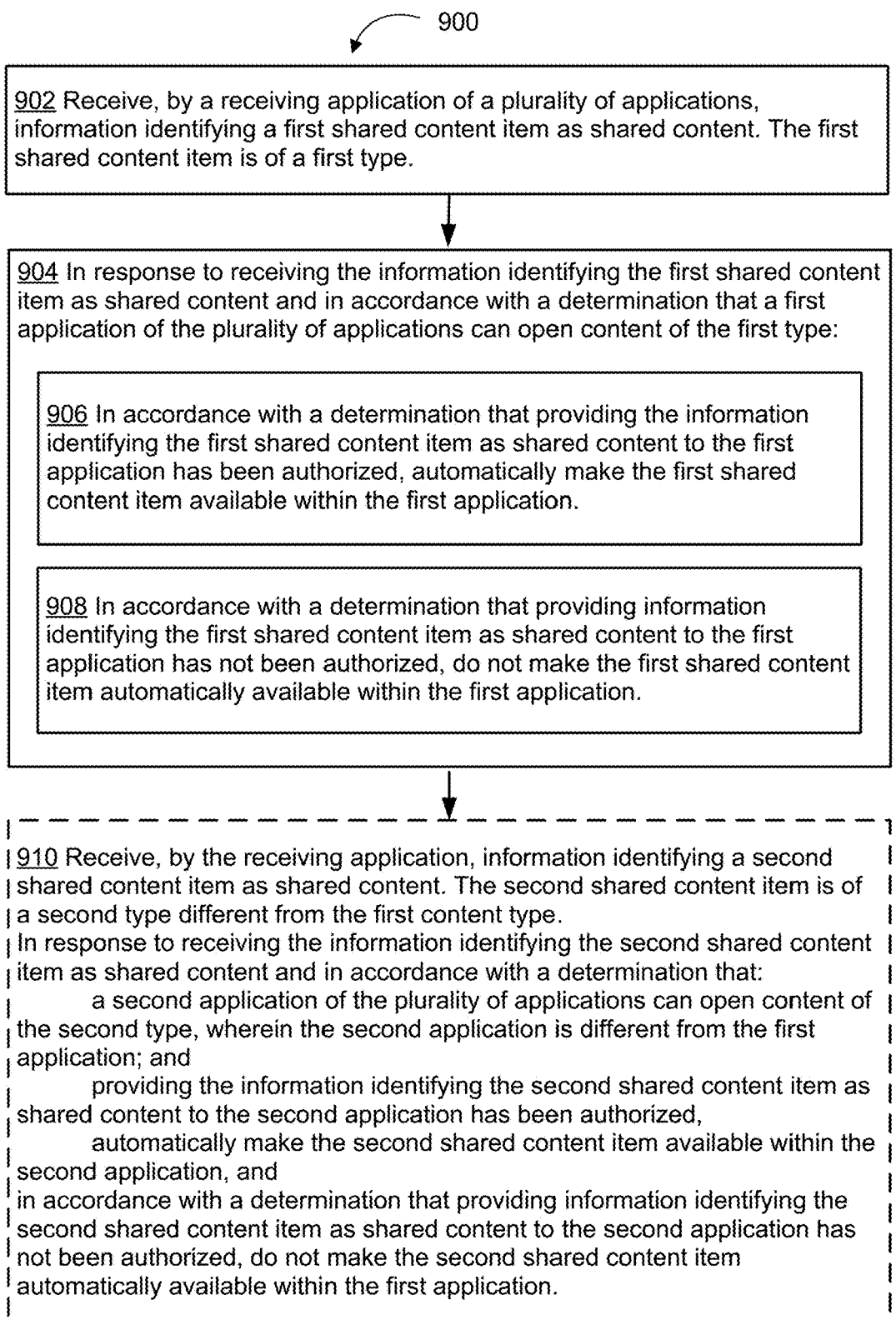
Figure 10A:
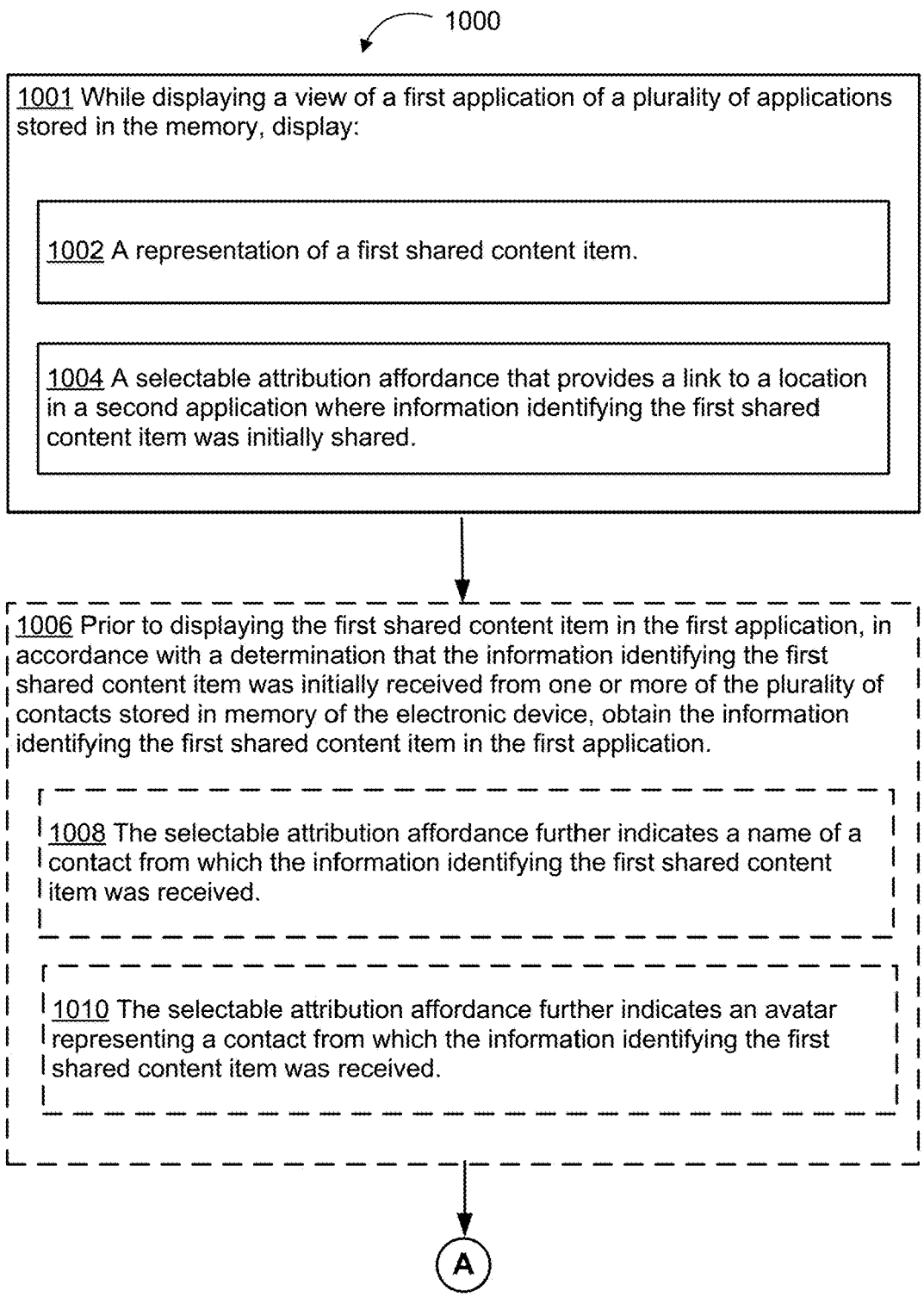
Figure 11A:
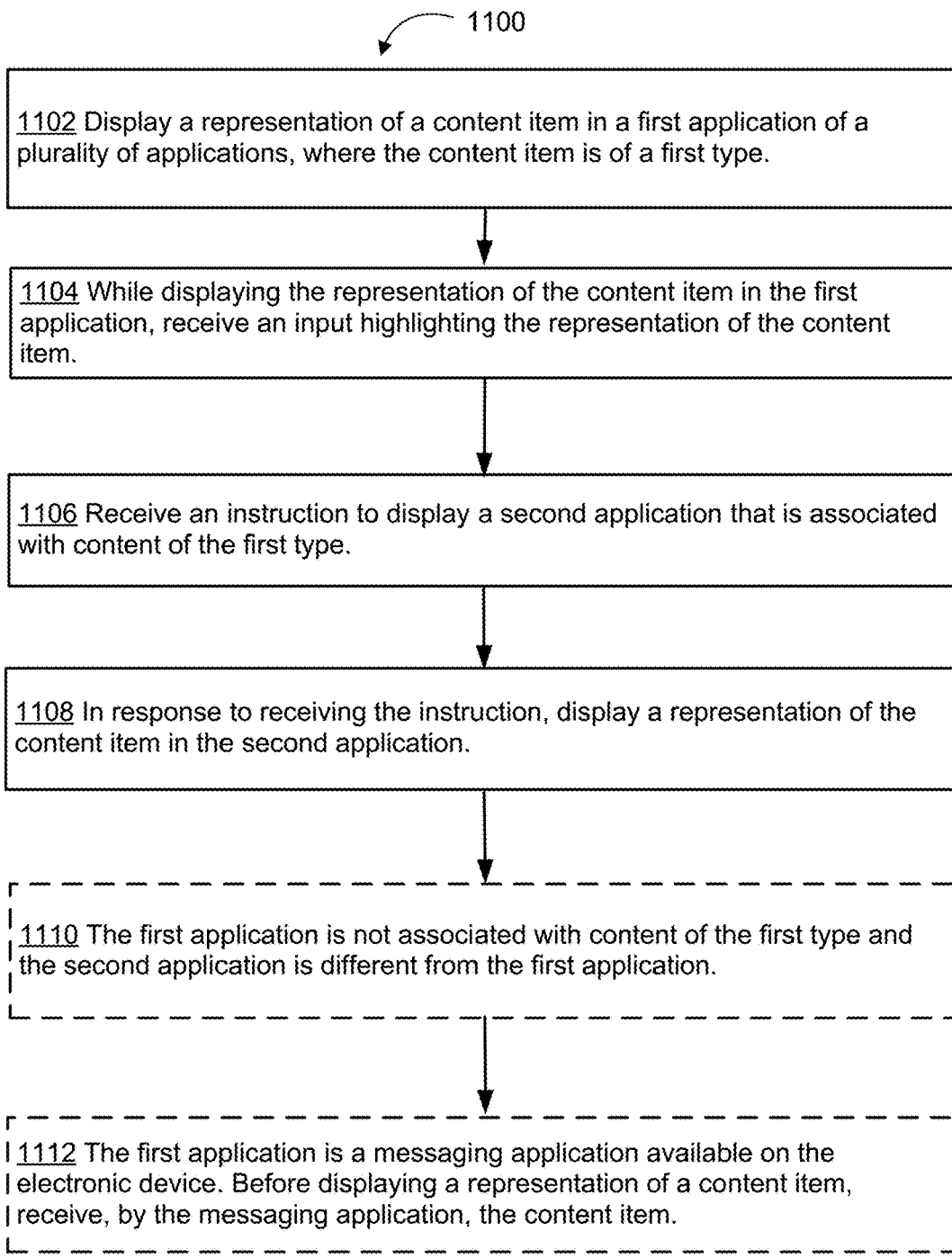

FIG. 7D illustrates an example user interface that is displayed in accordance with a user enabling the "Shared With You" functionality for one or more applications. In some embodiments, a user selects one or more applications in which to enable the "Shared With You" functionality (e.g., without selecting one or more other applications in which the "Shared With You" functionality remains disabled). In some embodiments, a user must select at least one communication application (e.g., in which media items are shared) and at least one media application (e.g., in which a respective media item (based on the type of media item) is displayed).

In some embodiments, in response to a user selecting one or more applications in which to enable the "Shared With You" functionality (e.g., by switching a toggle switch selected from toggle switches 7010a-7010n), toggle switch 7004 is automatically (e.g., without user input) switched from "off" to "on." For example, in response to a user selecting to enable the "Shared With You" functionality for one application, the "Shared With You" functionality (as represented by toggle switch 7004) is also enabled.

FIGS. 8A-8D are flow diagrams illustrating method 800 of automatically making content shared in one or more receiving application available within corresponding media applications based on the type of the content. Method 800 is performed at a computer system (e.g., device 300, FIG. 3, or portable multifunction device 100, FIG. 1A) that is in communication with (e.g., or including) a display generation component (e.g., a display device, optionally touch-sensitive, a projector, a head-mounted display, a heads-up display, or the like) and one or more input devices (e.g., including one or more sensors to detect intensity of contacts with the touch-sensitive surface). In some embodiments, the display generation component is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described herein, method 800 automatically makes content shared in a receiving application available within relevant applications capable of opening the shared content (e.g., applications where that content is typically provided, viewed, played, or listened to). Automatically making shared content available within relevant applications improves discoverability of shared content without the need of additional user inputs and reduces the number of inputs needed to perform an operation. Further, method 800 aggregates shared content of the same content type in a section of a respective application dedicated for shared content to reduce the number of inputs and the cognitive burden of a user trying to view or interact with the content. Reducing the number of inputs needed to interact with shared content items enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system receives (802), by a first receiving application, (e.g., in a first messaging conversation in a messaging application (e.g., represented by icons 5008*d*), a mail application (e.g., represented by icon 5008*r*), or a social media application) of a plurality of applications, information identifying a first shared content item (e.g., a media content item such as music, photos, videos, books, articles or news, podcasts, TV shows, or map locations, weblinks, etc.). In some embodiments, the information identifying the first shared content item is a representation of the content item; a link to the content item; a preview of the content item that links to the content item; a pointer or identifier of the content item that is readable by a corresponding host application. In some embodiments, instead of identifying information or a link, a copy of the content item is shared.

In response to receiving the information identifying the first shared content item (804) and in accordance with a determination that the first shared content item is of a first type (806), the computer system automatically makes the first shared content item available (e.g., without additional user input) within a first application of the plurality of applications, wherein the first application is associated with content of the first type. For example, when a user opens the first application (e.g. by contact 5012 shown in FIG. 5A) after the information identifying the content item has been received at the receiving application, the item, the copy of the item, or a representation of the item (e.g., representation 5045*a* shown in FIG. 5A6) automatically appear within a dedicated region (section 5054 shown in FIG. 5A6) in the first application without a need for the user to take any action. In some embodiments, the first application (e.g., music application represented by icon 5008*a*) is designated as default to handle content of the first type (e.g., music); the first application handles content of the first type such as music application handles music media content, a web browser handles web-links, a podcast application handles podcasts, an application for books opens and displays digital books, etc.

In response to receiving the information identifying the first shared content item and in accordance with a determination that the first shared content item is of a second type (808), the computer system automatically makes the first shared content item available within a second application of the plurality of applications, wherein the second application is associated with content of the second type. In some embodiments, the second type is (810) different from the first type. In some embodiments, the first application is not associated with content of the second type, and the second application is not associated with content of the first type (e.g., is not able to open, play or display that content). In some embodiments, the first receiving application is (811) a messaging application. For example, content received in the receiving application (e.g., a messaging application) (such as recommendations received from contacts for movies, books, songs, videos, photos, podcasts, articles, places to visit, etc.) is published or provided to the various applications where a user typically consumes (e.g., views or listens) such content. In some embodiments, the content item is stored within the messaging application but not within the first or the second application (e.g., the first and the second application references the messaging application to display the shared media item).

Automatically making different types of content shared in a receiving application available within different applications capable of opening the respective content type (e.g., applications where that type of content is typically provided, viewed, played, or listened to) improves discoverability of shared content without the need of additional user inputs and reduces the number of inputs needed to perform an operation. Reducing the number of inputs needed to interact with a shared content item enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system receives (812), by a second receiving application (e.g., an instant messaging application, a mail application, or a social media application) of the plurality of applications, information identifying a second shared content item, where the second receiving application is different from the first receiving application. In some embodiments, in response to receiving the information identifying the second shared content item and in accordance with a determination that the second shared content item is of the first type (e.g., music content), the computer system automatically makes the second shared content item available within the first application (e.g., representation 5045*b* of Song B (also referred to as "Song Name-B") shown in FIG. 5A6) of the plurality of applications. In some embodiments, in response to receiving the information identifying the second shared content item and in accordance with a determination that the second shared content item is of the second type (e.g., books), the computer system automatically makes the second shared content item available within the second application (e.g., representation 546*a* in section 546 shown in FIG. 5I4) of the plurality of applications.

Automatically making content shared in different receiving applications available within different applications capable of opening the respective content type (e.g., applications where that type of content is typically provided, viewed, played, or listened to) improves discoverability of shared content without the need of additional user inputs and reduces the number of inputs needed to perform an operation. Further, method 800 aggregates content of the same type that have been shared in different receiving applications in a section of respective applications dedicated for shared content to reduce the number of inputs and the cognitive burden of a user trying to view or interact with the content. Reducing the number of inputs needed to interact with shared content items enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the information identifying a first shared content item is received in a first location of the first receiving application and the computer system receives (814), in a second location of the first receiving application, information identifying a third shared content item. In response to receiving the information identifying the third shared content item and in accordance with a determination that the third shared content item is of the first type, the computer system automatically makes the third shared content item available within the first application of the plurality of applications. In response to receiving the information identifying the third shared content item and in accordance with a determination that the third shared content item is of the second type, the computer system automatically makes the third shared content item available within the second application of the plurality of applications. For example, a second type of content (e.g., Podcast Name A) is shared in the messaging conversation with Alex, as illustrated in FIG. 5A4 (e.g., wherein the shared Podcast is a different content type than the Song and News Article also shared in the messaging conversation).

Automatically making content shared in different messaging conversation available within various applications capable of opening the respective content type (e.g., applications where that type of content is typically provided, viewed, played, or listened to) improves discoverability of shared content without the need of additional user inputs and reduces the number of inputs needed to perform an operation. Further, shared content of the same type can be aggregated in a specific section of a respective application to reduce the number of inputs and the cognitive burden of a user trying to view or interact with the content. Reducing the number of inputs needed to interact with a shared content item enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first shared content item is (816) of the first type and the computer system receives a user input to add the first shared content item to a library of the first application (e.g., adding the song to the Apple Music library or another Music application library; bookmarking a web-link in Safari or another browser; adding a video to Apple TV library or to another video/television library). In some embodiments, in response to receiving the user input to add the first shared content item to the library of the first application, the computer system adds the first shared content item in the library of the first application. (e.g., saving or storing the shared content in a library associated with the user of the electronic device that may be stored in the cloud or can be accessed from multiple electronic devices). In some embodiments, the first shared content item is (818) not automatically added to a library of the first application in response to receiving the information identifying the first shared content item.

Automatically making different types of content shared in a receiving application available in relevant applications capable of opening the respective content type while not automatically adding the shared content to content libraries of the relevant applications improves discoverability of shared content and provides the user with control of the sharing process, thus reducing the number of inputs needed to perform an operation. Reducing the number of inputs needed to interact with a shared content item enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the information identifying the first shared content item and in accordance with the determination that the first shared content item is of the second type (e.g., photos or videos), the computer system automatically adds (820) the first shared content item to a library in the second application of the plurality of applications. For example, a copy of the content item is not only made automatically available within the second application, but it is also saved (e.g., added) to a library of the second application. In some embodiments, the copy of the content item is retained in the library unless the user takes an action to remove it (e.g., by using control 5090d shown in FIG. 5D4). For example, copies of content items saved in the library are not dynamically updated by the computer system. In some embodiments, content items of the second type are user-generated and are not available within any of the plurality of applications unless shared in the receiving application or manually added to respective libraries of the plurality of applications, or generated and saved by the user of the electronic device.

Automatically making different types of content shared in a receiving application available in relevant applications capable of opening the respective content type while also automatically adding the shared content to content libraries of the relevant applications improves discoverability of shared content and reduces the number of inputs needed to perform an operation. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system aggregates (e.g., groups together or puts in a collection) (822) a plurality of information identifying respective shared content items of the first type for display in the first application. In some embodiments, the computer system aggregates a plurality of information identifying respective shared content items of the second type (e.g., groups together or puts in a collection) for display in the second application. For example, shared content items of one type are grouped together in one collection, and content items of another type are grouped together in another collection. In some embodiments, the plurality of information identifying respective shared content items includes information shared from different users, information shared at different times and/or in different conversations.

Automatically marking different types of content for sharing and/or automatically grouping together shared content of the same type for display in a section of respective applications dedicated for shared content improves discoverability of shared content and reduces the number of inputs and the cognitive burden of a user trying to view or interact with the shared content. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays (824) the plurality of information identifying respective shared content items of the first type are in a dedicated section of the first application (e.g., section 5054 "Shared with You" shown in FIG. 5A6), and the plurality of information identifying respective shared content items of the second type in a dedicated section of the second application (e.g., section 546 "Shared with You" shown in FIG. 5I4). For example, the first application includes a section that displays content items of the first type that are shared in the receiving application and the second application includes a section that displays content items of the second type that are shared in the receiving application. Thus, content items of the same type are grouped together to be displayed in a "shared with you" section in the respective applications. In some embodiments, not all content items of the same type that are identified as shared are grouped together for display, e.g., only a subset of the shared content items are displayed at a time such (e.g., only most relevant content items are displayed, where relevancy may be determined based on a variety of criteria).

Automatically displaying shared content of the same type in a section of respective applications dedicated for shared content improves discoverability of shared content and reduces the number of inputs and the cognitive burden of a user trying to view or interact with the shared content. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system receives (826), at the first receiving application (e.g., a messaging application), information identifying a first plurality of shared content items, wherein the first plurality of shared content items are of the first type. After receiving the information identifying the first plurality of shared content items, the computer system receives, via the one or more input devices, a request to open the first application (e.g., a user can tap on an icon representing the first application). In response to receiving the request to open the first application, the computer system concurrently displays the information identifying the first plurality of shared content items in the dedicated section of the first application (section 5054 in FIG. 5A6) and a second plurality of content items of the first type in a portion of the first application other than the dedicated section (e.g., section 5056 for recently played music in FIG. 5A6). For example, when a user of the electronic device opens the first application, a default user interface (e.g., default view 5052 in FIG. 5A6) is displayed including content items added, saved, played or liked by the user in one section, and content items recommended to the user or content items that have been shared with the user via the messaging application in another separate section (e.g., section 5054).

Concurrently displaying shared content (in a dedicated section) and content that have not be shared (in other sections) in respective applications improves discoverability of shared content and content that have not been shared and reduces the number of inputs and the cognitive burden of a user trying to view or interact with the shared content. Reducing the number of inputs needed to interact with shared content and content that have not been shared enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first plurality of shared content items are (828) of the first type and, in accordance with a determination that a pre-determined criterion is met for a content item in the first plurality of shared content items, the computer system removes the information identifying the content item from display in the dedicated section of the first application. For example, the content items that are included in the first group for display are dynamically updated based on one or more criterion including, but not limited to, when the information identifying the content was received; whether the shared content was consumed after the information identifying the content was received; whether the shared content was manually highlighted or otherwise marked as more important than other, unmarked content; whether the information identifying the content was received in a messaging conversation marked as more important than other, unmarked messaging conversations; whether the information identifying the content was sent by a specific contact such as a contact marked as more important or a contact that the user of the electronic device frequently connects with.

Removing content from the group of content items intended for display in a section dedicated for shared content based on various predetermined criteria improves the relevancy of the displayed content and reduces the number of inputs needed to discover content that is both shared and relevant. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the pre-determined criterion is (830) a time-based criterion, and in accordance with a determination that a pre-determined amount (e.g., 30 days) of time has passed from the time when the content item was shared, the computer system removes the information identifying the content item from display in dedicated section of the first application.

Decaying shared content included the group within a predetermined amount of time improves the relevancy of the displayed content and reduces the number of inputs needed to discover content that is both shared and relevant. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the dedicated section in the first application and the dedicated section in the second application are (832) visually similar. In some embodiments, the dedicated section in the first application and the dedicated section in the second application are associated with the same attribution (e.g., same tab, label or name associated with the dedicated section) that indicates content displayed in the respective dedicated sections is shared. For example, the attribution is a text label such as "Share with you" or "From your friends". The attribution is also the same color and size in both the first application and the second application. For example, section 5054 in the music application (shown in FIG. 5A6); section 542 in the news application (shown in FIG. 5I2); section 546 in the books application (shown in FIG. 5I4); section 549 in the app store application (shown in FIG. 5I6); section 552 (shown in FIG. 5I8); and section 555 in TV application are visually similar and are all labeled "Shared with You".

Having a dedicated section in different applications for shared content that is visually similar improves discoverability of shared content across different applications and provides visual feedback to the user indicating that the content in each of the dedicated sections is shared content even though the different applications otherwise may not be visually consistent or similar. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first shared content item is (834) of a first type, and automatically making the first shared content item available (e.g., without additional user input) within the first application includes: providing a mechanism (e.g., pill 5056a shown in FIG. 5A6) in the first application for navigating to a location in the first receiving application where the information identifying the first shared content item was initially received (e.g., as described in relation to FIGS. 5A7, 5A8, and 5B3 above). For example, making shared content available in a corresponding application allows a user to open the content from the corresponding application (e.g., by selecting representation 5054a) and also to refer back to where the content item was originally shared in the receiving application (e.g., by selecting pill 5056a shown in FIG. 5A6).

Providing, in a media application that displays shared content, a mechanism for navigating to a location in a receiving application where the shared content was originally shared improves discoverability of shared content while improving communication with the contact that has shared the content and reduces the number of inputs needed to discover content that is both shared and relevant. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, providing the mechanism in the first application for navigating to the location in the first receiving application where the information identifying the first shared content item was initially received includes (836) the computer system auto-scrolling to a location (e.g., message) within the first receiving application (e.g., a first messaging conversation in the first messaging application) where the first shared content item was initially received. In some embodiments, the receiving application is a messaging application with a messaging conversation wherein the messaging conversation includes a plurality of messages (e.g., the computer system displays message 5001d last as described in FIG. 5A8 above). For example, making shared content available in a corresponding application allows a user to open the content from the corresponding application and also to refer back to the message where the content item was originally shared in the messaging application.

Providing, in a media application that displays shared content, a mechanism for navigating directly to a message in a messaging conversation where the shared content was originally shared improves discoverability of shared content while improving communication with the contact that has shared the content and reduces the number of inputs needed to discover content that is both shared and relevant. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a request to share the first shared content item is (838) initiated from a remote messaging application on a remote electronic device.

In some embodiments, a plurality of contacts is (840) stored in a contacts application of the plurality of applications, and prior to the automatically making the first shared content item available within the first application or the second application, the computer system determines that the information identifying the first shared content item was received from one or more of the plurality of contacts.

Determining whether the shared content was shared by a contact (as opposed to a user that is not contact) prior to automatically making the shared content available in relevant applications improves relevancy of shared content that is displayed in the relevant applications and reduces the number of inputs needed to perform an operation. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to the automatically making the first shared content item available within the first application or the second application, the computer system determines (842) that the information identifying the first shared content item as shared content was received from a contact of the one or more of the plurality of contacts that meets communication criteria (e.g., recently communicated with contacts, regularly communicated with contacts, a favorites list, VIP list of contacts, recently added friends, etc.).

Determining whether the shared content was shared by a contact that meets certain communication criteria (as opposed to any contact or any user) prior to automatically making the shared content available in relevant applications improves relevancy of shared content that is displayed in the relevant applications and reduces the number of inputs needed to perform an operation. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to the automatically making the first shared content item available within the first application or the second application, the computer system determines (844) that the information identifying the first shared content item was received from a contact of the one or more of the plurality of contacts that meets a threshold level of communication (e.g., recently communicated with contacts; regularly communicated with contacts.) In some embodiments, the threshold level of communication may be predetermined or may change dynamically, for example, based on behavior of the user of the computer system.

Determining whether the shared content was shared by a contact that meets a threshold level of communication (as opposed to any contact or any user) prior to automatically making the shared content available in relevant applications improves relevancy of shared content that is displayed in the relevant applications and reduces the number of inputs needed to perform an operation. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a plurality of contacts is (846) stored in a contacts application of the plurality of applications, and prior to the automatically making the first shared content item available within the first application or the second application, the computer system determines that the information identifying the first shared content item was received by a group conversation that meets a threshold level of communication, wherein two or more of the plurality of contacts are participants in the group conversation.

Determining whether the shared content was shared in a group conversation that meets a threshold level of communication (as opposed to any group conversation) prior to automatically making the shared content available in relevant applications improves relevancy of shared content that is displayed in the relevant applications and reduces the number of inputs needed to perform an operation. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

FIGS. 9A-9F are flow diagrams illustrating method 900 of automatically displaying shared content within media applications based on whether the sharing functionality has been enabled in accordance with some embodiments. Method 900 is performed at a computer system (e.g., device 300, FIG. 3, or portable multifunction device 100, FIG. 1A) that is in communication with (e.g., includes) a display generation component (e.g., a display device, optionally touch-sensitive, a projector, a head-mounted display, a heads-up display, or the like) and one or more input devices (e.g., including one or more sensors to detect intensity of contacts with the touch-sensitive surface). In some embodiments, the display generation component is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described herein, method 900 determines when a respective content item has been identified and/or shared with the user using a receiving application, and automatically displays the respective content item in a corresponding application without requiring the user to provide inputs to select or add the item within the corresponding application. The method automatically displays the respective item if the user of the electronic device has authorized this functionality (e.g., when the sharing setting for the correspond application is enabled). Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system receives (902), by a receiving application (e.g., an instant messaging application, a mail application, or a social media application) of a plurality of applications, information identifying a first shared content item as shared content. The first shared content item is of a first type. In some embodiments, the information identifying the first shared content item is a representation of the content item and/or a link to the content item (e.g., but not the content item itself). In some embodiments, the information identifying the first shared content item is a pointer or identifier of the content item that is readable by a corresponding application (e.g., a media application) designed to open such content. In some embodiments, a copy of the content item itself is shared as opposed to identifying information or a link. For example, as described with reference to FIG. 5A4, information identifying a first shared content item (e.g., representation 5045*b*) is received in a messaging application.

In response to receiving the information identifying the first shared content item as shared content (904) and in accordance with a determination that a first application of the plurality of applications can open content of the first type (e.g., the application is capable of opening and/or displaying the content): in accordance with a determination that providing the information identifying the first shared content item as shared content to the first application has been authorized (906), the computer system automatically (e.g., without additional user input) makes the first shared content item available within the first application, and in accordance with a determination that providing information identifying the first shared content item as shared content to the first application has not been authorized (908), the computer system does not make the first shared content item automatically available within the first application. For example, in response to a user opening the first application (e.g., after the information identifying the content item has been received by the messaging application), the content item, the copy of the content item, and/or a representation of the content item automatically appear within a dedicated region in the first application without a need for the user to take any action. For example, the user is not required to open the messaging application and select the content item for display in the first application. For example, whether information about content identified as shared in the messaging application is or is not provided to a corresponding application (e.g., one that is designed to read and open such content) can be enabled or disabled for a particular application and/or content type. For example, as described with reference to FIGS. 5A4-5A6, the representation of Song A shared in the messaging conversation with Alex is displayed in the Music Application illustrated in FIG. 5A6.

The ability to enable or disable the sharing of the information identifying the content item as shared content improves discoverability of that content within the relevant applications while providing control of the sharing process and without requiring further user input. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (910), by the messaging application, information identifying a second shared content item as shared content, wherein the second shared content item is of a second type different from the first content type. In some embodiments, in response to receiving the information identifying the second shared content item as shared content and in accordance with a determination that: a second application of the plurality of applications can open content of the second type, wherein the second application is different from the first application, and providing the information identifying the second shared content item as shared content to the second application has been authorized, the computer system automatically (e.g., without additional user input) makes the second shared content item available within the second application. For example, when a user opens the second application after the information identifying the content item has been received by the messaging application, the content item, the copy of the content item, or a representation of the content item automatically appear within a dedicated region in the first application without a need for the user to take any action (e.g., there is no need for the user to open the messaging application and select the content item for display in the second application). In some embodiments, in accordance with a determination that providing information identifying the second shared content item as shared content to the second application has not been authorized, the computer system does not make the second shared content item automatically available within the first application. For example, whether information about content identified as shared in the messaging application is or is not provided to a corresponding application (e.g., one that is designed to read and open such content) can be enabled or disabled for a particular application and/or content type. For example, a second type of content (e.g., Podcast Name A) is shared in the messaging conversation with Alex, as illustrated in FIG. 5A4 (e.g., wherein the shared Podcast is a different content type than the Song and News Article also shared in the messaging conversation).

The ability to enable or disable the sharing of the information identifying the content item as shared content for various applications and/or content types improves discoverability of the content item within relevant applications while providing control of the sharing process and without requiring further user input. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, a default setting of the computer system is (912) to allow automatic content sharing from the messaging application to the plurality of applications. For example, as illustrated in FIG. 7A, initially, all applications listed allow automatic contact sharing. In some embodiments, the computer system receives a user input requesting inclusion of a new application to the plurality of applications. In some embodiments, in response to the user input requesting inclusion of the new application to the plurality of applications, the computer system includes the new application to the plurality of applications (e.g., a new application may be downloaded or installed on the computer system). In some embodiments, the computer system receives a user input requesting to turn off the default setting for the new application (e.g., the user requests to disable automatic sharing for the new application). For example, as illustrated in FIG. 7B, the user uses the toggle switches to turn "off" automatic content sharing for one or more applications. In some embodiments, in response to the user input requesting to turn off the default setting for the new application, the computer system includes the new application to a set of applications for which automatic content sharing from the messaging application to the set of applications is not authorized.

The ability to disable the automatic content sharing from the messaging application to various applications and/or content types by blacklisting applications improves discoverability of the content item within relevant applications while providing control of the sharing process and without requiring further user input. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (914), by the messaging application, information identifying a second shared content item as shared content, wherein the second shared content item is of a second type (e.g., distinct from the first type). In some embodiments, in response to receiving the information identifying the second shared content item as shared content and in accordance with a determination that (i) a second application can open content of the second type and (ii) the second application is included in the set of applications for which automatic content sharing from the messaging application to the set of applications is not authorized, the computer system does not make the second shared content item automatically available within the second application.

The ability to disable the automatic content sharing from the messaging application to various applications and/or content types such that the shared content does not automatically appear in blacklisted applications provides improved visible feedback to the user when the use accesses the blacklisted applications by reducing the amount of clutter displayed in the accessed application. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, a default setting of the computer system is (916) to not allow automatic content sharing from the messaging application to the plurality of applications. For example, as illustrated in FIG. 7C, in some embodiments, "Shared With You" is set to off for all applications (e.g., as indicated by toggle switch 7004 set to off). In some embodiments, the computer system receives a user input requesting inclusion of a new application to the plurality of applications. In some embodiments, in response to the user input requesting inclusion of the new application to the plurality of applications, the computer system includes the new application to the plurality of applications (e.g., a new application may be downloaded or installed on the computer system). In some embodiments, the computer system receives a user input requesting to turn off the default setting for the new application (e.g., the user requests to enable automatic sharing for the new application). In some embodiments, in response to the user input requesting to turn off the default setting for the new application, the computer system includes the new application to a set of applications for which automatic content sharing from the messaging application to the set of applications is authorized. For example, as illustrated in FIG. 7D, the user is enabled to turn the "Shared With You" setting on for one or more applications.

The ability to enable automatic content sharing for various applications and/or content types by whitelisting applications improves discoverability of shared content items within relevant applications while providing control of the sharing process and without requiring further user input. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (918), by the messaging application, information identifying a second shared content item as shared content, wherein the second shared content item is of a second type. In some embodiments, in response to receiving the information identifying the second shared content item as shared content and in accordance with a determination that (i) a second application can open content of the second type, and (ii) the second application is included in the set of applications for which automatic content sharing from the messaging application to the set of applications is authorized, the computer system automatically makes the second shared content item available within the second application.

The ability to enable the automatic content sharing for various applications and/or content types such that the shared content is automatically displayed in whitelisted applications provides improved visible feedback to the user by displaying the content without requiring the user to navigate complex menu hierarchies in order to manually request display of shared content within a whitelisted application. Providing improved visual feedback to the user and performing an operation (e.g., automatically) when a set of conditions has been met without requiring further user input, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the receiving application is a messaging application and the information identifying the first shared content item as shared content is received (920) in a first conversation of a plurality of conversations in the messaging application and a default setting of the computer system is to allow automatic content sharing from the plurality of conversations in the messaging application to the plurality of applications. For example, the information identifying the first shared content item is received in a communication thread in the messaging application. In some embodiments, the communication thread may include an exchange of messages between a user of the electronic device and one or more contacts stored in the electronic device (e.g., stored in a contacts application). In some embodiments, the communication thread may include a single message that includes information identifying content as shared. In some embodiments, the messages may include text. In some embodiments, the messages may also include and/or identify other type of content such as media content (e.g., photos, videos, GIFs, podcasts, applications, songs, etc.). In some embodiments, the computer system receives a new conversation in the messaging application, and in response to receiving the new conversation in the messaging application, includes the new application to the plurality of conversations. For example, a new conversation is started by the user of the computer system by sending a message from the messaging application or a new conversation is response to the user of the computer system receiving a message in the messaging application from a contact. In some embodiments, the computer system receives a user input requesting to turn off the default setting for the new conversation (e.g., the user requests to disable automatic sharing for the new conversation). In some embodiments, in response to the user input requesting to turn off the default setting for the new conversation, the computer system includes the new conversation to a set of conversations for which automatic content sharing from the set of conversations to the plurality of applications is not authorized (e.g., a blacklist of messaging conversations for which automatic sharing is disabled).

The ability to disable the automatic content sharing from particular message threads within a messaging application by blacklisting particular message threads without limiting the automatic content sharing across all message threads in the message application provides improved visual feedback to the user by automatically displaying shared content from only approved message threads without displaying shared content received from blacklisted message threads without requiring the user input to manually sort through the shared content that the user wants to be displayed. Performing an operation (e.g., automatically) when a set of conditions has been met without requiring further user input, and providing improved visual feedback to the user, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (922), in a second conversation, information identifying a second shared content item as shared content, wherein the second shared content item is of the first type. In some embodiments, in response to receiving the information identifying the second shared content item as shared content and in accordance with a determination that (i) the first application can open content of the first type and (ii) the second conversation is included in the set of conversations for which automatic content sharing from the set of conversations to the plurality of applications is not authorized, the computer system does not make the second shared content item automatically available within the first application. For example, as illustrated in FIG. 5G3, the user is enabled to "Hide in Shared With You" using toggle switch 527 to control whether the selected conversation is enabled to use automatic content sharing functionality.

The ability to disable automatic content sharing for specific messaging conversations (regardless of the content type) improves discoverability of shared content items within relevant applications while providing control of the sharing process and without requiring further user input. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the receiving application is a messaging application and the information identifying the first shared content item as shared content is received (924) in a first conversation of a plurality of conversations in the messaging application and a default setting of the computer system is not to allow automatic content sharing from the plurality of conversations in the messaging application to the plurality of applications. For example, the information identifying the first shared content item is received in a communication thread in the messaging application. In some embodiments, the communication thread may include an exchange of messages between a user of the electronic device and one or more contacts stored in the electronic device (e.g., stored in a contacts application). In some embodiments, the communication thread may include a single message that includes information identifying content as shared. In some embodiments, the messages may include text. In some embodiments, the messages may also include and/or identify other type of content such as media content (e.g., photos, videos, GIFs, podcasts, applications, songs, etc.) In some embodiments, the computer system receives a new conversation in the messaging application and, in response to receiving the new conversation in the messaging application, including the new application to the plurality of conversations, the computer system receives a user input requesting to turn off the default setting for the new conversation (e.g., the user requests to disable automatic sharing for the new conversation). In some embodiments, in response to the user input requesting to turn off the default setting for the new conversation, the computer system includes the new conversation to a set of conversations for which automatic content sharing from the set of conversations to the plurality of applications is authorized (e.g., a blacklist of messaging conversations for which automatic sharing is disabled).

The ability to enable the automatic content sharing from particular message threads within a messaging application by whitelisting particular message threads without enabling the automatic content sharing across all message threads in the message application provides improved visual feedback to the user by automatically displaying shared content from only approved (e.g., whitelisted) message threads without displaying shared content received from message threads that are not approved, without requiring the user input to manually sort through the shared content that the user wants to be displayed. Performing an operation (e.g., automatically) when a set of conditions has been met without requiring further user input, and providing improved visual feedback to the user, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (926), in the second conversation, information identifying a second shared content item as shared content, wherein the second shared content item is of the first type. In some embodiments, in response to receiving the information identifying the second shared item as shared content in the second conversation and in accordance with a determination that (i) the first application can open content of the first type and (ii) the second conversation is included in the set of conversations for which automatic content sharing from the set of conversations to the plurality of applications is authorized, the computer system automatically (e.g., without user input) makes the second shared content item available from within the first application. For example, automatic content sharing is turned "on" for the message conversation with Alex, as described with reference to FIGS. 5A4-5A6, and thus, music content (e.g., Song A) shared by Alex in the message conversation automatically is displayed in the music application, illustrated in FIG. 5A6.

The ability to enable the sharing of the information identifying the content item as shared content for specific messaging conversations (regardless of the content type) improves discoverability of the content item within relevant applications while providing control of the sharing process and without requiring further user input. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the plurality of applications includes (928) a settings application (e.g., corresponding to the settings application icon 446, FIG. 4A that provides a user with options for adjusting settings related to the electronic device (e.g., system settings, network and connectivity settings, battery settings, display settings) and for adjusting settings related to the applications stored on the computer system). In some embodiments, the computer system receives an input requesting to modify content sharing settings and, in response to receiving the input requesting to modify content sharing settings, the computer system displays a user interface for content sharing setting, wherein the user interface for content sharing settings includes a plurality of controls for authorizing the provision of information identifying content as shared to the plurality of applications. For example, the user of the computer system can authorize (or remove an authorization) for the provision of information identifying content as shared using a user interface for sharing-specific settings. In some embodiments, the user interface for content sharing setting is a user interface of a settings application for adjusting content sharing and other settings of the computer system. For example, as described above with reference to FIGS. 7A-7D, the user is enabled to update toggle switches 7010a-7010n to modify content sharing settings of device 100.

The ability to enable or disable the sharing of the information identifying the content item as shared content for various using a user interface for sharing-specific settings improves discoverability of the content item within relevant applications while providing control of the sharing process and without requiring further user input. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the plurality of controls includes (930) a control for activating and deactivating the provision of information identifying content as shared content for all applications from the plurality of applications. For example, as described above with reference to FIGS. 7A-7D, a toggle switch 7004 is provided for controlling sharing settings for all relevant applications.

Providing a control that allows a user to choose between authorizing and not authorizing the provision of information identifying content as shared content for all applications with a single user input provides additional control options without needing to navigate through complex menu hierarchies, improves the user experience, and provides additional visual feedback. Providing improved visual feedback to the user, and (e.g., automatically) providing additional control options without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the plurality of controls includes (932) a control for activating and deactivating the provision of information identifying content as shared content for each application of the plurality of applications that is capable of opening content for which information identifying the content as shared is received (e.g., toggle switches 7010a-7010n, described with reference to FIGS. 7A-7D).

Providing a control that allows a user to choose between authorizing and not authorizing the provision of information identifying content as shared content for each application with a single user input provides additional control options without needing to navigate through complex menu hierarchies, improves the user experience, and provides additional visual feedback. Providing improved visual feedback to the user, and (e.g., automatically) providing additional control options without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, providing information identifying content as shared content to the first application is not authorized (934) and the content item has not been automatically made available within the first application in response to receiving the information identifying the content item as shared content. In some embodiments, the computer system receives a request to authorize the provision of information identifying the content item as shared content to one or more relevant applications of the plurality of applications, including the first application. For example, the user highlights the information identifying the content item as shared content. In some embodiments, in response to the request to authorize the provision of information identifying the content item as shared content to one or more relevant applications, the computer system automatically makes the content item available from within the first application (e.g., as described with reference to FIGS. 5E5-5E8). In some embodiments, in response to receiving an input selecting the information identifying the content item as shared content, a control for marking the content item as favorite (e.g., a star, a pin, a heart, etc.) is displayed, where the control is displayed overlaying or near the location where the information identifying the content item was received. In some embodiments, in response to receiving an input selecting the control, the content item is marked as favorite. In some embodiments, the same user input can be used to unmark the content item as favorite, and in response to unmarking the content as favorite, the computer system ceases display of information identifying the content item as shared in the first application.

Providing a control that allows a user to mark individual items as a favorite provides additional control options of the sharing process without needing to navigate through complex menu hierarchies, improves the user experience, and provides visual feedback. Providing improved visual feedback to the user, and (e.g., automatically) providing additional control options when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (936), at the messaging application, a request to open a conversation of a plurality of conversations, where the conversation includes a message including the information identifying the content item. In some embodiments, in response to the request to open the conversation, the computer system displays a user interface that at least partially includes the first messaging conversation, and includes a user-selectable affordance that when selected displays a first set of controls related to the first messaging conversation. For example, as described with reference to FIGS. 5G2-5G3, a tap input detected on the information icon (e.g., user-selectable option 523) in a messaging conversation (e.g., at the top of the messaging conversation user interface) causes the user interface illustrated in FIG. 5G3 to be displayed. In some embodiments, a tap on an image associated with the messaging conversation, or a tap on description at the top associated with the messaging application, opens a detailed view related to the messaging conversation. In some embodiments, in response to a selection of the user-selectable affordance, the computer system concurrently displays the first set of controls, including a control for activating and deactivating the provision of the information identifying the content as shared content for the conversation (e.g., "Hide in Shared With You" toggle switch 527, FIG. 5G3). For example, the first set of controls includes names of members associated with the messaging conversations, images or avatars of contacts that are participants in the messaging conversation.

Providing a control that allows a user to choose between authorizing and not authorizing the provision of information identifying content as shared content for an individual messaging conversation using the user interface of the messaging conversation provides additional control options without needing to navigate through complex menu hierarchies, improves the user experience, and provides additional visual feedback. Providing improved visual feedback to the user, and (e.g., automatically) providing additional control options without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system concurrently displays (938) the first set of controls and information specific to the conversation, as described with reference to FIG. 5G3.

Automatically displaying additional information about a selected conversation concurrently with a set of controls for the selected conversation provides additional control options to the user without requiring the user to navigate through complex menu hierarchies, improves the user experience, and provides additional visual feedback to the user. Providing improved visual feedback to the user, and (e.g., automatically) providing additional control options without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the information specific to the first conversation includes (940) names of contacts associated with the conversation (e.g., a list of names of the participants in the messaging conversation), avatars of contacts associated with the conversation (e.g., avatars of the participants in the conversation), and/or a count of contacts associated with the conversation (e.g., the number of contacts that are part of the conversation or the group chat), as illustrated in FIG. 5G3.

Automatically displaying additional information, such as identifying information about the individuals that are participating in a selected conversation, provides real-time visual feedback to the user about which users are included in the conversation, without requiring the user to navigate through complex menu hierarchies to find the information. Providing improved visual feedback to the user, and (e.g., automatically) providing additional control options without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first set of controls includes (942) one or more options (e.g., an option for a voice conversation with the participants in the messaging conversation, an option for video conversation/chat with the participants in the messaging conversation, an option for emailing the participants in the messaging conversation, and an option for co-presence experience) for communicating with one or more users participating in the conversation (e.g., controls 526a-526d, described with reference to FIG. 5G3). In some embodiments, the messaging conversation is a group chat with more than two participants. In some embodiments, the some of the participants are contacts stored in the memory of the electronic device. In some embodiments, the one or more options for communicating with the one or more users participating in the first messaging conversation include: an option for sharing location with the one or more users participating in the conversation, an option for leaving the conversation, and/or an option for editing a name or a photo associated with the conversation.

Providing the user with an option to reply to, or otherwise contact, an individual that is participating in a selected conversation, provides improved visual feedback to the user and provides the user with an option to easily communicate with individuals that are participating in the selected conversation without requiring the user to navigate through complex menu hierarchies to communicate with the individual. Providing improved visual feedback to the user, and (e.g., automatically) providing additional control options without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, concurrently displaying the first set of controls and the information specific to the conversation further comprises (944) displaying a plurality of shared content items and a plurality of indicators for each displayed content item of the plurality of content, wherein each of the plurality of indicators indicates that information identifying a corresponding content item of the plurality of content item has been received in the conversation. For example, as illustrated in FIG. 5G3, shared content is displayed with sharing indicator 528.

Concurrently displaying information to distinguish between shared content items within a selected conversation with additional controls for interacting with the selected conversation, provides improved visual feedback to the user by allowing the user to easily view information about the shared content items, without requiring the user to navigate through complex menu hierarchies to obtain the information manually. Providing improved visual feedback to the user, and (e.g., automatically) providing additional control options without requiring further user input enhances the operability of the system and makes the user-device interface more efficient (e.g., by helping the user to achieve an intended result and reducing user mistakes when operating/ interacting with the system), which, additionally, reduces power usage and improves battery life of the device by enabling the user to use the device more quickly and efficiently.

In some embodiments, a request to share the content item is initiated (946) from a remote messaging application on a remote electronic device. For example, a content item is shared (e.g., the information identifying the first shared content item) via a messaging interface that includes a message transcript between at least two users. In some embodiments, the messaging interface includes a messaging conversation with an ability to return to the messaging conversation upon request from a different application (e.g., as described with reference to FIGS. 5E1-5E2 and 5F2).

Allowing content items to be shared from a remote device via a messaging application that is also used by the sharing device and the receiving device provides improved visual feedback to the user to make it easy to see the shared content items within a messaging thread of the messaging application and improves the user experience by allowing the user of the device to both share and receive shared content items using the messaging application. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the request to share the content item is initiated (948) by a remote user of the remote messaging application and providing the information identifying the content item as shared content to the first application has been authorized (e.g., according to the settings interface described above). In some embodiments, in response to receiving the information identifying the content item as shared content, in accordance with a determination that the remote user is not a contact from a plurality of contacts stored in the memory, the computer system does not make the content item available within the first application. In some embodiments, in accordance with a determination that the remote user is a contact from the plurality of contacts stored in the memory, the computer system does not make the content item available within the first application.

Allowing content items to be shared from a remote device that is associated with an individual that the receiving device recognizes as a saved contact, without automatically enabling shared content from individuals that are not recognized by the device as a saved contact, provides improved visual feedback to the user and improves the user experience by only allowing shared content from saved contents to be automatically displayed. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, automatically (e.g., without additional user input) making the first shared content item available within the first application is (950) not in response to receiving, in the messaging application, a user request to open the first shared content item. For example, a user is enabled to view and open the first shared content item within the messaging application independently of the content item being available within the first application. For example, the first shared content item is made available within the first application even if the user has not opened the first shared content (e.g., or the conversation thread) in the messaging application.

Providing the user with an option to view a shared content item within a messaging application without affecting how the shared content item is displayed automatically in the first application, provides improved visual feedback to the user such that the shared content item is automatically made available within the first application whether or not the user has viewed and/or opened the shared content item in the messaging application in which it was shared. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, in accordance with the determination that providing the information identifying the first shared content item as shared content to the first application has been authorized, the first shared content item is automatically made available (952) for later viewing within the first application. For example, a representation of the shared content item is displayed within a dedicated section for shared items in the first application, and the user may at a later point in time select the shared content item for viewing, playing, or otherwise consuming the shared content item. For example, FIGS. 5I1-5I10 provide a plurality of examples of shared content items displayed within different media applications (e.g., in accordance with a determination that the sharing functionality has been enabled for the applications illustrated in FIGS. 5I1-5I10).

Automatically displaying shared content within a relevant application based on the type of content, after the shared content has been received by a distinct messaging application, provides improved visual feedback to the user to make the shared content item accessible within the relevant application without requiring user input to find or view the shared content item from within the relevant application. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the receiving application is (954) a messaging application.

It should be understood that the particular order in which the operations in FIGS. 9A-9E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 1000 and 1100) are also applicable in an analogous manner to method 900 described above with respect to FIGS. 9A-9E. For example, the user inputs described above with reference to method 900 optionally have one or more of the characteristics of the user inputs described herein with reference to other methods described herein (e.g., methods 800, 1000 and 1100). For brevity, these details are not repeated here.

FIGS. 10A-10E are flow diagrams illustrating method 1000 of displaying information related to how a content item was shared in accordance with some embodiments. Method 1000 is performed at an electronic device (e.g., device 300, FIG. 3, or portable multifunction device 100, FIG. 1A) that is in communication with (e.g., includes) a display generation component (e.g., a display device, optionally touch-sensitive, a projector, a head-mounted display, a heads-up display, or the like) and one or more input devices (e.g., including one or more sensors to detect intensity of contacts with the touch-sensitive surface). In some embodiments, the display generation component is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described herein, method 1000, provides, in a first (e.g., media) application, a selectable attribution affordance that provides a link to a location in a second (e.g., messaging) application where information identifying the content item was initially shared. Displaying, upon selecting the selectable attribution affordance, the second (e.g., messaging) application at a location where information identifying the content item was initially shared improves discoverability of shared content and the message in which the content was shared, improves communication with the contact that has shared the content, and reduces the number of inputs needed to discover shared content and the message that shared the content and reduces the number of inputs needed to reply to the contact that shared the content. Further, the selectable attribution affordance provides visual feedback that the content was shared, who shared the content, and how many contacts have shared the content (if more than one). Providing improved visual feedback to the user and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying (1001) a view (e.g., a user interface of the application, including a set of tabs such as a library user interface; or a single tab within the set of tabs (e.g., "Listen Now" is one tab in the main user interface of the "Apple Music" application and "Radio" may be another tab)) of a first application of a plurality of applications (e.g., TV app, Music App, Books app, Podcasts app, News app, etc.) stored in the memory, the electronic device displays: a representation of (1002) a first shared content item (e.g., a representation or identifying information for the content item is added to a conversation in the messaging app), and a selectable attribution affordance (1004) (e.g., a user interface object) that provides a link to a location in a second application where information identifying the first shared content item was initially shared. For example, as described with reference to FIGS. 5A6-5A7, while music application is displayed, a representation of Song Name-A is displayed, and selectable pill 5056a (e.g., a selectable attribution affordance), when selected, causes the device to display the message thread in which Song Name-A was shared. For example, when the selectable attribution affordance is selected, a process for displaying a user interface of the second application where the information identifying the content item was received is initiated. In some embodiments, the first shared content item is a single media file. In some embodiments, he first shared content item is a collection of media items (e.g., an album of photos, an album of songs, a series of episodes, a podcast channel with a series of podcases, etc.).

In some embodiments, prior to displaying the first shared content item in the first application, in accordance with a determination that the information identifying the first shared content item was initially received from one or more of the plurality of contacts stored in memory of the electronic device, the electronic device obtains (1006) the information identifying the first shared content item in the first application. For example, before displaying Song Name-A in the music application, device 100 determine that Song Name-A was shared by a contact stored at device 100 (e.g., "Alex" is a contact, as described with reference to FIG. 5A6-5A7).

Determining whether the shared content was shared by a contact (as opposed to a user that is not contact) prior to automatically obtaining the information identifying the shared content in the first (e.g., media) application improves relevancy of shared content that is displayed in the relevant applications (e.g., capable to open the content) and reduces the number of inputs needed to perform an operation. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the selectable attribution affordance further indicates (1008) a name of a contact from which the information identifying the first shared content item was received. For example, as illustrated in FIG. 5A6, selectable pill 5056a displays "Alex" indicates that the contact who shared the first shared content item is "Alex."

Displaying the name of the contact that has shared the content item provides additional visual feedback. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the selectable attribution affordance further indicates (1010) an avatar representing a contact from which the information identifying the first shared content item was received. For example, as illustrated in FIG. 5A6, selectable pill 5056a includes an avatar of Alex. In some embodiments, device 100 displays the text identifying the contact (e.g., "Alex") and/or the avatar that represents Alex concurrently. It will be understood that in some embodiments, device 100 displays alternative and/or additional indications of the contact who shared the first content item.

Displaying an avatar of the contact that has shared the content item provides additional visual feedback. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the electronic device receives (1012) an input (e.g., tap or long press on the "from" pill) in the first application selecting the selectable attribution affordance, and in response to the input, at the location in the second application where the information identifying the first shared content item was initially shared, displays the information identifying the first shared content item (e.g., a location in the second application where the request to share the content item was received). For example, as described with reference to FIGS. 5A6 and 5A7, in some embodiments, in response to the user selecting selectable pill 5056*a*, the electronic device displays the message thread in which Song Name-A was shared (e.g., the message thread with Alex). In some embodiments, the device displays a most recent portion of the message thread (e.g., instead of displaying the portion of the message thread at which the media item was shared).

Displaying, upon selecting the selectable attribution affordance, the information identifying the shared content item at a location, in the second (e.g., messaging application), where the information was initially shared improves discoverability of shared content, improves discoverability of the conversation in which the content was shared, improves communication with the contact that has shared the content, and reduces the number of inputs needed to discover shared content and the message/conversation that shared the content and reduces the number of inputs needed to reply to the contact that shared the content. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second application is a messaging application that includes a plurality of messaging conversations and the information identifying the content item was received in a first messaging conversation of the plurality of messaging conversations. In some embodiments, the electronic device, in response to receiving the input selecting the selectable attribution affordance, displays (1014) a portion of a message thread (e.g., a message thread displays both sides of a messaging conversation on one screen, in chronological order; messages from contacts are displayed on one side, and messages from the user of the electronic device/computer system are displayed on the other side) of the first messaging conversation that includes a previously-received message within the first messaging conversation where the information identifying the first shared content item was initially shared. For example, upon tapping on the selectable attribution affordance, the method displays the messaging conversation and auto-scrolls to the message that includes information identifying the content item as shared content. For example, as described with reference to FIGS. 5A6 and 5A8, in some embodiments, in response to the user selecting selectable pill 5056*a*, the electronic device displays message 5001*d* (e.g., the message that shared Song Name-A) as the bottom message in the message thread of the messaging application shown in FIG. 5A8.

Displaying, upon selecting the selectable attribution affordance, a previously-received message that includes the information identifying the shared content item improves discoverability of shared content, improves discoverability of the previously-received message in which the content was shared, improves communication with the contact that has shared the content, and reduces the number of inputs needed to discover shared content and the message/conversation that shared the content and reduces the number of inputs needed to reply to the contact that shared the content. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second application is a messaging application that includes a plurality of messaging conversations and the information identifying the first shared content item was received in a message of a plurality of messages in a first messaging conversation of the plurality of messaging conversations. In some embodiments, the electronic device, in response to receiving the input selecting the selectable attribution affordance (e.g., a single tap), displays (1016) the message and a field (e.g., text entry field or a box for entering a message) for replying to the message (e.g., as described with reference to FIGS. 5B2-5B3). For example, a tapping on the selectable attribution affordance displays an inline-reply user interface that the user can use to send a reply directly to the message that includes the information identifying the content item.) In some embodiments, the user is enabled to reply in the messaging application (e.g., device 100 switches to the messaging application in response to selection of the selectable attribution affordance). In some embodiments, the user is enabled to reply in a message bubble within the first application (e.g., within the Music application) (e.g., a "quick reply").

Displaying, upon selecting the selectable attribution affordance, a reply user interface that shows the message that includes the information identifying the shared content and a field for replying to the message improves discoverability of shared content, improves discoverability of the message in which the content was shared, improves communication with the contact that has shared the content, and reduces the number of inputs needed to discover shared content and the message/conversation that shared the content and reduces the number of inputs needed to reply to the contact that shared the content. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input is (1018) a tap (e.g., a tap input) (e.g., as described with reference to FIGS. 5A6 and 5B2).

Responding to a tap input as a user input to the electronic device improves the user experience by making it easy for the user to select different user interface elements, including using different types of inputs (e.g., gestures) to cause the device to perform different responses and provide continual visual feedback as the user interacts with the device. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second application is a messaging application that includes a plurality of messaging conversations and the information identifying the first shared content item was received in a message of a plurality of messages in a first messaging conversation of the plurality of messaging conversations. In some embodiments, the electronic device, in response to receiving the input selecting the selectable attribution affordance (e.g., a long press), displays (1020) a set of controls (e.g., reply; shared listening; remove; info card; add to a playlist/library; delete from a Library; download, etc.) for performing an action related to the first shared content item. For example, as described with reference to FIG. 5D1-5D5, in response to user input 5022 selecting selectable pill 5056*a*, device 100 displays a set of controls 5080. In some embodiments, the device displays the set of controls 5080 in response to a tap input or a long-press input on the representation of the content item. In some embodiments, the set of controls includes controls for displaying, playing, saving or adding the content item to a library.

Displaying the conversation that includes the shared content item in response to one type of input that selects the selectable attribution affordance, and displaying a set of controls for performing an action related to the shared content, in response to a second type of input that selects the selectable attribution affordance, improves discoverability of shared content, improves communication with the contact that has shared the content, improves ability to interact with shared content, and provides additional control options without cluttering the UI with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of controls includes (1022) a control for replying to the message. For example, control 5080*a* illustrated in FIG. 5D2 is a control to "reply" to the message in which the selected shared content item was received.

Displaying the message/conversation that includes the shared content item in response to one type of input that selects the selectable attribution affordance, and displaying a control for replying to the message, in response to a second type of input that selects the selectable attribution affordance, improves discoverability of shared content, improves communication with the contact that has shared the content, improves ability to interact with shared content, and provides additional control options without cluttering the UI with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of controls includes (1024) a control for removing the representation of a first shared content item and the selectable attribution affordance from being displayed by the first application. For example, the control allows the user to disassociate the content item from the message including the information identifying the content and/or from the user that initiated the sharing. For example, as illustrated in FIGS. 5D2-5D4, the electronic device displays a control for "Remove Shared Song" (e.g., control 5080*d* and control 5090*f*).

Displaying the message/conversation that includes the shared content item in response to one type of input that selects the selectable attribution affordance, and displaying a control for removing the representation of the shared content from the section dedicated for shared content, in response to a second type of input that selects the selectable attribution affordance, improves discoverability of shared content, improves communication with the contact that has shared the content, improves ability to interact with shared content, and provides additional control options without cluttering the UI with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of controls includes (1026) a control (e.g., control 5080*c*, FIGS. 5D2-5D3) for listening or viewing the first shared content item together with one or more other users. In some embodiments, the one or more other users are contacts of the use of the electronic device. In some embodiments, the one or more other users are participants in a conversation (e.g., a group conversation) in which information identifying the content item as shared was received from at least one user of the one or more other users.

Displaying the message/conversation that includes the shared content item in response to one type of input that selects the selectable attribution affordance, and displaying a control for listening or viewing the shared content together with other contacts, in response to a second type of input that selects the selectable attribution affordance, improves discoverability of shared content, improves communication with the contact that has shared the content, improves ability to interact with shared content, and provides additional control options without cluttering the UI with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the information identifying the first shared content item was received in a first message of the plurality of messages in the first messaging conversation of the plurality of messaging conversations. In some embodiments, displaying the view of the second application further includes (1028) displaying a user interface of the first messaging conversation, including a message thread of one or more of the plurality of messages and a message entry field. For example, as described with reference to FIGS. 5A6 and 5A8, in some embodiments, in response to the user selecting selectable pill 5056a, the electronic device displays the message thread of the messaging application shown in FIG. 5A8. In another example, FIGS. 5B2-5B3 illustrate displaying the message conversation in which Song Name-D was shared.

Displaying, upon selecting the selectable attribution affordance, in a message conversation, a message thread of the message conversation that includes the information identifying the shared content and a message entry field, improves discoverability of the message in which the content was shared, improves communication with the contact that has shared the content, and reduces the number of inputs needed to discover shared content and the message/conversation that shared the content and reduces the number of inputs needed to reply to the contact that shared the content. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the view of the first application is a default view that includes a section for shared content. In some embodiments, while displaying the information identifying the first shared content item in the second application, the electronic device receives (1030) a single input (e.g., a tap on "done") to return to the default view of the first application that includes a section for shared content. For example, as illustrated in FIG. 5A6, a default "Shared With You" section 5054 is displayed in the music application user interface. as explained with reference to FIG. 5A8, "Done" 5043, when selected, causes device 100 to return to the user interface of the music application (e.g., the user interface illustrated in FIG. 5A6).

Returning to the default view of the first (e.g., messaging) application that includes a section for shared content in response to a single input, received while displaying the message/conversation that includes the information identifying the shared content, improves discoverability of the message in which the content was shared, improves communication with the contact that has shared the content, and reduces the number of inputs needed to discover shared content and the message/conversation that shared the content and reduces the number of inputs needed to reply to the contact that shared the content. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the view of the first application, the electronic device displays (1032): a plurality of representations of a plurality of shared content items, including the first shared content item, and a plurality of selectable attribution affordances that provide links to respective locations in the second application where respective information identifying the plurality of shared content items were initially shared. For example, as illustrated in FIG. 5A6, device 100 displays representations for Song Name-A, Song Name-B, and Song Name-C in the music application, wherein each representation includes a selectable attribution affordance (e.g., selectable pill 5056a, selectable pill 5056b, and selectable pill 5056c).

Providing in a first (e.g., media) application, a number of representations of shared content items and a number of associated selectable attribution affordances that provide links to respective locations in a second (e.g., messaging) application where information identifying the number of content item were initially shared improves discoverability of shared content and the message in which the content was shared, improves communication with the contact that has shared the content, and reduces the number of inputs needed to discover shared content and the message that shared the content, reduces clutter in the UI with additional displayed controls, and reduces the number of inputs needed to reply to the contact that shared the content. Further, the selectable attribution affordances provide visual feedback that the content was shared, who shared the content, and how many contacts have shared the content (if more than one). Providing improved visual feedback to the user, reducing the clutter in the UI and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the view of the first application, the electronic device displays (1034): a representation of a second shared content item (e.g., a representation or identifying information for the content item is added to a conversation in the messaging app), and a second selectable attribution affordance that provides a link to a location in the second application where information identifying the second shared content item was initially shared. For example, as described with reference to FIGS. 5B2-5B3, user input 5016 selecting the attribution affordance for Song Name-D causes device 100 to display the location where Song Name-D was shared (e.g., in a message conversation with Alex in the messaging application).

Providing in a first (e.g., media) application, a number of representations of shared content items of same or of different types and a number of associated selectable attribution affordances that provide links to respective locations in a second (e.g., messaging) application where information identifying the number of content item were initially shared improves discoverability of shared content of various types, improves discoverability of the message(s) in which the content was shared, improves communication with the contact that has shared the content, and reduces the number of inputs needed to discover shared content and the message that shared the content, reduces clutter in the UI with additional displayed controls, and reduces the number of inputs needed to reply to the contact that shared the content. Further, the selectable attribution affordances provide visual feedback that the content was shared, who shared the content, and how many contacts have shared the content (if more than one). Providing improved visual feedback to the user, reducing the clutter in the UI and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device receives (1036) an input (e.g., tap or long press on the "from" pill) selecting the second selectable attribution affordance, and in response to the input, displays, at the location in the second application, the information identifying the second shared content item (e.g., a location in the second application where the request to share the content item was received) (e.g., as described with reference to FIG. 5B3).

Displaying, upon selecting a second selectable attribution affordance, the information identifying a second shared content item at a location, in the second (e.g., messaging application), where the information was initially shared improves discoverability of shared content, improves discoverability of the conversation in which the content was shared, improves communication with the contact that has shared the content, and reduces the number of inputs needed to discover shared content and the message/conversation that shared the content and reduces the number of inputs needed to reply to the contact that shared the content. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second application is a messaging application that includes a plurality of messaging conversations and the information identifying the second content item was received in a messaging conversation of the plurality of messaging conversations. In some embodiments, in response to receiving the input selecting the second selectable attribution affordance, the electronic device displays (1038) a message within the messaging conversation that includes the information identifying the second shared content item. For example, upon tapping on the selectable attribution affordance, the device displays the messaging conversation and auto-scrolls to the message that includes information identifying the content item as shared content (e.g., the selecting). For example, as illustrated in FIG. 5B3, the device 100 displays the message 5009f in which Song-D was shared.

Displaying, upon selecting a selectable attribution affordance, a previously-received message that includes information identifying a second shared content item improves discoverability of shared content, improves discoverability of the previously-received message in which the second content item was shared, improves communication with the contact that has shared the content, and reduces the number of inputs needed to discover shared content and the message/conversation that shared the content and reduces the number of inputs needed to reply to the contact that shared the content. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the view of the first application is a first view. In some embodiments, while displaying a second view of the first application, in accordance with a determination that the first shared content item is a single media file (e.g., a single song, book, recording, video, etc.), the electronic device displays (1040) a first attribution affordance (e.g., a badge showing an avatar of the contact that shared the content; near a representation of the collection of items) near a representation of the single media file, wherein the first attribution affordance indicates that information identifying the single media file as shared content was received by the second application, and in accordance with a determination that the first shared content item is a collection of media (e.g., a playlist, an album, a TV series, etc.), displays a second attribution affordance (e.g., a badge showing an avatar of the contact that shared the content; near a representation of the collection of items) near a representation of the collection of media, wherein the second attribution affordance indicates that information identifying the collection of media as shared content was received by the second application. For example, as illustrated in FIG. 5C2, a representation of a playlist 5054c (e.g., a collection of media items) is displayed with information identifying that playlist 5054c is shared by "Joe" and a representation of an individual media item (e.g., Song Name-A) is displayed with information identifying that Song Name-A is shared by Alex.

Displaying an attribution affordance near a representation of a single media file and displaying an attribution affordance near a representation of the collection of media based on whether the shared content is a single media file or a collection of media provides visual feedback to user indicate at what granularity level the content has been shared. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first attribution affordance is (1042) an avatar overlapping the representation of the single media file, and the second attribution affordance is an avatar overlapping the representation of the collection of media (e.g., as illustrated in FIG. 5C2).

Displaying an avatar overlapping a representation of a single media file and displaying an avatar overlapping a representation of a collection of media based on whether the shared content is a single media file or a collection of media provides visual feedback to user indicating who shared the content and at what granularity level the content has been shared. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first attribution affordance is (1044) selectable and provides a link to a location in the second application where information identifying the single media file as shared content was received, and wherein the second attribution affordance is selectable and provides a link to a location in the second application where information identifying the collection of media as shared content was received. In some embodiments, the overlapping avatars are selectable and provide the same functionality as the selectable pills (e.g., as illustrated in FIG. 5C2).

Providing in a first (e.g., media) application, a number of representations of shared content items and a number of associated selectable avatars that provide links to respective locations in a second (e.g., messaging) application where information identifying the number of content item were initially shared improves discoverability of shared content and the message in which the content was shared, improves communication with the contact that has shared the content, and reduces the number of inputs needed to discover shared content and the message that shared the content, reduces clutter in the UI with additional displayed controls, and reduces the number of inputs needed to reply to the contact that shared the content. Further, the selectable attribution affordances provide visual feedback that the content was shared, who shared the content, and how many contacts have shared the content (if more than one). Providing improved visual feedback to the user, reducing the clutter in the UI and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the selectable attribution affordance is (1046) a pill user interface object and the selectable attribution affordance is displayed near the representation of the first shared content item (e.g., as illustrated in FIG. 5C2).

Displaying a pill user interface object near representation of the shared content item provides visual feedback to the user of who shared or how many contacts have shared the content, and provides a mechanism for displaying the conversation/message in which the content item was originally shared, thereby reducing the number of inputs needed to perform the operation. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the memory stores (1048) a plurality of contacts of a user of the electronic device, and wherein the electronic device receives from the plurality of contacts information identifying one or more shared content items. For example, as described with reference to FIG. 5A6, "Alex" is a contact that shared Song Name-A with the user of device 100.

Providing a selectable attribution affordance that provides a link to a location in a second (e.g., messaging) application where information identifying the content item was initially shared only for content that has been shared by a contact (as opposed to a user that is not contact) improves relevancy of displayed representations of shared content in the first (e.g., media) applications and reduces the number of inputs needed to perform an operation. Reducing the number of inputs needed to interact with shared content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the selectable attribution affordance further indicates (1050) a number of contacts of the plurality of contacts that included the information identifying the one or more shared content items in one or more messages received by the second application. For example, the selectable attribution affordance shows how many people shared the same content item, e.g., by displaying a text label "Shared by X contacts" or "Shared From X contacts", where X is the number of contacts that shared the same content item. For example, as illustrated in FIGS. 5A6 and 5F1, selectable pill 5056*c* indicates that Song Name-C is shared "From 3 People."

Displaying an indicator of the number of contacts that shared the content item provides additional visual feedback. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the electronic device receives (1052) a first input selecting the selectable attribution affordance (e.g., tap or long press on the "from" pill). In some embodiments, in response to receiving the input selecting the selectable attribution affordance, in accordance with a determination that a number of contacts of the plurality of contacts shared the information identifying the first shared content item, the electronic device displays a disambiguation user interface that includes a plurality of selectable contact affordances, each selectable contact affordance associated with a separate one of the number of contacts of the plurality of contacts. For example, as described with reference to FIG. 5F1-5F2, device 100 displays information related each contact that shared Song Name-C.

Displaying a disambiguation interface if more than one contact has shared same content item reduces the number of inputs needed to perform to reply to one of the contacts. Reducing the number of inputs needed to interact the contacts that have shared the content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device receives (1054) second input selecting a contact affordance of the plurality of selectable contact affordances, where the selected contact affordance is associated with a particular contact. In some embodiments, in response to the second input, the electronic device displays a view of the second application including a message sent by the particular contact and that includes the information identifying the first shared content. (e.g., a location in the second application where the request to share the content item was received). For example, as described with reference to FIG. 5F2, a user may select option 574 to view the communication application in which the selected media item was shared (e.g., and/or reply or initiate a conversation with the respective contact).

Displaying, upon selecting a contact affordance, a message that includes the information identifying the shared content item improves discoverability of shared content, improves discoverability of the message in which the content was shared, improves communication with a selected contact from the number of contacts that have shared the content, and reduces the number of inputs needed to discover shared content and the message/conversation that shared the content and reduces the number of inputs needed to reply to the contact that shared the content. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, each contact affordance of the plurality of selectable contact affordances is displayed (1056) as a pill user interface object, including an option to send a message and an option for virtual co-presence communication (e.g., an expanse option). For example, as described with reference to FIG. 5F2, option 574 and option 575 are displayed for each contact.

Displaying contact affordances as a pill user interface object that includes an option to send a message and an option for virtual co-presence communication provides additional visual feedback and provide control options without cluttering the UI with additional displayed controls or menu hierarchies. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the view of the first application, the electronic device displays (1058) an indicator of the number of content items for which information identifying the shared content items were received by the second application. In some embodiments, the number of content items that are shared (or for which information identifying the content as shared content) may be higher than what the view of the first application may accommodate. For example, as described with reference to FIGS. 5C1-5C2, in the "See All" user interface, a number of shared content items (e.g., 5 items) is displayed in indicator 5075a.

Displaying an indicator of the number of (e.g., shared) content items provides additional visual feedback. Providing improved visual feedback to the user, and (e.g., automatically) providing additional control options without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 10A-10E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900 and 1100) are also applicable in an analogous manner to method 1000 described above with respect to FIGS. 10A-10E. For example, the user inputs described above with reference to method 900 optionally have one or more of the characteristics of the user inputs described herein with reference to other methods described herein (e.g., methods 800, 900 and 1100). For brevity, these details are not repeated here.

FIGS. 11A-11D are flow diagrams illustrating method 1100 of highlighting representations of content items such that the highlighted representations of the content items are available in another application in accordance with some embodiments. Method 1100 is performed at an electronic device (e.g., device 300, FIG. 3, or portable multifunction device 100, FIG. 1A) that is in communication with (e.g., includes) a display generation component (e.g., a display device, optionally touch-sensitive, a projector, a head-mounted display, a heads-up display, or the like) and one or more input devices (e.g., including one or more sensors to detect intensity of contacts with the touch-sensitive surface). In some embodiments, the display generation component is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

As described herein, method 1100, provides a user interface control in a first application for highlighting the content item in another application and automatically makes a representation of the content item available in the second application. Automatically highlighting content within respective applications (e.g., where that content is typically provided, viewed or listened to), improves discoverability of that content without the need of additional user inputs and reduces the number of inputs needed to perform an operation. Reducing the number of inputs needed to perform an enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device displays (1102) a representation of a content item (e.g., or information identifying the content item as shared content) in a first application (e.g., a communication application such as an instant messaging application, a mail application, or a social media application) of a plurality of applications, where the content item is of a first type.

In some embodiments, the electronic device is associated with a user of the electronic device (e.g., a user that have access to functionality on the electronic device such as an owner of the electronic device or an authorized user of the electronic device.

While displaying the representation of the content item in the first application, the electronic device receives (1104) an input highlighting the representation of the content item. For example, the electronic device receives an input selecting a control (e.g., user interface element) to highlight the content item, as described with reference to FIGS. 5E5-5E6. In some embodiments, the control includes an indicator in the form of a star, a pin, a heart, or other icon. In response to receiving the input highlighting the representation of the content item, the electronic device marks (e.g., stores) the representation of the content item as a highlighted item (e.g., a favorite item). In some embodiments, in response to the user highlighting a content item (e.g., within a first application (a messaging application)), the representation of the content item is marked as highlighted (e.g., without automatically saving the highlighted item to a media library (of a media application)).

The electronic device receives (1106) an instruction to display a second application that is associated with content of the first type (e.g., the second application is designated as a default application to handle content of the first type and/or is capable of handling (e.g., presenting, displaying, etc.) content of the first type. For example, music application handles music media content, a web browser handles weblinks, a podcast application handles podcasts, etc. For example, as described with reference to FIGS. 5I1-5I10, different types of content are displayed within different applications.

In response to receiving the instruction, the electronic device (automatically) displays (1108) a representation of the content item in the second application. For example, as explained with reference to FIGS. 5A4-5A6.

In some embodiments, the first application is not (1110) associated with content of the first type (e.g., is not able to open or display that content) and the second application is different from the first application. For example, the first application is not an application designed for collaboration or sharing of files and the second application is not an application designed for collaboration (e.g., the second application handles media content, but not communication).

Automatically displaying a representation of a content item in multiple distinct applications without requiring the user to provide inputs to select or add the item within the different application improves the visual feedback for the user. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first application is (1112) a messaging application (e.g., a communication application, such as an instant messaging application, a mail application, or a social media application) available on the electronic device. In some embodiments, before displaying a representation of a content item, the electronic device receives, by the messaging application, the content item. In some embodiments, the content item is received from a third party (e.g., another user and/or another device) or from the user of the electronic device. For example, as described with reference to FIG. 5A4, device 100 receives a plurality of content items in the messaging application.

Automatically displaying a representation of a content item that is received via a messaging application in a media application distinct from the messaging application without requiring the user to provide inputs to select or add the item from the messaging application to the media application improves the visual feedback for the user. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first application is a messaging application (e.g., an instant messaging application, a mail application, or a social media application), and the electronic device, before displaying a representation of a content item, receives (1114), by the messaging application, information identifying a plurality of content items as shared content, wherein each of the plurality of content items is of the first type. In some embodiments, in response to receiving the information identifying the plurality of content items as shared content, the electronic device displays, within the second application, representations of the plurality of content items. For example, as illustrated in FIG. 5A6 representations of a shared content item (received by messaging application in FIG. 5A4) is displayed within the music application.

Automatically displaying a representation of content items of a first type that are received via a messaging application in a media application for viewing the content items of the first type without requiring the user to provide inputs to select or add the content items from the messaging application to the media application improves the visual feedback for the user. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the representations of the plurality of content items are not marked as highlighted in the second application, wherein displaying, in the second application, the representation of the content item and the representations of the plurality of content items further comprises (1116) displaying, in the second application, the representation of the content item and the representations of the plurality of content items in a dedicated section in the second application, where the representation of the content item that was highlighted is displayed first (or on top). For example, as illustrated in FIG. 5E8, device 100 displays a "Highlights" section of the Music application user interface. In some embodiments, highlight indicator 598-2 is optionally not displayed. In some embodiments, the second application includes a section that displays content items of the first type that are shared in the messaging application. For example, content items of the same type are grouped together to be displayed in a "shared with you" section in the respective application. In some embodiments, content items that are identified as shared and are highlighted appear on the top of the list (e.g., indicating higher priority or importance) compared to content items that are identified as shared but not highlighted. In some embodiments, not all content items of the same type that are identified as shared are grouped together for display (e.g., only a subset of the shared content items are displayed at a respective time). In some embodiments, only most relevant content items are displayed, where relevancy may be determined based on a variety of criteria including whether content item has been marked as highlighted or not.

Automatically displaying a representation of content items, received via a messaging application, that have been marked as highlighted, in a media application for viewing the content items in a specified portion of the user interface of the media application, without displaying content items that have not been highlighted, improves the visual feedback to the user by allowing the user to easily view the highlighted content items (e.g., within the specified portion) without requiring the user to navigate through complex menu hierarchies to search through all of the content to find the highlighted content. Performing an operation (e.g., automatically) when a set of conditions has been met without requiring further user input and providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, receiving the input highlighting the representation of the content item further comprises (1118) receiving a selection of the representation of the content item, displaying a control menu (e.g., including controls 594, described with reference to FIG. 5E3) that includes an affordance (e.g., control 598-1) for highlighting the representation of the content item, receiving a selection of the affordance for highlighting the representation of the content item, and in response to receiving the selection of the affordance for highlighting the representation of the content item, displaying an indication that the representation of the content item has been highlighted, as described with reference to FIGS. 5E5-5E6. For example, a color of the affordance is changed.

Providing a control that allows a user to highlight individual items as a favorite provides additional control options that the user can select easily without needing to navigate through complex menu hierarchies, improves the user experience, and provides improved visual feedback by updating the display after the item has been highlighted. Providing improved visual feedback to the user, and (e.g., automatically) providing additional control options when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while displaying a user interface of the second application, the electronic device automatically (e.g., without additional user input) displays (1120) the highlighted content item and a highlight indicator (e.g., a start indicator) associated with the content item, the highlighter indicator indicating that the content item has been highlighted. For example, as illustrated in FIGS. 5E5-5E8, highlighted "Song A" is displayed in the music application (shown in FIG. 5E8) with highlight indicator 598-2. In some embodiments, the indicator is a star indicator on top of the content item such a star on top of a photo, or a star on top of a music artist or a song, etc.

Providing an indication that an item has been highlighted as a favorite provides improved visual feedback by updating the display of the item after the item has been highlighted, such that the user can easily identify which items have been highlighted. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the highlighted content item and the highlight indicator are displayed (1122) in a dedicated section in the user interface of the second application, the dedicated section displaying other content items of the first type that are highlighted. For example, as illustrated in FIG. 5E8, the second application (e.g., music application) includes a Highlight section (e.g., that is automatically generated and/or curated from content items that are highlighted in the messaging application.

Displaying content items that have been highlighted in a distinct portion of the user interface provides improved visual feedback such that the user can easily identify which items have been highlighted based on the item appearing in the distinct portion of the user interface. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first application is a messaging application (e.g., an instant messaging application, a mail application, or a social media application). In some embodiments, the electronic device, prior to displaying a representation of a content item, receives (1124), by the messaging application, information identifying the content items as shared content and in response to receiving the information, does not make the content item automatically available for display within the second application. In some embodiments, content items that are identified as shared are not made available in the second application in accordance with a determination that providing information identifying the content as shared content to the second application has not been authorized for the first type of content. For example, whether information about content identified as shared in the messaging application is or is not provided to a corresponding application (e.g., one that is designed to read and open such content) can be enabled or disabled for a particular application and/or content type (as described with reference to FIGS. 7A-7D). For example, marking (e.g., highlights) the content supersedes or overrides the absence of authorization for proving information identifying the content item as shared content to the second application. In other words, even though the content item is of the same type as the plurality of content items and that, based on the lack of authorization, would not have been made available, the marking of the content item as highlighted provides such authorization.

Providing a control that allows a user to highlight individual items as a favorite, without automatically displaying the item in another media application when sharing integration functionality is not turned on, provides additional control options and improves visual feedback to the user by allowing the user to mark an item as a favorite even when the media application does not display the item. Providing improved visual feedback to the user, and (e.g., automatically) providing additional control options when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the representation of the content item is displayed (1126) in a shared content section of a plurality of sections of the second application and the representation of the content item is displayed in a highlighted section of a plurality of sections of the second application (e.g., without additional user input) indicating that the content item was highlighted. In some embodiments, the plurality of sections includes a section for displaying the highlighted content, a second for displaying trending content, a For You section, and/or a search section. For example, the plurality of sections includes a For You section (e.g., that is automatically generated and/or curated from content items that are identified as shared in the messaging application). In some embodiments, the plurality of sections includes a Highlight section (e.g., that is automatically generated and/or curated from content items that are highlighted in the messaging application).

Displaying content items that have been highlighted in a distinct portion of a user interface for a media application provides improved visual feedback such that the user can easily identify which items have been highlighted based on the item appearing in the distinct portion of the user interface in the media application, even when the user highlights the item in a different (e.g., messaging) application. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first application is a messaging application, and the electronic device receives (1128) a search request (e.g., a text search) having search criteria (e.g., the search request defines the search criteria). In some embodiments, the search request comprises one or more search terms and the search criteria comprises content items that are associated with the one or more search terms. In some embodiments, the search criteria comprises one or more categories of content (or types of content), including photos, links, videos, locations, contacts or people. For example, the user may select a category of content items to be search in the first application and the results will display a list of items that belong to the selected category. In some embodiments, in response to receiving the search request, the electronic device concurrently displays representations of one or more content items that are not marked as highlighted (e.g., content items that have been referenced in one or more messages of the messaging application but were not marked as highlighted), and the representation of the content item that is marked as highlighted, wherein the representation of the content item that is marked as highlighted appears more prominently as compared to the representations of one or more content items that are not marked as highlighted. In some embodiments, the one or more content items from the first application may be different types of content (e.g., according to the search criteria used). In some embodiments, the electronic device displays the representation of the content item that is marked as highlighted appears more prominently comprises, including displaying the representation of the highlighted content item on top of (e.g., as a first item in) a list, as a larger size (e.g., relative to the representation of the one or more (not highlighted) content items), and/or marked with a highlight indicator to provide visual feedback for the relevance of the content item. In some embodiments, the device displays a search user interface (e.g., illustrated in FIG. 5H) with a search bar for searching the content.

Selecting a set of content items that satisfy search criteria and automatically prioritizing for display content items that have been highlighted improves the user experience and provides improved visual feedback to the user by displaying prominently within search results, for the user, those content items that are marked as highlighted and that satisfy the search criteria. This allows the user to easily navigate to content items that are deemed more relevant or important by the user of the electronic device. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the search request is (1130) for content in one of the first application, the second application, or both the first and second applications.

Displaying an option to search within a plurality of different applications, and providing search results that automatically prioritize displaying highlighted items over items that have not been highlighted, regardless of the application in which the user is searching, improves the user experience and provides improved visual feedback to the user by displaying prominently within search results, for the user, those content items that are marked as highlighted and that satisfy the search criteria. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first application is a messaging application (e.g., an instant messaging application, a mail application, or a social media application), and the electronic device receives (1132), in a messaging conversation in the messaging application, information identifying the content item as shared content, wherein a request to share the content item is initiated from a remote messaging application on a remote electronic device. In some embodiments, the electronic device receives, in the messaging conversation, information identifying a plurality of content items as shared content, wherein each of the plurality of content items is of the first type. In some embodiments, in response to receiving the information identifying the plurality of content items as shared content, the electronic device does not make the plurality of content items automatically available for display within the second application. For example, content items that are identified as shared are not made available in the second application in accordance with a determination that providing information identifying the content as shared content to the second application has not been authorized for the first type of content. For example, whether information about content identified as shared in the messaging application is or is not provided to a corresponding application (e.g., one that is designed to read and open such content) can be enabled or disabled for a particular application and/or content type. In some embodiments, the electronic device receives an additional input to highlight the representation of the content item and in response to the additional input, marks the content item as highlighted and making the content item available for display in the second application. For example, marking the content supersedes or overrides the absence of authorization for proving information identifying the content item as shared content to the second application. In other words, even though the content item is of the same type as the plurality of content items and that, based on the lack of authorization, would not have been made available, the marking of the content item as highlighted provides such authorization.

Allowing a user to select and highlight one or more shared items, and automatically displaying the highlighted shared items within a distinct media application, provides additional control options to the user and improves visual feedback to the user by automatically updating display of the media application to include highlighted items without displaying all of the items that have been shared (e.g., but have not been highlighted). Providing improved visual feedback to the user, and (e.g., automatically) providing additional control options when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first application is a messaging application, and the information identifying the content item as shared content is received in a first messaging conversation of a plurality of messaging conversations in the messaging application. In some embodiments, the electronic device receives (1134) an additional input to display information about the first messaging conversation and displays information about the first messaging conversation including an indication that the representation of the content item was highlighted. For example, as described with reference to user input 524 in FIG. 5G2, additional information is provided about the selected message conversation for "Costa Rica Trip."

Providing control options for the user that allow the user to view additional information about one or more shared items that were shared within a selected conversation, provides additional control options to the user and improves visual feedback to the user by displaying the additional information about the selected conversation without requiring the user to navigate through complex menu hierarchies. Providing improved visual feedback to the user, and (e.g., automatically) providing additional control options when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first application is a messaging application available on the electronic device and the input selecting the representation of the content item is a first input. In some embodiments, the electronic device receives (1136), by the messaging application, information identifying the content item as shared content, wherein a request to share the content item is initiated from a remote messaging application on a remote electronic device. In some embodiments, the electronic device receives a second input directed at the control for highlighting the content item in the second application and in response to the second input, marks the content item as highlighted and making the content item available in the second application (e.g., as described with reference to FIGS. 5E1-5E6).

Automatically displaying representations of shared content items, received via a messaging application, that have been marked as highlighted, in a distinct media application for viewing the content items, improves the visual feedback to the user by allowing the user to easily view the highlighted content items in the media application without requiring the user to navigate through complex menu hierarchies to search through all of the content in the media application to find the highlighted content. Performing an operation (e.g., automatically) when a set of conditions has been met without requiring further user input and providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the electronic device, in response to receiving the input, displays (1138) a set of controls, including the control for highlighting the content item (e.g., as illustrated in FIG. 5E5). For example, when a user of the electronic device selects the representation of the content item, a set of controls are activated and displayed that are associated with the content item. In some embodiments, the set of controls include various controls (e.g., controls 594) for providing a user reaction associated with the content item. In some embodiments, the set of controls include a control for sending a messaging associated with the content item (e.g., reply control 599).

Providing control options for the user, including a control option that allows the user to highlight the content item, in addition to other control options, improves visual feedback to the user by providing the user with a plurality of control options without requiring the user to navigate through complex menu hierarchies. Providing improved visual feedback to the user, and (e.g., automatically) providing additional control options when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the second application is (1140) a music application, a photos application, or a video application (e.g., as described with reference to FIGS. 5I1-5I10). In some embodiments, the first application is a media application (e.g., Music Application, TV application, News Application, Books application, Articles application, etc. In some embodiments, the first application is not an application designed for collaboration or sharing of files.

Automatically displaying representations of shared content items, received via a messaging application, that have been marked as highlighted, in a music application, a photos application, or a video application, depending on the type of shared content, improves the visual feedback to the user by allowing the user to easily view the highlighted content items within the respective media application designed to view the type of shared content. Performing an operation (e.g., automatically) when a set of conditions has been met without requiring further user input and providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, highlighting the representation of the content item in the first application comprises (1142) marking the representation in the first application to indicate that the content item is highlighted (e.g., as explained with reference to FIGS. 5E5-5E6).

Providing a control that allows a user to mark an individual item, and in response to the user marking the item, updates display of the control to indicate that the item has been marked provides real-time visual feedback to the user by automatically updating the display after the item has been highlighted. Providing improved visual feedback to the user, and (e.g., automatically) providing additional control options when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the second application is available (e.g., installed, stored, can be opened from the electronic device, etc.) on the electronic device. In some embodiments, the second application is available on a remote electronic device (e.g., another device from which the content was received and/or another device associated with the user of device 100). In some embodiments, a user of the electronic device may be associated with more than one device (e.g., a user may own, have control over, or access to a laptop, a tablet, a smartphone, a smart TV, etc.). When the user highlights content item via the electronic device, the content may automatically appear in a version of the second application installed on the electronic device and on a version of the second application installed on the remote electronic device. In some embodiments, the user is required to authorize the automatic sharing of information about the highlighted content for the electronic device and/or for the remote electronic device. In some embodiments, a request to share the content item is initiated from a remote messaging application on a remote electronic device.

It should be understood that the particular order in which the operations in FIGS. 11A-11D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900 and 1000) are also applicable in an analogous manner to method 1100 described above with respect to FIGS. 11A-11D. For example, the user inputs described above with reference to method 900 optionally have one or more of the characteristics of the user inputs described herein with reference to other methods described herein (e.g., methods 800, 900 and 1000. For brevity, these details are not repeated here.

The operations described above with reference to FIGS. 8A-8D, 9A-9F, 10A-10E and 11A-11D are, optionally, implemented by components depicted in FIGS. 1A-1B. For example, receiving operation 802 and displaying operation 1001 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

What is claimed is:

1. A method, including:
at a computer system that is in communication with a display generation component and one or more input devices:
receiving, by one or more receiving applications of a plurality of applications, information identifying a plurality of shared content items including a first shared content item;
in response to receiving the information:
in accordance with a determination that the first shared content item is of a first type associated with a first application of the plurality of applications, automatically making the first shared content item available to the first application, such that when the first application is opened, information identifying the first shared content item aggregated with information identifying other shared content items of the first type from the plurality of shared content items are concurrently displayed in a dedicated section of the first application;
in accordance with a determination that the first shared content item is of a second type associated with a second application of the plurality of applications, automatically making the first shared content item available to the second application, such that when the second application is opened, information identifying the first shared content item aggregated with information identifying other shared content items of the second type from the plurality of shared content items are concurrently displayed in a dedicated section of the second application;
receiving, via the one or more input devices, a request to open the first application; and
in response to receiving the request to open the first application and in accordance with a determination that the first shared content item is of the first type, concurrently displaying information identifying the first shared content item and information identifying the other shared content items of the first type in the dedicated section of the first application and a second plurality of content items of the first type in a portion of the first application other than the dedicated section.

2. The method of claim 1, wherein the second type is different from the first type, the first application is not associated with content of the second type, and the second application is not associated with content of the first type.

3. The method of claim 1, wherein the information identifying the first shared content item is received by a first receiving application of the one or more receiving applications, and the method includes:
receiving, by a second receiving application of the one or more receiving applications, information identifying a second shared content item, wherein the second receiving application is different from the first receiving application;
in response to receiving the information:
in accordance with a determination that the second shared content item is of the first type, automatically making the second shared content item available to the first application of the plurality of applications, such that when the first application is opened, information identifying the second shared content item and information identifying other shared content items of the first type are concurrently displayed in the dedicated section of the first application; and
in accordance with a determination that the second shared content item is of the second type, automatically making the second shared content item available to the second application of the plurality of applications, such that when the second application is opened, information identifying the second shared content item and information identifying other shared content items of the second type are concurrently displayed in the dedicated section of the second application.

4. The method of claim 1, wherein the information identifying the first shared content item is received in a first location of a first receiving application of the one or more receiving applications, and the method includes:
receiving, in a second location of the first receiving application, information identifying a third shared content item;
in response to receiving the information identifying the third shared content item:
in accordance with a determination that the third shared content item is of the first type, automatically making the third shared content item available to the first application of the plurality of applications, such that when the first application is opened, information identifying the third shared content item and information identifying other shared content items of the first type are concurrently displayed in the dedicated section of the first application; and
in accordance with a determination that the third shared content item is of the second type, automatically making the third shared content item available to the second application of the plurality of applications, such that when the second application is opened, information identifying the third shared content item and information identifying other shared content items of the second type are concurrently displayed in the dedicated section of the second application.

5. The method of claim 1, wherein the first shared content item is of the first type, and wherein the method further comprises:
at the computer system, receiving a user input to add the first shared content item to a library of the first application; and
in response to receiving the user input to add the first shared content item to the library of the first application, adding the first shared content item to the library of the first application.

6. The method of claim 5, wherein the first shared content item is not automatically added to the library of the first application in response to receiving the information identifying the first shared content item.

7. The method of claim 1, further comprising, in response to receiving the information identifying the first shared content item and in accordance with the determination that the first shared content item is of the second type:
automatically adding the first shared content item to a library of the second application of the plurality of applications.

8. The method of claim 1, wherein the dedicated section in the first application and the dedicated section in the second application are visually similar.

9. The method of claim 1, further comprising:
in accordance with a determination that a pre-determined criterion is met for a content item in the other shared content items of the first type, removing the information identifying the content item from display in the dedicated section of the first application.

10. The method of claim 9, wherein the pre-determined criterion is a time-based criterion, and the method further comprises:
in accordance with a determination that a pre-determined amount of time has passed from the time when the content item was shared, removing the information identifying the content item from display in the dedicated section of the first application.

11. The method of claim 1, wherein the first shared content item is of a first type and the first shared content item is received in a first location in a first receiving application of the one or more receiving applications, and wherein automatically making the first shared content item available within the first application includes:
providing a mechanism in the first application for navigating to the first location in the first receiving.

12. The method of claim 11, wherein providing the mechanism in the first application for navigating to the first location in the first receiving application includes:
auto-scrolling to the first location within the first receiving application.

13. The method of claim 1, wherein a request to share the first shared content item is initiated from a remote messaging application on a remote electronic device.

14. The method of claim 1, wherein a plurality of contacts are stored in a contacts application of the plurality of applications, and wherein the method further comprises:
prior to automatically making the first shared content item available within the first application or the second application, determining that the information identifying the first shared content item was received from one or more of the plurality of contacts.

15. The method of claim 14, further comprising:
prior to automatically making the first shared content item available within the first application or the second application, determining that the information identifying the first shared content item was received from a contact of the one or more of the plurality of contacts that meets communication criteria.

16. The method of claim 14, further comprising:
prior to automatically making the first shared content item available within the first application or the second application, determining that the information identifying the first shared content item was received from a contact of the one or more of the plurality of contacts that meets a threshold level of communication.

17. The method of claim 1, wherein a plurality of contacts are stored in a contacts application of the plurality of applications, and wherein the method further comprises:
prior to automatically making the first shared content item available within the first application or the second application, determining that the information identifying the first shared content item was received by a group conversation that meets a threshold level of communication, wherein two or more of the plurality of contacts are participants in the group conversation.

18. The method of claim 1, wherein the first shared content item is received in a first receiving application of the one or more receiving applications and the first receiving application is a messaging application.

19. The method of claim 1, wherein the first shared content item is made available to the first application without opening the first application or the first shared content item is made available to the second application without opening the second application.

20. The method of claim 1, further comprising:
receiving, via the one or more input devices, a request to open the second application; and
in response to receiving the request to open the second application and in accordance with a determination that the first shared content item is of the second type, concurrently displaying information identifying the first shared content item and information identifying the other shared content items of the second type in the dedicated section of the second application and a second plurality of content items of the second type in a portion of the second application other than the dedicated section.

21. A computer system, comprising:
a display generation component;
one or more input devices;
one or more processors; and
memory storing one or more programs, wherein the one or more programs are configured to be executed by the one or more processors, the one or more programs including instructions for:
receiving, by one or more receiving applications of a plurality of applications, information identifying a plurality of shared content items including a first shared content item;
in response to receiving the information:
in accordance with a determination that the first shared content item is of a first type associated with a first application of the plurality of applications, automatically making the first shared content item available to the first application, such that when the first application is opened, information identifying the first shared content item aggregated with information identifying other shared content items of the first type from the plurality of shared content items are concurrently displayed in a dedicated section of the first application;
in accordance with a determination that the first shared content item is of a second type associated with a second application of the plurality of applications, automatically making the first shared content item available to the second application, such that when the second application is opened, information identifying the first shared content item aggregated with information identifying other shared content items of the second type from the plurality of shared content items are concurrently displayed in a dedicated section of the second application;
receiving, via the one or more input devices, a request to open the first application; and
in response to receiving the request to open the first application and in accordance with a determination that the first shared content item is of the first type, concurrently displaying information identifying the first shared content item and information identifying the other shared content items of the first type in the dedicated section of the first application and a second plurality of content items of the first type in a portion of the first application other than the dedicated section.

22. The computer system of claim 21, wherein the second type is different from the first type, the first application is not associated with content of the second type, and the second application is not associated with content of the first type.

23. The computer system of claim 21, wherein the information identifying the first shared content item is received by a first receiving application of the one or more receiving applications, and the one or more programs include instructions for:
  receiving, by a second receiving application of the one or more receiving applications, information identifying a second shared content item, wherein the second receiving application is different from the first receiving application;
  in response to receiving the information:
    in accordance with a determination that the second shared content item is of the first type, automatically making the second shared content item available to the first application of the plurality of applications, such that when the first application is opened, information identifying the second shared content item and information identifying other shared content items of the first type are concurrently displayed in the dedicated section of the first application; and
    in accordance with a determination that the second shared content item is of the second type, automatically making the second shared content item available to the second application of the plurality of applications, such that when the second application is opened, information identifying the second shared content item and information identifying other shared content items of the second type are concurrently displayed in the dedicated section of the second application.

24. The computer system of claim 21, wherein the information identifying the first shared content item is received in a first location of a first receiving application of the one or more receiving applications, and the one or more programs include instructions for:
  receiving, in a second location of the first receiving application, information identifying a third shared content item;
  in response to receiving the information identifying the third shared content item:
    in accordance with a determination that the third shared content item is of the first type, automatically making the third shared content item available to the first application of the plurality of applications, such that when the first application is opened, information identifying the third shared content item and information identifying other shared content items of the first type are concurrently displayed in the dedicated section of the first application; and
    in accordance with a determination that the third shared content item is of the second type, automatically making the third shared content item available to the second application of the plurality of applications, such that when the second application is opened, information identifying the third shared content item and information identifying other shared content items of the second type are concurrently displayed in the dedicated section of the second application.

25. The computer system of claim 21, wherein the first shared content item is of the first type, and wherein the one or more programs include instructions for:
  at the computer system, receiving a user input to add the first shared content item to a library of the first application; and
  in response to receiving the user input to add the first shared content item to the library of the first application, adding the first shared content item to the library of the first application.

26. The computer system of claim 25, wherein the first shared content item is not automatically added to the library of the first application in response to receiving the information identifying the first shared content item.

27. The computer system of claim 21, wherein the one or more programs include instructions for:
  in response to receiving the information identifying the first shared content item and in accordance with the determination that the first shared content item is of the second type:
    automatically adding the first shared content item to a library of the second application of the plurality of applications.

28. The computer system of claim 21, wherein the dedicated section in the first application and the dedicated section in the second application are visually similar.

29. The computer system of claim 21, wherein the one or more programs include instructions for:
  in accordance with a determination that a pre-determined criterion is met for a content item in the other shared content items of the first type, removing the information identifying the content item from display in the dedicated section of the first application.

30. The computer system of claim 29, wherein the pre-determined criterion is a time-based criterion, and the one or more programs include instructions for:
  in accordance with a determination that a pre-determined amount of time has passed from the time when the content item was shared, removing the information identifying the content item from display in the dedicated section of the first application.

31. The computer system of claim 21, wherein the first shared content item is of a first type and the first shared content item is received in a first location in a first receiving application of the one or more receiving applications, and the one or more programs include instructions for:
  providing a mechanism in the first application for navigating to the first location in the first receiving.

32. The computer system of claim 31, wherein providing the mechanism in the first application for navigating to the first location in the first receiving application includes:
  auto-scrolling to the first location within the first receiving application.

33. The computer system of claim 21, wherein a request to share the first shared content item is initiated from a remote messaging application on a remote electronic device.

34. The computer system of claim 21, wherein a plurality of contacts are stored in a contacts application of the plurality of applications, and wherein the one or more programs include instructions for:
  prior to automatically making the first shared content item available within the first application or the second application, determining that the information identifying the first shared content item was received from one or more of the plurality of contacts.

35. The computer system of claim 34, wherein the one or more programs include instructions for:
  prior to automatically making the first shared content item available within the first application or the second application, determining that the information identifying the first shared content item was received from a contact of the one or more of the plurality of contacts that meets communication criteria.

36. The computer system of claim 34, wherein the one or more programs include instructions for:
  prior to automatically making the first shared content item available within the first application or the second application, determining that the information identifying the first shared content item was received from a contact of the one or more of the plurality of contacts that meets a threshold level of communication.

37. The computer system of claim 21, wherein a plurality of contacts are stored in a contacts application of the plurality of applications, and wherein the one or more programs include instructions for:
prior to automatically making the first shared content item available within the first application or the second application, determining that the information identifying the first shared content item was received by a group conversation that meets a threshold level of communication, wherein two or more of the plurality of contacts are participants in the group conversation.

38. The computer system of claim 21, wherein the first shared content item is received in a first receiving application of the one or more receiving applications and the first receiving application is a messaging application.

39. The computer system of claim 21, wherein the first shared content item is made available to the first application without opening the first application or the first shared content item is made available to the second application without opening the second application.

40. The computer system of claim 21, wherein the one or more programs include instructions for:
receiving, via the one or more input devices, a request to open the second application; and
in response to receiving the request to open the second application and in accordance with a determination that the first shared content item is of the second type, concurrently displaying information identifying the first shared content item and information identifying the other shared content items of the second type in the dedicated section of the second application and a second plurality of content items of the second type in a portion of the second application other than the dedicated section.

41. A non-transitory computer readable storage medium storing one or more programs, the one or more programs comprise instructions, which, when executed by a computer system with a display generation component, and one or more input devices, cause the computer system to:
receive, by one or more receiving applications of a plurality of applications, information identifying a plurality of shared content items including a first shared content item;
in response to receiving the information:
in accordance with a determination that the first shared content item is of a first type associated with a first application of the plurality of applications, automatically make the first shared content item available to the first application, such that when the first application is opened, information identifying the first shared content item aggregated with information identifying other shared content items of the first type from the plurality of shared content items are concurrently displayed in a dedicated section of the first application;
in accordance with a determination that the first shared content item is of a second type associated with a second application of the plurality of applications, automatically make the first shared content item available to the second application, such that when the second application is opened, information identifying the first shared content item aggregated with information identifying other shared content items of the second type from the plurality of shared content items are concurrently displayed in a dedicated section of the second application;
receive, via the one or more input devices, a request to open the first application; and
in response to receiving the request to open the first application and in accordance with a determination that the first shared content item is of the first type, concurrently display information identifying the first shared content item and information identifying the other shared content items of the first type in the dedicated section of the first application and a second plurality of content items of the first type in a portion of the first application other than the dedicated section.

42. The non-transitory computer readable storage medium of claim 41, wherein the second type is different from the first type, the first application is not associated with content of the second type, and the second application is not associated with content of the first type.

43. The non-transitory computer readable storage medium of claim 41, wherein the information identifying the first shared content item is received by a first receiving application of the one or more receiving applications, and the one or more programs comprise instructions, which, when executed further cause the computer system to:
receive, by a second receiving application of the one or more receiving applications, information identifying a second shared content item, wherein the second receiving application is different from the first receiving application;
in response to receiving the information identifying the second shared content item:
in accordance with a determination that the second shared content item is of the first type, automatically make the second shared content item available within the first application of the plurality of applications; and
in accordance with a determination that the second shared content item is of the second type, automatically make the second shared content item available within the second application of the plurality of applications.

44. The non-transitory computer readable storage medium of claim 41, wherein the information identifying a first shared content item is received in a first location of a first receiving application of the one or more receiving applications, and the one or more programs comprise instructions, which, when executed further cause the computer system to:
receive, in a second location of the first receiving application, information identifying a third shared content item;
in response to receiving the information identifying the third shared content item:
in accordance with a determination that the third shared content item is of the first type, automatically make the third shared content item available within the first application of the plurality of applications; and
in accordance with a determination that the third shared content item is of the second type, automatically make the third shared content item available within the second application of the plurality of applications.

45. The non-transitory computer readable storage medium of claim 41, wherein the first shared content item is of the first type, and the one or more programs comprise instructions, which, when executed further cause the computer system to:

at the computer system, receive a user input to add the first shared content item to a library of the first application; and in response to receiving the user input to add the first shared content item to the library of the first application, add the first shared content item to the library of the first application.

46. The non-transitory computer readable storage medium of claim 41, wherein the first shared content item is not automatically added to a library of the first application in response to receiving the information identifying the first shared content item.

47. The non-transitory computer readable storage medium of claim 41, wherein the one or more programs comprise instructions, which, when executed further cause the computer system to:

in response to receiving the information identifying the first shared content item and in accordance with the determination that the first shared content item is of the second type:

automatically add the first shared content item to a library of the second application of the plurality of applications.

48. The non-transitory computer readable storage medium of claim 41, wherein the dedicated section in the first application and the dedicated section in the second application are visually similar.

49. The non-transitory computer readable storage medium of claim 41, wherein the one or more programs comprise instructions, which, when executed further cause the computer system to:

in accordance with a determination that a pre-determined criterion is met for a content item in the other shared content items of the first type, remove the information identifying the content item from display in the dedicated section of the first application.

50. The non-transitory computer readable storage medium of claim 49, wherein the one or more programs comprise instructions, which, when executed further cause the computer system to:

in accordance with a determination that a pre-determined amount of time has passed from the time when the content item was shared, remove the information identifying the content item from display in the dedicated section of the first application.

51. The non-transitory computer readable storage medium of claim 41, wherein the first shared content item is of a first type and the first shared content item is received in a first location in a first receiving application of the one or more receiving applications, and wherein the one or more programs comprise comprising instructions, which, when executed further cause the computer system to:

provide a mechanism in the first application for navigating to the first location in the first receiving.

52. The non-transitory computer readable storage medium of claim 51, wherein providing the mechanism in the first application for navigating to the first location in the first receiving application includes:

auto-scrolling to the first location within the first receiving application.

53. The non-transitory computer readable storage medium of claim 41, wherein a request to share the first shared content item is initiated from a remote messaging application on a remote electronic device.

54. The non-transitory computer readable storage medium of claim 41, wherein a plurality of contacts are stored in a contacts application of the plurality of applications, and wherein the one or more programs comprise instructions, which, when executed further cause the computer system to:

prior to automatically making the first shared content item available within the first application or the second application, determine that the information identifying the first shared content item was received from one or more of the plurality of contacts.

55. The non-transitory computer readable storage medium of claim 54, wherein the one or more programs comprise instructions, which, when executed further cause the computer system to:

prior to automatically making the first shared content item available within the first application or the second application, determine that the information identifying the first shared content item was received from a contact of the one or more of the plurality of contacts that meets communication criteria.

56. The non-transitory computer readable storage medium of claim 54, wherein the one or more programs comprise instructions, which, when executed further cause the computer system to:

prior to automatically making the first shared content item available within the first application or the second application, determine that the information identifying the first shared content item was received from a contact of the one or more of the plurality of contacts that meets a threshold level of communication.

57. The non-transitory computer readable storage medium of claim 41, wherein a plurality of contacts are stored in a contacts application of the plurality of applications, and the one or more programs comprise instructions, which, when executed further cause the computer system to:

prior to automatically making the first shared content item available within the first application or the second application, determine that the information identifying the first shared content item was received by a group conversation that meets a threshold level of communication, wherein two or more of the plurality of contacts are participants in the group conversation.

58. The non-transitory computer readable storage medium of claim 41, wherein the first shared content item is received in a first receiving application of the one or more receiving applications and the first receiving application is a messaging application.

59. The non-transitory computer readable storage medium of claim 41, wherein the first shared content item is made available to the first application without opening the first application or the first shared content item is made available to the second application without opening the second application.

60. The non-transitory computer readable storage medium of claim 41, wherein the one or more programs comprise instructions, which, when executed further cause the computer system to:

receive, via the one or more input devices, a request to open the second application; and in response to receiving the request to open the second application and in accordance with a determination that the first shared content item is of the second type, concurrently display information identifying the first shared content item and information identifying the other shared content items of the second type in the dedicated section of the second application and a second plurality of content items of the second type in a portion of the second application other than the dedicated section.

* * * * *